US006870878B1

(12) United States Patent
Doi et al.

(10) Patent No.: US 6,870,878 B1
(45) Date of Patent: Mar. 22, 2005

(54) RADIO DEVICE AND METHOD OF CALIBRATION THEREOF

(75) Inventors: Yoshiharu Doi, Gifu (JP); Toshinori Iinuma, Gifu (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/762,049

(22) PCT Filed: Aug. 2, 1999

(86) PCT No.: PCT/JP99/04173

§ 371 (c)(1),
(2), (4) Date: Feb. 1, 2001

(87) PCT Pub. No.: WO00/08777

PCT Pub. Date: Feb. 17, 2000

(30) Foreign Application Priority Data

Aug. 5, 1998 (JP) .......................................... 10-221810

(51) Int. Cl.[7] .............................. H04B 1/40; H04B 3/46
(52) U.S. Cl. ..................................................... 375/226
(58) Field of Search ................................. 375/226, 232, 375/261, 268, 267, 270, 285, 220, 219, 224, 308, 300, 328, 320; 702/85, 106, 107, 108, 116, 117, 118

(56) References Cited

U.S. PATENT DOCUMENTS 5,164,985 A * 11/1992 Nysen et al. ................... 380/9

FOREIGN PATENT DOCUMENTS

| EP | 0 938204 A1 | 8/1999 |
| JP | 2-265302 | 10/1990 |
| JP | 10-503892 | 4/1998 |
| JP | 11-46180 | 2/1999 |
| JP | 2000013454 A | 1/2000 |
| WO | WO-34103 | 12/1995 |

OTHER PUBLICATIONS

Proceedings of the IEEE, vol. 55, No. 12,—pp. 2143–2159, Dec. 1967.
IEEE Transactions on Antennas and Propagation, vol. AP–24, No. 5, pp. 585–598, Sep. 1976.
B. Widrow et al.; "Adaptive Signal Processing" —Chapter 6, pp. 99–116. 1985.
R. A. Monzingo et al.; "Introduction to Adaptive Arrays", A Wiley–Interscience Publication—Chapter 3, pp. 78–105, 1980.
IEE Electromagnetic Waves Series II, Chapter 3, pp. 59–154.
R. T. Compton, Jr.; "Adaptive Antennas", pp. 6–11—1988.
E. Nicolau et al; "Adaptive Arrays", ELSEVIER, Chapter 8, pp. 122–163, 1989.

* cited by examiner

*Primary Examiner*—Mohammad H. Ghayour
*Assistant Examiner*—Dung X. Nguyen
(74) *Attorney, Agent, or Firm*—Westerman, Hattori, Daniels & Adrian, LLP

(57) ABSTRACT

An adaptive array radio base station comprises at least three antenna elements ($ANT_j$ (j=1, 2, . . . , n)) and a signal processing circuit (20). In calibration, the difference in a phase rotation quantity and the difference in an amplitude fluctuation quantity between a transmission circuit and a receiving circuit in each transmission system are estimated on the basis of a known signal transmitted from each transmission system and a received signal measured in each transmission system. A phase rotation quantity of a phase shifter ($PS_j$) and an amplitude fluctuation quantity of an attenuator ($ATT_j$) are set on the basis of the results of the estimation. Thus provided are a radio apparatus and a calibration method capable of calibrating transmission characteristics of the transmission circuit and the receiving circuit in a simple structure at a low cost without providing a specific measuring circuit.

34 Claims, 69 Drawing Sheets

FIG.10

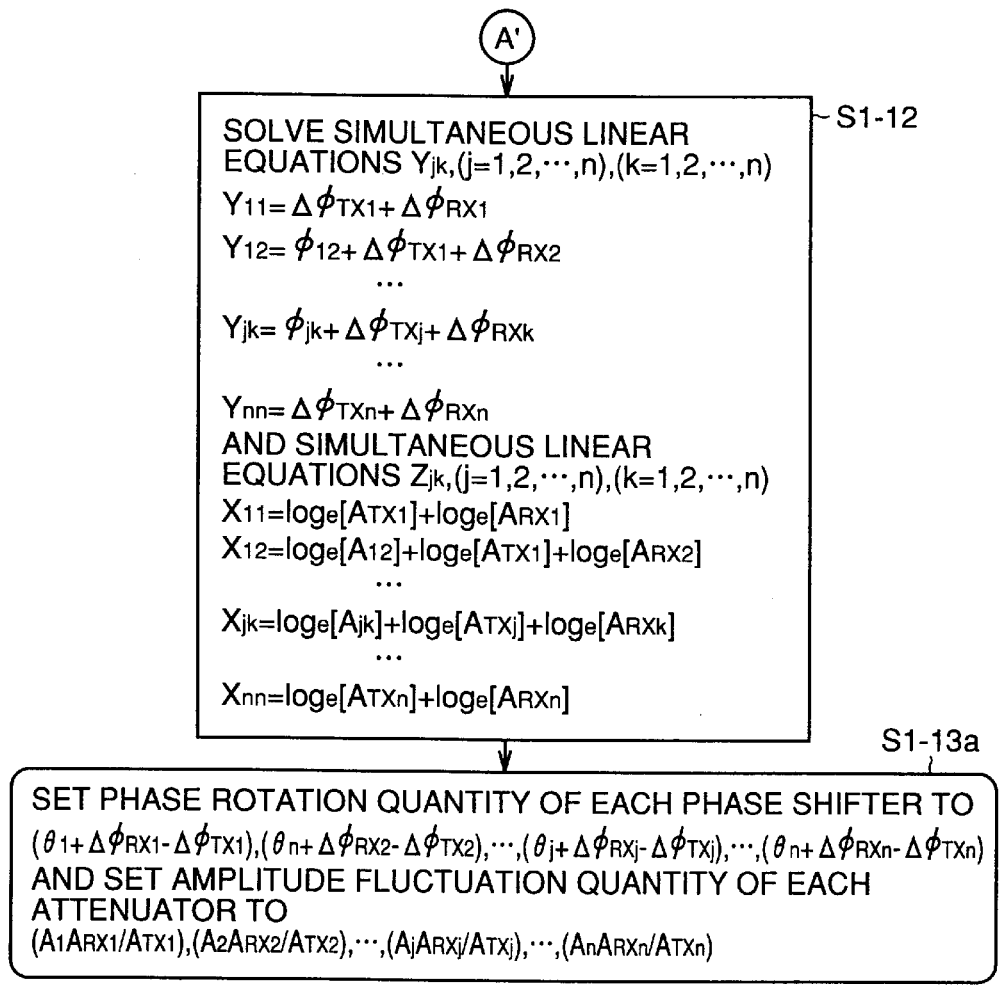

S1-12

SOLVE SIMULTANEOUS LINEAR EQUATIONS $Y_{jk}, (j=1,2,\cdots,n), (k=1,2,\cdots,n)$
$Y_{11} = \Delta\phi_{TX1} + \Delta\phi_{RX1}$
$Y_{12} = \phi_{12} + \Delta\phi_{TX1} + \Delta\phi_{RX2}$
$\cdots$
$Y_{jk} = \phi_{jk} + \Delta\phi_{TXj} + \Delta\phi_{RXk}$
$\cdots$
$Y_{nn} = \Delta\phi_{TXn} + \Delta\phi_{RXn}$ AND SIMULTANEOUS LINEAR EQUATIONS $Z_{jk}, (j=1,2,\cdots,n), (k=1,2,\cdots,n)$
$X_{11} = \log_e[A_{TX1}] + \log_e[A_{RX1}]$
$X_{12} = \log_e[A_{12}] + \log_e[A_{TX1}] + \log_e[A_{RX2}]$
$\cdots$
$X_{jk} = \log_e[A_{jk}] + \log_e[A_{TXj}] + \log_e[A_{RXk}]$
$\cdots$
$X_{nn} = \log_e[A_{TXn}] + \log_e[A_{RXn}]$ S1-13a SET PHASE ROTATION QUANTITY OF EACH PHASE SHIFTER TO $(\theta_1 + \Delta\phi_{RX1} - \Delta\phi_{TX1}), (\theta_n + \Delta\phi_{RX2} - \Delta\phi_{TX2}), \cdots, (\theta_j + \Delta\phi_{RXj} - \Delta\phi_{TXj}), \cdots, (\theta_n + \Delta\phi_{RXn} - \Delta\phi_{TXn})$ AND SET AMPLITUDE FLUCTUATION QUANTITY OF EACH ATTENUATOR TO $(A_1 A_{RX1}/A_{TX1}), (A_2 A_{RX2}/A_{TX2}), \cdots, (A_j A_{RXj}/A_{TXj}), \cdots, (A_n A_{RXn}/A_{TXn})$

FIG. 70

| 1 | 0 | ... | 1 | 1 | 0 | ... | 0 | 1 |
|---|---|-----|---|---|---|-----|---|---|
| PREAMBLE (SIGNAL SERIES KNOWN TO RADIO BASE STATION) | | | | DATA (SOUND etc.) (SIGNAL SERIES UNKNOWN TO RADIO BASE STATION) | | | | |

RADIO DEVICE AND METHOD OF CALIBRATION THEREOF

TECHNICAL FIELD

The present invention relates to a radio apparatus and a calibration method therefor, and more particularly, it relates to a radio apparatus employed in an adaptive array radio base station and a calibration method therefor.

BACKGROUND ART

An adaptive array radio base station employing an array antenna is recently put into practice as a radio base station for a mobile communication system such as a portable telephone. The operation principle of such an adaptive array radio base station is described in the following literature, for example:

B. Widrow, et al.: "Adaptive Antenna Systems", Proc. IEEE, vol.55, No.12, pp.2143–2159 (December 1967).

S. P. Applebaum: "Adaptive Arrays", IEEE Trans. Antennas & Propag, vol.AP-24, No.5, pp.585–598 (September 1976).

O. L. Frost, III: "Adaptive Least Squares Optimization Subject to Linear Equality Constraints", SEL-70-055, Technical Report, No.6796-2, Information System Lab., Stanford Univ. (August 1970).

B. Widrow and S. D. Stearns: "Adaptive Signal Processing", Prentice-Hall, Englewood Cliffs (1985).

R. A. Monzingo and T. W. Miller: "Introduction to Adaptive Arrays", John Wiley & Sons, New York (1980).

J. E. Hudson: "Adaptive Array Principles", Peter Peregrinus Ltd., London (1981).

R. T. Compton, Jr.: "Adaptive Antennas—Concepts and Performance", Prentice-Hall, Englewood Cliffs (1988).

E. Nicolau and D. Zaharia: "Adaptive Arrays", Elsevier, Amsterdam (1989).

FIG. 68 is a model diagram conceptually showing the operation principle of such an adaptive array radio base station. Referring to FIG. 68, an adaptive array radio base station 1 comprises an array antenna 2 formed by n antennas #1, #2, #3, . . . , #n, and a first diagonal line area 3 shows a range in which radio waves from the array antenna 2 can be received. A second diagonal line area 7 shows a range in which radio waves from adjacent another radio base station 6 can be received.

In the area 3, the adaptive array radio base station 1 transmits/receives a radio signal to/from a portable telephone 4 forming a terminal of a user A (arrow 5). In the area 7, the radio base station 6 transmits/receives a radio signal to/from a portable telephone 8 forming a terminal of another use B (arrow 9).

When the radio signal for the portable telephone 4 of the user A happens to be equal in frequency to the radio signal for the portable telephone 8 of the user B, it follows that the radio signal from the portable telephone 8 of the user B serves as an unnecessary interference signal in the area 3 depending on the position of the user B, to disadvantageously mix into the radio signal transmitted between the portable telephone 4 of the user A and the adaptive array radio base station 1.

In this case, it follows that the adaptive array radio base station 1 receiving the mixed radio signals from both users A and B in the aforementioned manner outputs the signals from the users A and B in a mixed state unless some necessary processing is performed, to disadvantageously hinder communication with the regular user A.

In order to eliminate the signal from the user B from the output signal, the adaptive array radio base station 1 performs the following processing. FIG. 69 is a schematic block diagram showing the structure of the adaptive array radio base station 1.

Assuming that A(t) represents the signal from the user A and B(t) represents the signal from the user B, a signal x1(t) received in the first antenna #1 forming the array antenna 2 shown in FIG. 68 is expressed as follows:

$$x1(t) = a1 \times A(t) + b1 \times B(t)$$

where a1 and b1 represent factors changing in real time, as described later.

A signal x2(t) received in the second antenna #2 is expressed as follows:

$$x2(t) = a2 \times A(t) + b2 \times B(t)$$

where a2 and b2 also represent factors changing in real time.

A signal x3(t) received in the third antenna #3 is expressed as follows:

$$x3(t) = a3 \times A(t) + b3 \times B(t)$$

where a3 and b3 also represent factors changing in real time.

Similarly, a signal xn(t) received in the n-th antenna #n is expressed as follows:

$$xn(t) = an \times A(t) + bn \times B(t)$$

where an and bn also represent factors changing in real time.

The above factors a1, a2, a3, . . . , an show that the antennas #1, #2, #3, . . . , #n forming the array antenna 2 are different in receiving strength from each other with respect to the radio signal from the user A since the relative positions of the antennas #1, #2, #3, . . . , #n are different from each other (the antennas #1, #2, #3, . . . , #n are arranged at intervals about five times the wavelength of the radio signal, i.e., about 1 m, from eath other).

The above factors b1, b2, b3, . . . , bn also show that the antennas #1, #2, #3, . . . , #n are different in receiving strength from each other with respect to the radio signal from the user B. The users A and B are moving and hence these factors a1, a2, a3, . . . , an and b1, b2, b3, . . . , bn change in real time.

The signals x1(t), x2(t), x3(t), . . . , xn(t) received in the respective antennas #1, #2, #3, . . . , #n are input in a receiving unit 1R forming the adaptive array radio base station 1 through corresponding switches 10-1, 10-2, 10-3, . . . , 10-n respectively so that the received signals are supplied to a weight vector control unit 11 and to one inputs of corresponding multipliers 12-1, 12-2, 12-3, . . . , 12-n respectively.

Weights w1, w2, w3, . . . , wn for the signals x1(t), x2(t), x3(t), . . . , xn(t) received in the antennas #1, #2, #3, . . . , #n are applied to other inputs of these multipliers 12-1, 12-2, 12-3, . . . , 12-n respectively. The weight vector control unit 11 calculates these weights w1, w2, w3, . . . , wn in real time, as described later.

Therefore, the signal x1(t) received in the antenna #1 is converted to w1×(a1A(t)+b1B(t)) through the multiplier 12-1, the signal x2(t) received in the antenna #2 is converted to w2×(a2A(t)+b2B(t)) through the multiplier 12-2, the signal x3(t) received in the antenna #3 is converted to w3×(a3A(t)+b3B(t)) through the multiplier 12-3, and the signal xn(t) received in the antenna #n is converted to wn×(anA(t)+bnB(t)) through the multiplier 12-n.

An adder 13 adds the outputs of these multipliers 12-1, 12-2, 12-3, . . . , 12-n, and outputs the following signal:

w1(a1A(t)+b1B(t))+w2(a2A(t)+b2B(t))+w3(a3A(t)+b3B(t))+ . . . +wn(anA(t)+bnB(t))

This expression is classified into terms related to the signals A(t) and B(t) respectively as follows:

(w1a1+w2a2+w3a3+ . . . +wnan)A(t)+(w1b1+w2b2+w3b3+ . . . +wnbn)B(t)

As described later, the adaptive array radio base station 1 identifies the users A and B and calculates the aforementioned weights w1, w2, w3, . . . , wn to be capable of extracting only the signal from the desired user. Referring to FIG. 69, for example, the weight vector control unit 11 regards the factors a1, a2, a3, . . . , an and b1, b2, b3, . . . , bn as constants and calculates the weights w1, w2, w3, . . . , wn so that the factors of the signals A(t) and B(t) are 1 and 0 as a whole respectively, in order to extract only the signal A(t) from the intended user A for communication.

In other words, the weight vector control unit 11 solves the following simultaneous linear equations, thereby calculating the weights w1, w2, w3, . . . , wn so that the factors of the signals A(t) and B(t) are 1 and 0 respectively:

w1a1+w2a2+w3a3+ . . . +wnan=1 w1b1+w2b2+w3b3+ . . . +wnbn=0

The method of solving the above simultaneous linear equations, not described in this specification, is known as described in the aforementioned literature and already put into practice in an actual adaptive array radio base station.

When setting the weights w1, w2, w3, . . . , wn in the aforementioned manner, the adder 13 outputs the following signal:

output signal=1×A(t)+0×B(t)=A(t)

The aforementioned users A and B are identified as follows: FIG. 70 is a schematic diagram showing the frame structure of a radio signal for a portable telephone set. The radio signal for the portable telephone set is roughly formed by a preamble consisting of a signal series known to the radio base station and data (sound etc.) consisting of a signal series unknown to the radio base station.

The signal series of the preamble includes a signal series of information for recognizing whether or not the user is a desired user for making communication with the radio base station. The weight vector control unit 11 (FIG. 69) of the adaptive array radio base station 1 compares a training signal corresponding to the user A fetched from a memory 14 with the received signal series and performs weight vector control (decision of weights) for extracting a signal apparently including the signal series corresponding to the user A. The adaptive array radio base station 1 outputs the signal from the user A extracted in the aforementioned manner as an output signal $S_{RX}(t)$.

Referring again to FIG. 69, an external input signal $S_{TX}(t)$ is input in a transmission unit 1T forming the adaptive array radio base station 1 and supplied to one inputs of multipliers 15-1, 15-2, 15-3, . . . , 15-n. The weights w1, w2, w3, . . . , wn previously calculated by the weight vector control unit 11 on the basis of the received signal are copied and applied to other inputs of these multipliers 15-1, 15-2, 15-3, . . . , 15-n respectively.

The input signal $S_{TX}(t)$ weighted by these multipliers 15-1, 15-2, 15-3, . . . , 15-n is sent to the corresponding antennas #1, #2, #3, . . . , #n through corresponding switches 10-1, 10-2, 10-3, . . . , 10-n respectively, and transmitted into the area 3 shown in FIG. 68.

The signal transmitted through the same array antenna 2 as that in receiving is weighted for the target user A similarly to the received signal, and hence the portable telephone set 4 of the user A receives the transmitted radio signal as if the signal has directivity to the user A. FIG. 71 images such transfer of a radio signal between the user A and the adaptive array radio base station 1. Imaged is such a state that the adaptive array radio base station 1 transmits the radio signal with directivity toward the target portable telephone set 4 of the user A as shown in a virtual area 3a in FIG. 71 in contrast with the area 3 of FIG. 68 showing the range actually receiving radio waves.

In order to implement such transmission/receiving of the radio signal with directivity between the desired user and the adaptive array radio base station 1, the adaptive array radio base station 1 must strictly calculate the weights w1, w2, w3, . . . , wn for equivalently weighting received and transmitted signals in the receiving unit 1R and the transmission unit 1T. Even if the adaptive array radio base station 1 completely controls weighting, however, the transmission characteristics of the transmitted signal may change with respect to the received signal such that the transmitted signal cannot be transmitted to the target user.

In the adaptive array radio base station 1 shown in FIG. 69, for example, the distance between the switches 10-1, 10-2, 10-3, . . . , 10-n and the corresponding multipliers 12-1, 12-2, 12-3, . . . , 12-n of the receiving unit 1R and the distance between the switches 10-1, 10-2, 10-3, . . . , 10-n and the corresponding multipliers 15-1, 15-2, 15-3, . . . , 15-n of the transmission unit 1T are generally not completely identical to each other. If the distances are different from each other, a difference in phase rotation quantity, a difference in amplitude fluctuation quantity, or the like is disadvantageously caused between the received signal and the transmitted signal received in and transmitted from each antenna, and the radio signal cannot be transferred between the target user and the adaptive array radio base station 1 with excellent directivity.

In general, paths between the switches 10-1, 10-2, 10-3, . . . , 10-n and the corresponding multipliers 12-1, 12-2, 12-3, . . . , 12-n of the receiving unit 1R include necessary receiving circuits (not shown) respectively, and paths between these switches 10-1, 10-2, 10-3, . . . , 10-n and the corresponding multipliers 15-1, 15-2, 15-3, . . . , 15-n of the transmission unit 1T include necessary transmission circuits (not shown) respectively. Therefore, it follows that a difference in phase rotation quantity, difference in amplitude fluctuation quantity, or the like is caused between the received signal and the transmitted signal received in and transmitted from each antenna depending on the characteristics of amplifiers, filters etc. forming the receiving and transmission circuits.

In the adaptive array radio base station 1, therefore, the transmission characteristics of the receiving circuit such as the phase rotation quantity and the amplitude fluctuation quantity and the transmission characteristics of the transmission circuit such as the phase rotation quantity and the amplitude fluctuation quantity must be measured as to each antenna forming the array antenna 2, for compensating for the differences. In general, a measuring circuit for measuring the transmission characteristics is separately provided on the adaptive array radio base station, to disadvantageously enlarge and complicate the circuit structure of the adaptive array radio base station while increasing the cost.

An object of the present invention is to provide a radio apparatus capable of estimating and compensating for a difference between transmission characteristics of a receiving circuit and a transmission circuit in a simple structure at a low cost without providing a specific measuring circuit and a calibration method therefor.

DISCLOSURE OF INVENTION

The present invention is directed to a radio apparatus capable of calibrating transmission characteristics, comprising n (n: integer greater than or equal to 3) signal transmission systems, a control unit, a signal processing circuit, a memory and an arithmetic circuit.

Each of the n signal transmission systems includes an antenna as well as a transmission circuit and a receiving circuit sharing the antenna.

The control unit makes control for transmitting a known signal from the transmission circuit of each of the n signal transmission systems and receiving the transmitted signal in the receiving circuits of a plurality of signal transmission systems included in the n signal transmission systems in calibration.

The signal processing circuit is provided for each signal transmission system, for performing prescribed signal processing on the signal received in the receiving circuit of the signal transmission system with the known signal.

The memory stores signals obtained by the signal processing circuits in the plurality of signal transmission systems.

The arithmetic circuit calculates information related to at least either a phase rotation quantity or an amplitude fluctuation quantity caused in a signal when the signal passes through each of the transmission circuit and the receiving circuit of each of the n signal transmission systems on the basis of the signals stored in the memory.

The present invention is also directed to a calibration method for a radio apparatus comprising n (n: integer greater than or equal to 3) signal transmission systems each including an antenna as well as a transmission circuit and a receiving circuit sharing the antenna, including a control step, a signal processing step, a storage step, an operation step and a calibration step. The control step performs control for transmitting a known signal from the transmission circuit of each of the n signal transmission systems and receiving the transmitted signal in the receiving circuits of a plurality of signal transmission systems included in the n signal transmission systems in calibration. The signal processing step performs prescribed signal processing on the signal received in the receiving circuit with the known signal in each signal transmission system. The storage step stores signals obtained by the signal processing in the plurality of signal transmission systems. The operation step calculates information related to at least either a phase rotation quantity or an amplitude fluctuation quantity caused in a signal when the signal passes through each of the transmission circuit and the receiving circuit of each of the n signal transmission systems on the basis of the stored signals. The calibration step calibrates at least either the difference in a phase rotation quantity or the difference in an amplitude fluctuation quantity between the transmission circuit and the receiving circuit of each of the n signal transmission systems on the basis of the calculated information.

BRIEF DESCRIPTION OF DRAWINGS

FIG. 10 is a flow chart showing the second half of the operations of the modification of the first basic structure.

FIG. 70 is a schematic diagram showing the frame structure of a radio signal for a portable telephone.

BEST MODE FOR CARRYING OUT THE INVENTION

Outline of First Basic Structure

Figure 1:
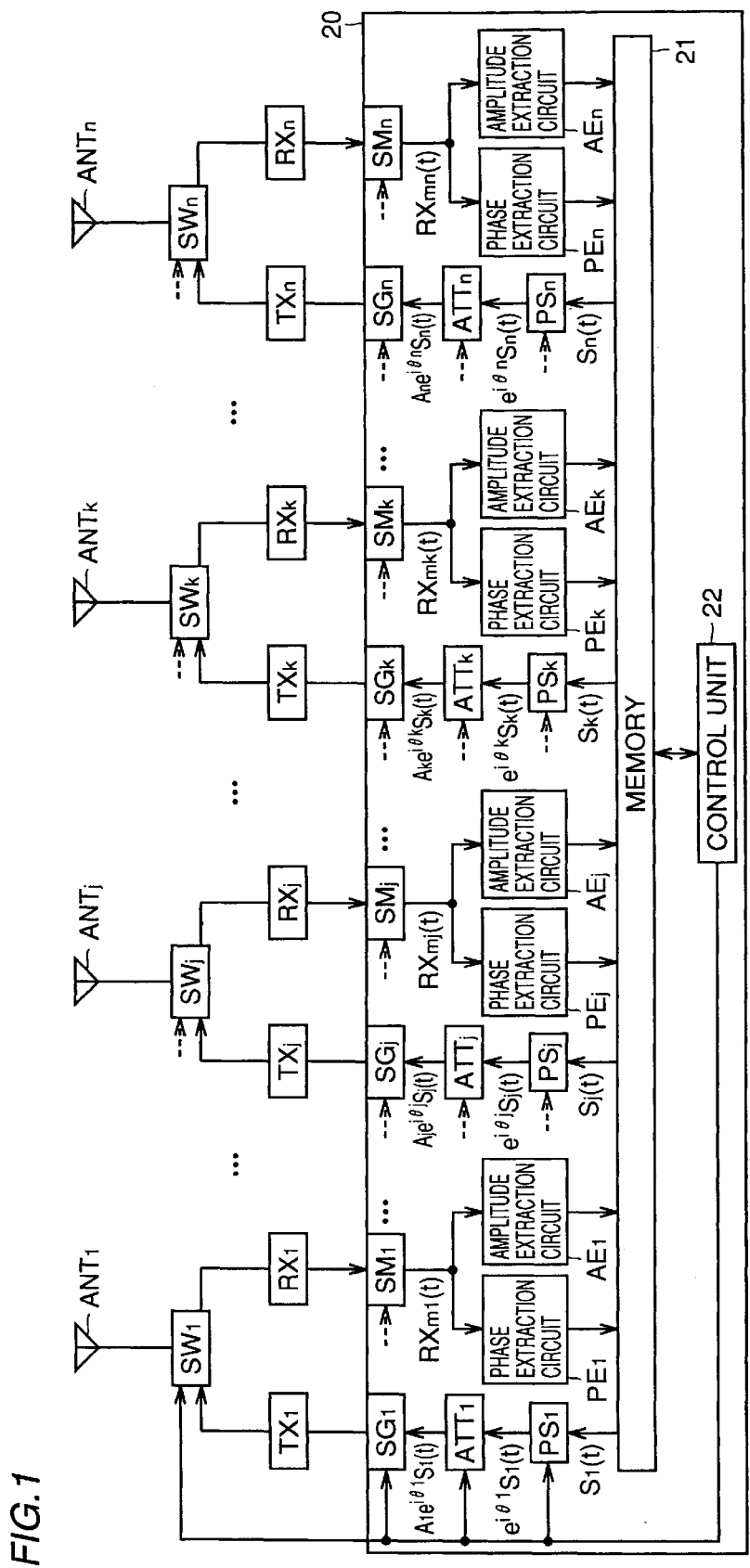
FIG. 1 is a schematic block diagram showing a principal part of a first basic structure of an adaptive array radio base station according to the present invention.
Figure 69:
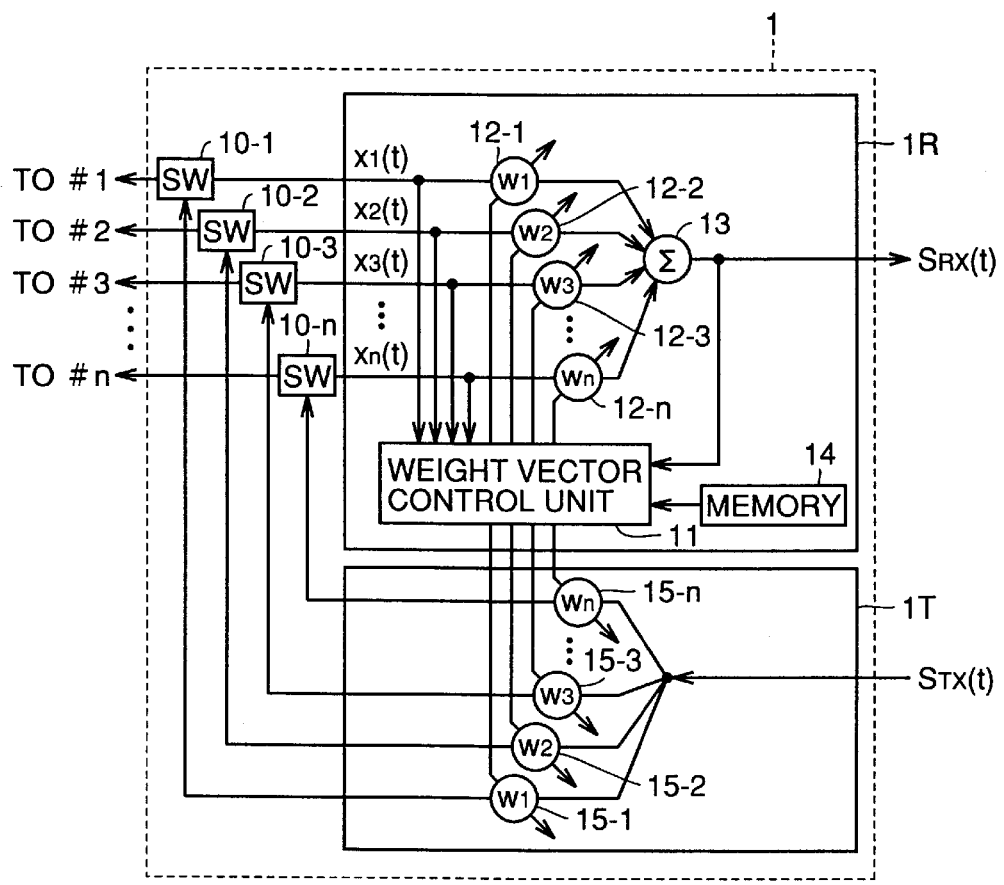
FIG. 69 is a schematic block diagram showing the structure of the adaptive array radio base station.
Figure 71:
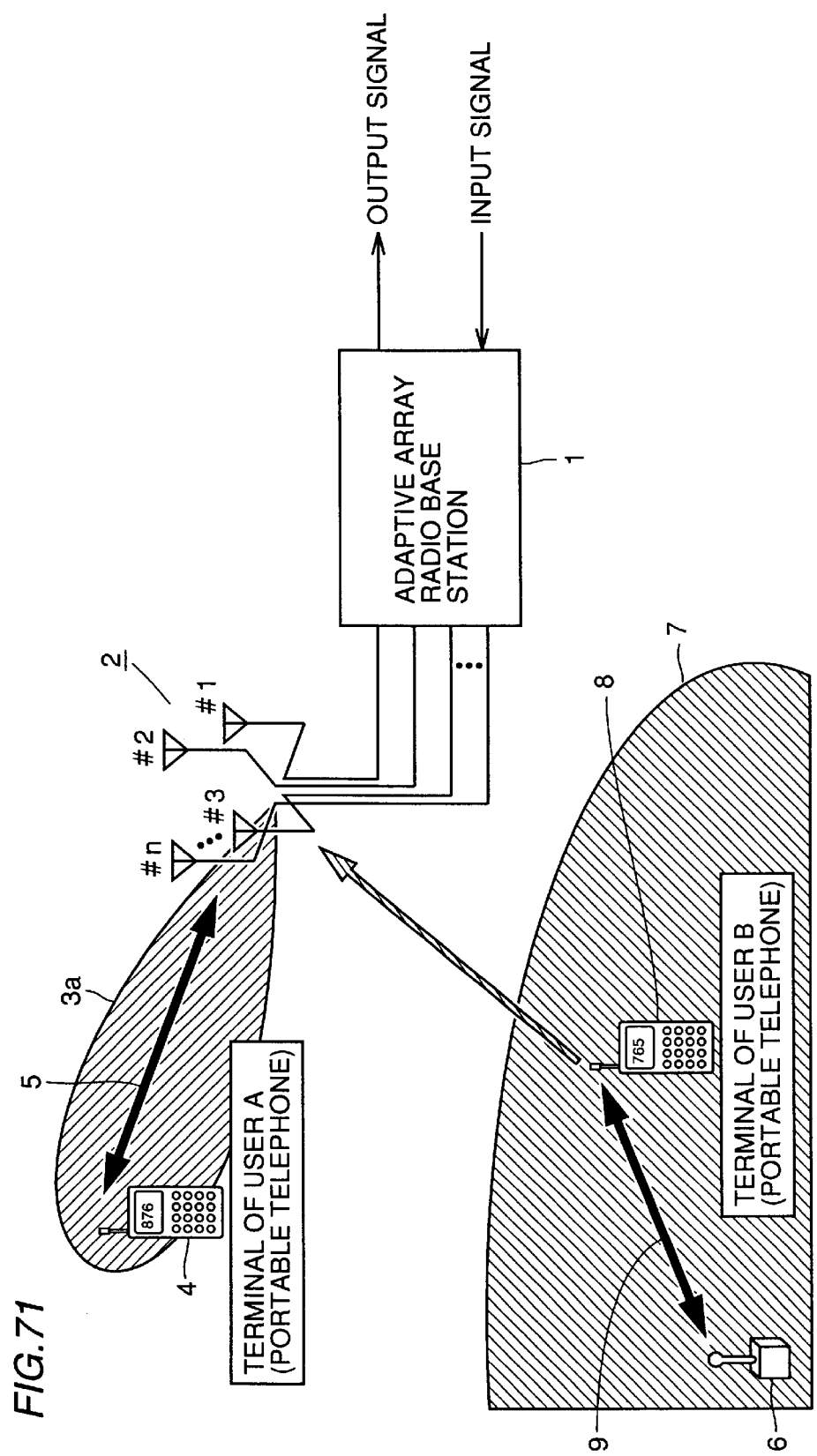
FIG. 71 is a model diagram imaging transfer of a radio signal between the adaptive array radio base station and a user.

FIG. 1 is a schematic block diagram showing a principal part of a first basic structure of an adaptive array radio base station according to the present invention. The basic structure of FIG. 1 shows only parts related to estimation of phase rotation quantities and amplitude fluctuation quantities and calibration thereof relevant to the present invention in the adaptive array radio base station, and omits illustration of parts corresponding to the receiving part 1R and the transmission part 1T for weighting the received signal and the transmitted signal shown in the aforementioned FIG. 69. This also applies to each embodiment described later.

The adaptive array radio base station shown in FIG. 1 comprises a signal processing circuit 20, n antenna elements $ANT_1, \ldots, ANT_k, \ldots, ANT_n$ forming an array antenna, antenna sharers $SW_1, \ldots, SW_j, \ldots, SW_k, \ldots, SW_n$ provided in correspondence to the antenna elements $ANT_1, \ldots, ANT_j, \ldots, ANT_k, \ldots, ANT_n$ respectively, and transmission circuits $TX_1, \ldots, TX_j, \ldots, TX_k, \ldots, TX_n$ and receiving circuits $RX_1, \ldots, RX_j, \ldots, RX_k, \ldots, RX_n$ provided between the antenna sharers $SW_1, \ldots, SW_j, \ldots, SW_k, \ldots, SW_n$ and the signal processing circuit 20 in correspondence to the antenna elements $ANT_1, \ldots, ANT_j, \ldots, ANT_k, \ldots, ANT_n$ respectively.

The signal processing circuit 20 includes a memory 21 previously storing known signals $S_1(t), \ldots, S_j(t), \ldots, S_k(t), \ldots, S_n(t)$ to be transmitted from the antenna elements $ANT_1, \ldots, ANT_j, \ldots, ANT_k, \ldots, ANT_n$ respectively in calibration while storing each calculated signal described later, a control unit 22 transmitting/receiving control signals and data to/from the memory 21, phase shifters $PS_1, \ldots, PS_j, \ldots, PS_k, \ldots, PS_n$, attenuators $ATT_1, \ldots, ATT_j, \ldots, ATT_k, \ldots, ATT_n$ and transmitted signal output units $SG_1, \ldots, SG_j, \ldots, SG_k, \ldots, SG_n$ provided between the memory 21 and the transmission circuits $TX_1, \ldots, TX_j, \ldots, TX_k, \ldots, TX_n$ in correspondence to the antenna elements $ANT_1, \ldots, ANT_j, \ldots, ANT_k, \ldots, ANT_n$ respectively, and received signal measuring units $SM_1, \ldots, SM_j, \ldots, SM_k, \ldots, SM_n$, phase extraction circuits $PE_1, \ldots, PE_j, \ldots, PE_k, \ldots, PE_n$ and amplitude extraction circuits $AE_1, \ldots, AE_j, \ldots, AE_k, \ldots, AE_n$ provided between the memory 21 and the receiving circuits $RX_1, \ldots, RX_j, \ldots, RX_k, \ldots, RX_n$ in correspondence to the antenna elements $ANT_1, \ldots, ANT_j, \ldots, ANT_K, \ldots, ANT_n$ respectively.

Figure 2:
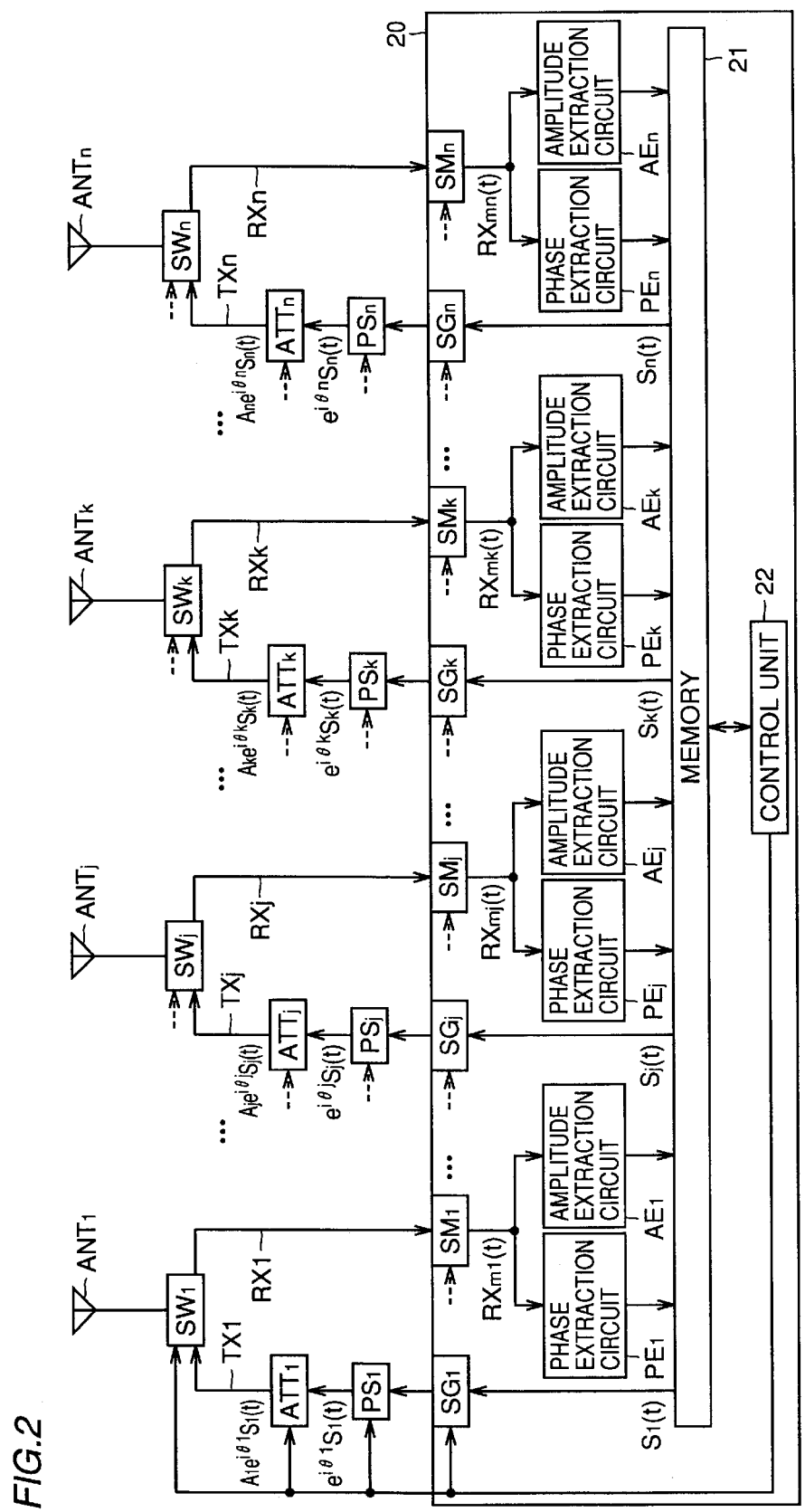
FIG. 2 is a schematic block diagram showing a modification of the first basic structure of the adaptive array radio base station according to the present invention.

It is assumed that each of the transmission circuits $TX_1, \ldots, TX_j, \ldots, TX_k, \ldots, TX_n$ is generically referred to as a circuit consisting of a frequency converter, an amplifier, a filter, a diffuser etc., for example, and existing on a path between the corresponding transmitted signal output unit SG and the corresponding antenna sharer SW. FIG. 2 and subsequent figures omit illustration of each transmission circuit TX for convenience of illustration, and it is assumed that a line TX between each transmitted signal output unit SG and the corresponding antenna sharer SW shows the presence of such a transmission circuit.

Similarly, it is also assumed that each of the receiving circuits $RX_1, \ldots, RX_j, \ldots, RX_k, \ldots, RX_n$ is generically referred to as a circuit consisting of a frequency converter, an amplifier, a filter, an inverse diffuser etc., for example, and existing on a path between the corresponding antenna sharer SW and the corresponding received signal measuring unit SM. FIG. 2 and subsequent figures omit illustration of each receiving circuit RX for convenience of illustration, and it is assumed that a line RX between each antenna sharer SW and the corresponding received signal measuring unit SM shows the presence of such a transmission circuit.

The known signals $S_1(t), \ldots, S_j(t), \ldots, S_k(t), \ldots, S_n(t)$, corresponding to the antenna elements $ANT_1, \ldots, ANT_j, \ldots, ANT_k, \ldots, ANT_n$ respectively, output from the memory 21 in calibration are rotated in phase by $\theta_1, \ldots, \theta_j, \ldots, \theta_k, \ldots, \theta_n$ by the corresponding phase shifters $PS_1, \ldots, PS_j, \ldots, PS_k, \ldots, PS_n$, to form signals $S_1(t)\exp(i\theta_1), \ldots, S_j(t)\exp(i\theta_j), \ldots, S_k(t)\exp(i\theta_k), \ldots, S_n(t)\exp(i\theta_n)$ respectively. The phase rotation quantity of each phase shifter is controlled by a control signal from the control unit 22.

The phase-rotated signals $S_1(t)\exp(i\theta_1), \ldots, S_j(t)\exp(i\theta_j), \ldots, S_k(t)\exp(i\theta_k), \ldots, S_n(t)\exp(i\theta_n)$ are amplitude-fluctuated by $A_1, \ldots, A_j, \ldots, A_k, \ldots, A_n$ by the corresponding attenuators $ATT_1, \ldots, ATT_j, \ldots, ATT_k, \ldots, ATT_n$, to form signals $A_1S_1(t)\exp(i\theta_1), \ldots, A_jS_j(t)\exp(i\theta_j), \ldots, A_kS_k(t)\exp(i\theta_k), \ldots, A_nS_n(t)\exp(i\theta_n)$ respectively. The amplitude fluctuation quantity of each attenuator is controlled by a control signal from the control unit 22.

These signals $A_1S_1(t)\exp(i\theta_1), \ldots, A_jS_j(t)\exp(i\theta_j), \ldots, A_kS_k(t)\exp(i\theta_k), \ldots, A_nS_n(t)\exp(i\theta_n)$ are transmitted from the corresponding transmitted signal output units $SG_1, \ldots, SG_j, \ldots, SG_k, \ldots, SG_n$ respectively, and supplied to the corresponding antenna sharers $SW_1, \ldots, SW_j, \ldots, SW_k, \ldots, SW_n$ through the corresponding transmission circuits $TX_1, \ldots, TX_j, \ldots, TX_k, \ldots, TX_n$ respectively.

Each of these antenna sharers $SW_1, \ldots, SW_j, \ldots, SW_k, \ldots, SW_n$ is switched to selectively supply the signal from the corresponding transmission circuit TX to either the corresponding antenna element ANT or the corresponding receiving circuit RX in response to a control signal from the control unit 22.

The signal supplied from each antenna sharer SW to the corresponding antenna element ANT is emitted as a radio signal. When the antenna sharer SW is not connected to the antenna element ANT, the corresponding receiving circuit RX receives the transmitted signal input in the antenna sharer SW as such.

On the other hand, signals received in the antenna elements $ANT_1, \ldots ANT_j, \ldots, ANT_k, \ldots, ANT_n$ in calibration are supplied to the corresponding received signal measuring units $SM_1, \ldots, SM_j, \ldots, SM_k, \ldots, SM_n$ through the corresponding antenna sharers $SW_1, \ldots, SW_j, \ldots, SW_k, \ldots, SW_n$ respectively. When the antenna sharer SW is not connected to the antenna element ANT as described above, it follows that the received signal measuring unit SM is supplied not with the signal from the antenna element ANT but with the signal from the corresponding transmission circuit TX.

The signals received in the received signal measuring units $SM_1, \ldots, SM_j, \ldots, SM_k, \ldots, SM_n$ are supplied in parallel to the corresponding phase extraction circuits $PE_1, \ldots, PE_j, \ldots, PE_k, \ldots, PE_n$ and the corresponding amplitude extraction circuits $AE_1, \ldots, AE_j, \ldots, AE_k, \ldots, AE_n$ respectively. As described later, information extracted in the phase extraction circuits $PE_1, \ldots, PE_j, \ldots, PE_k, \ldots, PE_n$ and the amplitude extraction circuits $AE_1, \ldots, AE_j, \ldots, AE_k, \ldots, AE_n$ is supplied to and stored in the memory 21.

Operations of the transmitted signal output units $SG_1, \ldots, SG_j, \ldots, SG_k, \ldots, SG_n$ and the received signal measuring units $SM_1, \ldots, SM_j, \ldots, SM_k, \ldots, SM_n$ are controlled by control signals from the control unit 22.

The structure of a group of circuits related to transmission/receiving of signals through each antenna element is hereinafter referred to as a (signal) transmission system.

In general signal transmission/receiving other than calibration, not the known signal from the memory 21 but a transmitted signal weighted for each transmission system by a transmission unit (not shown: refer to 1T in FIG. 69) is supplied to the phase shifter PS of the transmission system through a signal path (not shown), and transmitted from the antenna element ANT through the attenuator ATT, the transmitted signal output unit SG, the transmission circuit TX and the antenna sharer SW. A signal received by each antenna element ANT is received by the received signal measuring unit SM through the antenna sharer SW and the receiving circuit RX of the transmission system and thereafter supplied not to the phase extraction circuit PE and the amplitude extraction circuit AE but to a receiving unit (not shown: refer to 1R in FIG. 69) through a signal path (not shown) to be subjected to weighting and supplied outward as an output signal.

FIG. 2 is a schematic block diagram showing a modification of the first basic structure of the adaptive array radio base station shown in FIG. 1. The structure shown in FIG. 2 is identical to the first basic structure shown in FIG. 1 except the following point:

While the phase shifter PS and the attenuator ATT of each transmission system are provided in the signal processing circuit 20 in FIG. 1, a phase shifter PS and an attenuator ATT corresponding thereto are provided outside a signal processing circuit 20, i.e., between a transmitted signal output unit SG and a transmission circuit TX of each transmission system.

Thus, the positions for arranging the phase shifter PS and the attenuator ATT are not restricted so far as the phase shifter PS and the attenuator ATT are provided between the memory 21 and each antenna sharer SW, and one of the phase shifter PS and the attenuator ATT may be provided in the signal processing circuit 20 while arranging the other one outside the signal processing circuit 20, although this arrangement is not illustrated in particular. Further, the phase shifter PS and the attenuator ATT may be provided both inside and outside the signal processing circuit 20.

Outline of Second Basic Structure

Figure 3:
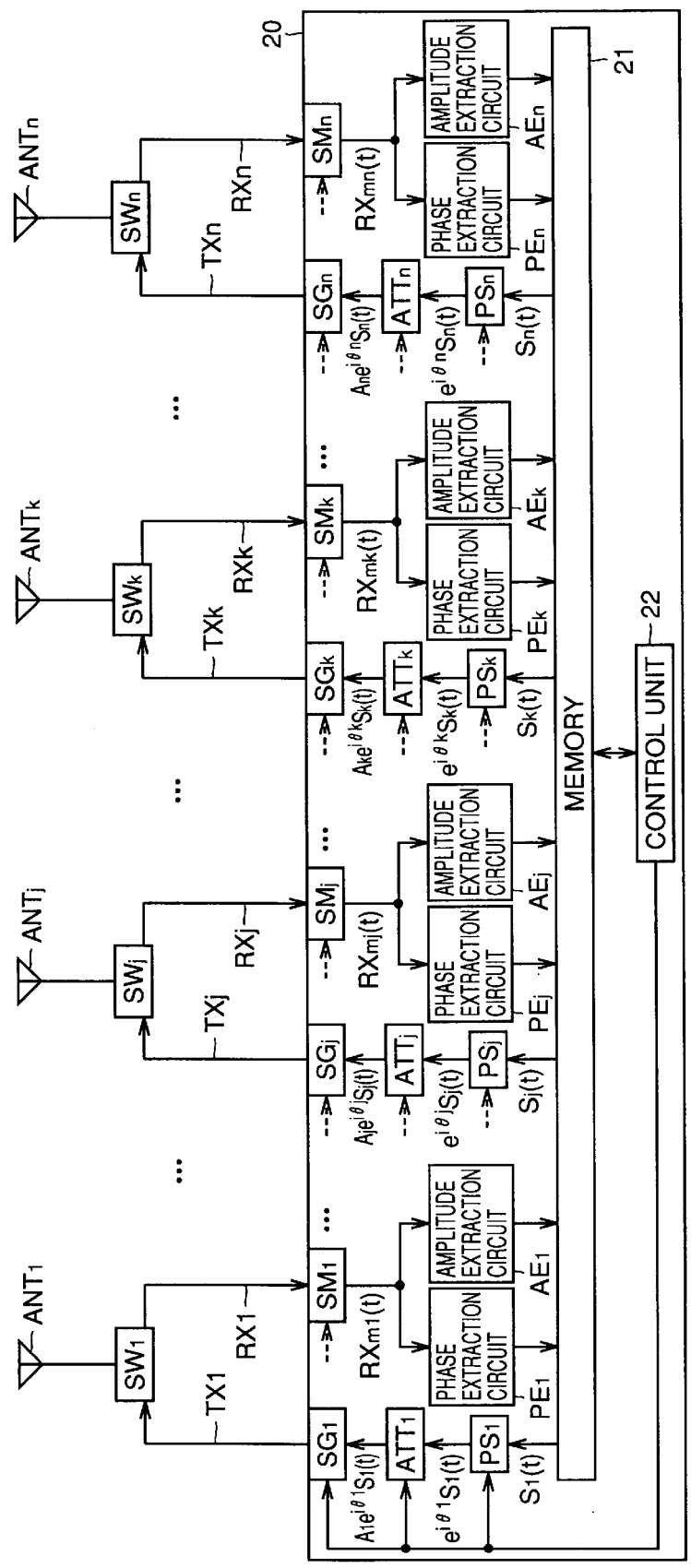
FIG. 3 is a schematic block diagram showing a principal part of a second basic structure of the adaptive array radio base station according to the present invention.

FIG. 3 is a schematic block diagram showing a principal part of a second basic structure of the adaptive array radio base station according to the present invention. The second basic structure shown in FIG. 3 is identical to the first basic structure shown in FIG. 1 except the following point:

An antenna sharer SW of each transmission system is not supplied with a control signal from a control unit 22, and each antenna sharer SW is not so switched that a signal from a transmission circuit TX is directly supplied to a receiving circuit RX, dissimilarly to the first basic structure of FIG. 1. Therefore, a signal from the transmission circuit TX of each transmission system is necessarily transmitted from the antenna element ANT through the corresponding antenna sharer SW, and a signal received at the antenna element ANT is supplied to the receiving circuit RX through the corresponding antenna sharer SW. The remaining structure is identical to the first basic structure shown in FIG. 1, and redundant description is not repeated.

Figure 4:
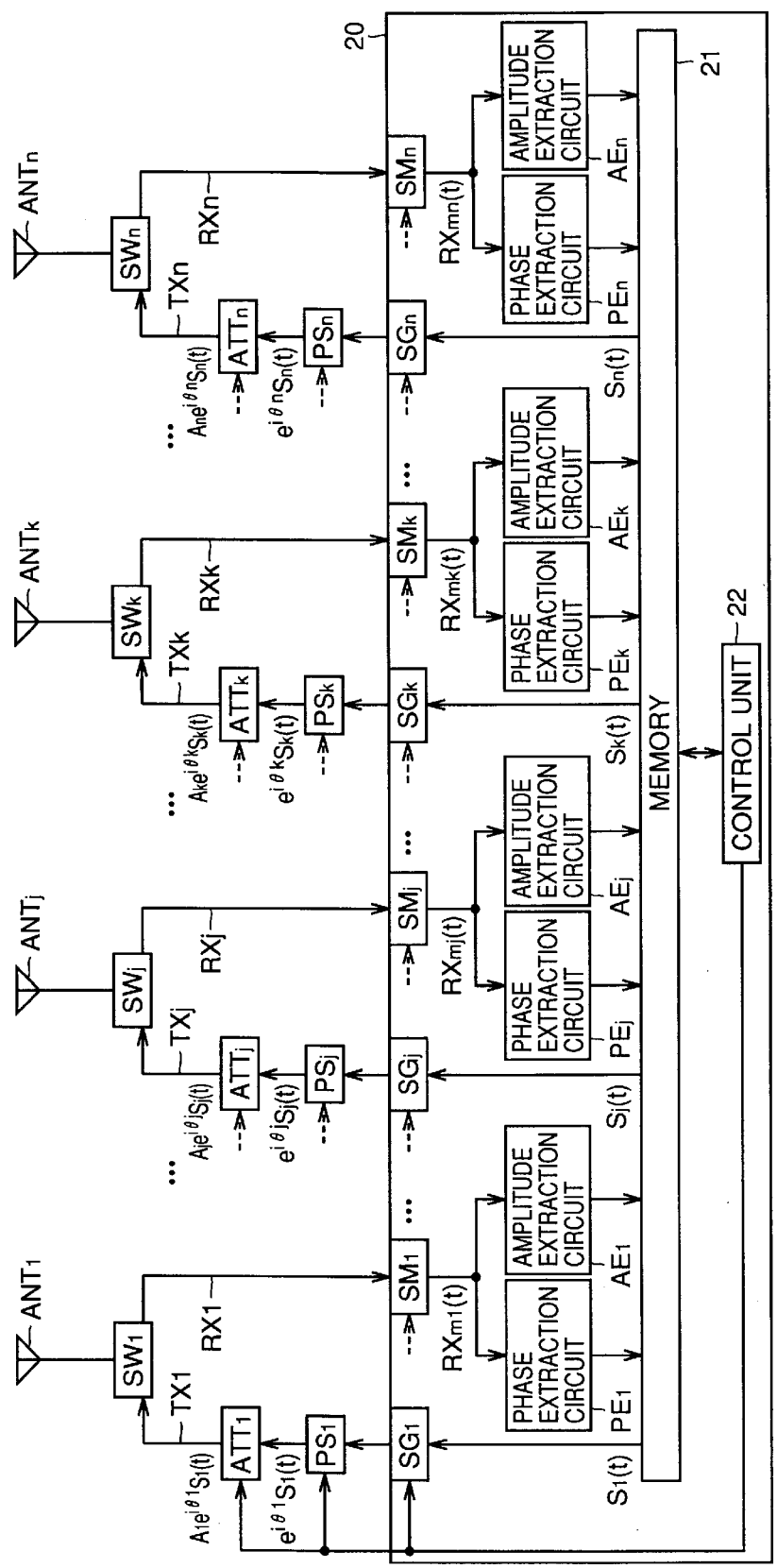
FIG. 4 is a schematic block diagram showing a modification of the second basic structure of the adaptive array radio base station according to the present invention.

FIG. 4 is a schematic block diagram showing a modification of the second basic structure of the adaptive array radio base station shown in FIG. 3. The structure of FIG. 4 is identical to the second basic structure shown in FIG. 3 except the following point:

While the phase shifter PS and the attenuator ATT of each transmission system are provided in the signal processing circuit 20 in FIG. 3, a phase shifter PS and an attenuator ATT corresponding thereto are provided outside a signal processing circuit 20 in the modification shown in FIG. 4.

As described with reference to the modification of FIG. 2, the positions for arranging the phase shifter PS and the attenuator ATT are not restricted so far as the phase shifter PS and the attenuator ATT are provided between the memory 21 and each antenna sharer SW, and one of the phase shifter PS and the attenuator ATT may be provided in the signal processing circuit 20 while arranging the other one outside the signal processing circuit 20, although this arrangement is not illustrated in particular. Further, the phase shifter PS and the attenuator ATT may be provided both inside and outside the signal processing circuit 20.

While the operation principles and specific embodiments of these first and second basic structures are now individually described, various types of variables employed in the following description are defined beforehand as follows:

$S_j(t)$: known signal output from j-th transmitted signal output unit $SG_j$ $RX_{jk}(t)$: signal $S_j(t)$, output from j-th transmitted signal output unit $SG_j$, measured by k-th received signal measuring unit $SM_k$ $\theta_j$: phase rotation quantity of signal resulting from passage through j-th phase shifter $PS_j$ $\Delta\phi RX_j$: phase rotation quantity of signal resulting from passage through j-th receiving circuit $RX_j$ $\Delta\phi TX_j$: phase rotation quantity of signal resulting from passage through j-th transmission circuit $TX_j$ $\phi_{jk}$: sum of phase rotation quantity of signal resulting from passage through j-th antenna sharer $SW_j$ to j-th antenna element $ANT_j$, phase rotation quantity of radio signal resulting from propagation through j-th antenna element $ANT_j$ to k-th antenna element $ANT_k$ and phase rotation quantity of signal resulting from passage through k-th antenna element $ANT_k$ to k-th antenna sharer $SW_k$ $A_j$: amplitude fluctuation quantity of signal resulting from passage through j-th attenuator $ATT_j$ $ARX_j$: amplitude fluctuation quantity of signal resulting from passage through j-th receiving circuit $RX_j$ $ATX_j$: amplitude fluctuation quantity of signal resulting from passage through j-th transmission circuit $TX_j$ $A_{jk}$: sum of amplitude fluctuation quantity of signal resulting from passage through j-th antenna sharer $SW_j$ to j-th antenna element $ANT_j$, amplitude fluctuation quantity of radio signal resulting from propagation through j-th antenna element $ANT_j$ to k-th antenna element $ANT_k$ and amplitude fluctuation quantity of signal resulting from passage through k-th antenna element $ANT_k$ to k-th antenna sharer $SW_k$ n: number of antenna elements (number of transmission systems)

Figure 5:
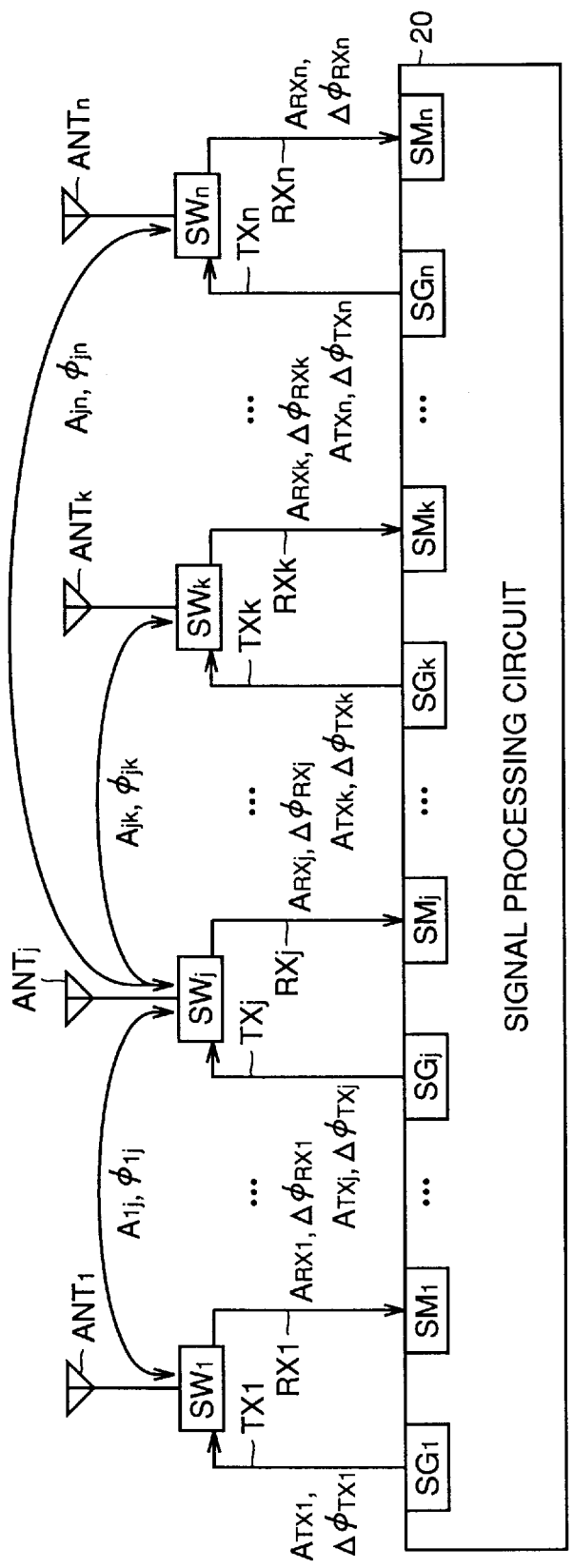
FIG. 5 illustrates a phase rotation quantity and an amplitude fluctuation quantity of a signal in each part of the first and second basic structures.

FIG. 5 shows the phase rotation quantities and the amplitude fluctuation quantities of the signals, included in the aforementioned various types of variables, displayed on corresponding portions of the first and second basic structures described above.

Operation Principle of First Basic Structure

Figure 6:
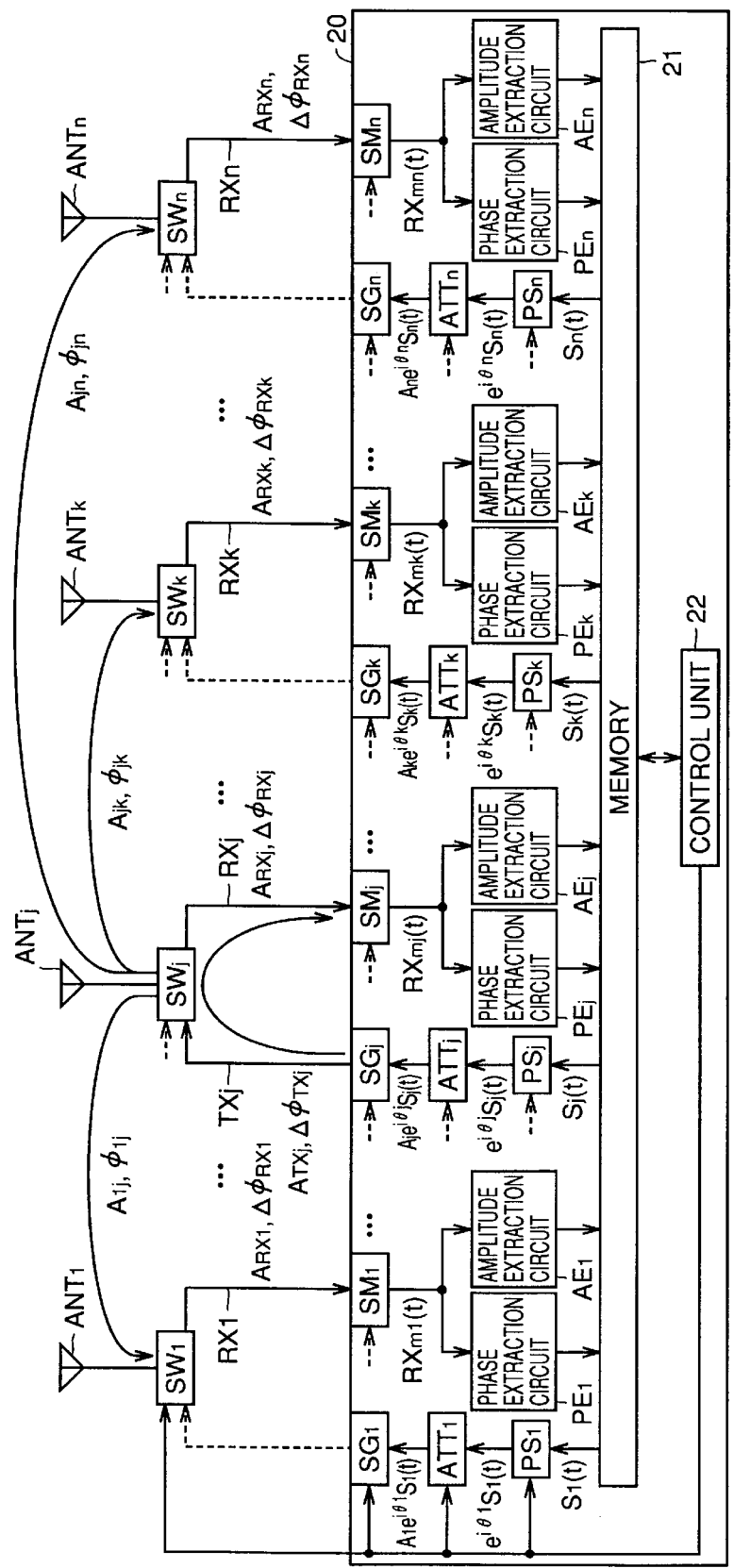
FIG. 6 is a model diagram showing a mode of transmission/receiving of signals in calibration in the adaptive array radio base station according to the first basic structure of the present invention.

FIG. 6 typically illustrates the mode of transmission/receiving of signals in calibration in the adaptive array radio base station according to the first basic structure of the present invention shown in FIG. 1. The operation principle of the adaptive array radio base station according to the first basic structure of the present invention is now described with reference to FIG. 6.

In calibration, the phase rotation quantity of the phase shifter $PS_j$ of the j-th transmission system, for example, is set to 0 and the amplitude fluctuation quantity $A_j$ of the attenuator $ATT_j$ is set to 1 (=0 dB) respectively in response to a control signal from the control unit 22. The memory 21 outputs the known signal $S_j(t)$ corresponding to the j-th transmission system under control of the control unit 22, for transmitting the same as a radio signal through the phase shifter $PS_j$, the attenuator $ATT_j$, the transmitted signal output unit $SG_j$, the transmission circuit $TX_j$, the antenna sharer $SW_j$ and the antenna element $ANT_j$ of this transmission system.

The transmitted radio signal is received in each of the remaining transmission systems excluding the j-th transmission system, e.g., in the antenna element $ANT_k$ and the receiving circuit $RX_k$ of the k-th transmission system, and measured by the received signal measuring unit $SM_k$ as a received signal $RX_{jk}(t)$.

The control signal from the control unit 22 switches a switch of the antenna sharer $SW_j$ of the j-th transmission system to connect the transmission circuit $TX_j$ to the receiving circuit $RX_j$ of this transmission system, so that the receiving circuit $RX_j$ of the transmission system itself receives the signal transmitted from the transmission circuit $TX_j$ and the received signal measuring unit $SM_j$ measures the signal as a received signal $RX_{jj}(t)$.

The following equation (1-1) expresses the signal $RX_{jk}(t)$ transmitted from the j-th transmission system and received and measured in the k-th transmission system, while the following equation (1-2) expresses the signal $RX_{jk}(t)$ received and measured in each of the first to n-th transmission systems after sequentially switching the transmission system transmitting the signal from the first to n-th transmission systems:

$$RX_{jk}(t)=A_{jk}ATX_jARX_k\exp\{i(\phi_{jk}+\Delta\phi TX_j+\Delta\phi RX_k)\}S_j(t)+n_{jk}(t),$$

$$(k=1, 2, \ldots, n) \tag{1-1}$$

$$RX_{jk}(t)=A_{jk}ATX_jARX_k\exp\{i(\phi_{jk}+\Delta\phi TX_j+\Delta\phi RX_k)\}S_j(t)+n_{jk}(t),$$

$$(j=1, 2, \ldots, n), (k=1, 2, \ldots, n)$$

where $A_{jk}=1$ and $\phi_{jk}=0$ (when $j=k$) (1-2)

In the above equations, $n_{jk}(t)$ represents noise and $i$ represents an imaginary unit ($i^2=-1$).

Both sides of the above equation (1-2) are divided by the known signal $S_j(t)$ in transmission as expressed in the following equation (1-3), and the natural logarithms of both sides of this equation are calculated as expressed in the following equation (1-4):

$$A_{jk}ATX_jARX_k\exp\{i(\phi_{jk}+\Delta\phi TX_j+\Delta\phi RX_k)\}+n_{jk}(t)/S_j(t)=RX_{jk}(t)/S_j(t)\tag{1-3}$$

$$\log_e[A_{jk}ATX_jARX_k\exp\{i(\phi_{jk}+\Delta\phi TX_j+\Delta\phi RX_k)\}+n_{jk}(t)/S_j(t)]=\log_e[RX_{jk}(t)/S_j(t)] \tag{1-4}$$

In the above equations, $\log_e[\cdot]$ represents the natural logarithm of $[\cdot]$.

The left side of the equation (1-4) is expressed as $\log_e[v+w]$, where $$A_{jk}ATX_jARX_k\exp\{i(\phi_{jk}+\Delta\phi TX_j+\Delta\phi RX_k)\}=v n_{jk}(t)/S_j(t)=w$$

Assuming that the signal power-to-noise power ratio (S-N ratio) is sufficiently excellent, v is greater than w.

The left side of the equation (1-4) subjected to the aforementioned replacement is Taylor-expanded to find the following equation (1-5), and the terms following $w/v$ on the right side of the equation (1-5) are ignorable since it is assumed that the S-N ratio is sufficiently excellent ($|w/v|\ll 1$). The following equality (1-6) results from the right sides of the above equations (1-4) and (1-5):

$$\log_e[v+w]=\log_e[v]+w/v-(w/v)^2/2+(w/v)^3/3-\ldots \tag{1-5}$$

$$\log_e[A_{jk}ATX_jARX_k]+i(\phi_{jk}+\Delta\phi TX_j+\Delta\phi RX_k)=\log_e[RX_{jk}(t)/S_j(t)] \tag{1-6}$$

The following equation (1-7) is deduced when noting the imaginary part of the above equation (1-6), while the following equation (1-8) is deduced when noting the real part. It is assumed that $Im[\cdot]$ represents the imaginary part of $[\cdot]$ and $Re[\cdot]$ represents the real part of $[\cdot]$ in these equations.

$$\phi_{jk}+\Delta\phi TX_j+\Delta\phi RX_k=Im[\log_e\{RX_{jk}(t)/S_j(t)\}]=Im[\log_e\{RX_{jk}(t)\}]-Im[\log_e\{S_j(t)\}],$$

$$(j=1, 2, \ldots, n), (k=1, 2, \ldots, n),$$

where $\phi_{jk}=0$ (when $j=k$) (1-7)

$$\log_e[A_{jk}ATX_jARX_k]=Re[\log_e\{RX_{jk}(t)/S_j(t)\}]=Re[\log_e\{RX_{jk}(t)\}]-Re[\log_e\{S_j(t)\}],$$

$$(j=1, 2, \ldots, n), (k=1, 2, \ldots, n),$$

where $A_{jk}=1$ (when $j=k$) (1-8)

The equation (1-7) related to the phase and the equation (1-8) related to the amplitude are separated through the aforementioned processing.

In the above equations, $RX_{jk}(t)$ represents an actually measured received signal and $S_j(t)$ represents a known signal. Therefore, the values of the right sides of the equations (1-7) and (1-8) can be readily found by calculation.

Assuming that $Y_{jk}$ and $X_{jk}$ represent the values found by calculating the right sides of the equations (1-7) and (1-8) respectively, these values are expressed in the following equations (1-9) and (1-10):

$$Y_{jk}=\phi_{jk}+\Delta\phi TX_j+\Delta\phi RX_k,$$

$$(j=1, 2, \ldots, n), (k=1, 2, \ldots, n)$$

where $\phi_{jk}=0$ (when $j=k$) (1-9)

$$X_{jk}=\log_e[A_{jk}]+\log_e[ATX_j]+\log_e[ARX_k],$$

$$(j=1, 2, \ldots, n), (k=1, 2, \ldots, n),$$

where $A_{jk}=1$ (when $j=k$) (1-10)

The above equation (1-9), simultaneous linear equations consisting of $n^2$ linear equations, is expressed in the following equations (1-11):

$$Y_{11}=\Delta\phi TX_1+\Delta\phi RX_1$$

$$Y_{12}=\phi_{12}+\Delta\phi TX_1+\Delta\phi RX_2$$

$$Y_{nn}=\Delta\phi TX_n+\Delta\phi RX_n \tag{1-11}$$

where $\phi_{jk}$ and $\phi_{kj}$ represent the phase rotation quantities of signals propagating in opposite directions while passing through the same circuit and propagation path, the values of which match with each other (where $j\ne k$). Therefore, the number of unknown variables $\phi_{jk}$ in the simultaneous linear equations (1-11) is $n(n-1)/2$, and the number of unknown variables $\Delta\phi TX_j$ and $\Delta\phi RX_k$ is $2n$ ($j=1, 2, \ldots, n$), ($k=1, 2, \ldots, n$)). Hence, the sum of unknown variables in the above simultaneous linear equations (1-11) is $(n^2+3n)/2$.

The above equation (1-10), also simultaneous linear equations consisting of $n^2$ linear equations, is expressed in the following equations (1-12):

$$X_{11}=\log_e[ATX_1]+\log_e[ARX_1]$$

$$X_{12}=\log_e[A_{12}]+\log_e[ATX_1]+\log_e[ARX_2]$$

$$X_{nn}=\log_e[ATX_n]+\log_e[ARX_n] \tag{1-12}$$

where $A_{jk}$ and $A_{kj}$ represent the amplitude fluctuation quantities of signals propagating in opposite directions while passing through the same circuit or propagation path, the values of which match with each other (where $j\ne k$). Therefore, the number of unknown variables $\log_e[A_{jk}]$ in the simultaneous linear equations (1-12) is $n(n-1)/2$, and the number of unknown variables $\log_e[ATX_j]$ and $\log_e[ATX_k]$ is $2n$ ($j=1, 2, \ldots, n$), $k=1, 2, \ldots, n$)). Hence, the sum of unknown variables in the above simultaneous linear equations (1-12) is also $(n^2+3n)/2$.

In order to solve these simultaneous linear equations, the sum $n^2$ of the equations forming the same must be at least identical to the number $(n^2+3n)/2$ of the unknown variables. In other words, $n^2\ge (n^2+3n)/2$ holds when n is at least 3, and hence the number of the equations exceeds that of the unknown variables in each of the simultaneous linear equations (1-11) and (1-12) if the number n of the signal transmission systems is at least 3, and the values of all unknown variables can be found in both simultaneous linear equations.

The phase rotation quantities $\Delta\phi TX_j$ and the amplitude fluctuation quantities $ATX_j$ of the signals resulting from passage through the transmission circuits $TX_j$ (j=1, 2, ..., n) and the phase rotation quantities $\Delta\phi RX_j$ and the amplitude fluctuation quantities $ARX_j$ of the signals resulting from passage through the receiving circuits $RX_j$ can be calculated in all transmission systems by solving the above simultaneous linear equations (1-11) and (1-12).

The differences in a phase rotation quantity and in an amplitude fluctuation quantity between the received signal and the transmitted signal can be compensated for in each transmission system for calibrating the transmission characteristics by supplying information on the difference between the phase rotation quantities of the receiving circuit and the transmission circuit of each transmission system estimated by the aforementioned calculation to the phase shifter of the transmission system while supplying information on the difference between the amplitude fluctuation quantities of the receiving circuit and the transmission circuit of each transmission system to the attenuator of the transmission system.

While the natural logarithm of the signal found by dividing the measured signal $RX_{jk}(t)$ by the known signal $S_j(t)$ is separated into the imaginary part and the real part in the above description of the operation principle, the operation principle of the adaptive array radio base station according to the present invention can also be implemented through a quadrature detection circuit having a function of separating an input signal into a real part and an imaginary part and outputting the same. In other words, the phase component and the amplitude component of the received signal can be readily extracted with an I signal and a Q signal output from the quadrature detection circuit.

For example, it is assumed that the signal $\{RX_{jk}(t)/S_j(t)\}$ on the right side of the equation (1-3) found by dividing the measured received signal by the known signal is input in the quadrature detection circuit and separated into an I signal and a Q signal. Assuming that A represents the amplitude value of the input signal in the quadrature detection circuit, this amplitude value is expressed as follows:

$$A=(I^2+Q^2)^{1/2}$$

Assuming that $\theta$ represents the phase value of the input signal in the quadrature detection circuit, this phase value is expressed as follows:

$$\theta=\text{Tan}^{-1}(Q/I)(\text{when } Q>0)$$

$$\theta=\text{Tan}^{-1}(Q/I)+\pi(\text{when } Q<0)$$

where $0<\text{Tan}^{-1}(Q/I)<\pi$

Also when employing such a quadrature detection circuit, therefore, the phase component and the amplitude component can be readily separated from each other. The technique of extracting the phase component and the amplitude component with the quadrature detection circuit itself is well known in the art.

When implementing the first basic structure of the present invention with the quadrature detection circuit, the output signal $Y_{jk}$ from the phase extraction circuit and the output signal $X_{jk}$ from the amplitude extraction circuit are expressed as follows:

$$Y_{jk}=\Delta\phi_{jk}+\Delta\phi TX_j+\Delta\phi RX_k$$

$$X_{jk}=A_{jk}ATX_jARX_k$$

Therefore, the received signal can be separated into an equation related to the phase and an equation related to the amplitude, and the phase rotation quantity difference as well as the amplitude fluctuation difference between the transmission circuit and the receiving circuit can be calculated through a procedure similar to the aforementioned procedure.

Also in each of the embodiments described later, the aforementioned technique of the quadrature detection circuit can be employed for extracting a phase component and an amplitude component from a signal obtained by dividing a received signal by a known signal.

The transmission characteristics of the transmission circuit and the receiving circuit regularly change due to external factors such as the temperature, and hence the adaptive array radio base station according to the present invention performs the aforementioned estimation of the transmission characteristics and calibration at intervals of several hours with frequency of several times a day.

Figure 7:
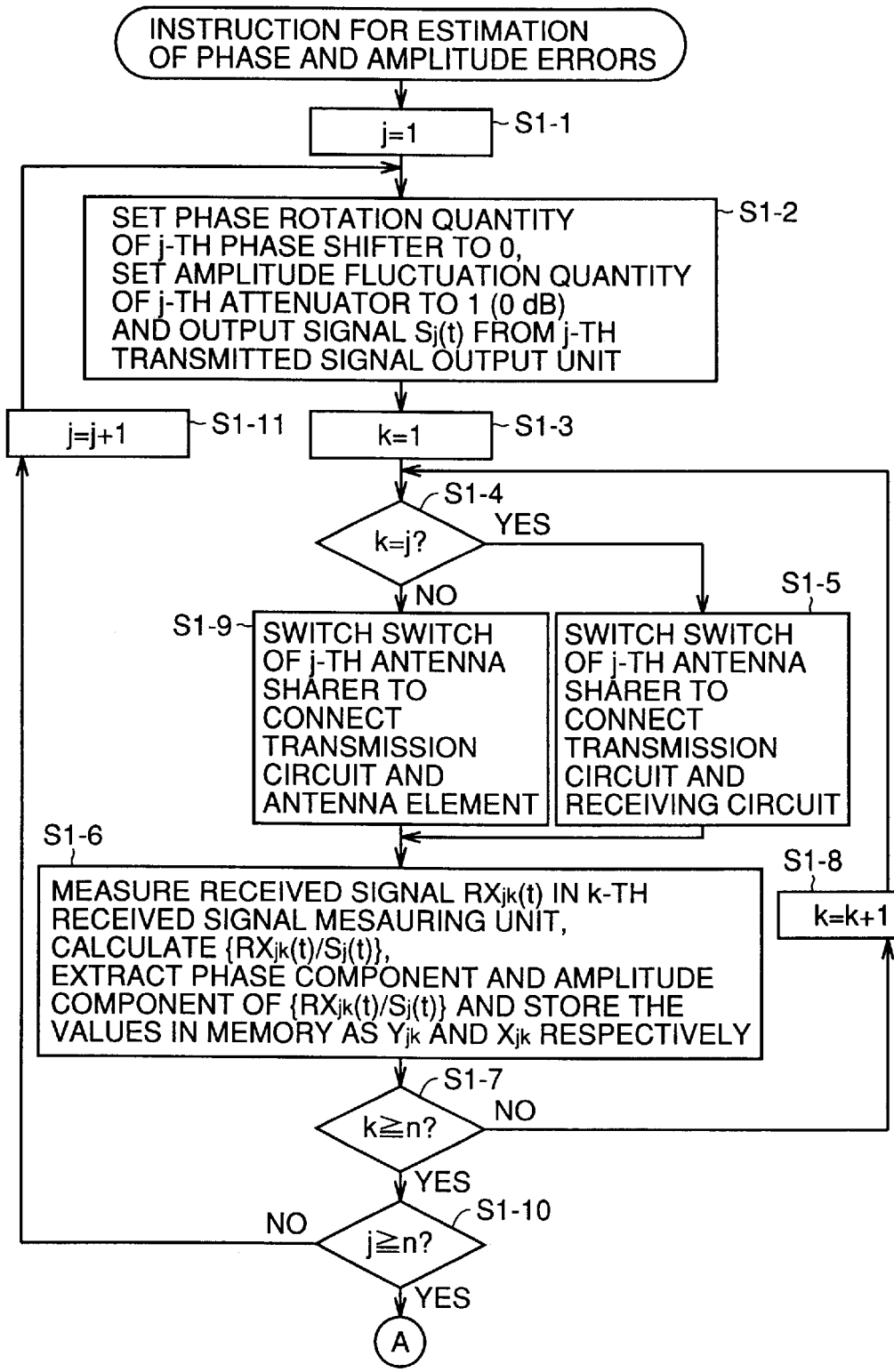
FIG. 7 is a flow chart showing the first half of operations of the first basic structure.
Figure 8:
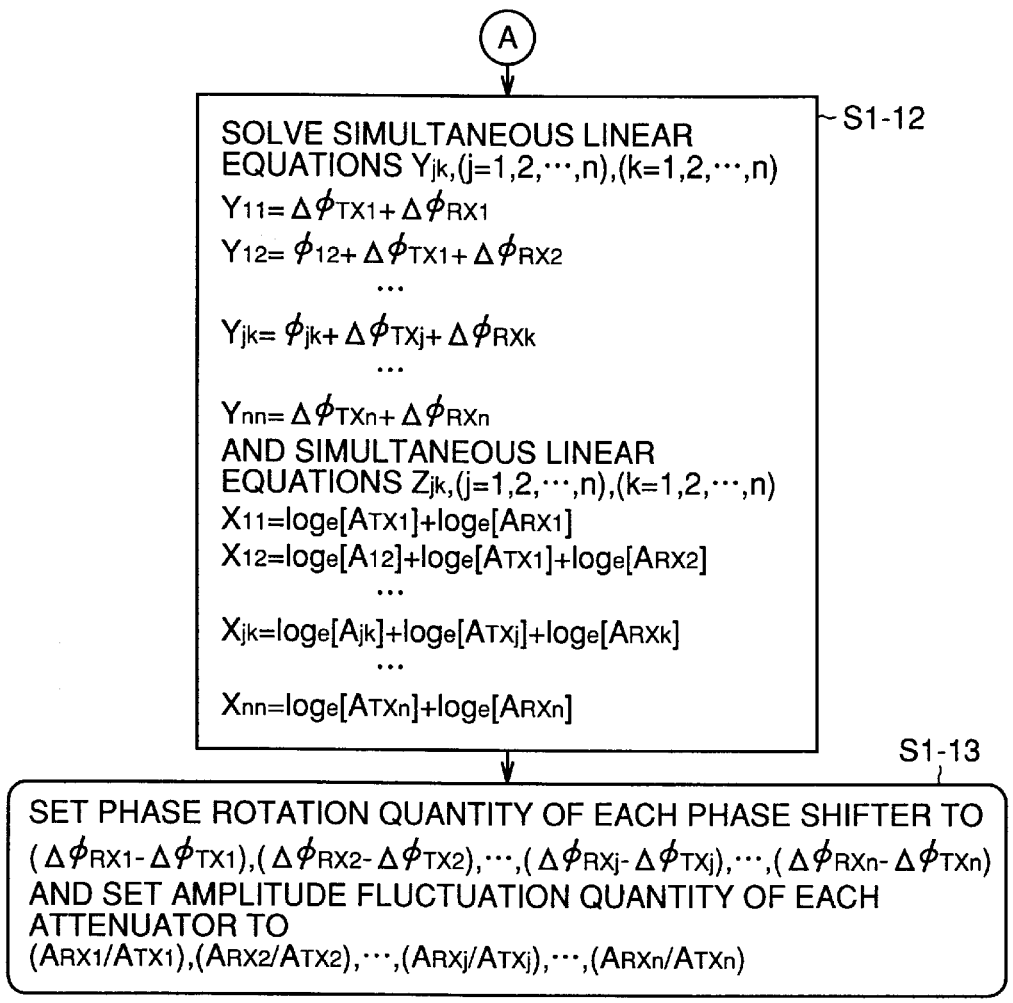
FIG. 8 is a flow chart showing the second half of the operations of the first basic structure.

In practice, a microcomputer forming the signal processing circuit 20 executes the aforementioned operations of the first basic structure of the present invention in a software manner. FIGS. 7 and 8 are flow charts of the aforementioned operations of the first basic structure implemented with the microcomputer in a software manner.

First, an instruction for estimation of phase and amplitude errors is issued at a prescribed timing (or with an external command), for starting the aforementioned calibration.

The microcomputer selects the j-th=first transmission system at a step S1-1, and sets the phase rotation quantity of the phase shifter $PS_1$ of this transmission system to 0 while setting the amplitude fluctuation quantity $A_1$ of the attenuator $ATT_1$ to 1 (=0 dB) at a step S1-2. The memory 21 outputs the known signal $S_1(t)$ corresponding to the first transmission system.

Then, the microcomputer sets the variable k to 1 at a step S1-3, and determines whether or not this transmission system corresponds to the k-th=first transmission system at a step S1-4. Since k=j=1, the microcomputer switches the antenna sharer $SW_1$ to connect the transmission circuit $TX_1$ and the receiving circuit $RX_1$ of this transmission system with each other at a step S1-5.

Then, the microcomputer measures a received signal $RX_{11}(t)$ with the received signal measuring unit $SM_1$ of the first transmission system on the basis of the above equation (1-1), calculates $RX_{11}(t)/S_1(t)$ through the equation (1-3) and separates the same into an imaginary part and a real part through the equations (1-6), (1-7) and (1-8) at a step S1-6. The microcomputer extracts the phase component of $RX_{11}(t)/S_1(t)$ along the equation (1-9) and stores the same in the memory 21 as $Y_{11}$, while extracting the amplitude component of $RX_{11}(t)/S_1(t)$ along the equation (1-10) and storing the same in the memory 21 as $X_{11}$.

Then, the microcomputer increments the value k one by one at steps S1-7, S1-8 and S1-4, and switches the antenna sharer $SW_1$ to connect the transmission circuit $TX_1$ and the antenna element $ANT_1$ of this transmission system (j=1) with each other at a step S1-6.

Then, the microcomputer measures the radio signal transmitted from the antenna element $ANT_1$ of the first transmission system with the received signal measuring unit $SM_k$ of the k-th transmission system for finding $RX_{1k}(t)$, calculates the phase component $Y_{1k}$ and the amplitude component $X_{1k}$ of $RX_{1k}(t)/S_1(t)$ along the equations (1-6) to (1-10) as described above and stores the same in the memory 21 at a step S1-6.

When determining that k reaches n at the step S1-7, the microcomputer increments the value j by 1 at steps S1-10 and S1-11 and repeats the operations of the aforementioned steps S1-2 to S1-9 in the next j-th=second transmission system.

Thus, when the microcomputer determines that j reaches n at the step S1-10, it follows that $Y_{jk}$ and $X_{jk}$ for all combinations of (j=1, 2, . . . , n) and (k=1, 2, . . . , n) are calculated and stored in the memory 21.

Then, the microcomputer solves the aforementioned two simultaneous linear equations (1-11) and (1-12) with all $Y_{jk}$ and $X_{jk}$ (j=1, 2, . . . , n), (k=1, 2, . . . , n) stored in the memory 21 at a step S1-12 shown in FIG. 8.

Then, the microcomputer sets the calculated difference in the phase rotation quantity and the calculated ratio of the amplitude fluctuation quantity between the transmission circuit and the receiving circuit of each transmission system in the phase shifter PS (previously set to 0) and the attenuator ATT (previously set to 1) of the corresponding transmission system respectively at a step S1-13. Thus, the microcomputer compensates for the differences in the aforementioned transmission characteristics and executes calibration in transmission in each transmission system.

Figure 9:
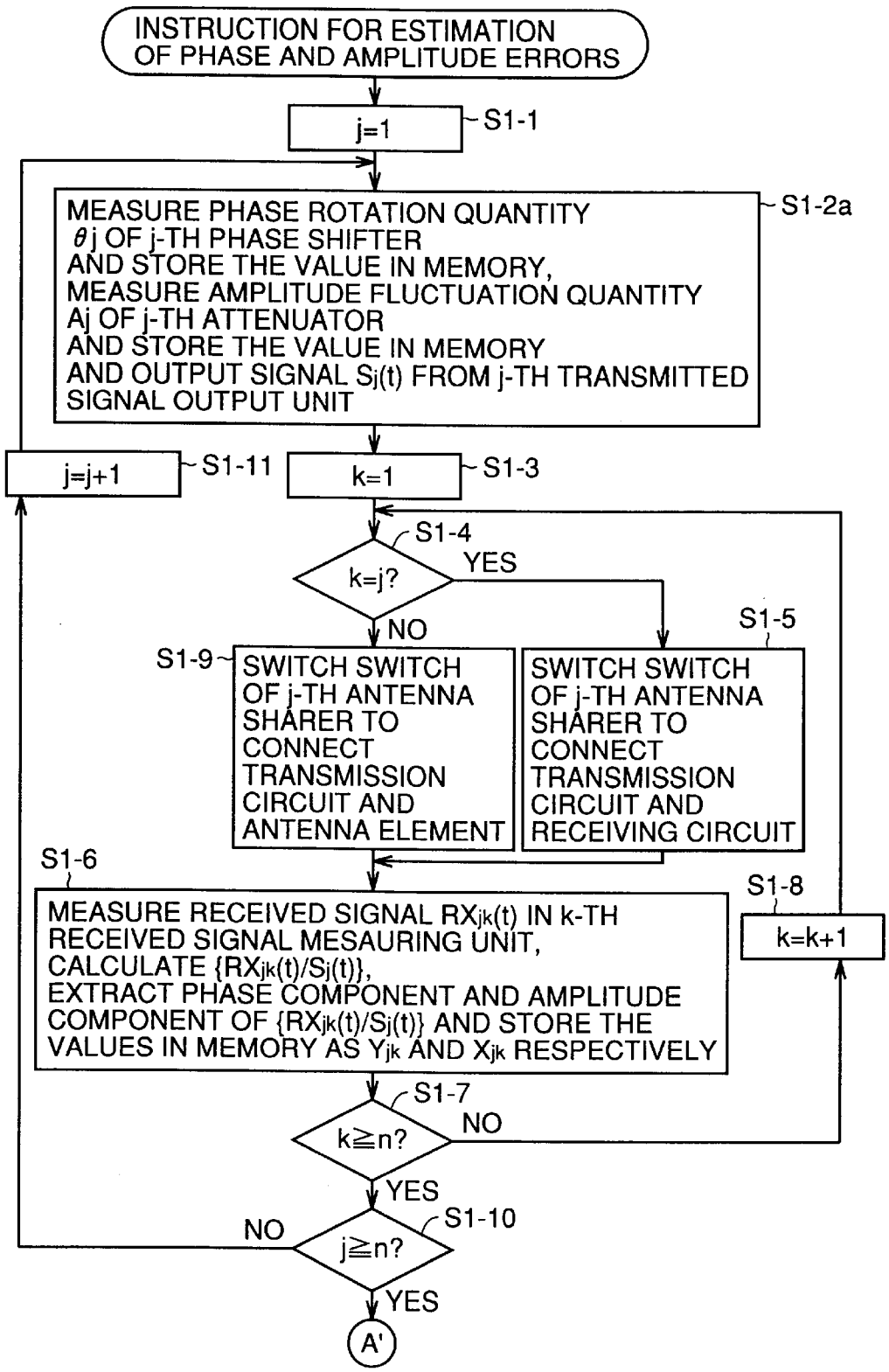
FIG. 9 is a flow chart showing the first half of operations of the modification of the first basic structure.

FIGS. 9 and 10 are flow charts showing a modification of the aforementioned operations shown in FIGS. 7 and 8. The operations shown in FIGS. 9 and 10 are identical to the operations shown in FIGS. 7 and 8 except the following points, and hence redundant description is not repeated for common operations.

While the microcomputer sets the phase rotation quantity of the phase shifter of each transmission system to 0 while setting the amplitude fluctuation quantity of the attenuator to 1 (=0 dB) at the step S1-2 in the example shown in FIG. 7, the microcomputer performs no such setting but measures the current phase rotation quantity $\theta_j$ of the phase shifter $PS_j$ and the current amplitude fluctuation quantity $A_j$ of the attenuator $ATT_j$ for storing the values in the memory 21 respectively at the step S1-2a in the example shown in FIG. 9.

While the microcomputer sets the difference in the phase rotation quantity and the ratio of the amplitude fluctuation quantity between the transmission circuit and the receiving circuit calculated for each transmission system in the phase shifter, previously set to 0, and the attenuator, previously set to 1, of the corresponding transmission system thereby performing calibration for compensating for the phase rotation quantity difference and the amplitude fluctuation quantity difference at the step S1-13 in the example shown in FIG. 8, the microcomputer reads initial values $\theta_j$ and $A_j$ of the phase shifter and the attenuator measured and stored in the memory 21 at the step S1-2a of FIG. 9 when starting calibration and compensates for these initial values $\theta_j$ and $A_j$ with the calculated difference in the phase rotation quantity and the calculated ratio of the amplitude fluctuation quantity thereby performing calibration at a step S1-13a.

Figure 11:
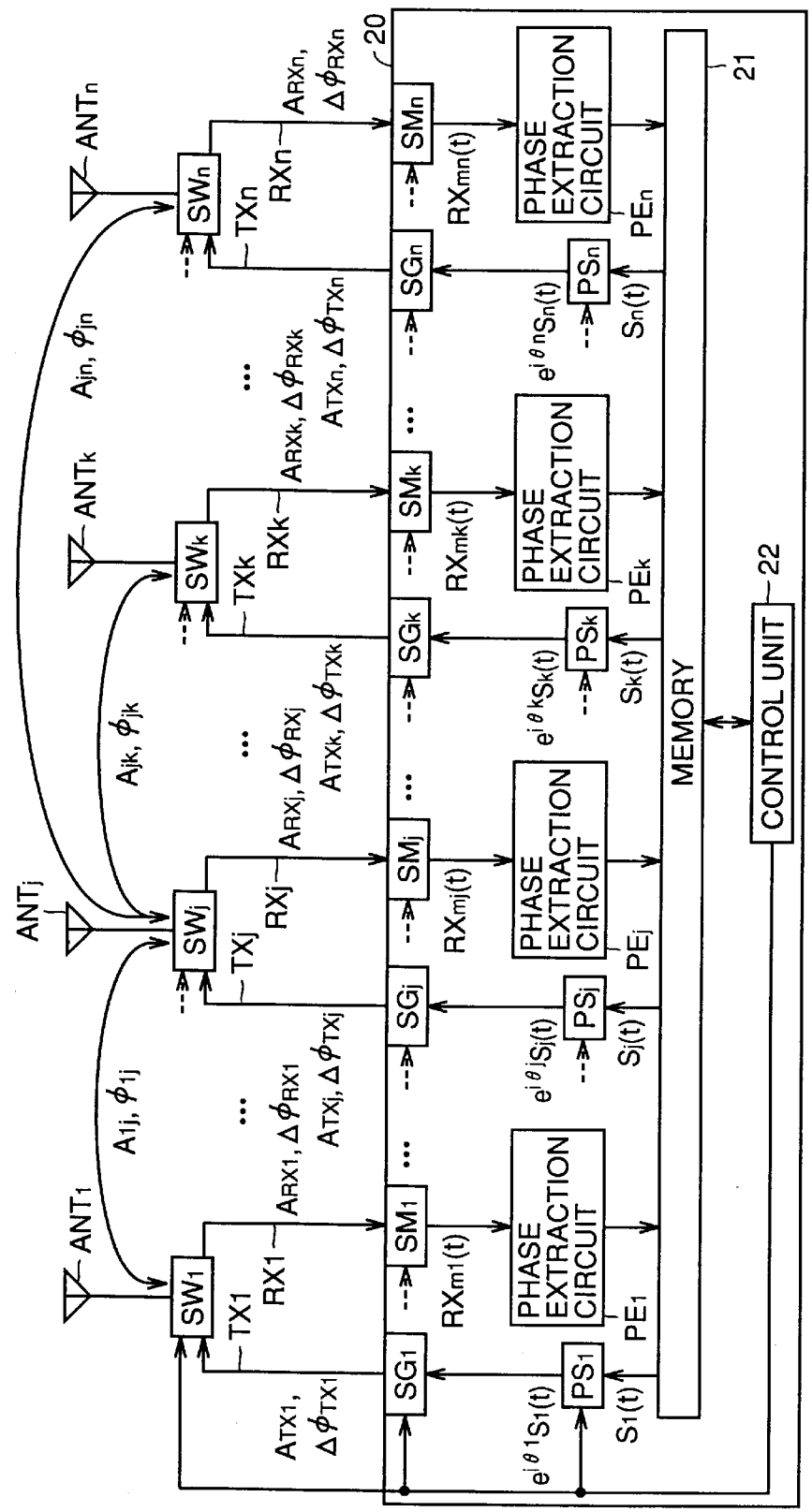
FIG. 11 is a schematic block diagram showing another modification of the first basic structure of the present invention.

FIG. 11 is a block diagram showing the structure of a signal processing circuit 20 of an adaptive array radio base station according to another modification of the first basic structure of the present invention shown in FIG. 1 for estimating only the difference between phase rotation quantities of a transmission circuit and a receiving circuit of each transmission system. The circuit structure shown in FIG. 11 is identical to the first basic structure shown in FIG. 1 except that the attenuator $ATT_j$ and the amplitude extraction circuit $AE_j$ (j=1, 2, . . . , n) are omitted in each transmission system, and hence the description of FIG. 1 is applied to this modification for omitting description of FIG. 11.

Figure 12:
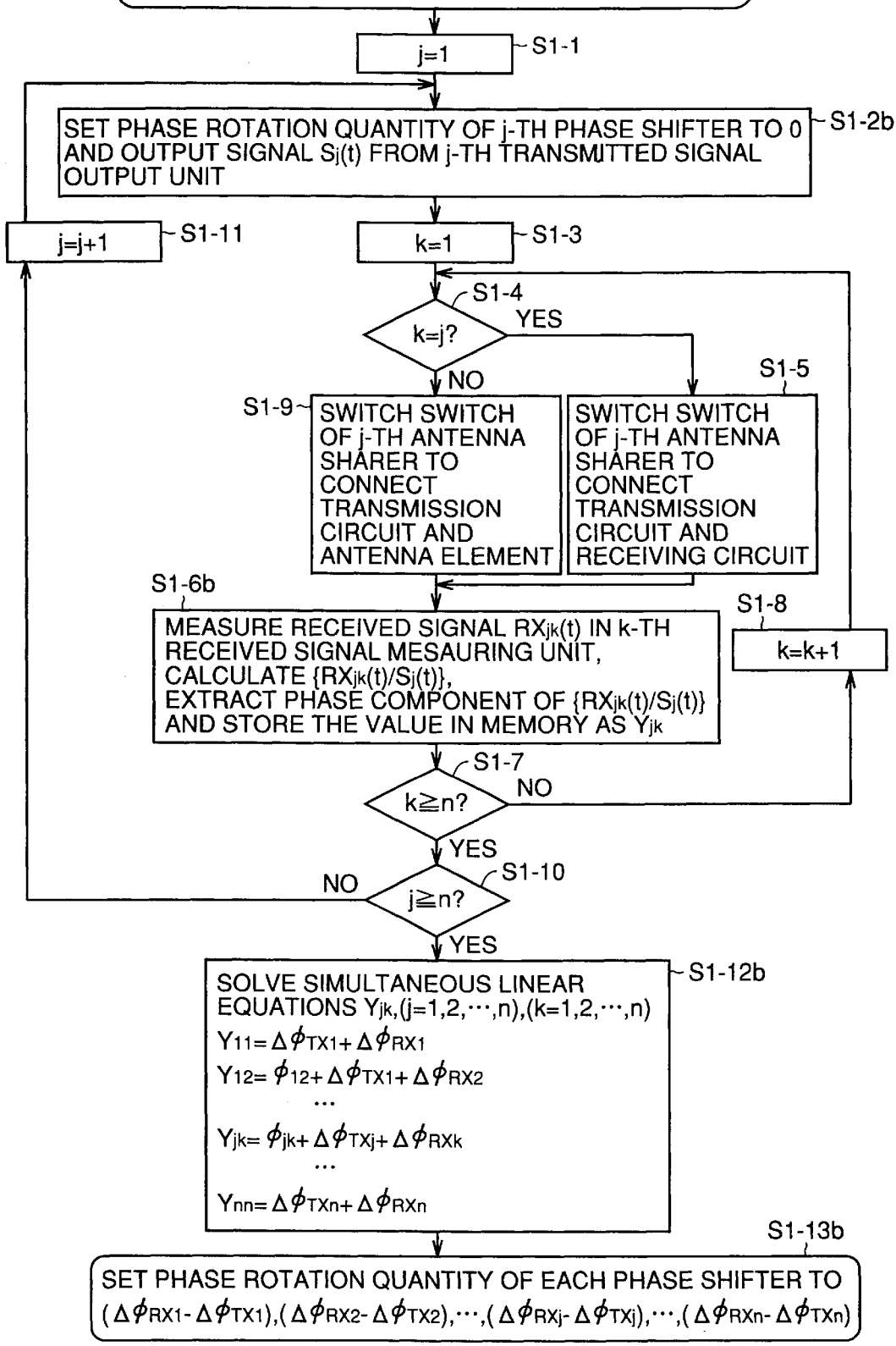
FIG. 12 is a flow chart showing operations of the modification shown in FIG. 11.

FIG. 12 is a flow chart of operations of the circuits shown in FIG. 11 implemented with a microcomputer in a software manner. This flow chart is identical to the operation flow charts of the first basic structure shown in FIGS. 7 and 8 except that operations related to the amplitude component are omitted, and hence the description of FIGS. 7 and 8 is applied to this flow chart for omitting description of FIG. 12.

Figure 13:
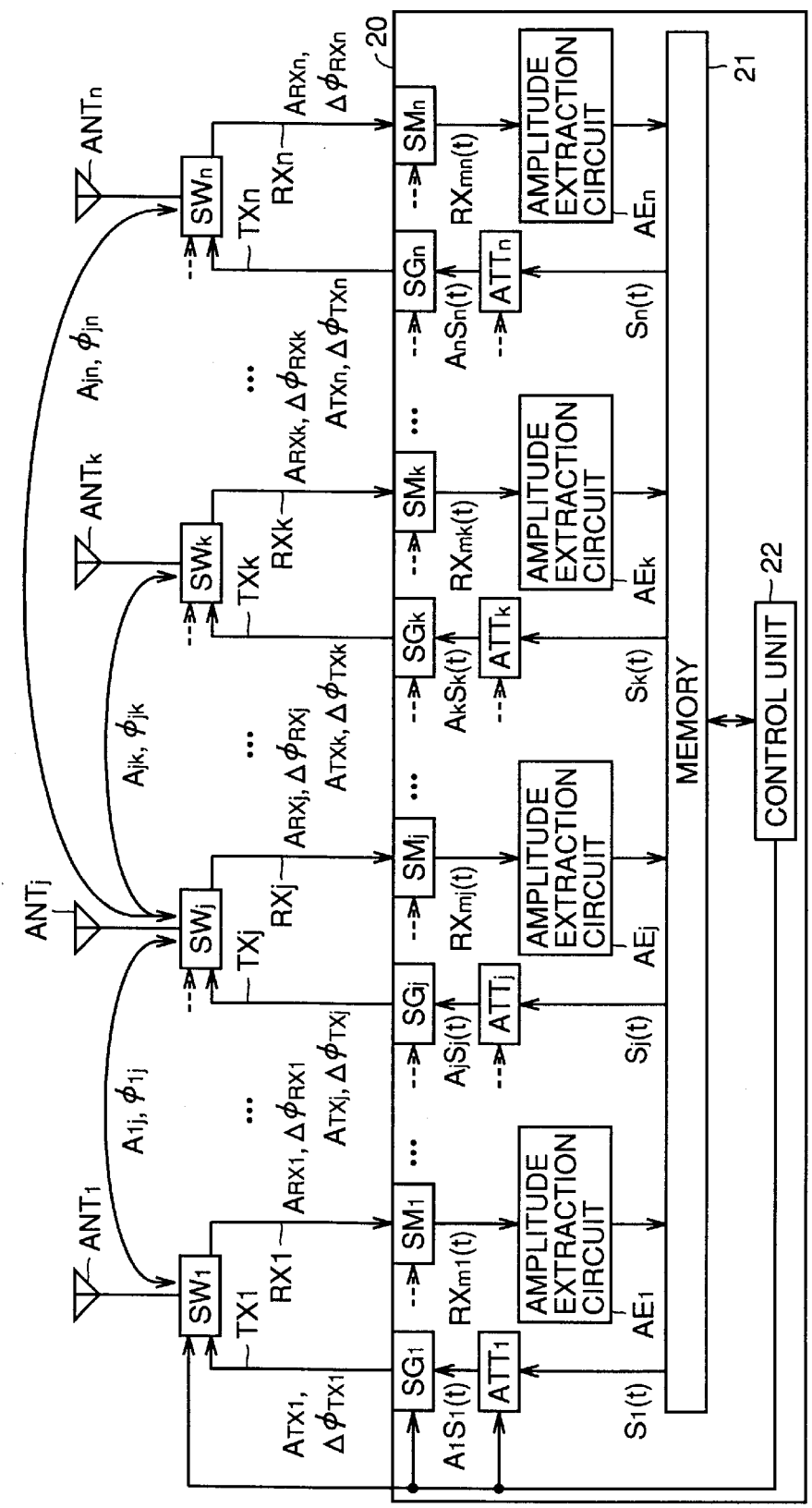
FIG. 13 is a schematic block diagram showing still another modification of the first basic structure of the present invention.

FIG. 13 is a block diagram showing the structure of a signal processing circuit 20 of an adaptive array radio base station according to still another modification of the first basic structure of the present invention shown in FIG. 1 for estimating only the difference in amplitude fluctuation quantity between a transmission circuit and a receiving circuit of each transmission system. The circuit structure shown in FIG. 13 is identical to the first basic structure shown in FIG. 1 except that the phase shifter $PS_j$ and the phase extraction circuit $PE_j$ (j=1, 2, . . . , n) are omitted in each transmission system, and hence the description of FIG. 1 is applied to this modification for omitting description of FIG. 13.

Figure 14:
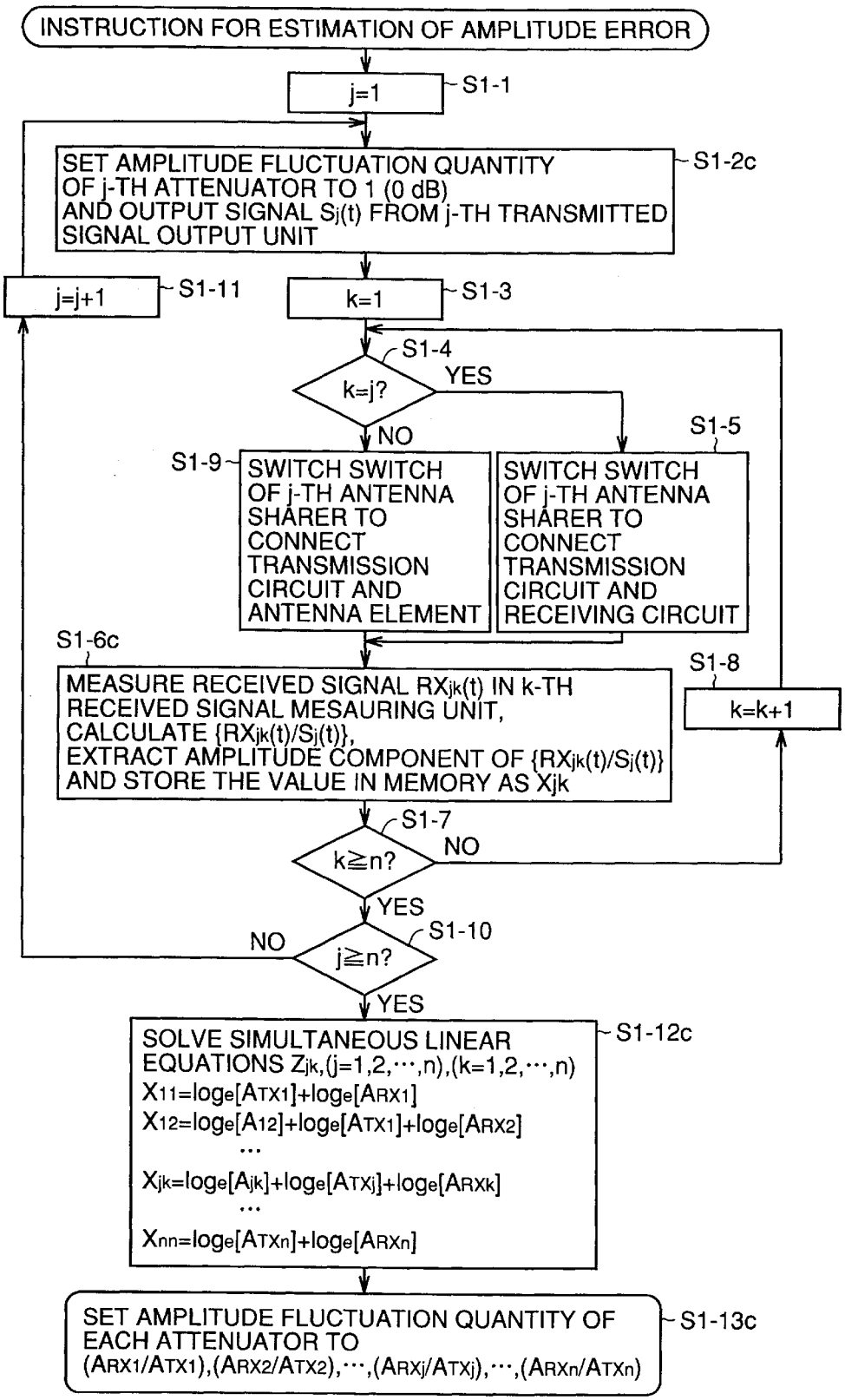
FIG. 14 is a flow chart showing operations of the modification shown in FIG. 13.

FIG. 14 is a flow chart of operations of the circuits shown in FIG. 13 implemented with a microcomputer in a software manner. This flow chart is identical to the operation flow charts of the first basic structure shown in FIGS. 7 and 8 except that operations related to the phase component are omitted, and hence the description of FIGS. 7 and 8 is applied to this flow chart for omitting description of FIG. 14.

Embodiments of First Basic Structure

First Embodiment

Figure 15:
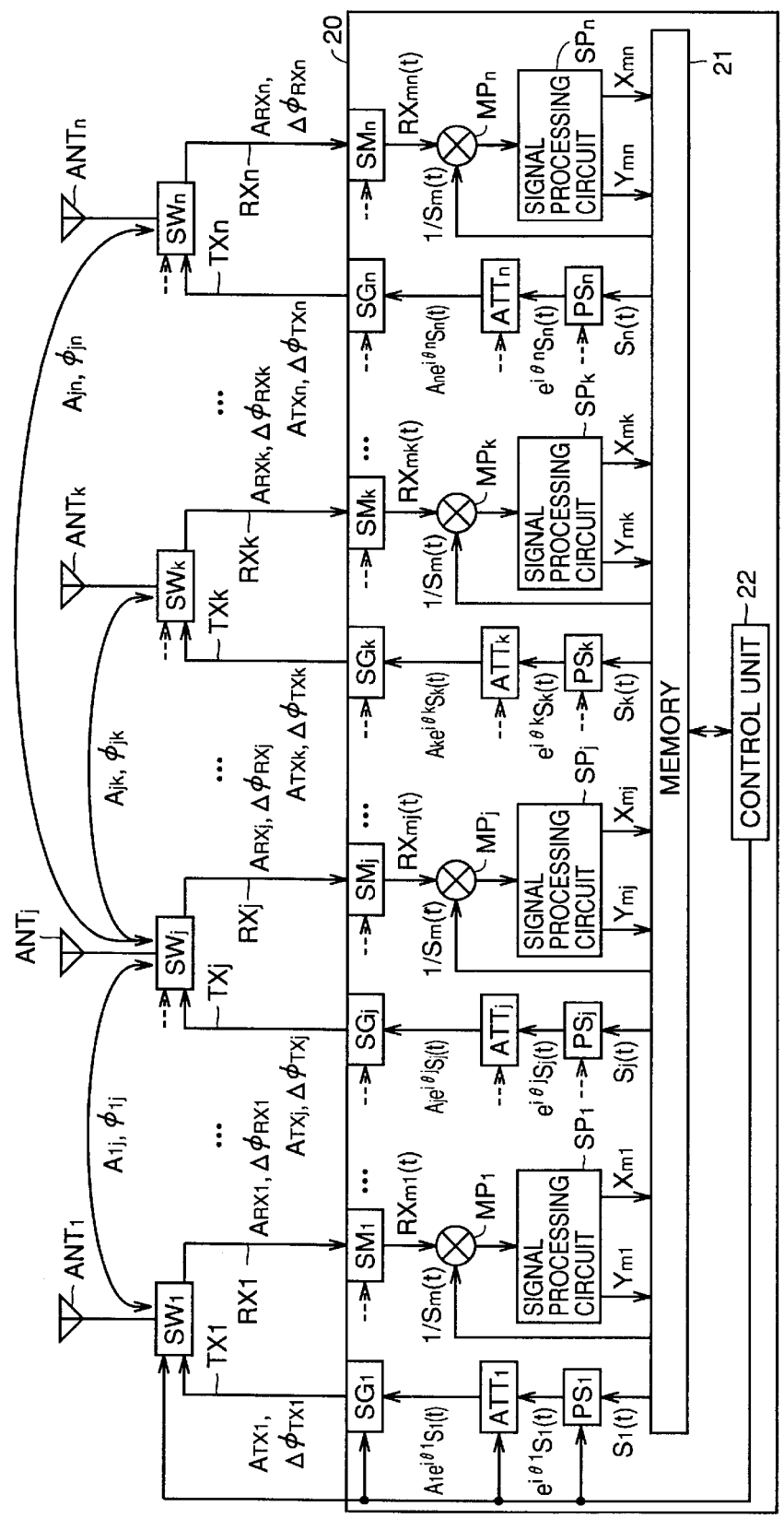
FIG. 15 is a block diagram showing a first embodiment of the first basic structure of the present invention.

FIG. 15 is a block diagram showing a specific circuit structure of a signal processing circuit 20 of an adaptive array radio base station according to a first embodiment of the first basic structure of the present invention shown in FIG. 1.

In contrast with the circuit structure of FIG. 1, a phase extraction circuit $PE_j$ and an amplitude extraction circuit $AE_j$ (j=1, 2, . . . , n) of each transmission system are formed by a single multiplier $MP_j$ and a single signal processing circuit $SP_j$ in the first basic structure.

The multiplier $MP_j$ (j=1, 2, . . . , n) of each transmission system operates the equation (1-3) described with reference to FIG. 6. In other words, the multiplier $MP_j$ divides a received signal measured in a received signal measuring unit $SM_j$ by a known transmitted signal $S_j(t)$ of the transmission system.

Then, the signal processing circuit $SP_j$ (j=1, 2, . . . , n) of each transmission system operates the equations (1-4) to (1-10) described with reference to FIG. 6. In other words, the signal processing circuit $SP_j$ calculates the natural logarithm of an output from the corresponding multiplier $MP_j$, extracts its imaginary part as $Y_{mj}$ and forms the equation (1-9) related to the phase while extracting the real part as $X_{mj}$ and forming the equation (1-10) related to the amplitude.

Figure 16:
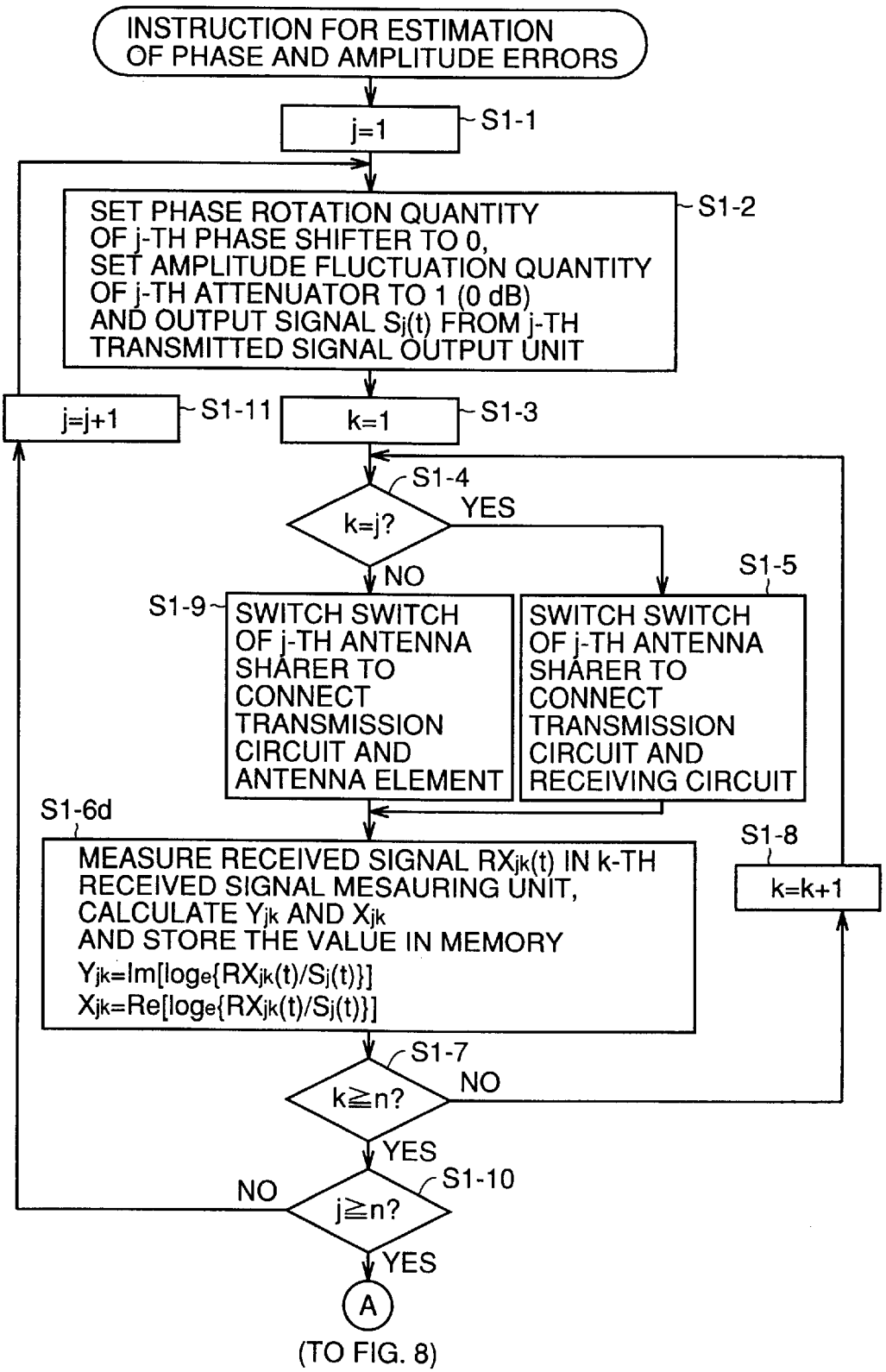
FIG. 16 is a flow chart showing operations of the first embodiment shown in FIG. 15.

FIG. 16 is a flow chart illustrating operations of the first embodiment shown in FIG. 15 in correspondence to the first half of the operations of the first basic structure shown in FIG. 7. In correspondence to the flow chart of FIG. 7, FIG. 16 specifically describes the contents of signal processing performed at the step S1-6 of FIG. 7 in a step S1-6d. At the step S1-6d shown in FIG. 16, a microcomputer calculates the natural logarithm of $RX_{jk}(t)/S_j(t)$ and extracts its imaginary and real parts, thereby finding the equations (1-9) and (1-10) of the phase component and the amplitude component respectively.

Second Embodiment

Figure 17:
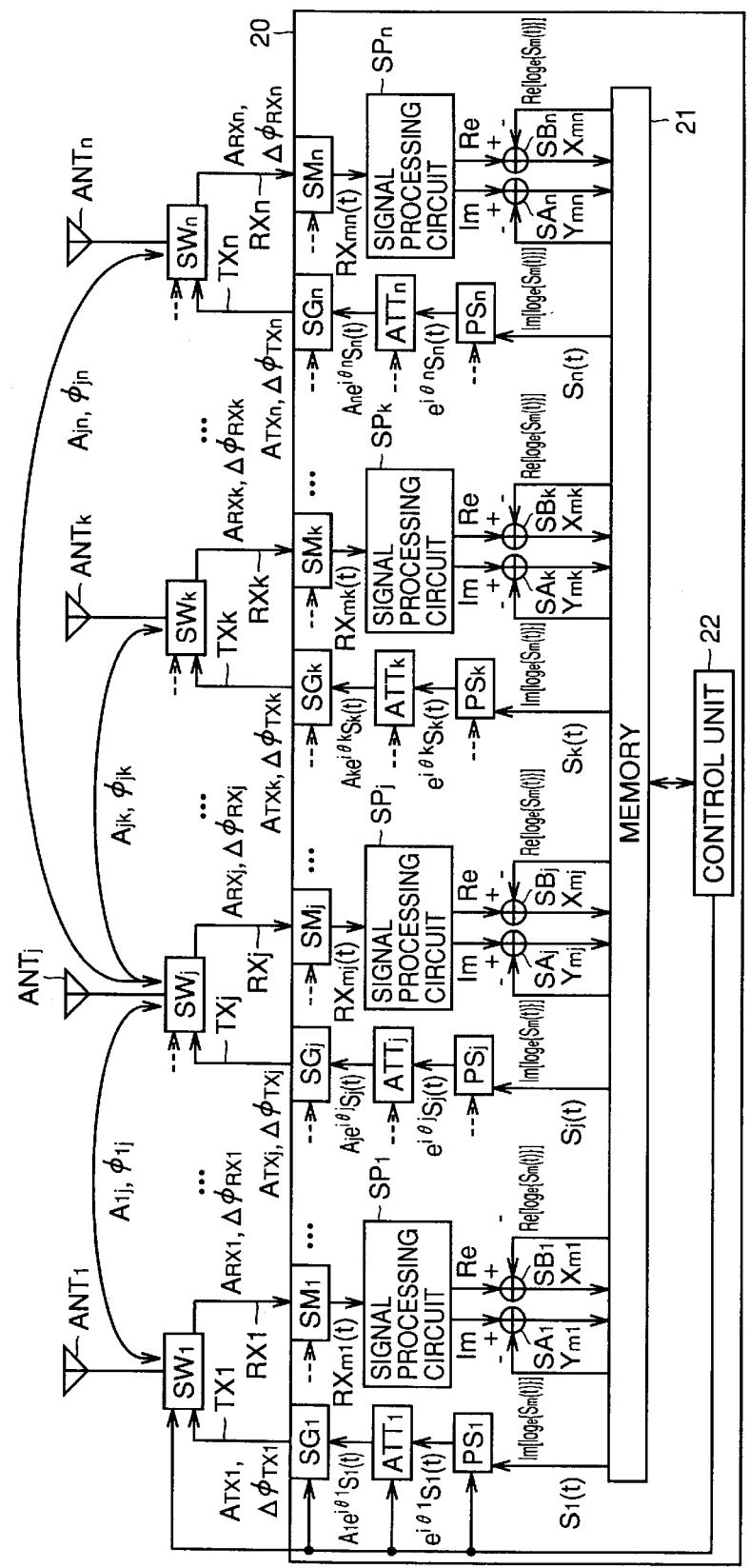
FIG. 17 is a block diagram showing a second embodiment of the first basic structure of the present invention.

FIG. 17 is a block diagram showing a specific circuit structure of a signal processing circuit 20 of an adaptive array radio base station according to a second embodiment of the first basic structure of the present invention shown in FIG. 1.

In contrast with the circuit structure of FIG. 1, a phase extraction circuit $PE_j$ and an amplitude extraction circuit $AE_j$ (j=1, 2, . . . , n) of each transmission system are formed by a single signal processing circuit $SP_j$ and two signal subtracters $SA_j$ and $SB_j$ in the first basic structure.

The signal processing circuit $SP_j$ (j=1, 2, . . . , n) of each transmission system calculates the natural logarithm of a received signal measured in a received signal measuring unit $SM_j$, extracts its imaginary part and supplies the same to the subtracter $SA_j$ while extracting the real part and supplying the same to the other subtracter $SB_j$.

The aforementioned subtracter $SA_j$ subtracts an imaginary part $Im[\log_e\{S_j(t)\}]$ of a value found by calculating the natural logarithm of a known transmitted signal $S_j(t)$ of the transmission system from the imaginary part of the supplied received signal. The other subtracter $SB_j$ subtracts a real part $Re[\log_e\{S_j(t)\}]$ of the value found by calculating the natural logarithm of the known transmitted signal $S_j(t)$ of the transmission system from the real part of the supplied received signal.

The result of the subtraction of the imaginary part found by the subtracter $SA_j$ is extracted as $Y_{mj}$ for forming the equation (1-9) related to the phase, while the result of the subtraction of the real part found by the other subtracter $SB_j$ is extracted as $X_{mj}$ for forming the equation (1-10) related to the amplitude.

According to the second embodiment shown in FIG. 17, as described above, the imaginary part and the real part of the received signal are previously separated for thereafter subtracting the imaginary part and the real part of the known signal $S_j(t)$ respectively.

In the first embodiment described with reference to FIGS. 6 and 15, on the other hand, the received signal is divided by the known signal in advance of separation into the imaginary part and the real part in reverse order of operations. However, the equations (1-9) and (1-10) are finally found in either case and hence the circuit structure shown in FIG. 17 is conceivably equivalent to the first basic structure shown in FIG. 1.

Figure 18:
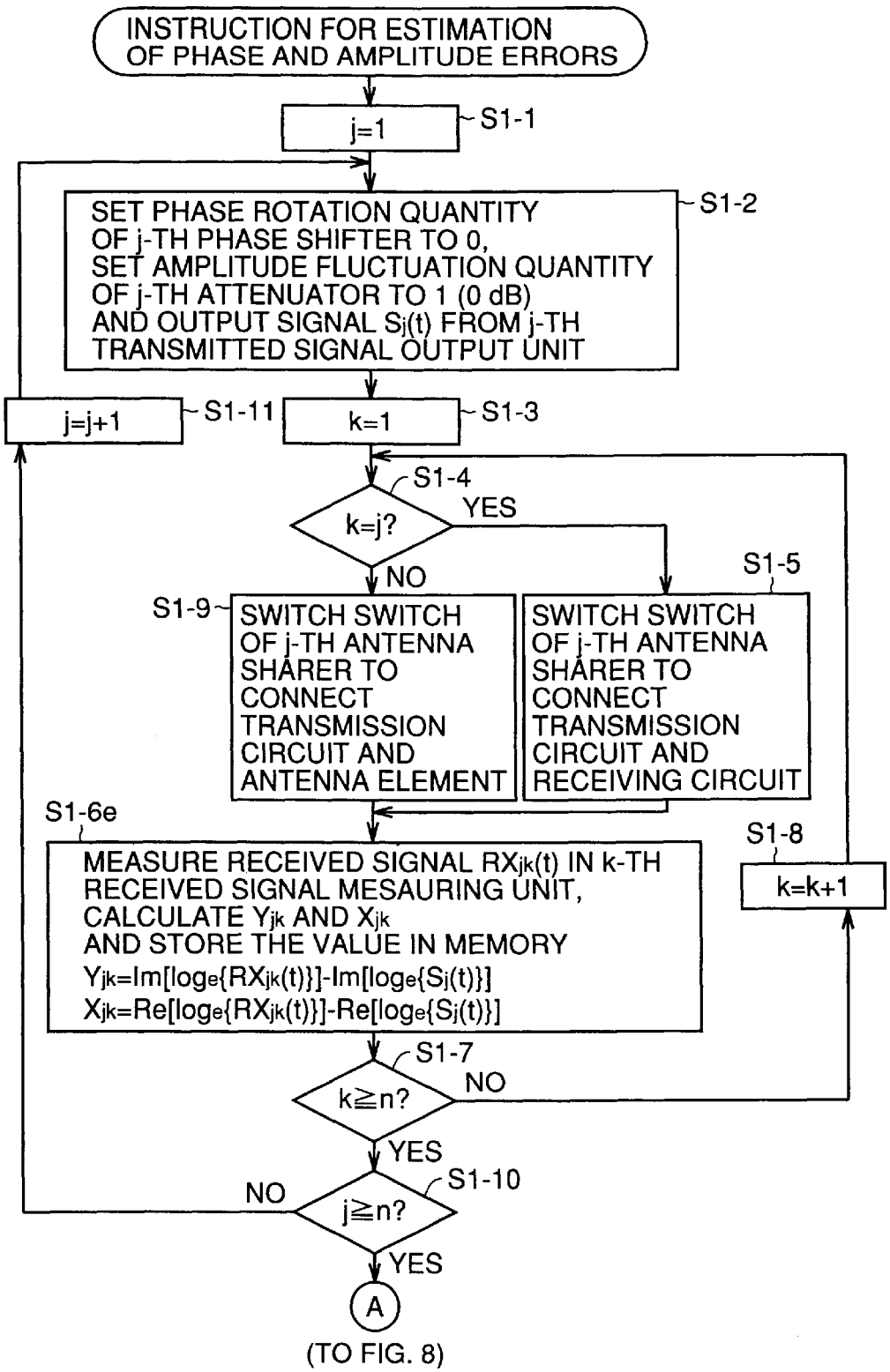
FIG. 18 is a flow chart showing operations of the second embodiment shown in FIG. 17.

FIG. 18 is a flow chart illustrating operations of the second embodiment shown in FIG. 17 in correspondence to the first half of the operations of the first basic structure shown in FIG. 7. In contrast with the flow chart of FIG. 7, FIG. 18 specifically describes the contents of signal processing performed at the step S1-6 of FIG. 7 in a step S1-6e. At the step S1-6e shown in FIG. 18, a microcomputer subtracts an imaginary part and a real part of a value found by calculating the natural logarithm of $S_j(t)$ from an imaginary part and a real part of a value found by calculating the natural logarithm of $RX_{jk}(t)$, thereby finding the equations (1-9) and (1-10) of the phase component and the amplitude component respectively.

The first and second embodiments have been described on the premise that the S-N ratio is sufficiently excellent, as described above. In other words, each of the first and second embodiments shown in FIGS. 15 to 18 is effective when a received signal has an excellent S-N ratio, and can estimate the phase rotation difference and the amplitude fluctuation difference between the transmission circuit and the receiving circuit of each transmission system with a relatively small signal processing quantity as compared with the remaining embodiments described later.

Operation Principle of Second Basic Structure

Figure 19:
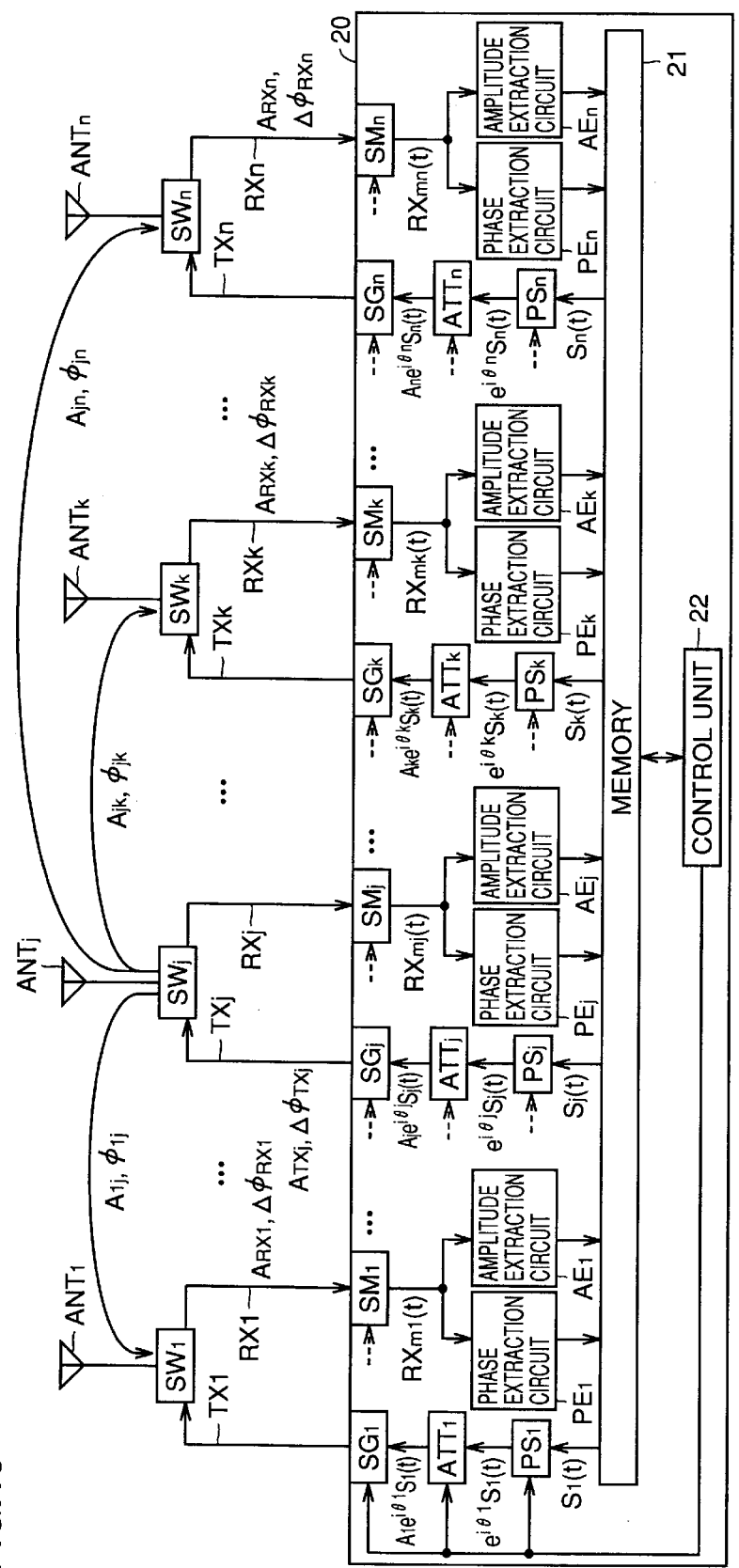
FIG. 19 is a model diagram showing a mode of transmission/receiving of signals in calibration in the adaptive array radio base station according to the second basic structure of the present invention.

FIG. 19 typically illustrates the mode of transmission/receiving of signals in calibration in the adaptive array radio base station according to the second basic structure of the present invention shown in FIG. 3. The operation principle of the adaptive array radio base station according to the second basic structure of the present invention is now described with reference to FIG. 19.

In calibration, the phase rotation quantity of the phase shifter $PS_j$ of the j-th transmission system, for example, is set to 0 and the amplitude fluctuation quantity $A_j$ of the attenuator $ATT_j$ is set to 1 (=0 dB) respectively in response to a control signal from the control unit 22. The memory 21 outputs the known signal $S_j(t)$ corresponding to the j-th transmission system under control of the control unit 22, for transmitting the same as a radio signal through the phase shifter $PS_j$, the attenuator $ATT_j$, the transmitted signal output unit $SG_j$, the transmission circuit $TX_j$, the antenna sharer $SW_j$ and the antenna element $ANT_j$ of this transmission system.

The transmitted radio signal is received in each of the remaining transmission systems excluding the j-th transmission system, e.g., in the antenna element $ANT_k$ and the receiving circuit $RX_k$ of the k-th transmission system, and measured by the received signal measuring unit $SM_k$ as a received signal $RX_{jk}(t)$.

In the adaptive array radio base station according to the second basic structure shown in FIG. 19, the antenna sharer SW is not switched to connect the transmission circuit TX and the receiving circuit RX with each other in the corresponding transmission system, dissimilarly to the adaptive array radio base station according to the first basic structure shown in FIG. 6.

The following equation (1-13) expresses the signal $RX_{jk}(t)$ transmitted from the j-th transmission system and received and measured in the k-th transmission system, while the following equation (1-14) expresses the signal $RX_{jk}(t)$ received and measured in each of the first to n-th transmission systems excluding the transmission system transmitting the signal after sequentially switching the transmission system transmitting the signal from the first to n-th transmission systems:

$$RX_{jk}(t) = A_{jk}ATX_j ARX_k \exp\{i(\varphi_{jk} + \Delta\varphi TX_j + \Delta\varphi RX_k)\} S_j(t) + n_{jk}(t)$$

$$(k=1, 2, \ldots, n)$$

where $k \neq j$ \hfill (1-13)

$$RX_{jk}(t) = A_{jk}ATX_j ARX_k \exp\{i(\varphi_{jk} + \Delta\varphi TX_j + \Delta\varphi RX_k)\} S_j(t) + n_{jk}(t)$$

$$(j=1, 2, \ldots, n), (k=1, 2, \ldots, n)$$

where $j \neq k$ \hfill (1-14)

Both sides of the above equation (1-14) are divided by the known signal $S_j(t)$ in transmission as expressed in the following equation (1-15), and the natural logarithms of both sides of this equation are calculated as expressed in the following equation (1-16):

$$A_{jk}ATX_j ARX_k \exp\{i(\varphi_{jk} + \Delta\varphi TX_j + \Delta\varphi RX_k)\} + n_{jk}(t)/S_j(t) = RX_{jk}(t)/S_j(t) \quad (1\text{-}15)$$

$$\log_e[A_{jk}ATX_j ARX_k \exp\{i(\varphi_{jk} + \Delta\varphi TX_j + \Delta\varphi RX_k)\} + n_{jk}(t)/S_j(t)] = \log_e[RX_{jk}(t)/S_j(t)] \quad (1\text{-}16)$$

The left side of the equation (1-16) is expressed as $\log_e[v+w]$, where $$A_{jk}ATX_jARX_k\exp\{i(\phi_{jk}+\Delta\phi TX_j+\Delta\phi RX_k)\}=vn_{jk}(t)/S_j(t)=w$$

Assuming that the signal power-to-noise power ratio (S-N ratio) is sufficiently excellent, v is greater than w.

The left side of the equation (1-16) subjected to the above replacement is Taylor-expanded to find the following equation (1-17), and the terms following w/v on the right side of the equation (1-17) are ignorable since it is assumed that the S-N ratio is sufficiently excellent ($|w/v|\ll 1$) as described above.

The following equality (1-18) results from the right sides of the above equations (1-16) and (1-17):

$$\log_e[v+w]=\log_e[v]+w/v-(w/v)^2/2+(w/v)^3/3- \quad (1\text{-}17)$$

$$\log_e[A_{jk}ATX_jARX_k]+i(\phi_{jk}+\Delta\phi TX_j+\Delta\phi RX_k)=\log_e[RX_{jk}(t)/S_j(t)] \quad (1\text{-}18)$$

The following equation (1-19) is deduced when noting the imaginary part of the above equation (1-18), while the following equation (1-20) is deduced when noting the real part.

$$\phi_{jk}+\Delta\phi TX_j+\Delta\phi RX_k=Im[\log_e\{RX_{jk}(t)/S_j(t)\}]=Im[\log_e\{RX_{jk}(t)\}]-Im[\log_e\{S_j(t)\}],$$

$(j=1, 2, \ldots, n), (k=1, 2, \ldots, n),$ where $j \neq k$ (1-19)

$$\log_e[A_{jk}ATX_jARX_k]=Re[\log_e\{RX_{jk}(t)/S_j(t)\}]=Re[\log_e\{RX_{jk}(t)\}]-Re[\log_e\{S_j(t)\}],$$

$(j=1, 2, \ldots, n), (k=1, 2, \ldots, n),$ where $j \neq k$ (1-20)

The equation (1-19) related to the phase and the equation (1-20) related to the amplitude are separated through the aforementioned processing.

In the above equations, $RX_{jk}(t)$ represents an actually measured received signal and $S_j(t)$ represents a known signal. Therefore, the values of the right sides of the equations (1-19) and (1-20) can be readily found by calculation.

Assuming that $Y_{jk}$ and $X_{jk}$ represent the values found by calculating the right sides of the equations (1-19) and (1-20), these values are expressed in the following equations (1-21) and (1-22) respectively:

$$Y_{jk}=\phi_{jk}+\Delta\phi TX_j+\Delta\phi RX_k,$$

$(j=1, 2, \ldots, n), (k=1, 2, \ldots, n),$ where $j \neq k$ (1-21)

$$X_{jk}=\log_e[A_{jk}]+\log_e[ATX_j]+\log_e[ARX_k],$$

$(j=1, 2, \ldots, n), (k=1, 2, \ldots, n),$ where $j \neq k$ (1-22)

When substituting $Y_{jk}-Y_{kj}=Z_{jk}$ in the equation (1-21) as to the phase information obtained in the aforementioned manner, the following equation (1-23) is found. When substituting $X_{jk}-X_{kj}=V_{jk}$ in the equation (1-22) as to the obtained amplitude information, the following equation (1-24) is found:

$$Z_{jk}=(\phi_{jk}-\phi_{kj})+(\Delta\phi RX_k-TX_k)-(\Delta\phi RX_j-\Delta\phi TX_j),$$

$(j=1, 2, \ldots, n-1), (k=j+1, j+2, \ldots, n)$ (1-23)

$$V_{jk}=(\log_e[A_{jk}]-\log_e[A_{kj}])+(\log_e[ARX_k]-\log_e[ATX_k])-(\log_e[ARX_j]-\log_e[ATX_j]),$$

$(j=1, 2, \ldots, n-1), (k=j+1, j+2, \ldots, n)$ (1-24)

where $\phi_{jk}$ and $\phi_{kj}$ represent the phase rotation quantities of signals propagating in opposite directions while passing through the same circuit and propagation path, the values of which match with each other (where $j \neq k$). Hence, the following equation (1-25) holds.

On the other hand, $\log_e[A_{jk}]$ and $\log_e[A_{kj}]$ represent the amplitude fluctuation quantities of signals propagating in opposite directions while passing through the same circuit and propagation path, the values of which match with each other (where $j \neq k$). Hence, the following equation (1-26) holds:

$\phi_{jk}=\phi_{kj}, (j=1, 2, \ldots, n), (k=1, 2, \ldots, n),$ where $j \neq k$ (1-25)

$\log_e[A_{jk}]=\log_e[A_{kj}], (j=1, 2, \ldots, n), (k=1, 2, \ldots, n),$ where $j \neq k$ (1-26)

Assuming that $\Delta\phi_j$ represents the difference between phase rotation quantities of a signal passing through the receiving circuit of the j-th transmission system and passing through the transmission circuit of the j-th transmission system, this difference is expressed in the following equation (1-27), and assuming that $\Delta A_j$ represents the difference between amplitude fluctuation quantities of the signal passing through the receiving circuit of the j-th transmission system and passing through the transmission circuit of the j-th transmission system, this difference is expressed in the following equation (1-28):

$\Delta\phi_j=\Delta\phi RX_j-\Delta\phi TX_j, (j=1, 2, \ldots, n)$ (1-27)

$\Delta A_j=\log_e[ARX_j]-\log_e[ATX_j], (j=1, 2, \ldots, n)$ (1-28)

When substituting the equations (1-25) and (1-27) in the above equation (1-23), the following equation (1-29) is found:

$Z_{jk}=\Delta\phi_k-\Delta\phi_j, (j=1, 2, \ldots, n-1), (k=j+1, j+2, \ldots, n)$ (1-29)

This equation, simultaneous equations having n unknown variables and $n(n-1)/2$ independent linear equations, is expressed as follows:

$Z_{12}=\Delta\phi_2-\Delta\phi_1$ $Z_{13}=\Delta\phi_3-\Delta\phi_1$ $Z_{n-1\,n}=\Delta\phi_n-\Delta\phi_{n-1}$ (1-30)

When substituting the equations (1-26) and (1-28) in the above equation (1-24), the following equation (1-31) is found:

$V_{jk}=\Delta A_k-\Delta A_j, (j=1, 2, \ldots, n-1), (k=j+1, j+2, \ldots, n)$ (1-31)

This equation, also simultaneous equations having n unknown variables and $n(n-1)/2$ independent linear equations, is expressed as follows:

$V_{12}=\Delta A_2-A_1$ $V_{13}=\Delta A_3-\Delta A_1$ $\ldots$ $V_{n-1\,n}=\Delta A_n-\Delta A_{n-1}$ (1-32)

In order to solve these simultaneous linear equations, the sum n(n−1)/2 of the equations forming the same must be at least identical to the number n of the unknown variables. In other words, n(n−1)/2≧n holds when n is at least 3, and hence the number of the equations exceeds that of the unknown variables in the simultaneous linear equations (1-31) and (1-32) if the number n of the signal transmission systems is at least 3, and the values of all unknown variables can be found in both simultaneous linear equations.

The differences $\Delta\phi_j$ (j=1, 2, . . . , n) between the phase rotation quantities of the signals passing through the transmission circuits and the receiving circuits and the differences $\Delta A_j$ (j=1, 2, . . . , n) between the amplitude fluctuation quantities thereof can be calculated in all transmission systems by solving the simultaneous linear equations (1-31) and (1-32).

The differences in a phase rotation quantity and in an amplitude fluctuation quantity between the received signal and the transmitted signal can be compensated for in each transmission system for calibrating the transmission characteristics by supplying information on the difference between the phase rotation quantities of the receiving circuit and the transmission circuit of each transmission system estimated by the aforementioned calculation to the phase shifter of the transmission system while supplying information on the difference between the amplitude fluctuation quantities of the receiving circuit and the transmission circuit of each transmission system to the attenuator of the transmission system.

Figure 20:
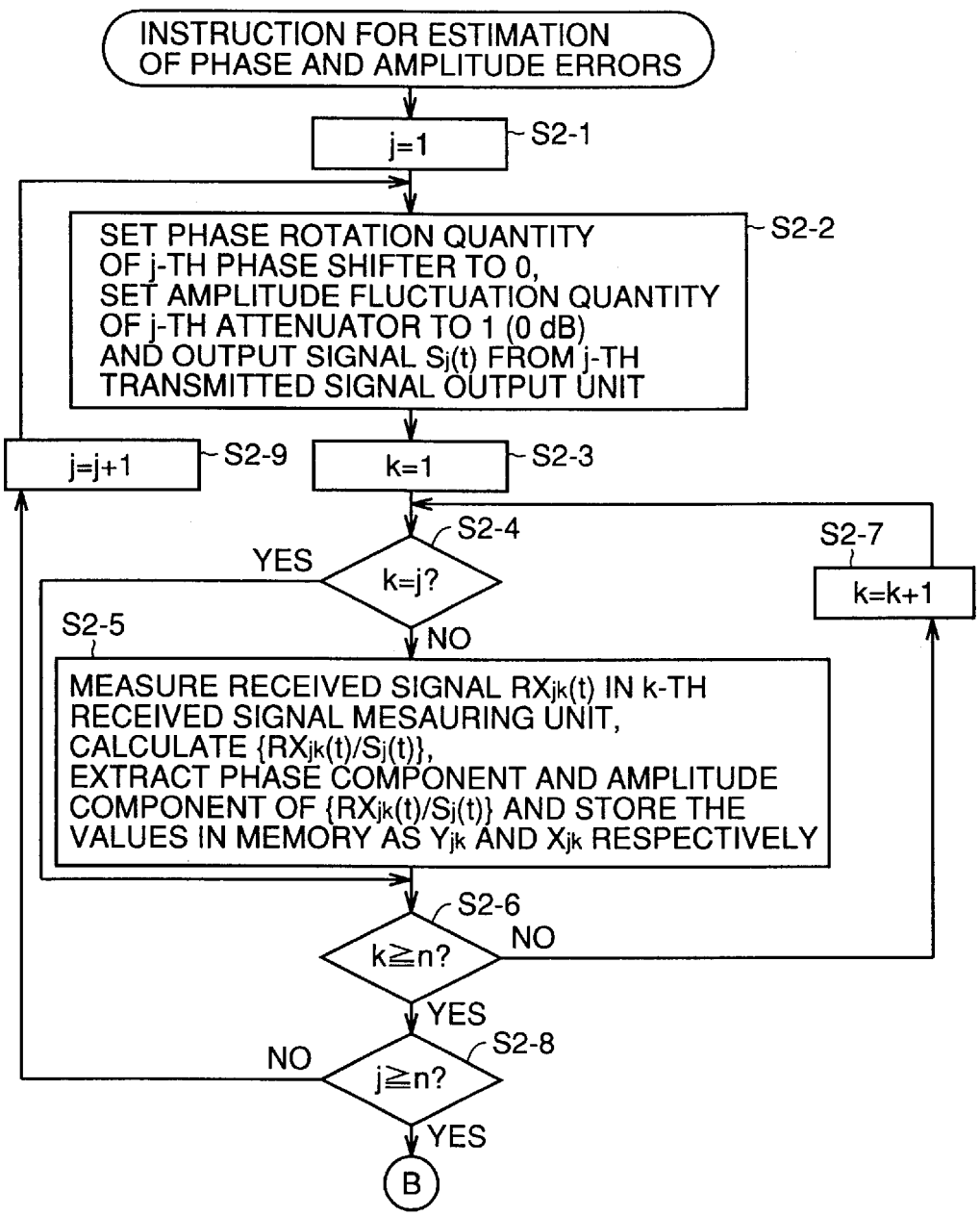
FIG. 20 is a flow chart showing the first half of operations of the second basic structure.
Figure 21:
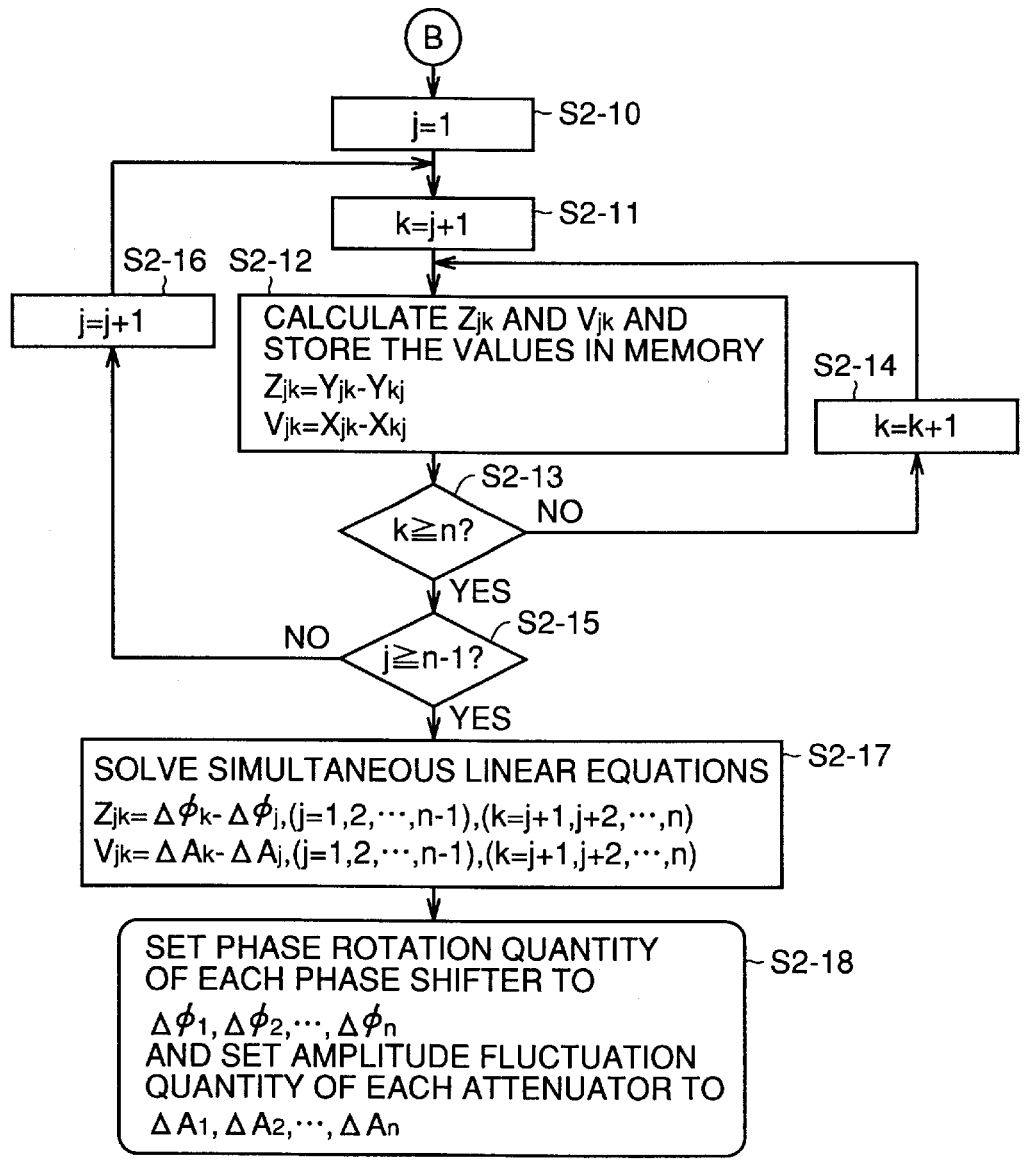
FIG. 21 is a flow chart showing the second half of the operations of the second basic structure.

In practice, a microcomputer forming the signal processing circuit 20 executes the aforementioned operations of the second basic structure of the present invention in a software manner. FIGS. 20 and 21 are flow charts of the aforementioned operations of the second basic structure implemented with the microcomputer in a software manner.

First, an instruction for estimation of phase and amplitude errors is issued at a prescribed timing (or with an external command), for starting the aforementioned calibration.

The microcomputer selects the j-th=first transmission system at a step S2-1, and sets the phase rotation quantity of the phase shifter $PS_1$ of this transmission system to 0 and the amplitude fluctuation quantity $A_1$ of the attenuator $ATT_1$ to 1 (=0 dB) at a step S2-2. The memory 21 outputs the known signal $S_1(t)$ corresponding to the first transmission system.

Then, the microcomputer sets the variable k to 1 at a step S2-3, and determines whether or not this transmission system corresponds to the k-th=first transmission system at a step S2-4. Since k=j=1, the microcomputer performs no processing but increments the value k by 1 at steps S2-6 and S2-7. When determining k≠j at the step S2-4, the microcomputer measures the radio signal transmitted from the antenna element $ANT_1$ of the first transmission system with the received signal measuring unit $SM_k$ of the k-th transmission system, finds $RX_{1k}(t)$, calculates the phase component $Y_{1k}$ and the amplitude component $X_{1k}$ of $RX_{1k}/S_1(t)$ along the equations (1-13) to (1-22) as described above and stores the same in the memory 21.

When determining that k reaches n at the step S2-6, the microcomputer increments the value j by 1 at steps S2-8 and S2-9 and repeats the aforementioned operations through the steps S2-2 to S2-7 for the next transmission system j=2.

Thus, when the microcomputer determines that j reaches n at the step S2-8, it follows that $Y_{jk}$ and $X_{jk}$ for all combinations of (j=1, 2, . . . , n) and (k=1, 2, . . . , n), where j≠k, are calculated and stored in the memory 21.

Then, the microcomputer sets j to 1 at a step S2-10 shown in FIG. 21, sets k to j+1 at a step S2-11, calculates $Z_{jk}=Y_{jk}-Y_{kj}$ and $V_{jk}=X_{jk}-X_{kj}$ as described above and stores the results in the memory 21. The microcomputer calculates $Z_{jk}$ and $V_{jk}$ while incrementing k one by one through steps S2-13 and S2-14, increments j one by one through steps S2-15 and S2-16 when determining that k reaches n at the step S2-13, and repeats the aforementioned calculation of $Z_{jk}$ and $V_{jk}$. When the microcomputer determines that j reaches n−1 at the step S2-15, it follows that $Y_{jk}$ and $V_{jk}$ for all combinations of (j=1, 2, . . . , n) and (k=1, 2, . . . , n), where j≠k, are calculated and stored in the memory 21.

Then, the microcomputer solves the above simultaneous linear equations (1-30) and (1-32) with all $Z_{jk}$ and $V_{jk}$ (3=1, 2, . . . , n), (k=1, 2, . . . , n), where j≠k, stored in the memory 21 at a step S2-17.

Finally, the microcomputer sets the difference between the phase rotation quantities of the transmission circuit and the receiving circuit of each transmission system and the difference between the amplitude fluctuation quantities thereof in the phase shifter (previously set to 0) and the attenuator (previously set to 1) of the transmission system respectively. Thus, the microcomputer compensates for the differences between the aforementioned transmission characteristics and executes calibration in transmission in each transmission system.

Figure 22:
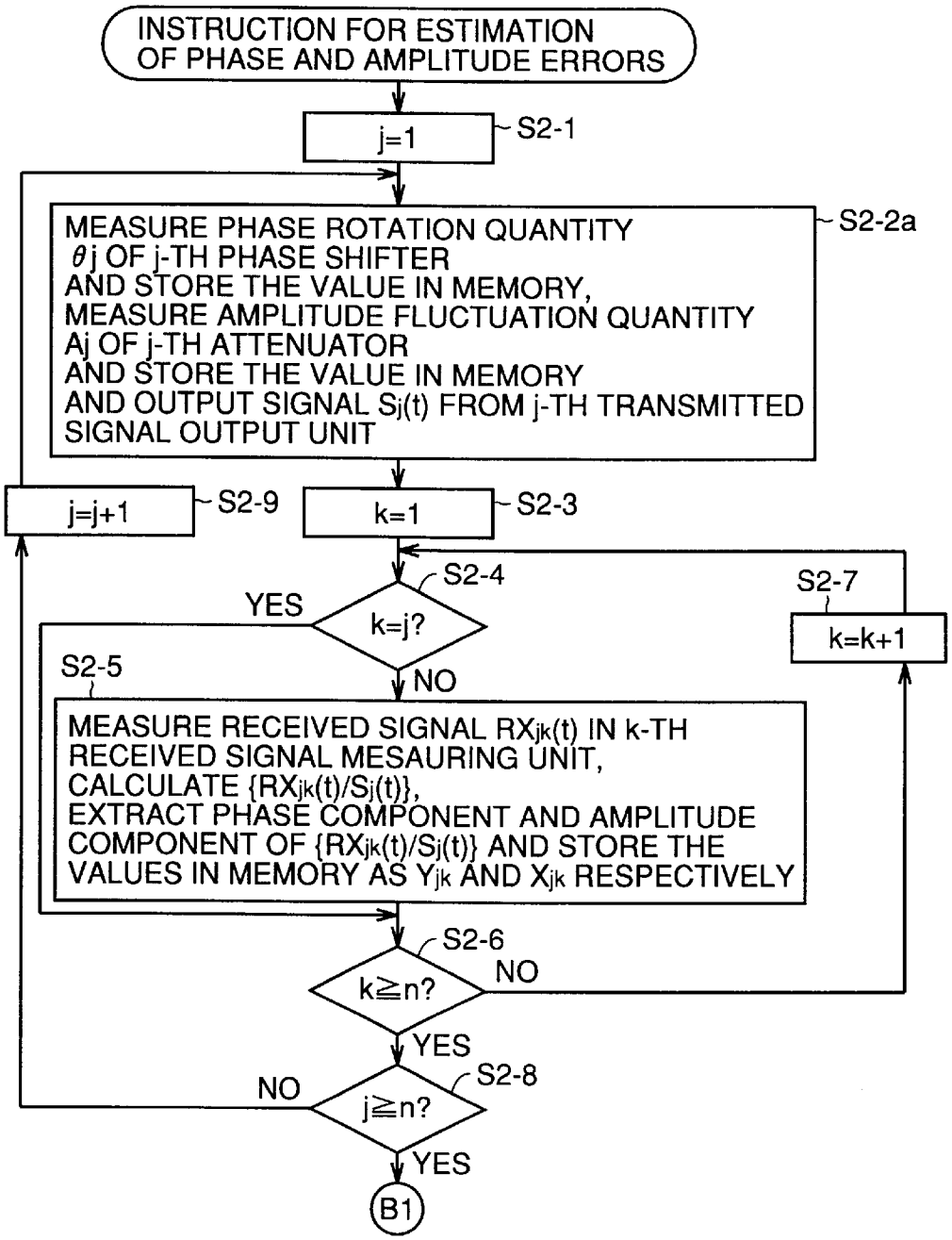
FIG. 22 is a flow chart showing the first half of operations of another modification of the second basic structure.
Figure 23:
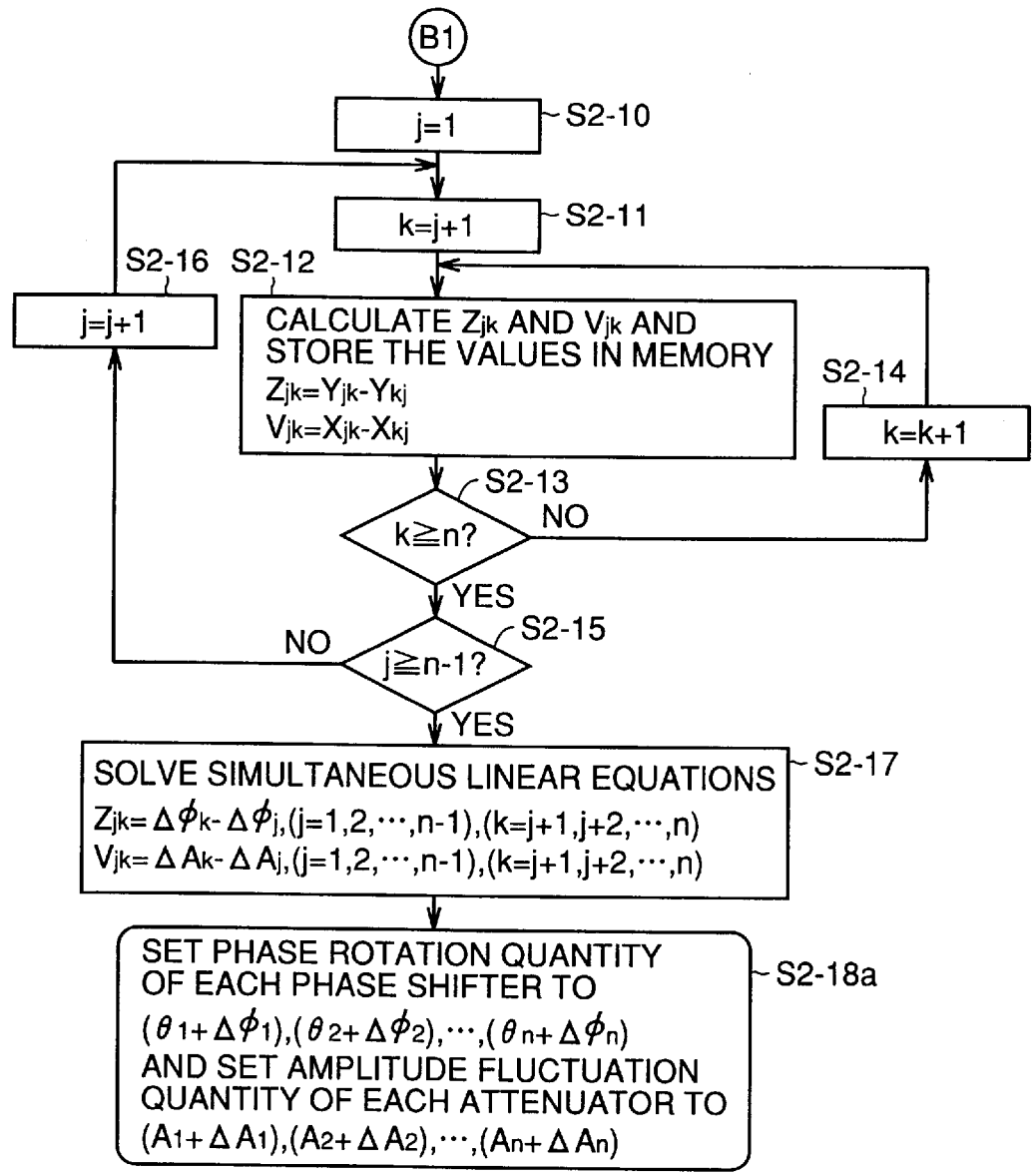
FIG. 23 is a flow chart showing the second half of the operations of the modification of the second basic structure.

FIGS. 22 and 23 are flow charts showing a modification of the aforementioned operations shown in FIGS. 20 and 21. The operations shown in FIGS. 22 and 23 are identical to the operations shown in FIGS. 20 and 21 except the following points, and hence redundant description is not repeated for common operations.

While the microcomputer sets the phase rotation quantity of the phase shifter of each transmission system to 0 while setting the amplitude fluctuation quantity of the attenuator to 1 (=0 dB) at the step S2-2 in the example shown in FIG. 20, the microcomputer performs no such setting but measures the current phase rotation quantity $\theta_j$ of the phase shifter $PS_j$ and the current amplitude fluctuation quantity $A_j$ of the attenuator $ATT_j$ and stores the same in the memory 21 respectively at a step S2-2a in the example shown in FIG. 22.

While the microcomputer sets the difference in the phase rotation quantity and the difference in the amplitude fluctuation quantity between the transmission circuit and the receiving circuit calculated for each transmission system in the phase shifter, previously set to 0, and the attenuator, previously set to 1, of the corresponding transmission system thereby performing calibration for compensating for the aforementioned differences at the step S2-18 in the example shown in FIG. 21, the microcomputer reads initial values $\theta_j$ and $A_j$ of the phase shifter and the attenuator measured and stored in the memory 21 at the step S2-2a of FIG. 22 when starting calibration and corrects these initial values $\theta_j$ and $A_j$ with the calculated difference in the phase rotation quantity and the calculated difference in the amplitude fluctuation quantity thereby performing calibration at a step S-18a in the example shown in FIG. 23.

Figure 24:
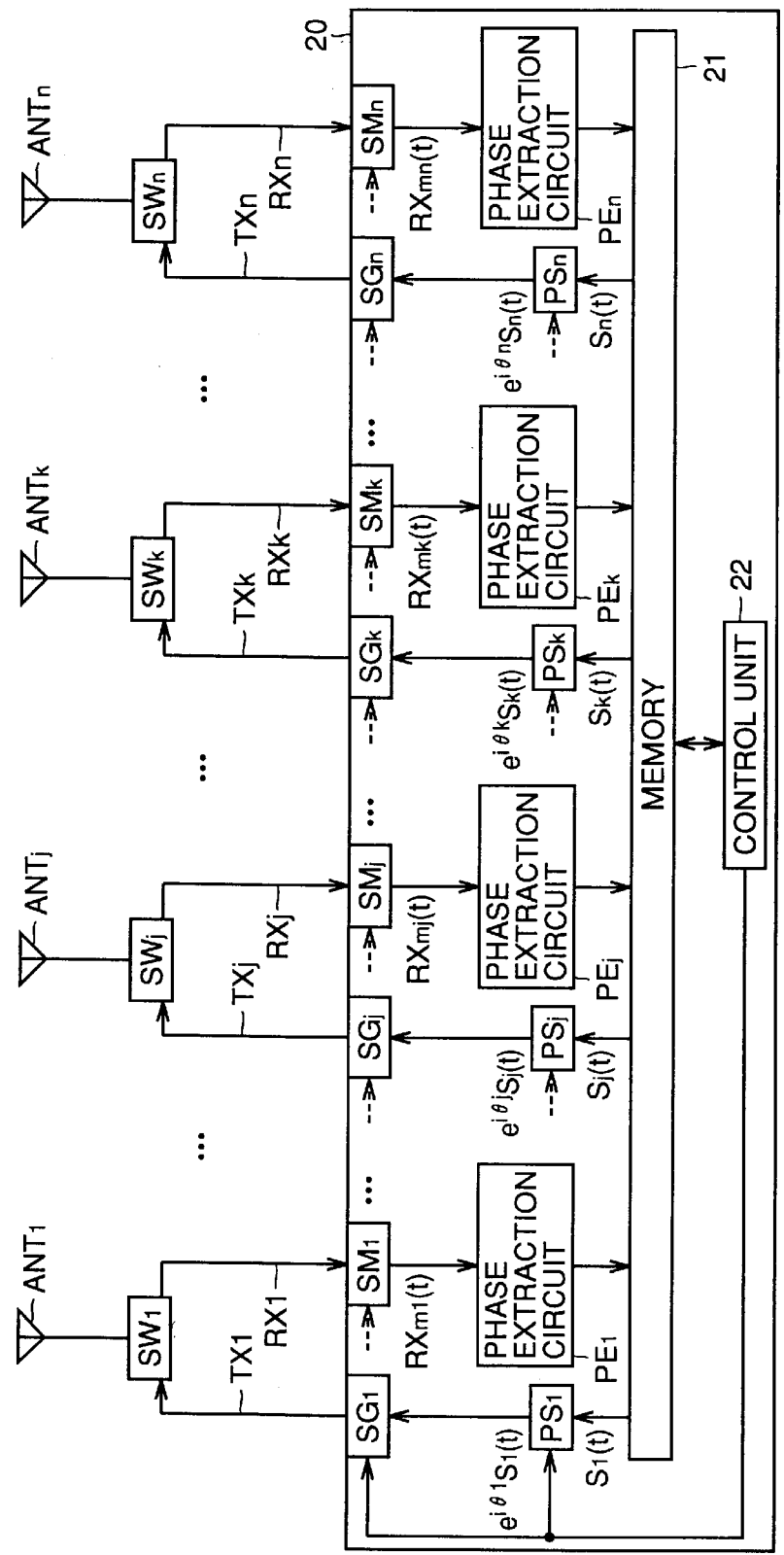
FIG. 24 is a schematic block diagram showing still another modification of the second basic structure of the present invention.

FIG. 24 is a block diagram showing the structure of a signal processing circuit 20 of an adaptive array radio base station according to still another modification of the second basic structure of the present invention shown in FIG. 3 for estimating only the difference between phase rotation quantities of a transmission circuit and a receiving circuit of each transmission system. The circuit structure shown in FIG. 24 is identical to the second basic structure shown in FIG. 3 except that the attenuator $ATT_j$ and the amplitude extraction circuit $AE_j$ (j=1, 2, . . . , n) are omitted in each transmission system, and hence the description of FIG. 3 is applied to this modification for omitting description of FIG. 24.

Figure 25:
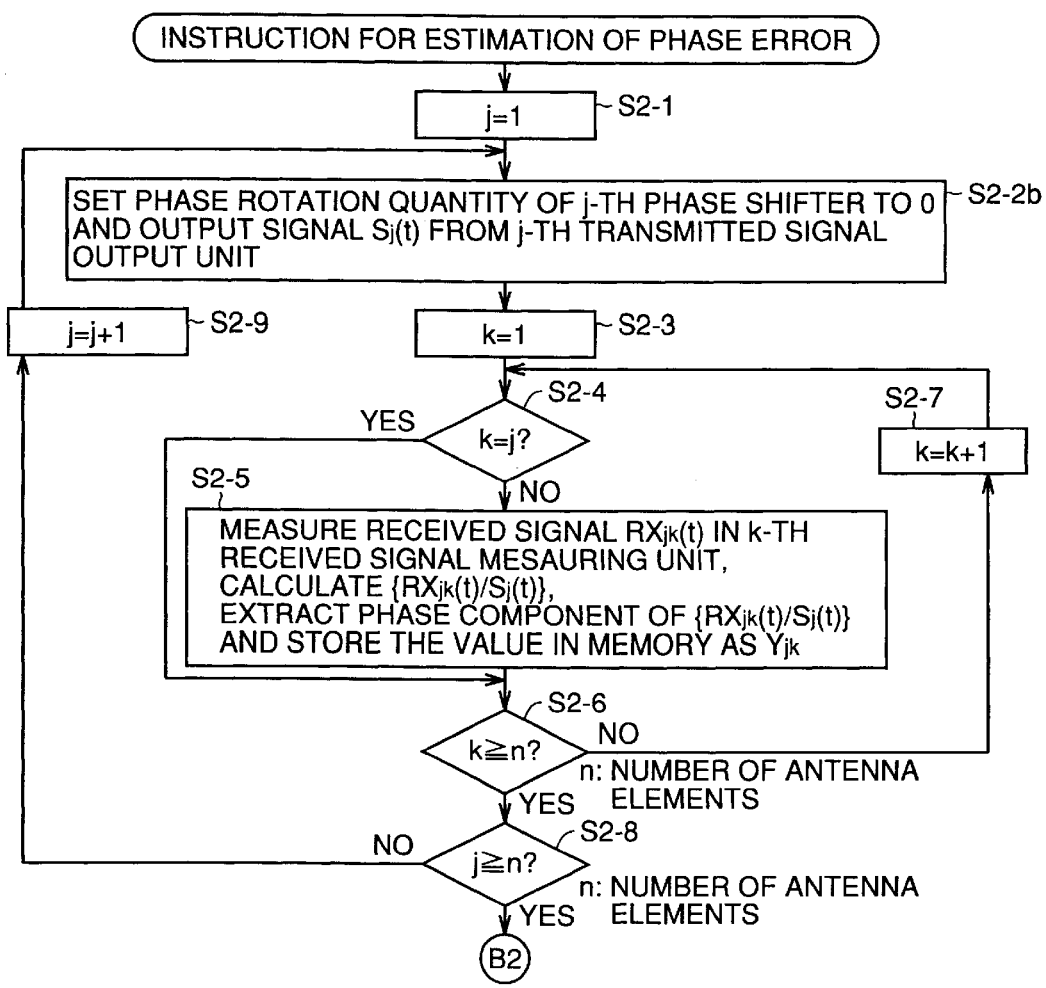
FIG. 25 is a flow chart showing the first half of operations of the modification shown in FIG. 24.
Figure 26:
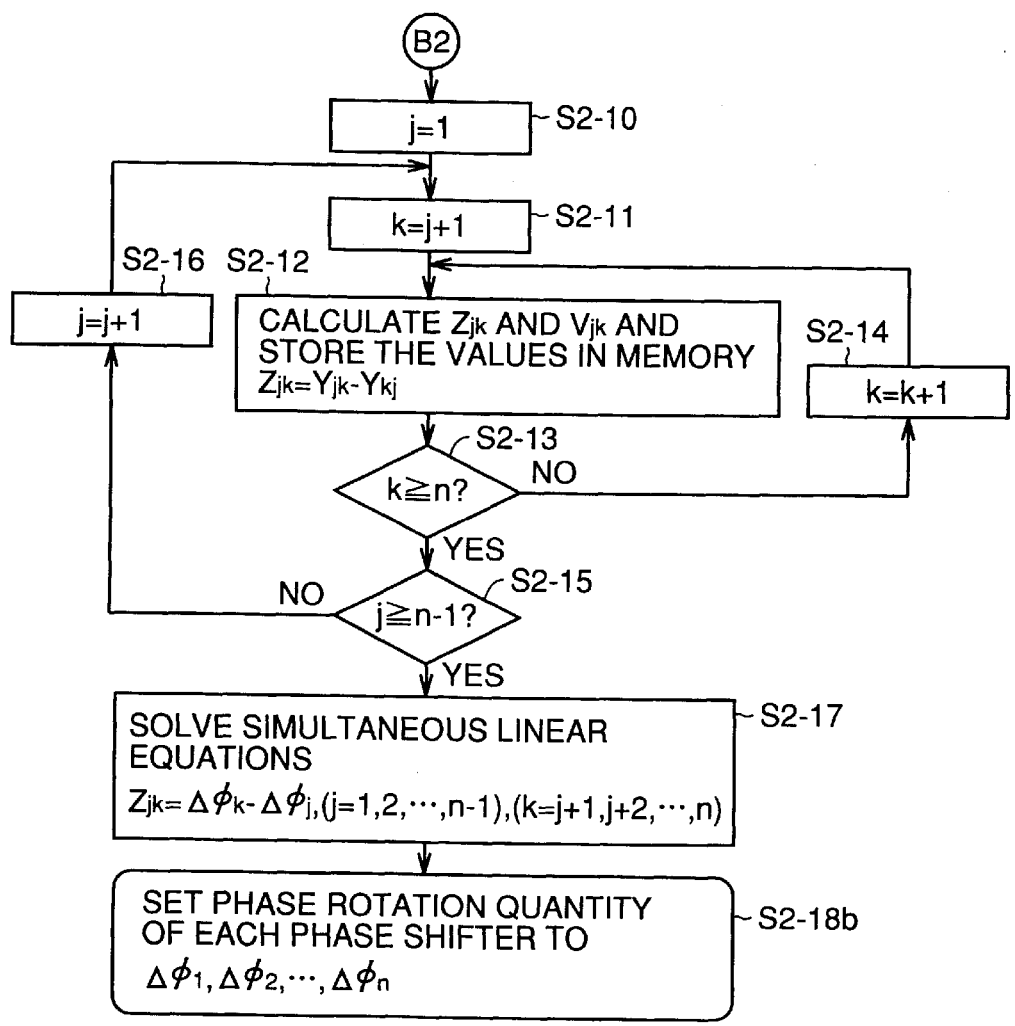
FIG. 26 is a flow chart showing the second half of operations of the modification shown in FIG. 24.

FIGS. 25 and 26 are flow charts of operations of the circuits shown in FIG. 24 implemented with a microcomputer in a software manner. The flow charts are identical to the flow charts shown in FIGS. 20 and 21 except that operations related to the amplitude component are omitted, and hence the description of FIGS. 20 and 21 is applied to these flow charts for omitting description of FIGS. 25 and 26.

Figure 27:
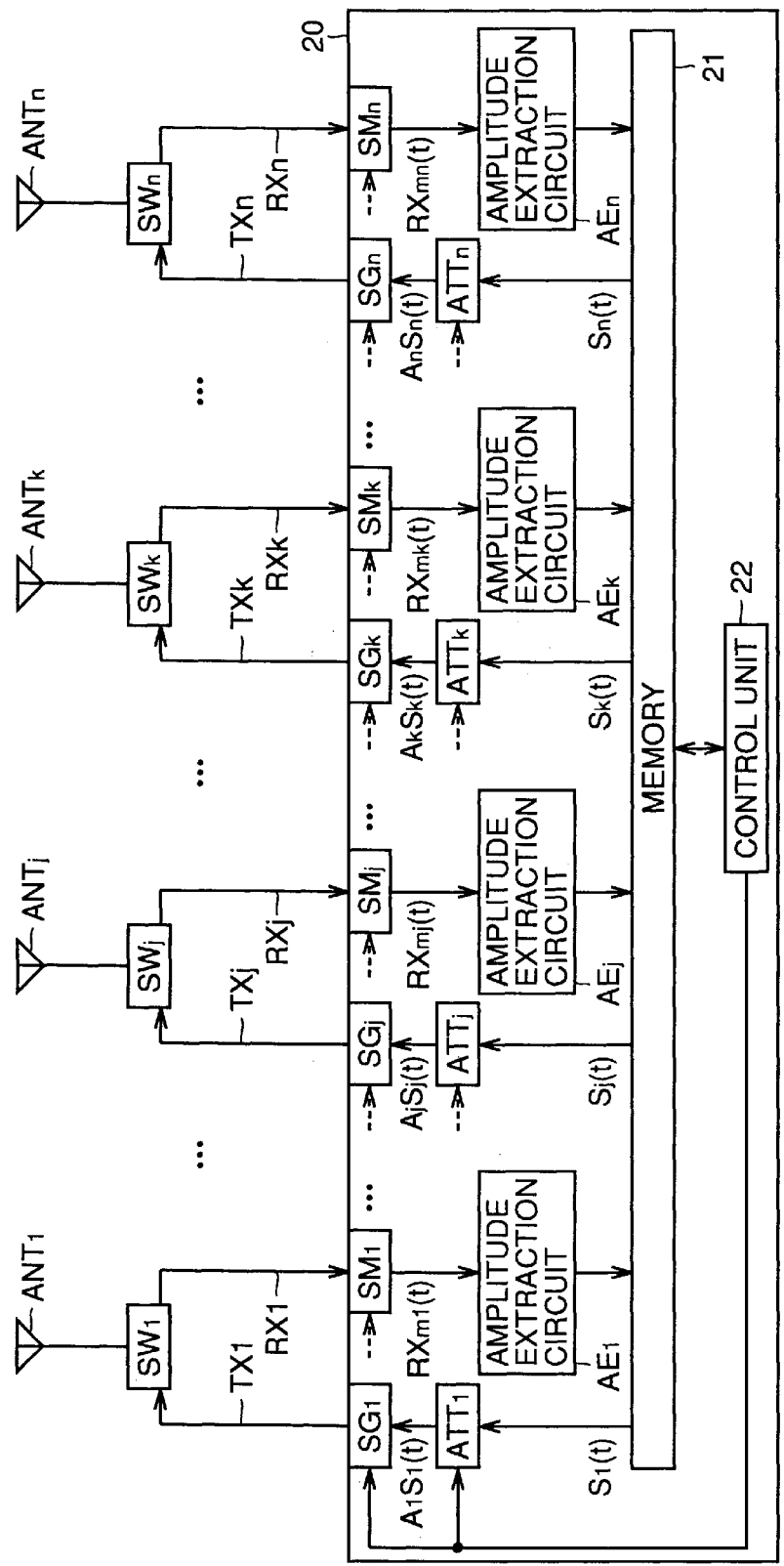
FIG. 27 is a schematic block diagram showing a further modification of the second basic structure of the present invention.

FIG. 27 is a block diagram showing the structure of a signal processing circuit 20 of an adaptive array radio base station according to a further modification of the second basic structure of the present invention shown in FIG. 3 for estimating only the difference between amplitude fluctuation quantities of a transmission circuit and a receiving circuit of each transmission system. The circuit structure shown in FIG. 27 is identical to the second basic structure shown in FIG. 3 except that the phase shifter $PS_j$ and the phase extraction circuit $PE_j$ (j=1, 2, . . . , n) are omitted in each transmission system, and hence the description of FIG. 3 is applied to this modification for omitting description of FIG. 27.

Figure 28:
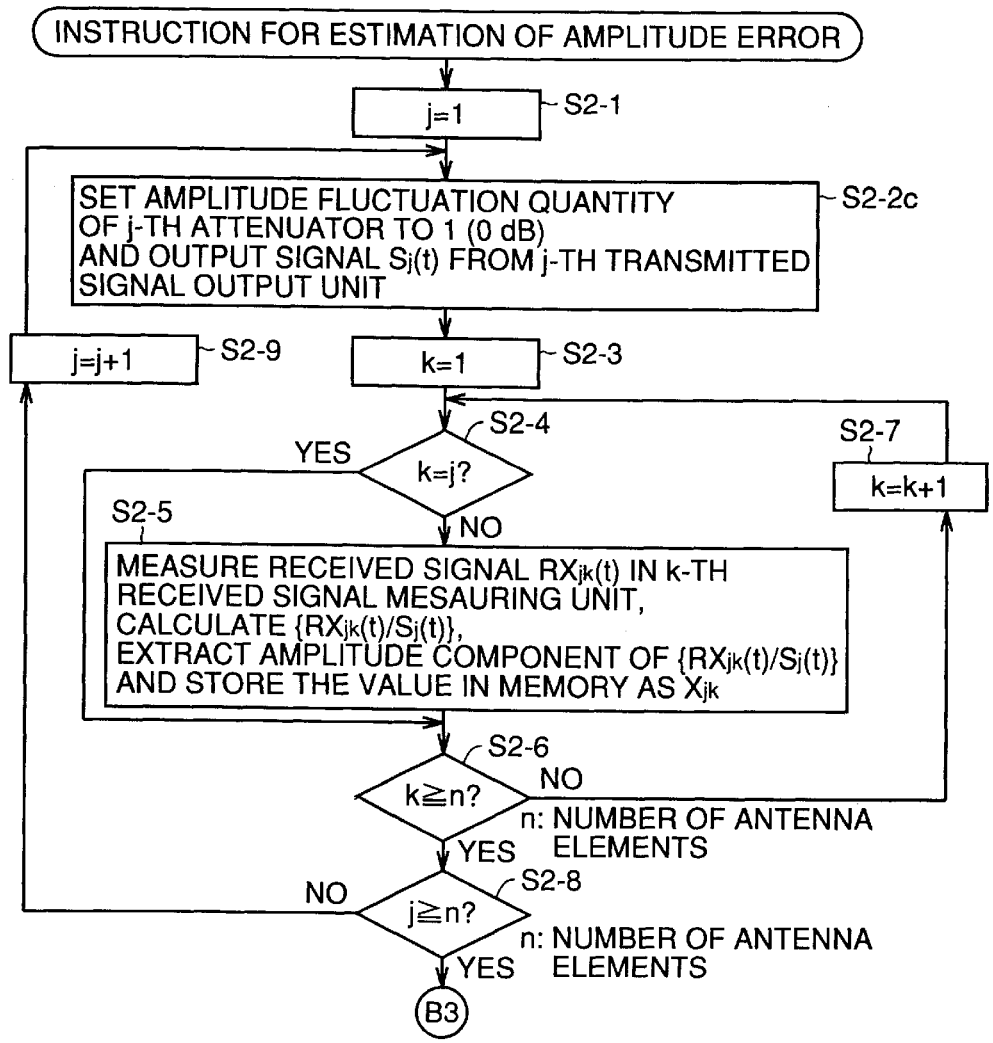
FIG. 28 is a flow chart showing the first half of operations of the modification shown in FIG. 27.
Figure 29:
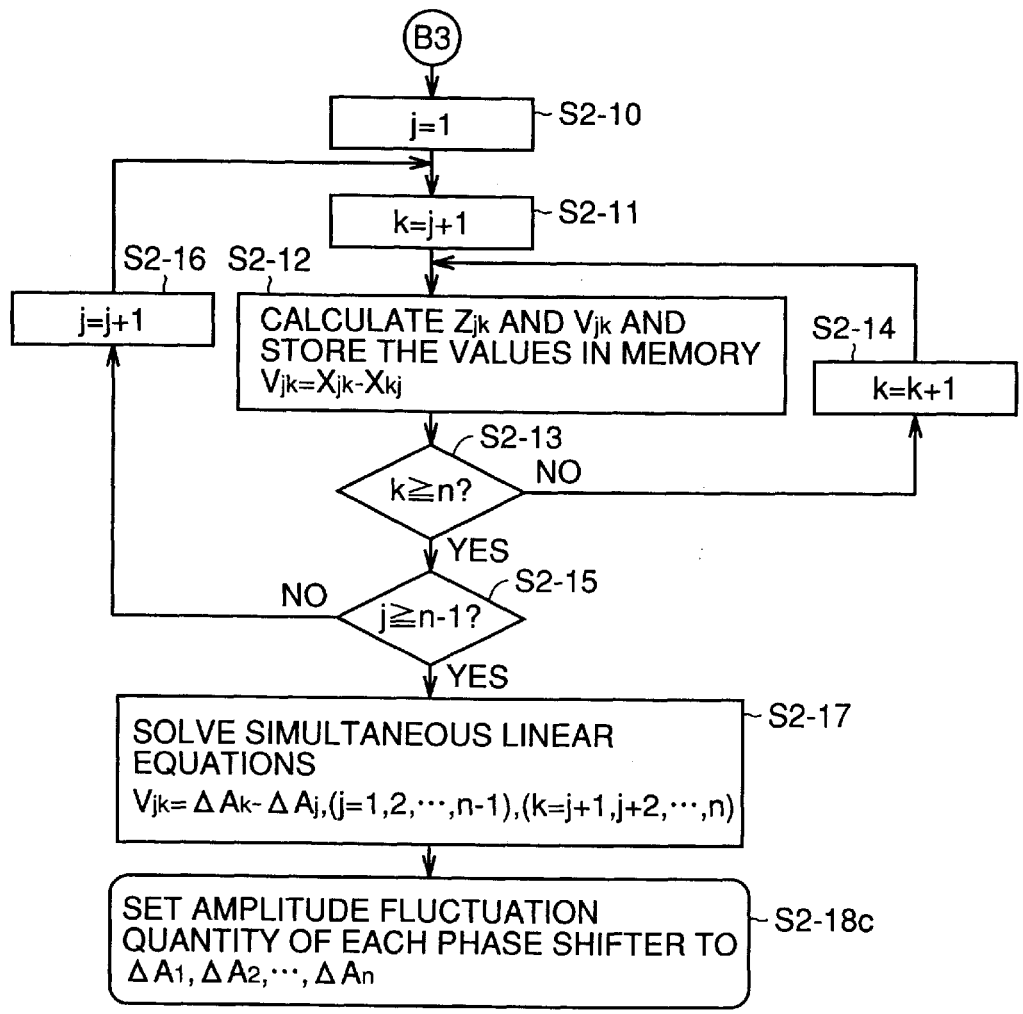
FIG. 29 is a flow chart showing the second half of operations of the modification shown in FIG. 27.

FIGS. 28 and 29 are flow charts of operations of the circuits shown in FIG. 27 implemented with a microcomputer in a software manner. The flow charts are identical to the flow charts shown in FIGS. 20 and 21 except that operations related to the phase component are omitted, and hence the description of FIGS. 20 and 21 is applied to these flow charts for omitting description of FIGS. 28 and 29.

Embodiments of Second Basic Structure

Third Embodiment

Figure 30:
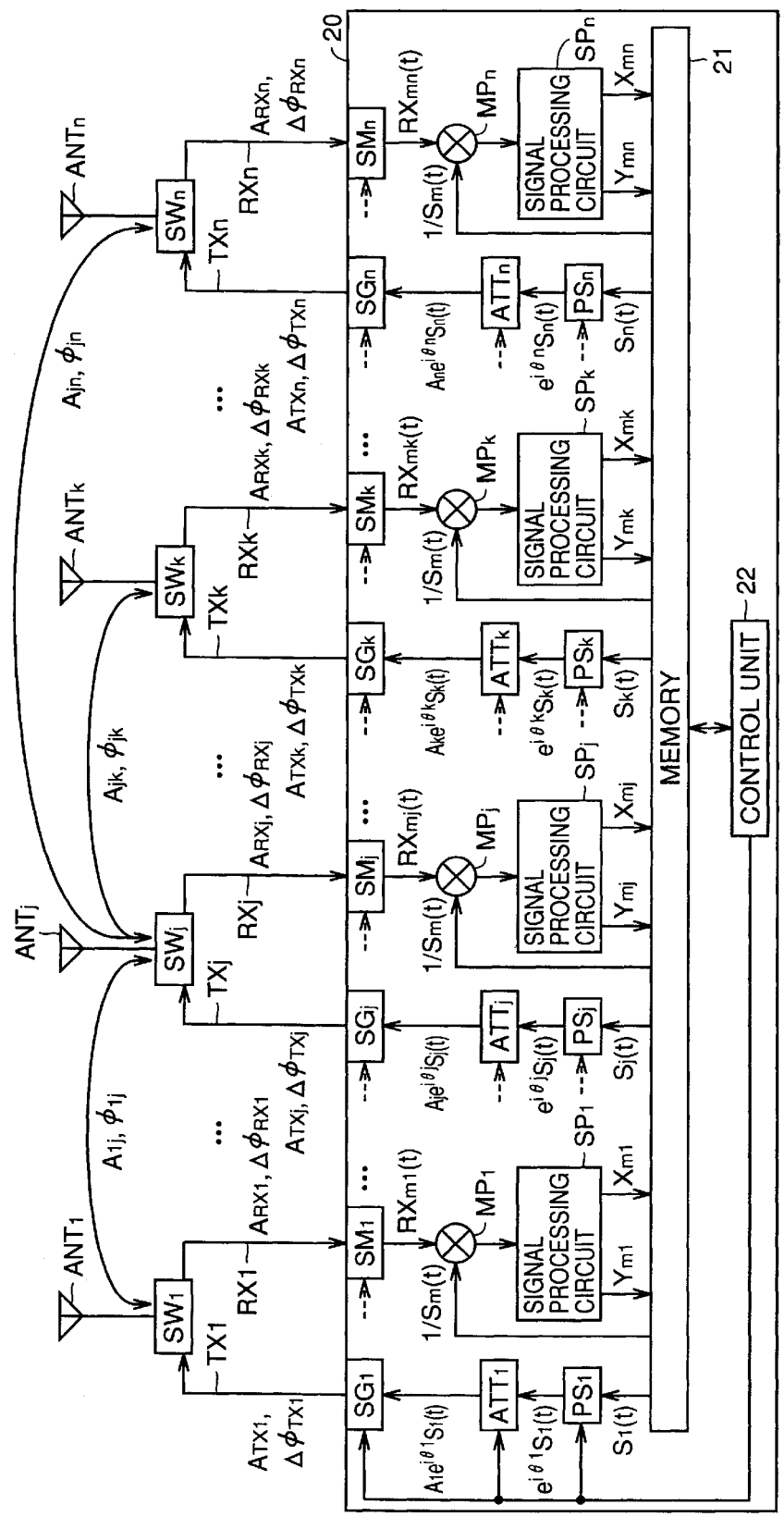
FIG. 30 is a block diagram showing a third embodiment of the second basic structure of the present invention.

FIG. 30 is a block diagram showing a specific circuit structure of a signal processing circuit 20 of an adaptive array radio base station according to a third embodiment of the second basic structure of the present invention shown in FIG. 3.

In contrast with the circuit structure of FIG. 3, a phase extraction circuit $PE_j$ and an amplitude extraction circuit $AE_j$ (j=1, 2, . . . , n) of each transmission system are formed by a single multiplier $MP_j$ and a single signal processing circuit $SP_j$ in the second basic structure.

The multiplier $MP_j$ (j=1, 2, . . . , n) of each transmission system operates the equation (1-15) described with reference to FIG. 19. In other words, the multiplier $MP_j$ divides a received signal measured in a received signal measuring unit $SM_j$ by a known transmitted signal $S_j(t)$ of the transmission system.

Then, the signal processing circuit $SP_j$ (j=1, 2, . . . , n) of each transmission system operates the equations (1-16) to (1-22) described with reference to FIG. 19. In other words, the signal processing circuit $SP_j$ calculates the natural logarithm of an output from the corresponding multiplier $MP_j$, extracts its imaginary part as $Y_{mj}$ and forms the equation (1-21) related to the phase while extracting the real part as $X_{mj}$ and forming the equation (1-22) related to the amplitude.

Figure 31:
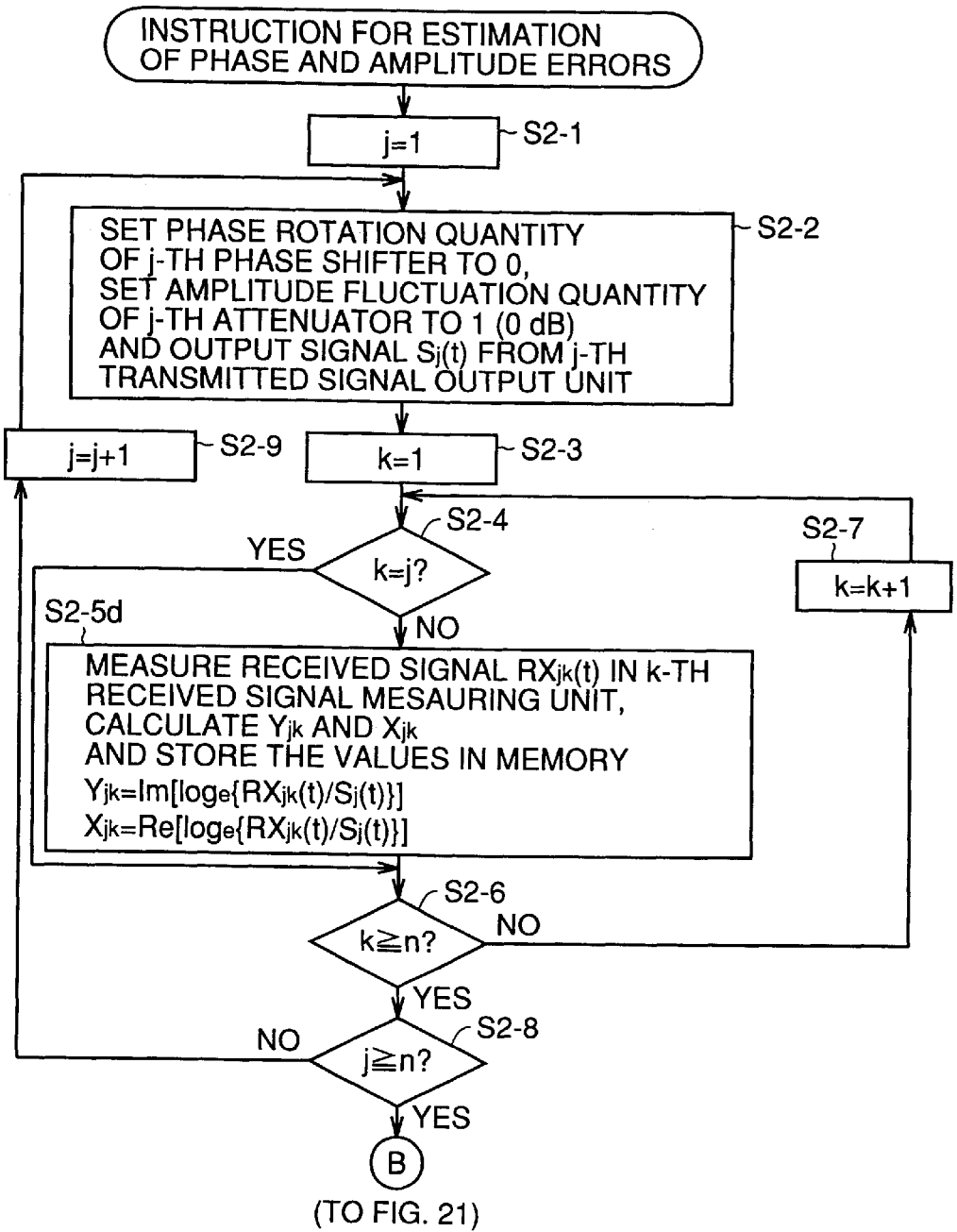
FIG. 31 is a flow chart showing operations of the third embodiment shown in FIG. 30.

FIG. 31 is a flow chart illustrating operations of the third embodiment shown in FIG. 30 in correspondence to the first half of the operations of the second basic structure shown in FIG. 20. In contrast with the flow chart of FIG. 20, FIG. 31 specifically describes the contents of signal processing performed at the step S2-5 of FIG. 20 in a step S2-6d. At the step S2-6d shown in FIG. 31, a microcomputer calculates the natural logarithm of $RX_{jk}(t)/S_j(t)$ and extracts its imaginary and real parts, thereby finding the equations (1-21) and (1-22) of the phase component and the amplitude component.

Fourth Embodiment

Figure 32:
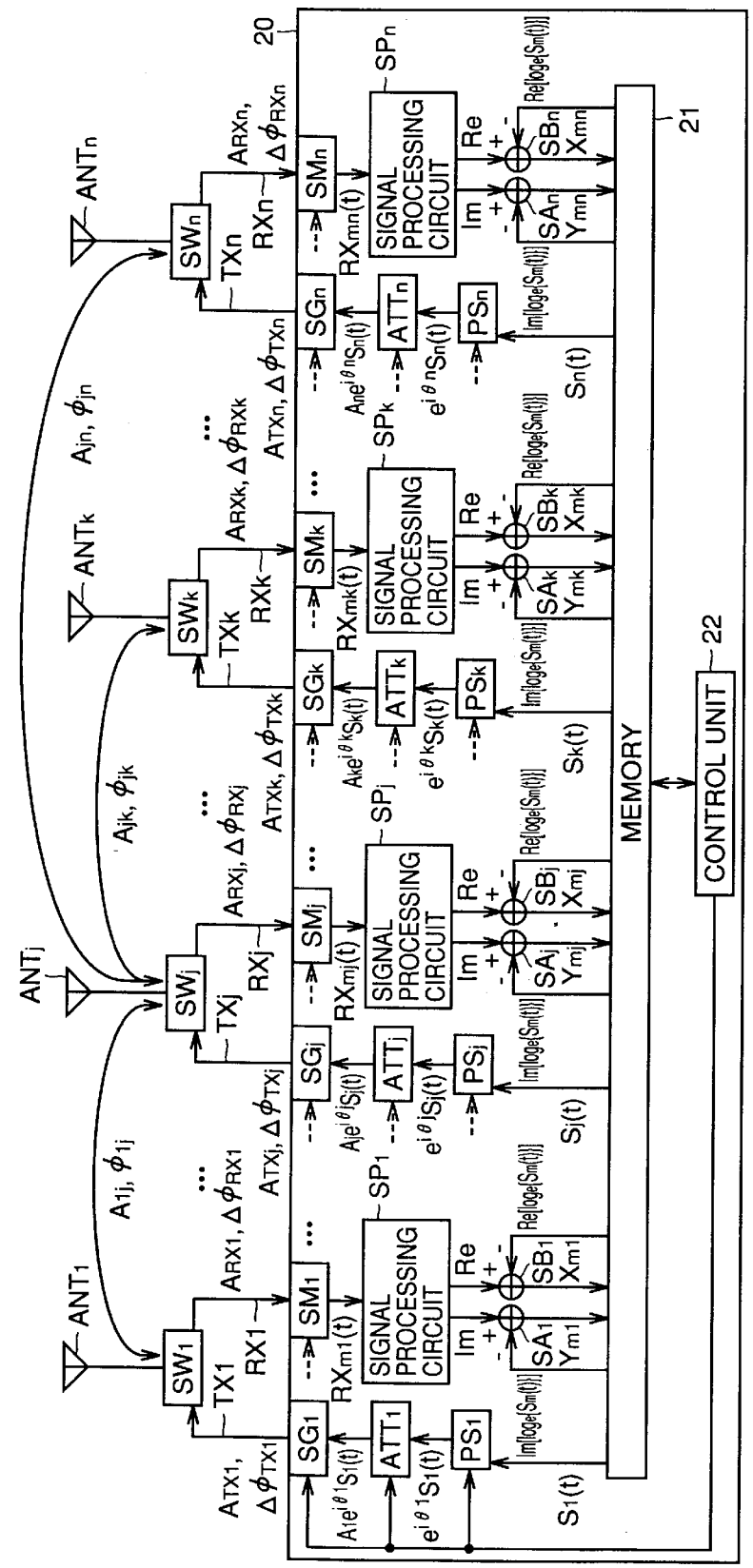
FIG. 32 is a block diagram showing a fourth embodiment of the second basic structure of the present invention.

FIG. 32 is a block diagram showing a specific circuit structure of a signal processing circuit 20 of an adaptive array radio base station according to a fourth embodiment of the second basic structure of the present invention shown in FIG. 3.

In contrast with the circuit structure of FIG. 3, a phase extraction circuit $PE_j$ and an amplitude extraction circuit $AE_j$ (j=1, 2, . . . , n) of each transmission system are formed by a single signal processing circuit $SP_j$ and two signal subtracters $SA_j$ and $SB_j$ in the second basic structure.

The signal processing circuit $SP_j$ (j=1, 2, . . . , n) of each transmission system calculates the natural logarithm of a received signal measured in a received signal measuring unit $SM_j$, extracts its imaginary part and supplies the same to the subtracter $SA_j$ while extracting the real part and supplying the same to the other subtracter $SB_j$.

The aforementioned subtracter $SA_j$ subtracts an imaginary part $Im[\log_e\{S_j(t)\}]$ of a value found by calculating the natural logarithm of a known transmitted signal $S_j(t)$ of the transmission system from the imaginary part of the supplied received signal. The other subtracter $SB_j$ subtracts a real part $Re[\log_e\{S_j(t)\}]$ of the value found by calculating the natural logarithm of the known transmitted signal $S_j(t)$ of the transmission system from the real part of the supplied received signal.

The result of the subtraction of the imaginary part obtained by the subtracter $SA_j$ is extracted as $Y_{mj}$ for forming the equation (1-21) related to the phase, while the result of the subtraction of the real part obtained by the other subtracter $SB_j$ is extracted as $X_{mj}$ for forming the equation (1-22) related to the amplitude.

According to the fourth embodiment shown in FIG. 32, as hereinabove described, the imaginary part and the real part of the received signal are previously separated for subtracting the imaginary part and the real part of the known signal $S_j(t)$ respectively.

In the third embodiment described with reference to FIGS. 19 and 30, on the other hand, the received signal is divided by the known signal in advance of separation into the imaginary part and the real part in reverse order of operations. However, the equations (1-21) and (1-22) are finally found in either case and hence the circuit structure shown in FIG. 32 is conceivably equivalent to the second basic structure shown in FIG. 3.

Figure 33:
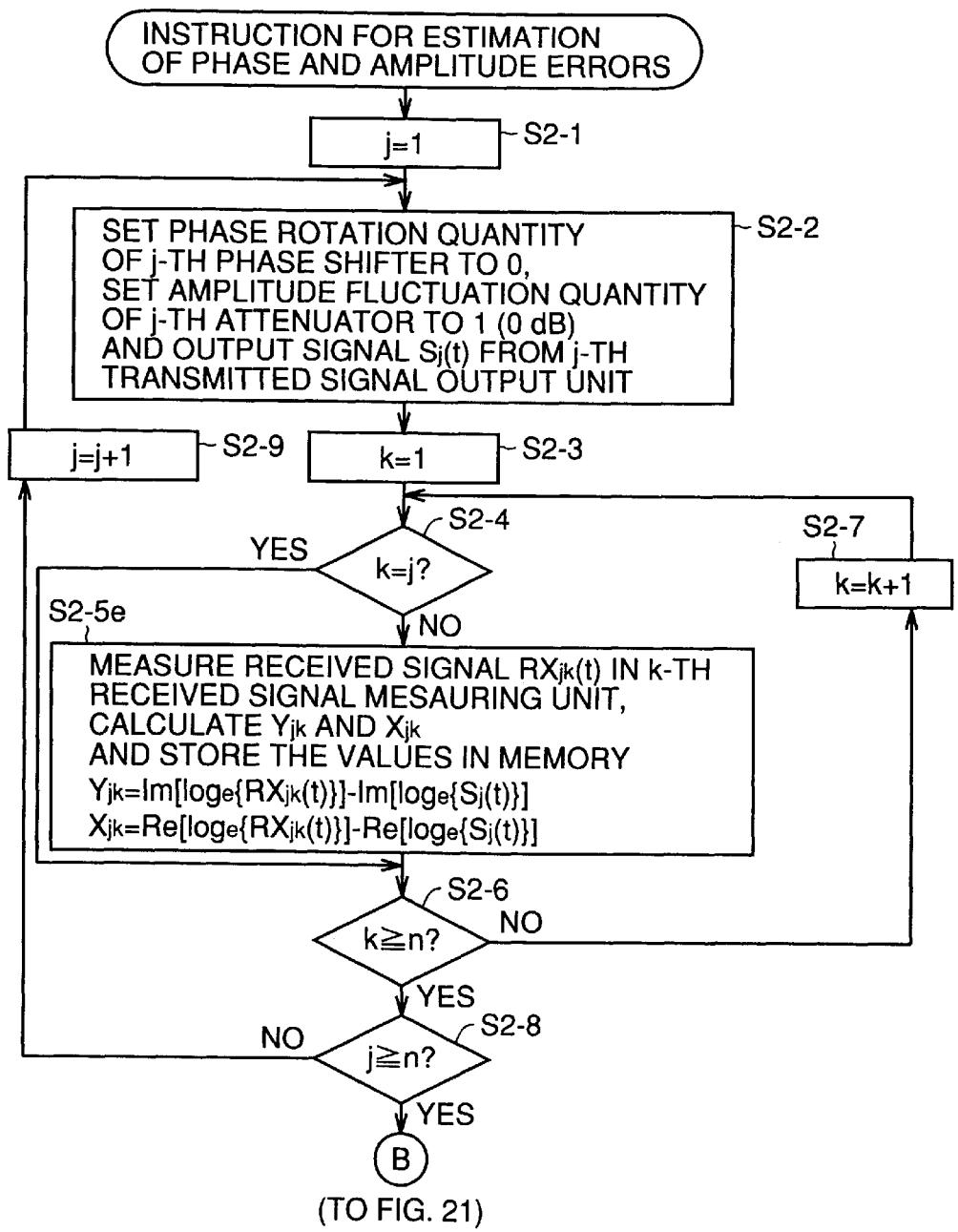
FIG. 33 is a flow chart illustrating operations of the fourth embodiment shown in FIG. 32.

FIG. 33 is a flow chart illustrating operations of the fourth embodiment shown in FIG. 32 in correspondence to the first half of the operations of the second basic structure shown in FIG. 20. In contrast with the flow chart of FIG. 20, FIG. 33 specifically describes the contents of signal processing performed at the step S2-5 of FIG. 20 in a step S2-5e. At the step S2-5e shown in FIG. 33, a microcomputer subtracts an imaginary part and a real part of a value found by calculating the natural logarithm of $S_j(t)$ from an imaginary part and a real part of a value found by calculating the natural logarithm of $RX_{jk}(t)$ respectively, thereby finding the equations (1-21) and (1-22) of the phase component and the amplitude component respectively.

The third and fourth embodiments also have been described on the premise that the S-N ratio is sufficiently excellent, as described above. In other words, each of the third and fourth embodiments shown in FIGS. 30 to 33 is effective when a received signal has an excellent S-N ratio, and can estimate the phase rotation quantity difference and the amplitude fluctuation quantity difference between the transmission circuit and the receiving circuit of each transmission system with a relatively small signal processing quantity as compared with the remaining embodiments described later.

Mode Providing Time Averaging Circuit on First Basic Structure

Fifth Embodiment

Figure 34:
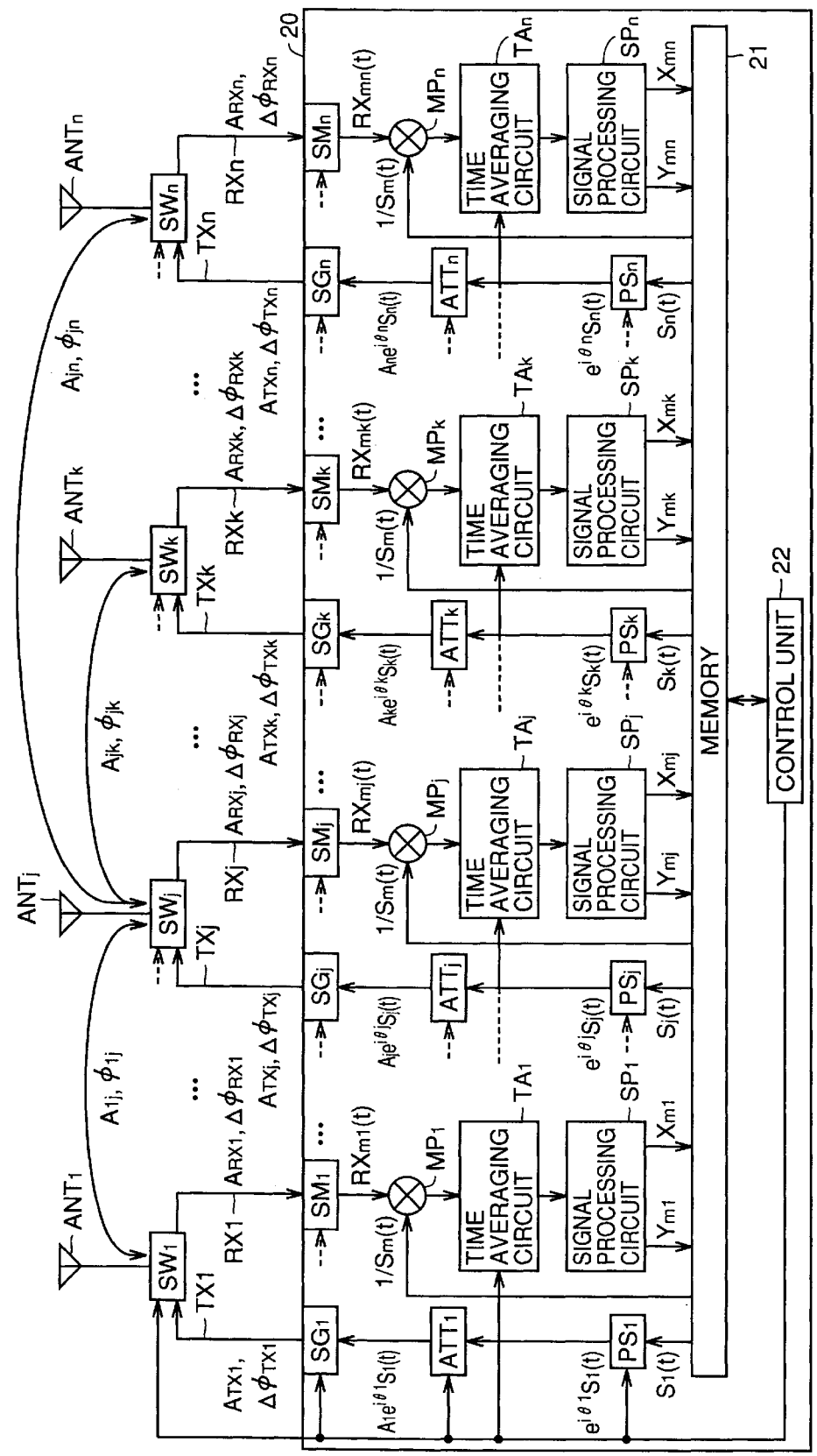
FIG. 34 is a block diagram showing a specific circuit structure of a fifth embodiment of the present invention.

FIG. 34 is a block diagram showing a specific circuit structure according to a fifth embodiment of the present invention. In the fifth embodiment shown in FIG. 34, time averaging circuits are added to the first embodiment of the first structure of the present invention shown in FIG. 15. The operation principle of an adaptive array radio base station according to the fifth embodiment is now described.

In calibration, a phase rotation quantity $\theta_j$ of a phase shifter $PS_j$ of a j-th (j=1, 2, . . . , n) transmission system is set to 0 and an amplitude fluctuation quantity $A_j$ of an attenuator $ATT_j$ is set to 1 (=0 dB). A known signal $S_j(t)$ corresponding to the j-th transmission system is read from a memory 21 and transmitted through an antenna element $ANT_j$.

The transmitted signal is received in antenna elements $ANT_k$ (k=1, 2, . . . , n, where j≠k) of all transmission systems excluding the j-th transmission system, and measured by a received signal measuring unit $SM_k$ of each transmission system as a received signal $R_{jk}(t)$.

An antenna sharer $SW_j$ of the j-th transmission system is so switched as to connect a transmission circuit $TX_j$ with a receiving circuit $RX_j$ of this transmission system, so that a received signal measuring unit $SM_j$ of the transmission system itself measures the transmitted signal from this transmission circuit $TX_j$ as a received signal $RX_{jj}(t)$.

The signal $RX_{jk}(t)$ transmitted from the j-th transmission system and received and measured by the k-th transmission system is expressed in the equation (1-1) described above with reference to the first basic structure shown in FIG. 6, while the signal $RX_{jk}(t)$ received and measured in each of the first to n-th transmission systems after sequentially switching the transmission system transmitting the signal from the first to n-th transmission systems is expressed in the above equation (1-2). In these equations, $n_{jk}(t)$ represents noise.

When dividing both sides of the equation (1-2) by the known signal $S_j(t)$ in a multiplier $MP_j$ of each transmission system and transposing the term including noise from the left side to the right side, the following equation (2-1) is found. When time-averaging the equation (2-1) with a time averaging circuit $TA_j$ (j=1, 2, . . . , n) of each transmission system, the left side is regularly constant with respect to time and hence the following equation (2-2) is found:

$$A_{jk}ATX_jARX_k\exp\{i(\phi_{jk}+\Delta\phi TX_j+\Delta\phi RX_k)\}=RX_{jk}(t)/S_j(t)-n_{jk}(t)/S_j(t) \quad (2\text{-}1)$$

$$A_{jk}ATX_jARX_k\exp\{i(\phi_{jk}+\Delta\phi TX_j+\Delta\phi RX_k)\}=Ave[RX_{jk}(t)/S_j(t)]-Ave[n_{jk}(t)/S_j(t)] \quad (2\text{-}2)$$

In the above equation, $Ave[\cdot]$ represents time averaging of $[\cdot]$.

$Ave[n_{jk}(t)/S_j(t)]=0$ due to the properties of the noise, and hence the natural logarithms of both sides of the above equation (2-2) calculated by the signal processing circuit $SP_j$ of each transmission system are expressed in the following equation (2-3). The following equation (2-4) is deduced when noting the imaginary part thereof, while the following equation (2-5) is deduced when noting the real part thereof:

$$\log_e[A_{jk}ATX_jARX_k]+i(\phi_{jk}+\Delta\phi TX_j+\Delta\phi RX_k)=\log_e[Ave[RX_{jk}(t)/S_j(t)]] \quad (2\text{-}3)$$

$$\phi_{jk}+\Delta\phi TX_j+\Delta\phi RX_k=Im[\log_e[Ave[RX_{jk}(t)/S_j(t)]]],$$

(j=1, 2, . . . , n), (k=1, 2, . . . , n), where $\phi_{jk}=0$ (when j=k) \quad (2-4)

$$\log_e[A_{jk}ATX_jARX_k]=Re[\log_e[Ave[RX_{jk}(t)/S_j(t)]]],$$

(j=1, 2, . . . , n), (k=1, 2, . . . , n), where $A_{jk}=1$ (when j=k) \quad (2-5)

The right sides of the equations (2-4) and (2-5) can be found by measurement and calculation in each transmission system, and the results of calculation are stored in the memory 21.

Assuming that $Y_{jk}$ and $X_{jk}$ represent the values of the right sides of the equations (2-4) and (2-5) respectively, these values are expressed in the following equations (2-6) and (2-7) respectively:

$$Y_{jk}=\phi_{jk}+\Delta\phi TX_j+\Delta\phi RX_k,$$

(j=1, 2, . . . , n), (k=1, 2, . . . , n), where $\phi_{jk}=0$ (when j=k) \quad (2-6)

$$X_{jk}=\log_e[A_{jk}]+\log_e[ATX_j]+\log_e[ARX_k],$$

(j=1, 2, . . . , n), (k=1, 2, . . . , n), where $A_{jk}=1$ (when j=k) \quad (2-7)

Subsequent processing is identical to the processing described with reference to FIG. 6, and the phase rotation quantity $\Delta\phi TX_j$ and the amplitude fluctuation quantity $ATX_j$ of the signal resulting from passage through the transmission circuit $TX_j$ (=1, 2, . . . , n) and the phase rotation quantity $\Delta\phi RX_j$ and the amplitude fluctuation quantity $ARX_j$ of the signal resulting from passage through the receiving circuit $RX_j$ can be calculated in all transmission systems by solving the above simultaneous linear equations (2-6) and (2-7) with the values $Y_{jk}$ and $X_{jk}$ stored in the memory 21 if the number n of the transmission systems is at least 3.

The transmission characteristics can be calibrated between the received signal and the transmitted signal in each transmission system by supplying information on the phase difference between the receiving circuit and the transmission circuit of each transmission system estimated in the aforementioned manner to the phase shifter of the transmission system while supplying information on the amplitude fluctuation quantity in each transmission system to the attenuator of the transmission system.

Figure 35:
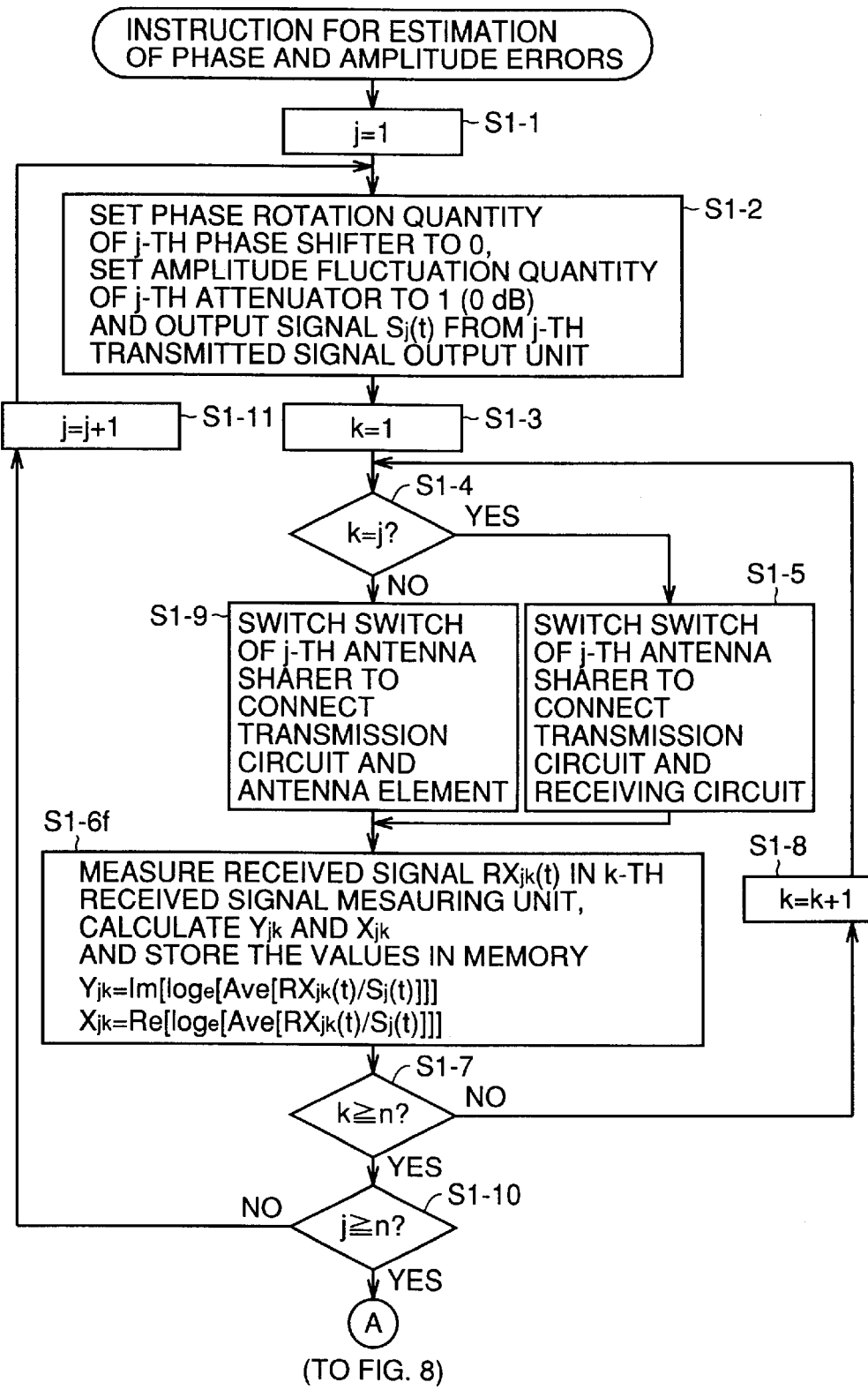
FIG. 35 is a flow chart showing operations of the fifth embodiment shown in FIG. 34.

FIG. 35 is a flow chart illustrating operations of the fifth embodiment shown in FIG. 34, in correspondence to the operations of the first embodiment shown in FIG. 16. The flow chart shown in FIG. 35 is different from that of FIG. 16 in a point that time averaging expressed as $Ave[\cdot]$ is added in a step S1-6f. At the step S1-6f shown in FIG. 35, imaginary and real parts of $\log_e[Ave\{RX_{jk}(t)/S_j(t)\}]$ are extracted thereby finding the equations (2-6) and (2-7) of the phase component and the amplitude component respectively.

Figure 36:
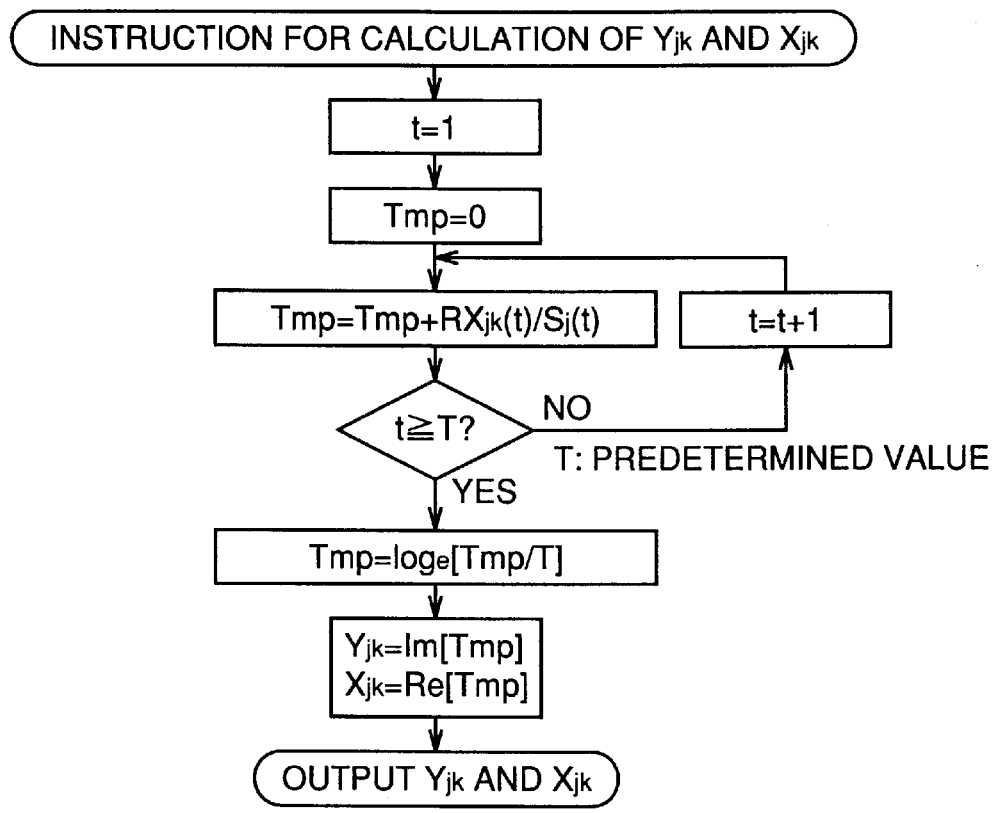
FIG. 36 is a flow chart showing a calculation routine included in the operations shown in FIG. 35.

FIG. 36 is a flow chart showing the calculation routine at the step S1-6f shown in FIG. 35 in detail. In the flow chart shown in FIG. 36, a temporary variable Tmp is set to 0 for accumulating $RX_{jk}(t)/S_j(t)$ up to a time T. The result of accumulation is divided by T for calculating a time average Tmp/T and the natural logarithm thereof is calculated for extracting an imaginary part $Y_{jk}$ and a real part $X_{jk}$.

The remaining processing excluding the step S1-6f is identical to that in the flow chart shown in FIG. 16, and hence redundant description is not repeated.

According to the fifth embodiment of the present invention, as hereinabove described, the term including a noise component can be eliminated by providing the time averaging circuit on each transmission system, and hence an error of estimation caused by influence of noise can be suppressed even if the received signal includes a large amount of noise components and has an inferior S-N ratio, so that information on the phase difference and the amplitude fluctuation quantities of each transmission system can be excellently estimated.

Sixth and Seventh Embodiments

Figure 37:
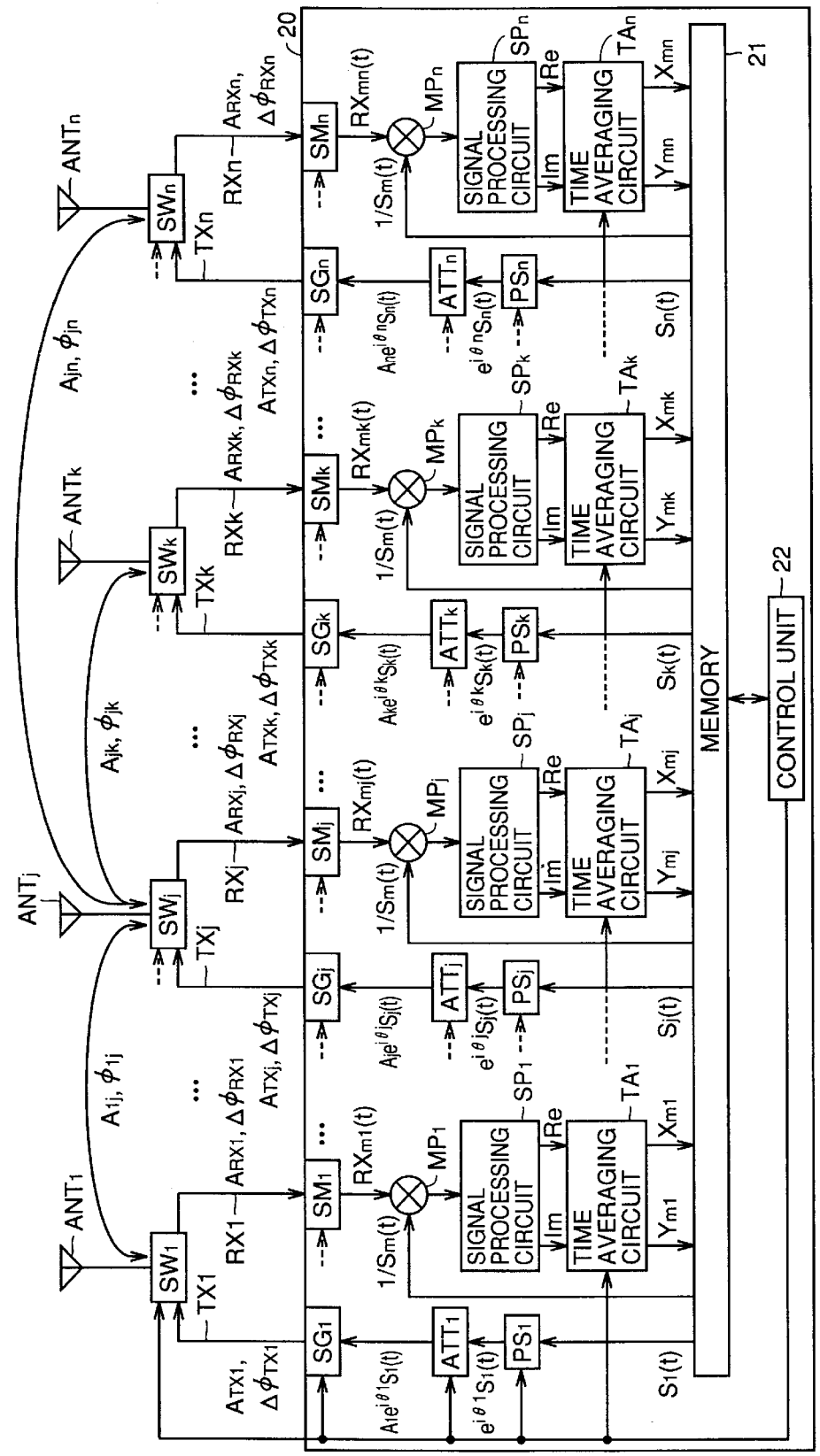
FIG. 37 is a block diagram showing a specific circuit structure of a sixth embodiment of the present invention.

FIG. 37 is a block diagram showing a specific circuit structure of a sixth embodiment of the present invention. In the sixth embodiment shown in FIG. 37, time averaging circuits are added to positions different from those in the fifth embodiment shown in FIG. 34 in the first embodiment of the first basic structure of the present invention shown in FIG. 15.

Both sides of the above equation (1-2) are divided by a known signal $S_j(t)$ for calculating natural logarithms and performing Taylor expansion without time averaging, dissimilarly to the fifth embodiment. When the S-N ratio is not much excellent, the result of Taylor expansion is expressed in the following approximation (2-8).

When separately extracting imaginary parts and real parts on both sides of the equation (2-8) and performing time averaging, the term including a noise component $n_{jk}(t)$ on the left side reaches 0 while the remaining terms are constant with respect to time, and hence the following equations (2-9) and (2-10) are found:

$$\log_e[A_{jk}ATX_jARX_k]+i(\phi_{jk}+\Delta\phi TX_j+\Delta\phi RX_k)+n_{jk}(t)/$$
$$[A_{jk}ATX_jARX_k\exp\{i(\phi_{jk}+\Delta\phi TX_j+\Delta\phi RX_k)\}S_j(t)]=\log_e[RX_{jk}(t)/S_j(t)]$$

$$\phi_{jk}+\Delta\phi TX_j+\Delta\phi RX_k=Ave[Im[\log_e[RX_{jk}(t)/S_j(t)]]],$$

$(j=1, 2, \ldots, n), (k=1, 2, \ldots, n),$ where $\phi_{jk}=0$ (when $j=k$) \hfill (2-9)

$$\log_e[A_{jk}ATX_jARX_k]=Ave[Re[\log_e[RX_{jk}(t)/S_j(t)]]],$$

$(j=1, 2, \ldots, n), (k=1, 2, \ldots, n),$ where $A_{jk}=1$ (when $j=k$) \hfill (2-10)

The right sides of the equations (2-9) and (2-10) can be found by measurement and calculation for each transmission system, and the results of calculation are entirely stored in a memory 21.

Assuming that $Y_{jk}$ and $X_{jk}$ represent the values of the right sides of the equations (2-9) and((2-10) respectively, the equations are converted to the simultaneous linear equations (2-6) and (2-7) described with reference to FIG. 34, and subsequent processing is identical to the processing described with reference to FIG. 34.

Figure 38:
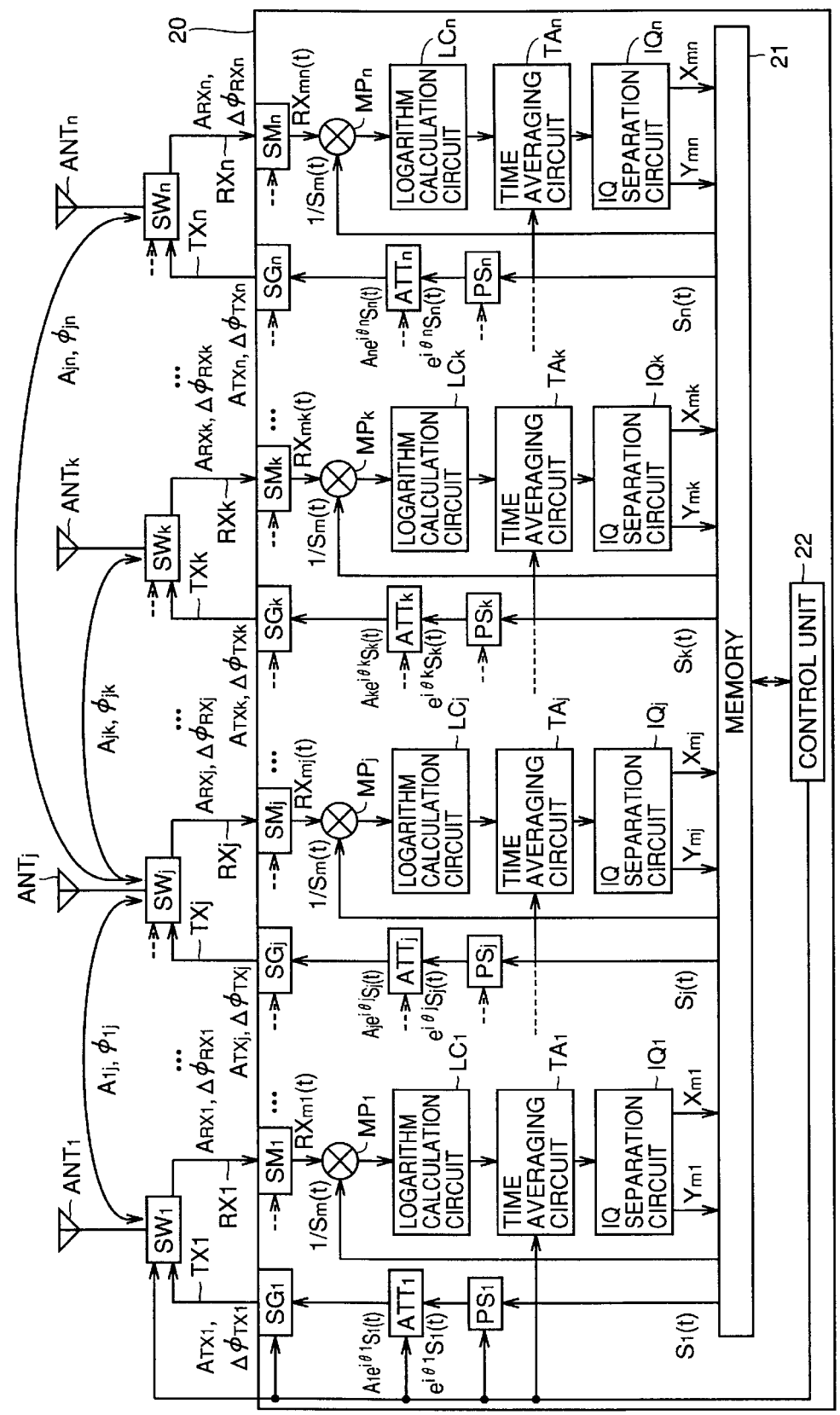
FIG. 38 is a block diagram showing a specific circuit structure of a seventh embodiment of the present invention.

FIG. 38 is a block diagram showing a specific circuit structure of a seventh embodiment of the present invention. In the seventh embodiment shown in FIG. 38, the signal processing circuit $SP_j$ in the first embodiment of the present invention shown in FIG. 15 is replaced with a logarithm calculation circuit $LC_j$, a time averaging circuit $TA_j$ and an I/Q separation circuit $IQ_j$.

A multiplier $MP_j$ divides both sides of the above equation (1-2) by a known signal $S_j(t)$ and the logarithm calculation circuit $LC_j$ calculates the natural logarithms of both sides for performing Taylor expansion. When the S-N ratio is not much excellent, the result of the Taylor expansion is expressed in the above equation (2-8).

According to the seventh embodiment, the time averaging circuit $TA_j$ time-averages the equation (2-8) without separating the imaginary part and the real part in this stage dissimilarly to the sixth embodiment. In this case, the first and second terms on the left side of the equation (2-8) are constant with respect to time and the term including the noise component $n_{jk}(t)$ reaches 0 due to time averaging, and hence the following equation (2-11) is found.

When the I/Q separation circuit $IQ_j$ separately extracts the imaginary and real parts from both sides of the equation (2-11), the following equations (2-12) and (2-13) are found:

$$\log_e[A_{jk}ATX_jARX_k]+i(\phi_{jk}+\Delta\phi TX_j+\Delta\phi RX_k)=Ave[\log_e[RX_{jk}(t)/S_j(t)]]\quad(2\text{-}11)$$

$$\phi_{jk}+\Delta\phi TX_j+\Delta\phi RX_k=Im[Ave[\log_e[RX_{jk}(t)/S_j(t)]]],$$

$(j=1, 2, \ldots, n), (k=1, 2, \ldots, n)$ where $\phi_{jk}=0$ (when $j=k$) \hfill (2-12)

$$\log_e[A_{jk}ATX_jARX_k]=Re[Ave[\log_e[RX_{jk}(t)/S_j(t)]]],$$

$(j=1, 2, \ldots, n), (k=1, 2, \ldots, n)$ where $A_{jk}=1$ (when $j=k$) \hfill (2-13)

The right sides of the equations (2-12) and (2-13) can be found by measurement and calculation for each transmission system, and the results of calculation are entirely stored in a memory 21.

Assuming that $Y_{jk}$ and $X_{jk}$ represent the values of the right sides of the equations (2-12) and (2-13) respectively, the equations are converted to the simultaneous linear equations (2-6) and (2-7) described with reference to FIG. 34, and subsequent processing is identical to the processing described with reference to FIG. 34.

Figure 39:
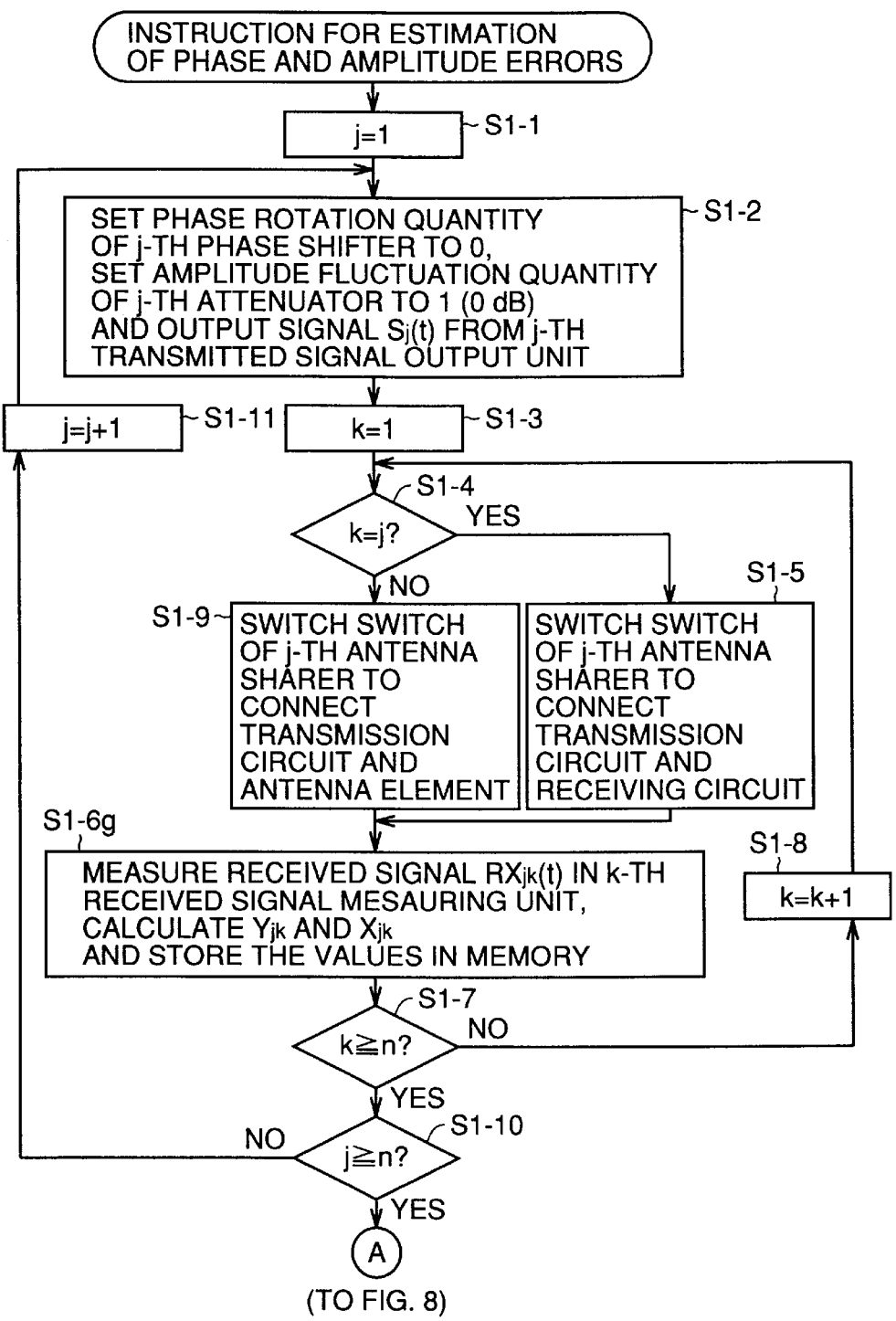
FIG. 39 is a flow chart inclusively showing operations of the sixth and seventh embodiments of the present invention.

FIG. 39 is a flow chart inclusively illustrating operations of the sixth and seventh embodiments shown in FIGS. 37 and 38, in correspondence to the operations of the first embodiment shown in FIG. 16.

Figure 40:
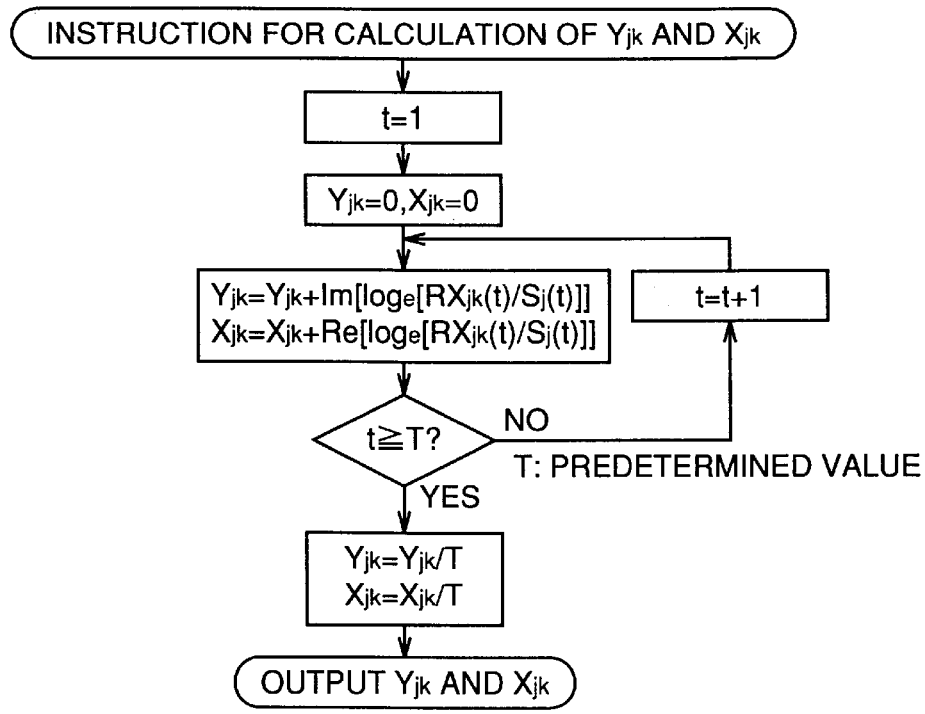
FIG. 40 is a flow chart showing a calculation routine included in the operations shown in FIG. 39.
Figure 41:
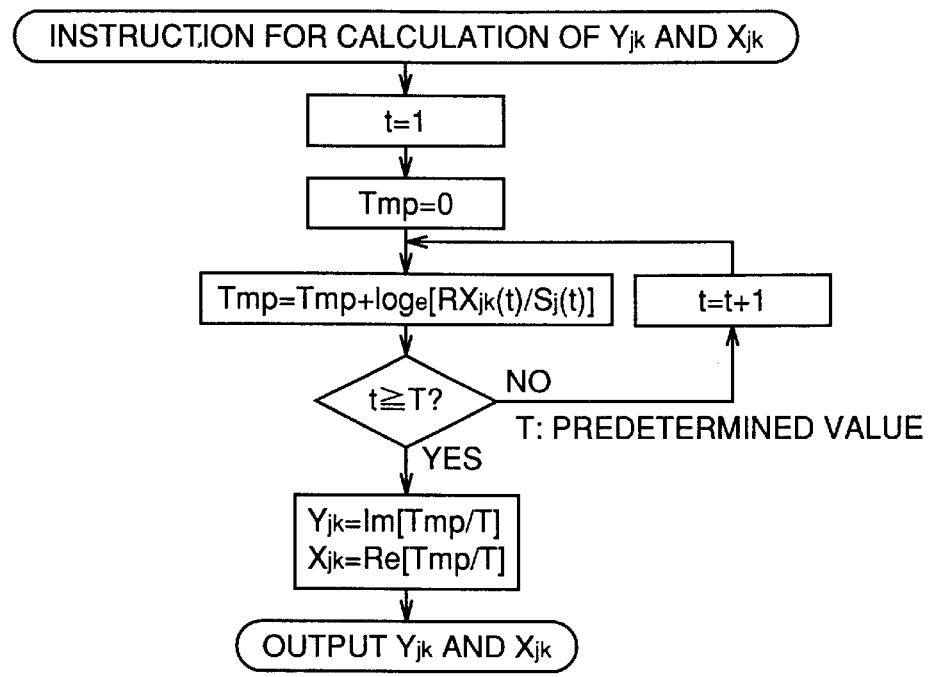
FIG. 41 a flow chart showing another calculation routine included in the operations shown in FIG. 39.

FIG. 40 is a flow chart showing a calculation routine of the sixth embodiment corresponding to a step S1-6g of the flow chart in FIG. 39, and FIG. 41 is a flow chart showing a calculation routine of the seventh embodiment corresponding to the step S1-6g of the flow chart in FIG. 39.

According to the sixth embodiment, imaginary and real parts of $\log_e\{RX_{jk}(t)/S_j(t)\}$ are separated and thereafter time averaging is performed for obtaining a phase component $Y_{jk}$ and an amplitude component $X_{jk}$ at the step S1-6g.

More specifically, $Y_{jk}$ and $X_{jk}$ are set to 0 in the flow chart shown in FIG. 40, and the imaginary and real parts of $\{RX_{jk}(t)/S_j(t)\}$ are accumulated up to a time T. The result of accumulation is divided by T for calculating time averages $Y_{jk}/T$ and $X_{jk}/T$ and outputting the same as a phase component $Y_{jk}$ and an amplitude component $X_{jk}$. Except the step S1-6g, the remaining processing of the sixth embodiment is identical to the processing of the first embodiment shown in FIG. 16.

According to the seventh embodiment, $\log_e\{RX_{jk}(t)/S_j(t)\}$ is subjected to time averaging for thereafter separating imaginary and real parts and obtaining a phase component $Y_{jk}$ and an amplitude component $X_{jk}$ at the step S1-6g.

More specifically, a temporary variable $T_{mp}$ is set to 0 in the flow chart shown in FIG. 41, and $\log_e\{RX_{jk}(t)/S_j(t)\}$ is accumulated up to a time T. The result of accumulation is divided by T for calculating a time average $T_{mp}/T$ and extracting its imaginary and real parts as a phase component $Y_{jk}$ and as an amplitude component $X_{jk}$ respectively. Except the step S1-6g, the remaining processing of the seventh embodiment is identical to the processing of the first embodiment shown in FIG. 16.

Eighth and Ninth Embodiments

Figure 42:
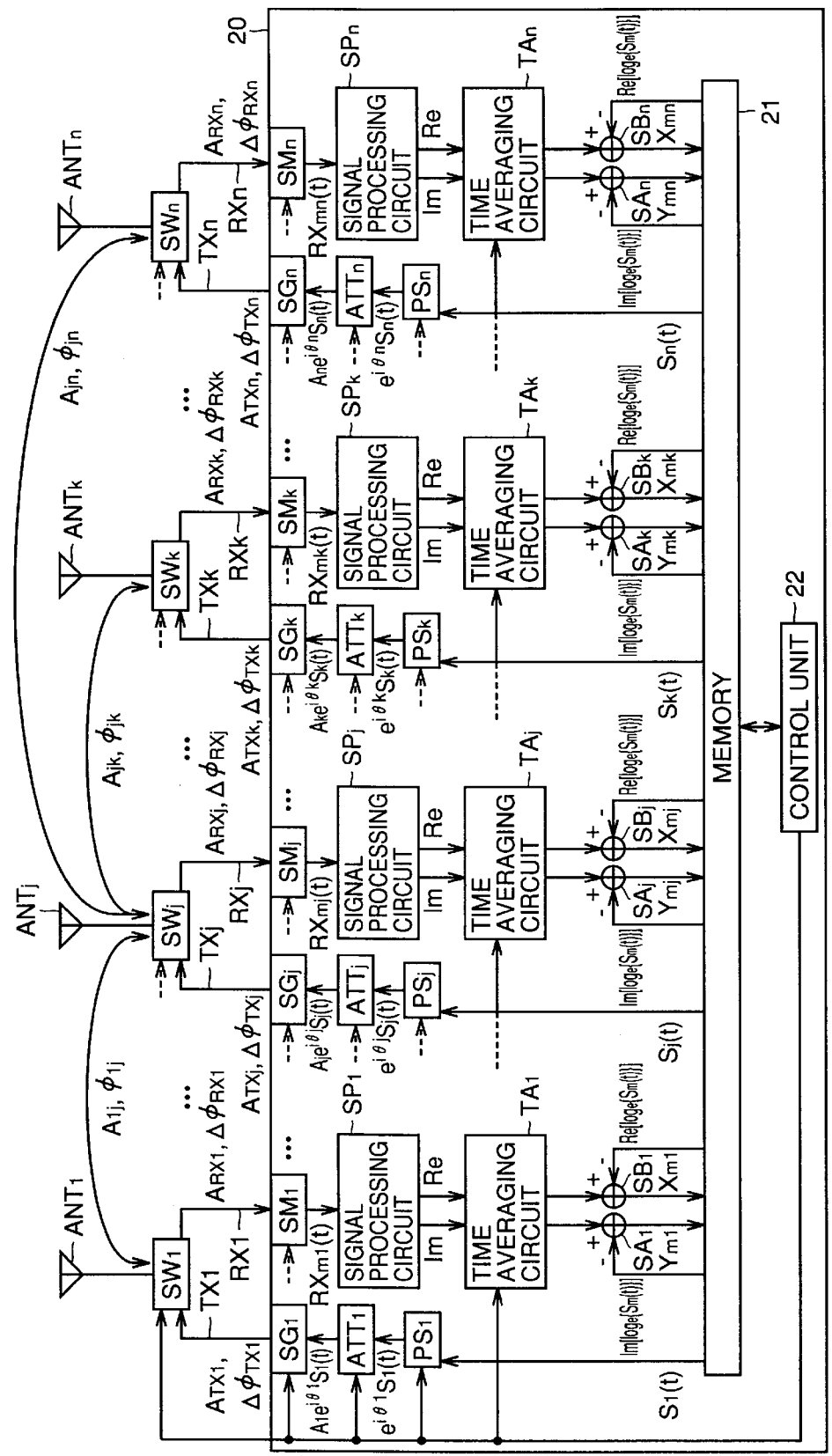
FIG. 42 is a block diagram showing a specific circuit structure of an eighth embodiment of the present invention.

FIG. 42 is a block diagram showing a specific circuit structure of an eighth embodiment of the present invention. The eighth embodiment shown in FIG. 42 is different from the sixth embodiment shown in FIG. 37 merely in a point that division by a known signal $S_j(t)$ is performed not on a measured received signal $RX_j(t)$ but on a received signal subjected to calculation of the natural logarithm, separated into imaginary and real parts and time-averaged in a final stage.

Figure 43:
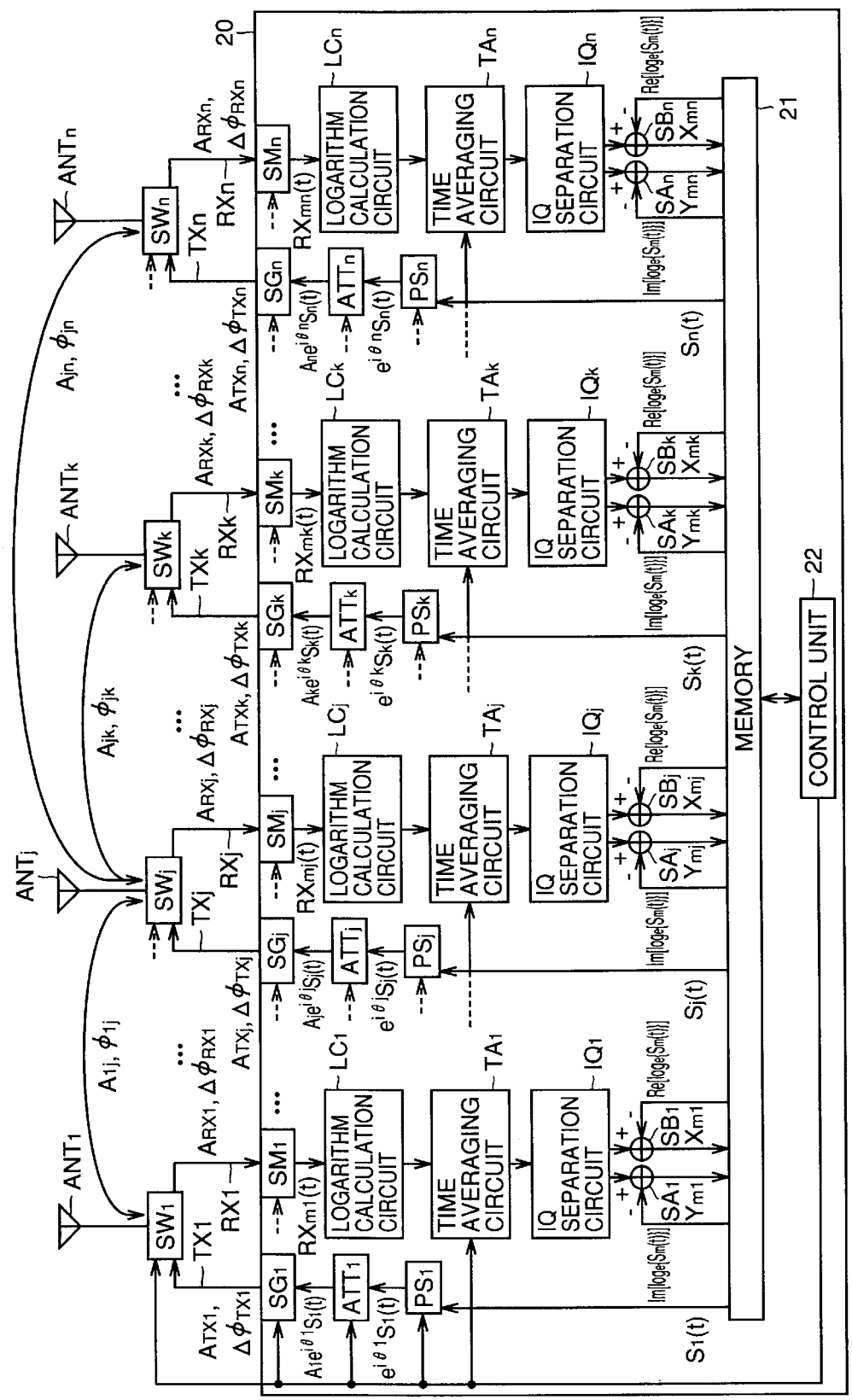
FIG. 43 is a block diagram showing a specific circuit structure of a ninth embodiment of the present invention.

FIG. 43 is a block diagram showing a specific circuit structure of a ninth embodiment of the present invention. The ninth embodiment shown in FIG. 43 is different from the seventh embodiment shown in FIG. 38 merely in a point that division by a known signal $S_j(t)$ is performed not on a measured received signal $RX_j(t)$ but on a received signal subjected to calculation of the natural logarithm, time-averaged and separated into imaginary and real parts in a final stage.

Figure 44:
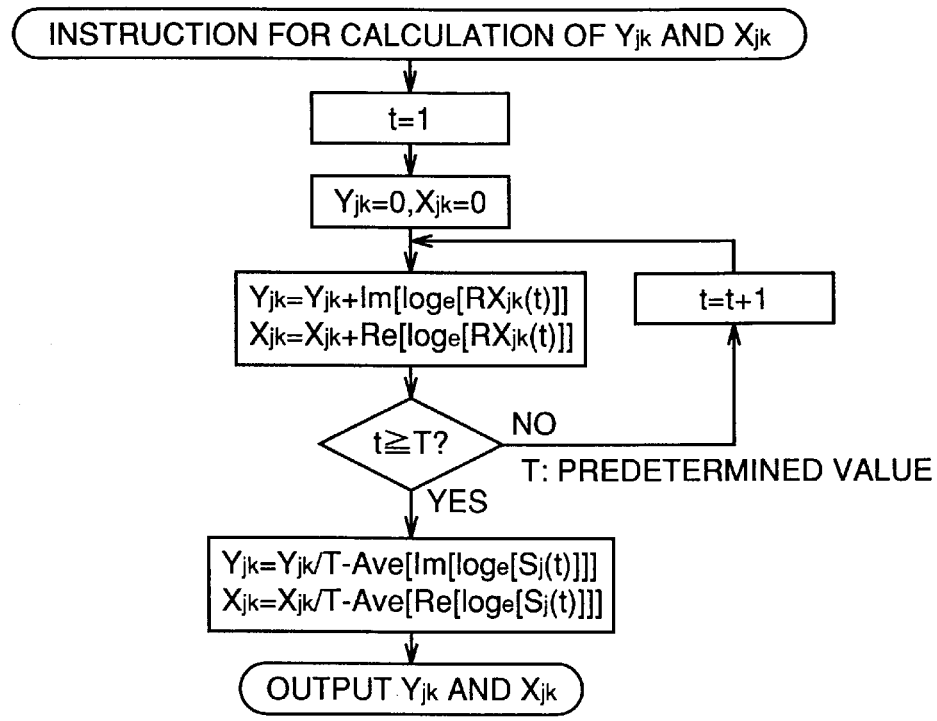
FIG. 44 is a flow chart showing still another calculation routine included in the operations shown in FIG. 39.
Figure 45:
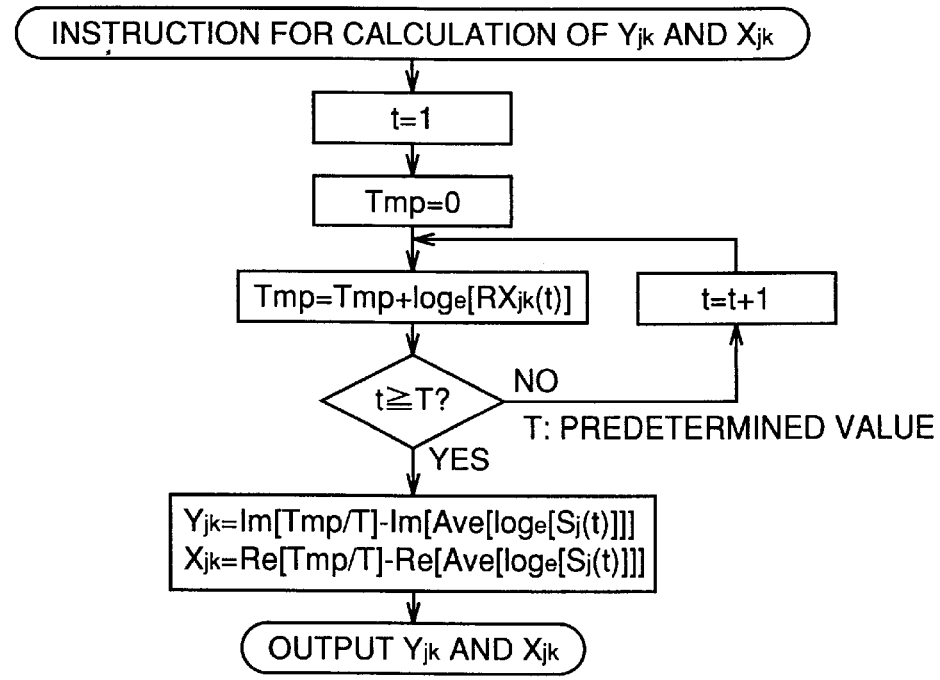
FIG. 45 is a flow chart showing a further calculation routine included in the operations shown in FIG. 39

The flow chart of FIG. 39 also inclusively shows operations of the eighth and ninth embodiments shown in FIGS. 42 and 43. FIG. 44 is a flow chart showing a calculation routine of the eighth embodiment corresponding to the step S1-6g in the flow chart of FIG. 39, and FIG. 45 is a flow chart showing a calculation routine of the ninth embodiment corresponding to the step S1-6g in the flow chart of FIG. 39.

According to the eighth embodiment, imaginary and real parts of $\log_e\{RX_{jk}(t)\}$ are separated and thereafter time averaging is performed for thereafter subtracting average values of the imaginary and real parts of $\log_e\{S_j(t)\}$ stored in a memory 21 respectively and obtaining a phase component $Y_{jk}$ and an amplitude component $X_{jk}$ at the step S1-6g.

More specifically, $Y_{jk}$ and $X_{jk}$ are set to 0 in the flow chart shown in FIG. 44, and the imaginary and real parts of $\log_e\{RX_{jk}(t)\}$ are accumulated up to a time T. The result of accumulation is divided by T for calculating time averages $Y_{jk}/T$ and $X_{jk}/T$, subtracting the average values of the imaginary and real parts of $\log_e\{S_j(t)\}$ stored in the memory 21 therefrom respectively and outputting the results as a phase component $Y_{jk}$ and an amplitude component $X_{jk}$. Except the step S1-6g, the remaining processing of the eighth embodiment is identical to the processing of the first embodiment shown in FIG. 16.

According to the ninth embodiment, $\log_e\{RX_{jk}(t)\}$ is subjected to time averaging and separated into imaginary and real parts for thereafter subtracting imaginary and real parts of average values of $\log_e\{S_j(t)\}$ stored in a memory 21 respectively and obtaining a phase component $Y_{jk}$ and an amplitude component $X_{jk}$ at the step S1-6g.

More specifically, a temporary variable $T_{mp}$ is set to 0 in the flow chart shown in FIG. 45, and $\log_e\{RX_{jk}(t)\}$ is accumulated up to a time T. The result of accumulation is divided by T for calculating a time average $T_{mp}/T$, subtracting the imaginary and real parts of the average values of $\log_e\{S_j(t)\}$ stored in the memory 21 therefrom respectively and obtaining a phase component $Y_{jk}$ and an amplitude component $X_{jk}$.

According to each of the sixth to ninth embodiments, as hereinabove described, the term including a noise component can be eliminated by providing the time averaging circuit on each transmission system, whereby an error in estimation caused by influence of noise can be suppressed even if the received signal has an inferior S-N ratio, and information on the phase difference and the amplitude fluctuation quantity of each transmission system can be excellently estimated.

Mode Providing Time Averaging Circuit on Second Basic Structure

Tenth Embodiment

Figure 46:
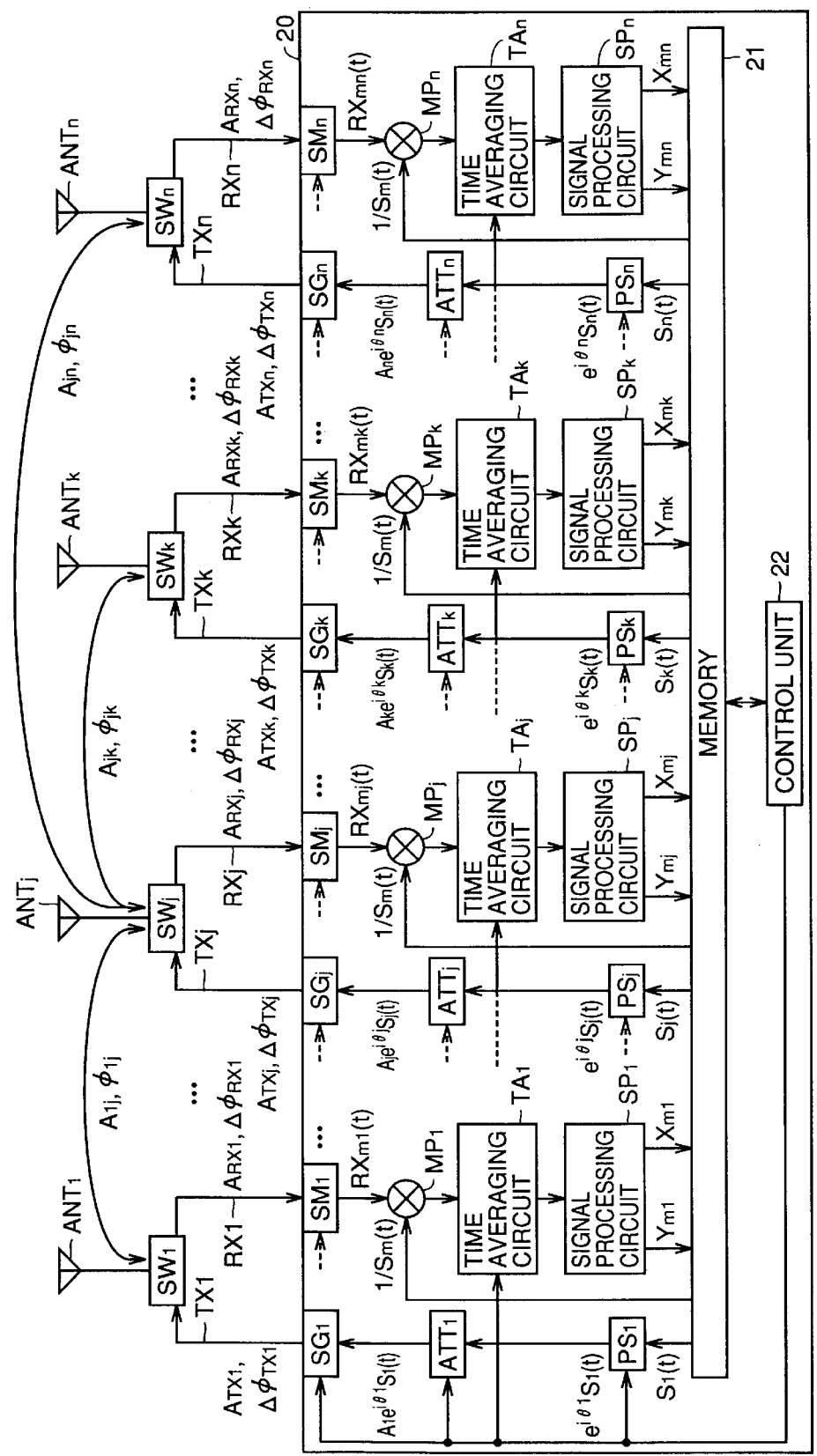
FIG. 46 is a block diagram showing a specific circuit structure of a tenth embodiment of the present invention.

FIG. 46 is a block diagram showing a specific circuit structure according to a tenth embodiment of the present invention. In the tenth embodiment shown in FIG. 46, time averaging circuits are added to the third embodiment of the second structure of the present invention shown in FIG. 30. The operation principle of an adaptive array radio base station according to the tenth embodiment is now described.

In calibration, a phase rotation quantity $\theta_j$ of a phase shifter $PS_j$ of a j-th (j=1, 2, ..., n) transmission system is set to 0 and an amplitude fluctuation quantity $A_j$ of an attenuator $ATT_j$ is set to 1 (=0 dB). A known signal $S_j(t)$ corresponding to the j-th transmission system is read from a memory 21 and transmitted through an antenna element $ANT_j$.

The transmitted signal is received in antenna elements $ANT_k$ (k=1, 2, ..., n, where j≠k) of all transmission systems excluding the j-th transmission system, and measured by a received signal measuring unit $SM_k$ of each transmission system as a received signal $R_{jk}(t)$.

In the tenth embodiment shown in FIG. 46, an antenna sharer is not switched to connect a transmission circuit and a receiving circuit with each other in each transmission system.

The signal $R_{jk}(t)$ transmitted from the j-th transmission system and received and measured in the k-th transmission system is expressed in the equation (1-13) described above with reference to the second basic structure shown in FIG. 19, while the signal $R_{jk}(t)$ received and measured in each of the first to n-th transmission systems excluding the transmission system transmitting the signal while sequentially switching the transmission system transmitting the signal from the first to n-th transmission systems is expressed in the equation (1-14) described above. In these equations, $n_{jk}(t)$ represents noise.

When dividing both sides of the equation (1-14) by the known signal $S_j(t)$ in a multiplier $MP_j$ of each transmission system and transposing the term including noise from the left side to the right side, the equation (2-1) described above with reference to FIG. 34 is found. When time-averaging the equation (2-1) with a time averaging circuit $TA_j$ (j=1, 2, ..., n) of each transmission system, the left side is constant with respect to time and hence the above equation (2-2) is found.

$Ave[n_{jk}(t)/S_j(t)]=0$ due to the properties of the noise, and hence the natural logarithms of both sides of the above equation (2-2) calculated by the signal processing circuit $SP_j$ of each transmission system are expressed in the above equation (2-3). The following equation (2-14) is deduced when noting the imaginary part thereof, while the following equation (2-15) is deduced when noting the real part thereof:

$$\phi_{jk}+\Delta\phi TX_j+\Delta\phi RX_k=Im[\log_e[Ave[RX_{jk}(t)/S_j(t)]]],$$

$(j=1, 2, \ldots, n), (k=1, 2, \ldots, n),$ where $j \neq k$ \hfill (2-14)

$$\log_e[A_{jk}ATX_jARX_k]=Re[\log_e[Ave[RX_{jk}(t)/S_j(t)]]],$$

$$(j=1, 2, \ldots, n), (k=1, 2, \ldots, n),$$

where $j \neq k$ (2-15)

The right sides of the equations (2-14) and (2-15) can be found by measurement and calculation in each transmission system, and the results of calculation are stored in the memory 21.

Assuming that $Y_{jk}$ and $X_{jk}$ represent the values of the right sides of the equations (2-14) and (2-15) respectively, these values are expressed in the following equations (2-16) and (2-17) respectively:

$$Y_{jk}=\phi_{jk}+\Delta\phi TX_j+\Delta\phi RX_k, (j=1, 2, \ldots, n), (k=1, 2, \ldots, n),$$

where $j \neq k$ (2-16)

$$X_{jk}=\log_e[A_{jk}]+\log_e[ATX_j]+\log_e[ARX_k],$$

$$(j=1, 2, \ldots, n), (k=1, 2, \ldots, n),$$

where $j \neq k$ (2-17)

When substituting $Y_{jk}-Y_{kj}=Z_{jk}$ in the equation (2-16) as to the phase information obtained in the aforementioned manner, the following simultaneous linear equations (2-18) are found. When substituting $X_{jk}-X_{kj}=V_{jk}$ in the equation (2-17) as to the obtained amplitude information, the following equation (2-19) is found:

$$Z_{jk}=Y_{jk}-Y_{kj}=\Delta\phi_k-\Delta\phi_j, (j=1, 2, \ldots, n-1), (k=j+1, j+2, \ldots, n)(2\text{-}18)$$

$$V_{jk}=X_{jk}-X_{kj}=\Delta A_k-\Delta A_j, (j=1, 2, \ldots, n-1), (k=j+1, j+2, \ldots, n)(2\text{-}19)$$

Subsequent processing is identical to the processing described with reference to FIG. 19, and the difference $\Delta\phi_j$ in the phase rotation quantity and the difference $\Delta A_j$ in the amplitude fluctuation quantity between the signals passing through the transmission circuit and the receiving circuit can be calculated in all transmission systems by solving the above simultaneous linear equations (2-18) and (2-19) with the values $Y_{jk}$ and $X_{jk}$ stored in the memory 21 if the number n of the transmission systems is at least 3.

The transmission characteristics can be calibrated between the received signal and the transmitted signal in each transmission system by supplying information on the phase difference between the receiving circuit and the transmission circuit of each transmission system estimated in the aforementioned manner to the phase shifter of the transmission system while supplying information on the amplitude fluctuation quantity of each transmission system to the attenuator of the transmission system.

Figure 47:
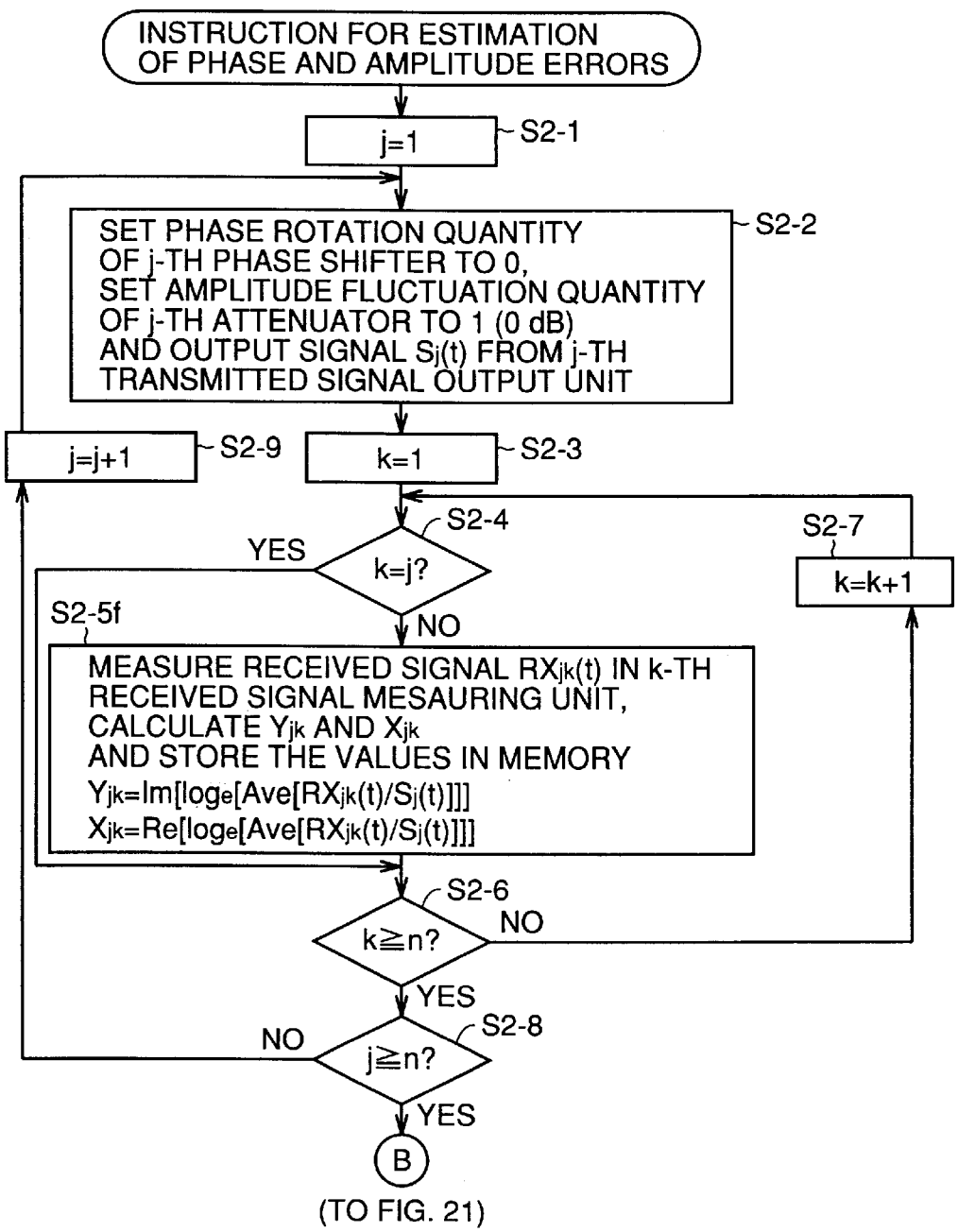
FIG. 47 is a flow chart showing operations of the tenth embodiment shown in FIG. 46.

FIG. 47 is a flow chart illustrating operations of the tenth embodiment shown in FIG. 46, in correspondence to the operations of the third embodiment shown in FIG. 31. The flow chart shown in FIG. 47 is different from that of FIG. 31 in a point that time averaging expressed as Ave[·] is added to a step S2-5ƒ. At the step S2-5ƒ shown in FIG. 47, imaginary and real parts of $\log_e[Ave\{RX_{jk}(t)/S_j(t)\}]$ are extracted thereby finding the equations (2-18) and (2-19) of the phase component and the amplitude component respectively.

The calculation routine at the step S2-5ƒ is identical to the calculation routine shown in FIG. 36 described with reference to the fifth embodiment, and hence redundant description is not repeated.

According to the tenth embodiment of the present invention, as hereinabove described, the term including a noise component can be eliminated by providing the time averaging circuit on each transmission system, and hence an error of estimation caused by influence of noise can be suppressed even if the received signal includes a large amount of noise components and has an inferior S-N ratio, so that information on the phase difference and the amplitude fluctuation quantity of each transmission system can be excellently estimated.

Eleventh and Twelfth Embodiments

Figure 48:
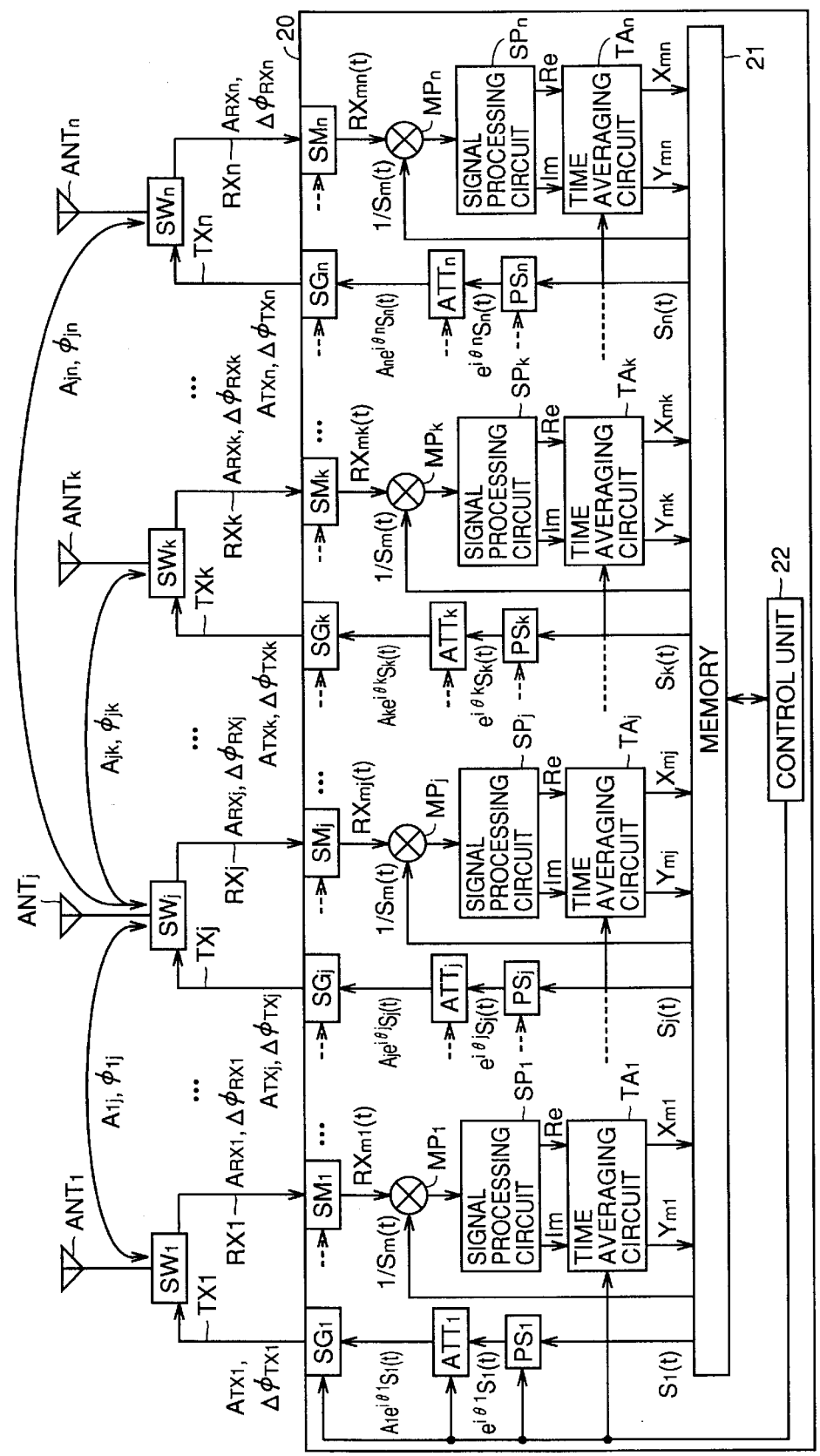
FIG. 48 is a block diagram showing a specific circuit structure of an eleventh embodiment of the present invention.

FIG. 48 is a block diagram showing a specific circuit structure of an eleventh embodiment of the present invention. In the eleventh embodiment shown in FIG. 48, time averaging circuits are added to positions different from those in the tenth embodiment shown in FIG. 46 in the third embodiment of the second basic structure of the present invention shown in FIG. 30.

Both sides of the above equation (1-2) are divided by a known signal $S_j(t)$ for calculating natural logarithms and performing Taylor expansion without time averaging, dissimilarly to the tenth embodiment. When the S-N ratio is not much excellent, the result of Taylor expansion can be expressed in the above approximation (2-8). When separately extracting imaginary parts and real parts from both sides of the equation (2-8) and performing time averaging, the term including a noise component $n_{jk}(t)$ on the left side reaches 0 while the remaining terms are constant with respect to time, and hence the following equations (2-20) and (2-21) are found:

$$\phi_{jk}+\Delta\phi TX_j+\Delta\phi RX_j=Ave[Im[\log_e[RX_{jk}(t)/S_j(t)]]]$$

$$(j=1, 2, \ldots, n), (k=1, 2, \ldots, n),$$

where $j \neq k$ (2-20)

$$\log_e[A_{jk}ATX_jARX_k]=Ave[Re[\log_e[RX_{jk}(t)/S_j(t)]]],$$

$$(j=1, 2, \ldots, n), (k=1, 2, \ldots, n),$$

where $j \neq k$ (2-21)

The right sides of the equations (2-20) and (2-21) can be found by measurement and calculation for each transmission system, and the results of calculation are entirely stored in a memory 21.

Assuming that $Y_{jk}$ and $X_{jk}$ represent the values of the right sides of the equations (2-20) and (2-21) respectively, the equations are converted to the equations (2-16) and (2-17) described with reference to FIG. 46, and subsequent processing is identical to the processing described with reference to FIG. 46.

Figure 49:
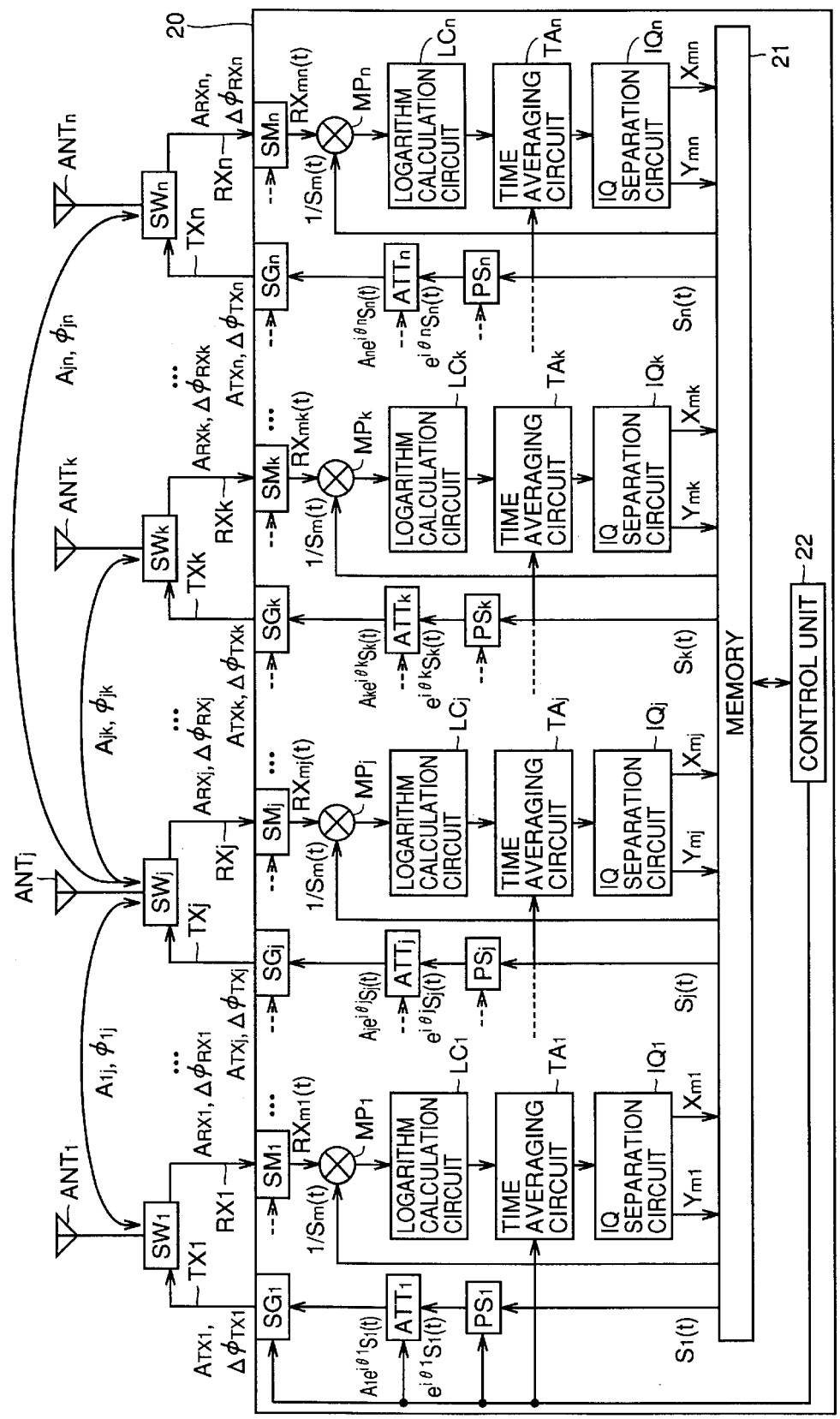
FIG. 49 is a block diagram showing a specific circuit structure of a twelfth embodiment of the present invention.

FIG. 49 is a block diagram showing a specific circuit structure of a twelfth embodiment of the present invention. In the twelfth embodiment shown in FIG. 49, the signal processing circuit SP$_j$ in the third embodiment of the second basic structure of tie present invention shown in FIG. 30 is replaced with a logarithm calculation circuit LC$_j$, a time averaging circuit TA$_j$ and an I/Q separation circuit IQ$_j$.

A multiplier MP$_j$ divides both sides of the above equation (1-2) by a known signal $S_j(t)$ and the logarithm calculation circuit LC$_j$ calculates the natural logarithms of both sides for performing Taylor expansion. When the S-N ratio is not much excellent, the result of the Taylor expansion is expressed in the above equation (2-8).

According to the twelfth embodiment, the time averaging circuit TA$_j$ time-averages the equation (2-8) without separating the imaginary part and the real part in this stage dissimilarly to the aforementioned eleventh embodiment. In this case, the first and second terms on the left side of the equation (2-8) are constants with respect to time and the term including a noise component $n_{jk}(t)$ reaches 0 due to time averaging, and hence the above equation (2-11) is found.

When the I/Q separation circuit $IQ_j$ separately extracts the imaginary and real parts from both sides of the equation (2-11), the following equations (2-22) and (2-23) are found:

$$\phi_{jk}+\Delta\phi TX_j+\Delta\phi RX_j=Im[Ave[\log_e[RX_{jk}(t)/S_j(t)]]]$$

$(j=1, 2, \ldots, n), (k=1, 2, \ldots, n),$ where $j \neq k$ (2-22)

$$\log_e[A_{jk}ATX_jARX_k]=Re[Ave[\log_e[RX_{jk}(t)/S_j(t)]]],$$

$(j=1, 2, \ldots, n), (k=1, 2, \ldots, n),$ where $j \neq k$ (2-23)

The right sides of the equations (2-22) and (2-23) can be found by measurement and calculation for each transmission system, and the results of calculation are entirely stored in a memory 21.

Assuming that $Y_{jk}$ and $X_{jk}$ represent the values of the right sides of the equations (2-22) and (2-23) respectively, the equations are converted to the simultaneous linear equations (2-16) and (2-17) described with reference to FIG. 46, and subsequent processing is identical to the processing described with reference to FIG. 46.

Figure 50:
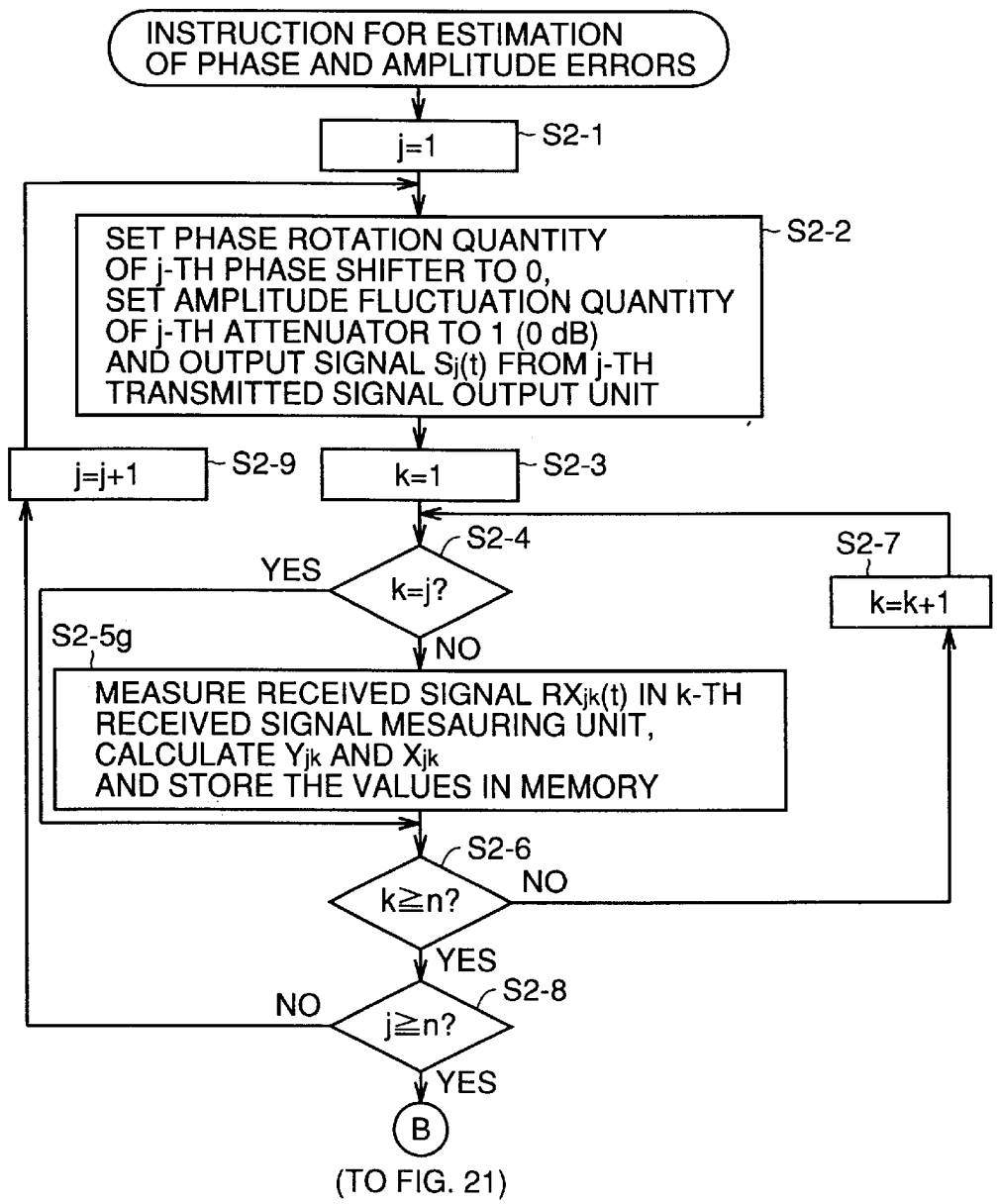
FIG. 50 is a flow chart inclusively showing operations of the eleventh and twelfth embodiments of the present invention.

FIG. 50 is a flow chart inclusively illustrating operations of the eleventh and twelfth embodiments shown in FIGS. 48 and 49, in correspondence to the operations of the third embodiment shown in FIG. 31.

A calculation routine at a step S2-5g of the twelfth embodiment is identical to the calculation routine in FIG. 40 described above with reference to the sixth embodiment, and hence redundant description is not repeated. Further, a calculation routine at the step S2-5g of the eleventh embodiment is identical to the calculation routine in FIG. 41 described above with reference to the seventh embodiment, and hence redundant description is not repeated.

According to each of the eleventh and twelfth embodiments of the present invention, as hereinabove described, an error in estimation of phase difference information caused by influence of noise can be suppressed even if the S-N ratio of a received signal is inferior by providing a time averaging circuit on each transmission system.

Thirteenth and Fourteenth Embodiments

Figure 51:
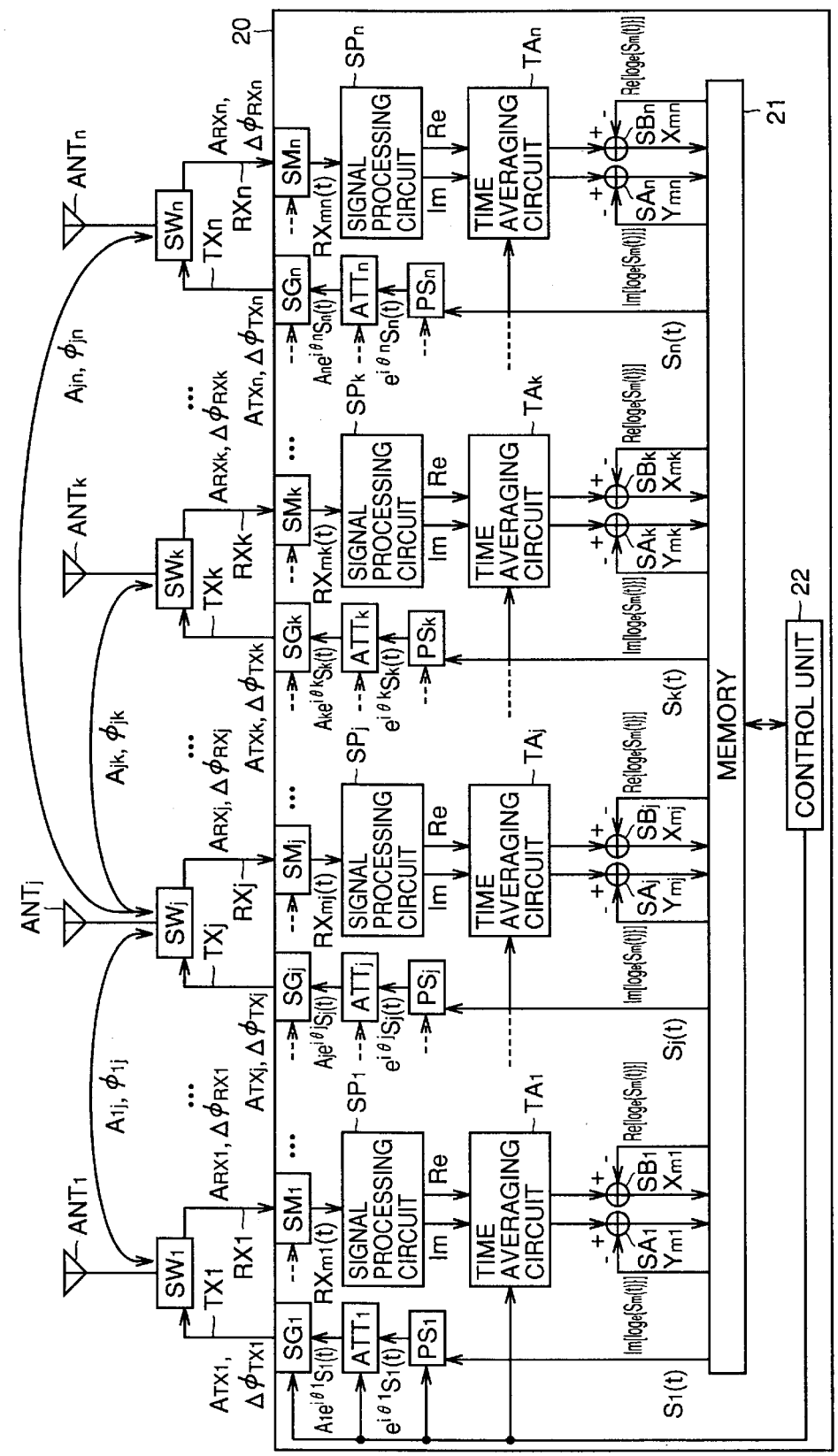
FIG. 51 is a block diagram showing a specific circuit structure of a thirteenth embodiment of the present invention.

FIG. 51 is a block diagram showing a specific circuit structure of a thirteenth embodiment of the present invention.

The thirteenth embodiment shown in FIG. 51 is different from the eleventh embodiment shown in FIG. 48 merely in a point that division by a known signal $S_j(t)$ is performed not on a measured received signal $RX_{jk}(t)$ but on a received signal subjected to calculation of the natural logarithm, separated into imaginary and real parts and time-averaged in a final stage.

Figure 52:
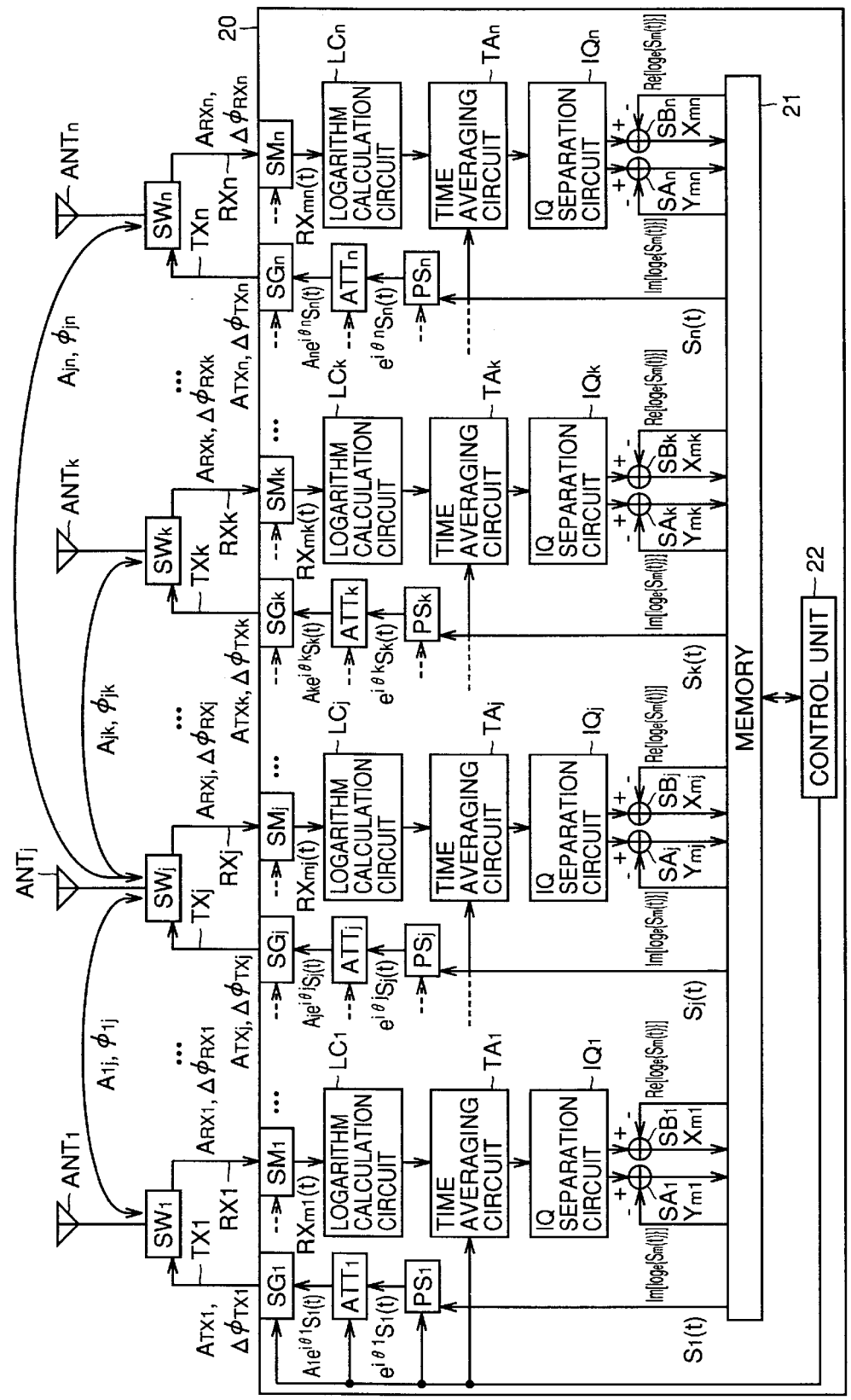
FIG. 52 is a block diagram showing a specific circuit structure of a fourteenth embodiment of the present invention.

FIG. 52 is a block diagram showing a specific circuit structure of a fourteenth embodiment of the present invention. The fourteenth embodiment shown in FIG. 52 is different from the twelfth embodiment shown in FIG. 49 merely in a point that division by a known signal $S_j(t)$ is performed not on a measured received signal $RX_{jk}(t)$ but on a received signal subjected to calculation of the natural logarithm, time-averaged and separated into imaginary and real parts in a final stage.

The flow chart of FIG. 50 also inclusively shows operations of the thirteenth and fourteenth embodiments shown in FIGS. 51 and 52.

A calculation routine at the step S2-5g of the thirteenth embodiment is identical to the calculation routine in FIG. 44 described above with reference to the eighth embodiment, and hence redundant description is not repeated.

A calculation routine at the step S2-5g of the fourteenth embodiment is identical to the calculation routine in FIG. 45 described above with reference to the ninth embodiment, and hence redundant description is not repeated.

According to each of the thirteenth and fourteenth embodiments, as hereinabove described, an error in estimation of the information on the phase difference and the amplitude fluctuation quantity caused by influence of noise can be suppressed even if the received signal has an inferior S-N ratio by providing a time averaging circuit on each transmission system.

Mode Providing Correlation Circuit on First Basic Structure

Fifteenth Embodiment

Figure 53:
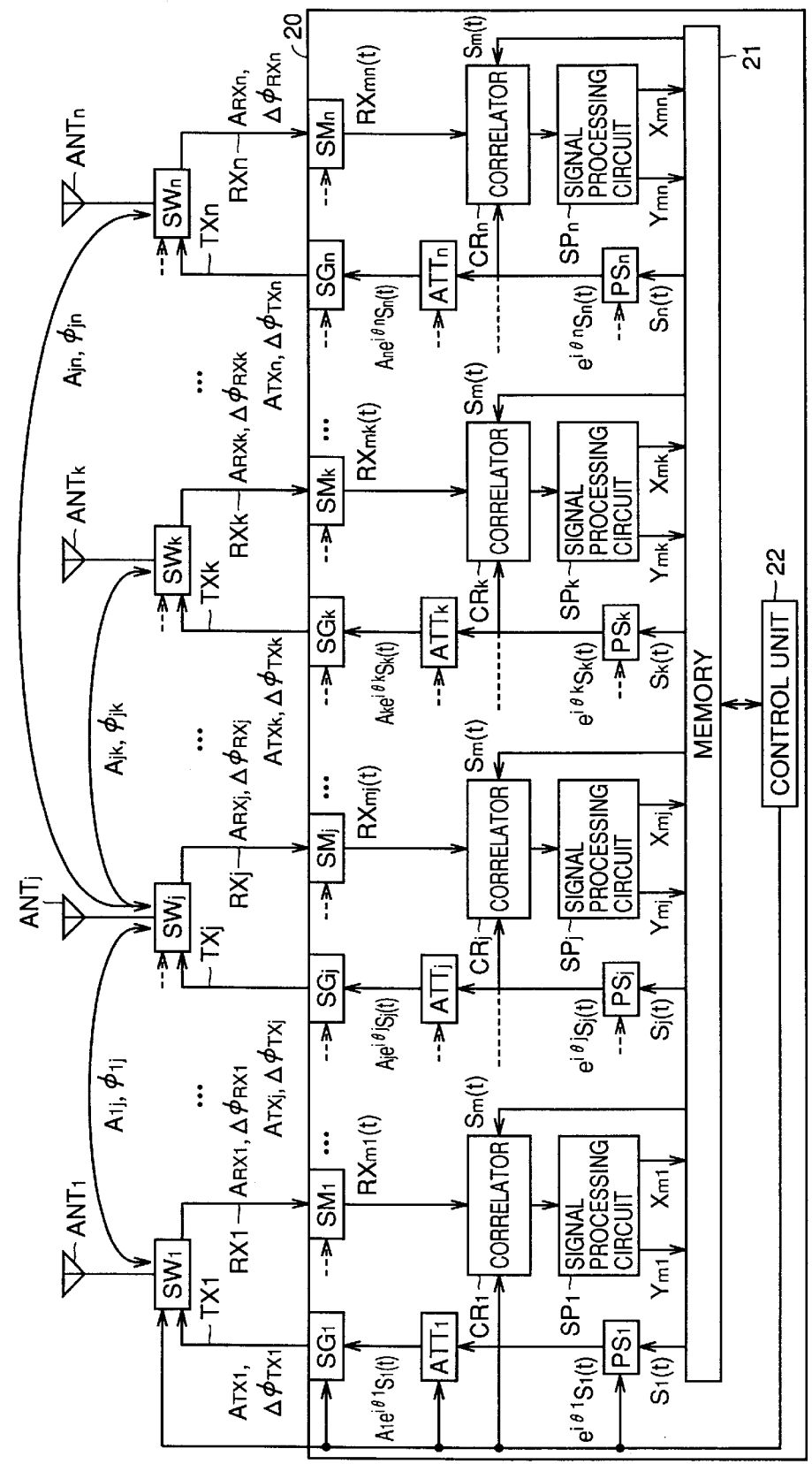
FIG. 53 is a block diagram showing a specific circuit structure of a fifteenth embodiment of the present invention.

FIG. 53 is a block diagram showing a specific circuit structure of a fifteenth embodiment of the present invention. In the fifteenth embodiment shown in FIG. 53, the multiplier $MP_j$ of each transmission system in the first embodiment of the first basic structure of the present invention shown in FIG. 15 is replaced with a correlator $CR_j$ $(j=1, 2, \ldots, n)$. The operation principle of an adaptive array radio base station according to the fifteenth embodiment is now described.

In calibration, a phase rotation quantity $\theta_j$ of a phase shifter $PS_j$ of a j-th $(j=1, 2, \ldots, n)$ transmission system is set to 0 and an amplitude fluctuation quantity $A_j$ of an attenuator $ATT_j$ is set to 1 (=0 dB). A known signal $S_j(t)$ corresponding to the j-th transmission system is read from a memory 21, and transmitted through an antenna element $ANT_j$.

The transmitted radio signal is received in an antenna element $ANT_k$ $(k=1, 2, \ldots, n,$ where $j \neq k)$ of each of the remaining transmission systems excluding the j-th transmission system, and measured by a received signal measuring unit $SM_k$ of each transmission system as a received signal $R_{jk}(t)$.

An antenna sharer $SW_j$ of the j-th transmission system is switched to connect a transmission circuit $TX_j$ to a receiving circuit $RX_j$ of this transmission system, so that a received signal measuring unit $SM_j$ of the transmission system itself measures a transmitted signal from this transmission circuit $TX_j$ as a received signal $RX_{jj}(t)$.

The following equation (3-1) expresses a signal $RX_{jk}(t)$ transmitted from each of the transmission systems sequentially switched from the first to n-th transmission systems and received and measured in all of the first to n-th transmission systems:

$$RX_{jk}(t)=A_{jk}ATX_jARX_k\exp\{i(\phi_{jk}+\Delta\phi TX_j+\Delta\phi RX_k)\}S_j(t)+I_{jk}(t)+n_{jk}(t),$$

$(j=1, 2, \ldots, n), (k=1, 2, \ldots, n)$ where $A_{jk}=1$ and $\phi_{jk}=0$ (when $j=k$)   (3-1)

In this equation, $I_{jk}(t)$ represents a composite signal of all interference signals included in the received signals. The interference signals include the radio signal from another user and the like described with reference to the prior art.

Then, a cross-correlation value $CS_{jk}$ of the received signal $RX_{jk}(t)$ and the known signal $S_j(t)$ of the corresponding transmission system is calculated. The cross-correlation value $CS_{jk}$, found by adding results of multiplication of two signals expressing functions of time t on a common time axis and time-averaging the sum, is expressed in the following equation (3-2). Calculation of this equation (3-2) results in the following equation (3-3):

$$CS_{jk} = \langle RX_{jk}(t) \cdot S_j(t) \rangle \quad (3\text{-}2)$$

$$CS_{jk} = A_{jk} ATX_j ARX_k \exp\{i(\phi_{jk} + \Delta\phi TX_j + \Delta\phi RX_k)\} \langle S_j(t) \cdot S_j(t) \rangle + \langle I_{jk}(t) \cdot S_j(t) \rangle + \langle n_{jk}(t) \cdot S_j(t) \rangle,$$

$$(j=1, 2, \ldots, n), (k=1, 2, \ldots, n)$$

where $A_{jk}=1$ and $\phi_{jk}=0$ (when $j=k$) \quad (3-3)

A transmitted signal is not correlated with the interference signal and a noise component due to the properties of the aforementioned correlation processing. Therefore, the following equations (3-4), (3-5) and (3-6) hold between the known signal $S_{jk}(t)$, the interference signal $I_{jk}(t)$ and a noise component $n_{jk}(t)$:

$$\langle S_j(t) \cdot S_j(t) \rangle = 1 \quad (3\text{-}4)$$

$$\langle I_{jk}(t) \cdot S_j(t) \rangle = 0 \quad (3\text{-}5)$$

$$\langle n_{jk}(t) \cdot S_j(t) \rangle = 0 \quad (3\text{-}6)$$

Therefore, the following equation (3-7) is found by substituting these equations (3-4), (3-5) and (3-6) in the above equation (3-3), and the natural logarithm thereof is expressed in the following equation (3-8):

$$CS_{jk} = A_{jk} ATX_j ARX_k \exp\{i(\phi_{jk} + \Delta\phi TX_j + \Delta\phi RX_k)\},$$

$$(j=1, 2, \ldots, n), (k=1, 2, \ldots, n),$$

where $A_{jk}=1$ and $\phi_{jk}=0$ (when $j=k$) \quad (3-7)

$$\log_e[A_{jk} ATX_j ARX_k] + i(\phi_{jk} + \Delta\phi TX_j + \Delta\phi RX_k) = \log_e[CS_{jk}] \quad (3\text{-}8)$$

The following equation (3-9) is deduced when noting the imaginary part of the above equation (3-8), while the following equation (3-10) is deduced when noting the real part:

$$\phi_{jk} + \Delta\phi TX_j + \Delta\phi RX_k = Im[\log_e[CS_{jk}]]$$

$$(j=1, 2, \ldots, n), (k=1, 2, \ldots, n),$$

$$\log_e[A_{jk} ATX_j ARX_k] = Re[\log_e[CS_{jk}]],$$

$$(j=1, 2, \ldots, n), (k=1, 2, \ldots, n)$$

where $A_{jk}=1$ (when $j=k$) \quad (3-10)

The right sides of the equations (3-9) and (3-10) can be found by measurement and calculation in each transmission system, and the results of calculation are stored in a memory 21.

Assuming that $Y_{jk}$ and $X_{jk}$ represent the values of the right sides of the equations (3-9) and (3-10) respectively, these values are expressed in the following equations (3-11) and (3-12) respectively:

$$Y_{jk} = \phi_{jk} + \Delta\phi TX_j + \Delta\phi RX_k, (j=1, 2, \ldots, n), (k=1, 2, \ldots, n),$$

where $\phi_{jk}=0$ (when $j=k$) \quad (3-11)

$$X_{jk} = \log_e[A_{jk}] + \log_e[ATX_j] + \log_e[ARX_k],$$

$$(j=1, 2, \ldots, n), (k=1, 2, \ldots, n),$$

where $A_{jk}=1$ (when $j=k$) \quad (3-12).

Subsequent processing is identical to the processing described with reference to FIG. 6, and the phase rotation quantity $\Delta\phi TX_j$ and the amplitude fluctuation quantity $ATX_j$ of the signal resulting from passage through the transmission circuit $TX_j$ and the phase rotation quantity $\Delta\phi RX_j$ and the amplitude fluctuation quantity $ARX_j$ of the signal resulting from passage through the receiving circuit $RX_j$ can be calculated in all transmission systems by solving the above simultaneous linear equations (3-11) and (3-12) with the values $Y_{jk}$ and $X_{jk}$ stored in the memory 21 if the number n of the transmission systems is at least 3.

The transmission characteristics can be calibrated between the received signal and the transmitted signal in each transmission system by supplying information on the phase difference between the receiving circuit and the transmission circuit of each transmission system estimated in the aforementioned manner to the phase shifter of the transmission system while supplying information on the amplitude fluctuation quantity of each transmission system to the attenuator of the transmission system.

Figure 54:
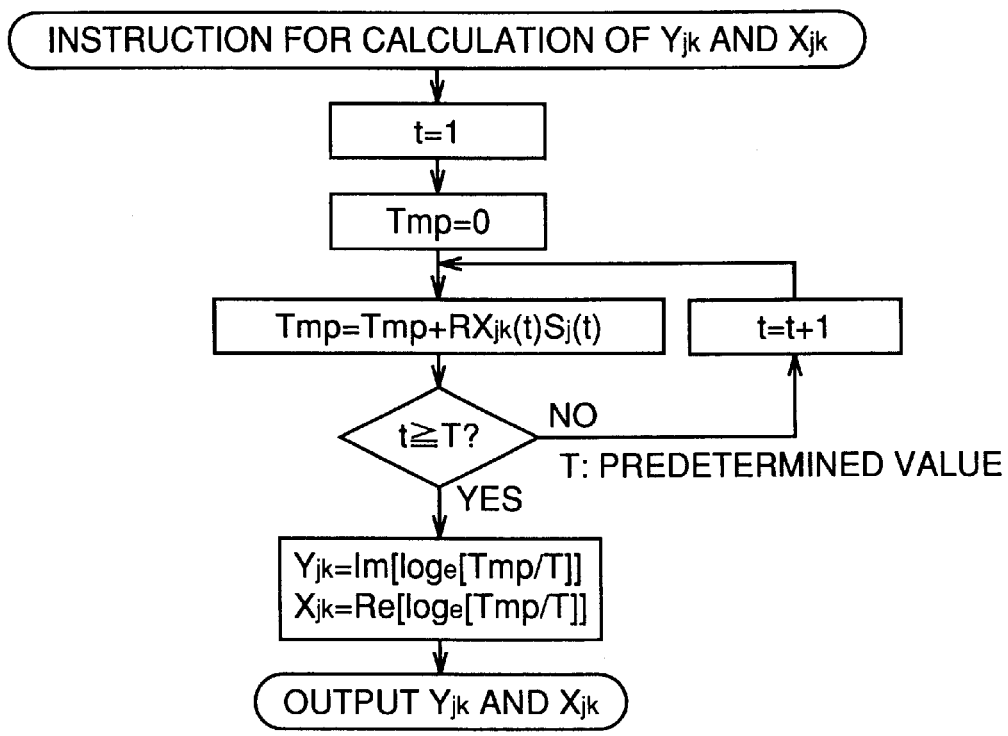
FIG. 54 is a flow chart showing a calculation routine of the fifteenth embodiment shown in FIG. 53.

FIG. 54 is a flow chart showing a calculation routine for $Y_{jk}$ and $X_{jk}$ in the fifteenth embodiment corresponding to the step S1-6d in the flow chart of the first embodiment shown in FIG. 16. In the flow chart shown in FIG. 54, a temporary variable Tmp is set to 0 for accumulating $RX_{jk}(t) \cdot S_j(t)$ up to a time T. The result of accumulation is divided by T for calculating a time average Tmp/T and the natural logarithm thereof is calculated for extracting the imaginary part $Y_{jk}$ and the real part $X_{jk}$.

The remaining processing excluding the calculation routine is identical to that in the flow chart of the first embodiment shown in FIG. 16, and hence redundant description is not repeated.

According to the fifteenth embodiment of the present invention, as hereinabove described, a correlation circuit is provided on each transmission system for correlating the received signal $RX_{jk}(t)$ and the known signal $S_j(t)$, thereby eliminating the noise component $n_{jk}(t)$ and the interference signal $I_{jk}(t)$. Therefore, an error in estimation caused by influence of the noise component or the interference signal or both thereof can be suppressed when the received signal has an inferior S-N ratio or the interference signal is mixed into the received signal or in both cases, for excellently estimating information on the phase difference and the amplitude fluctuation quantity of each transmission system.

Mode Providing Correlation Circuit on Second Basic Structure

Sixteenth Embodiment

Figure 55:
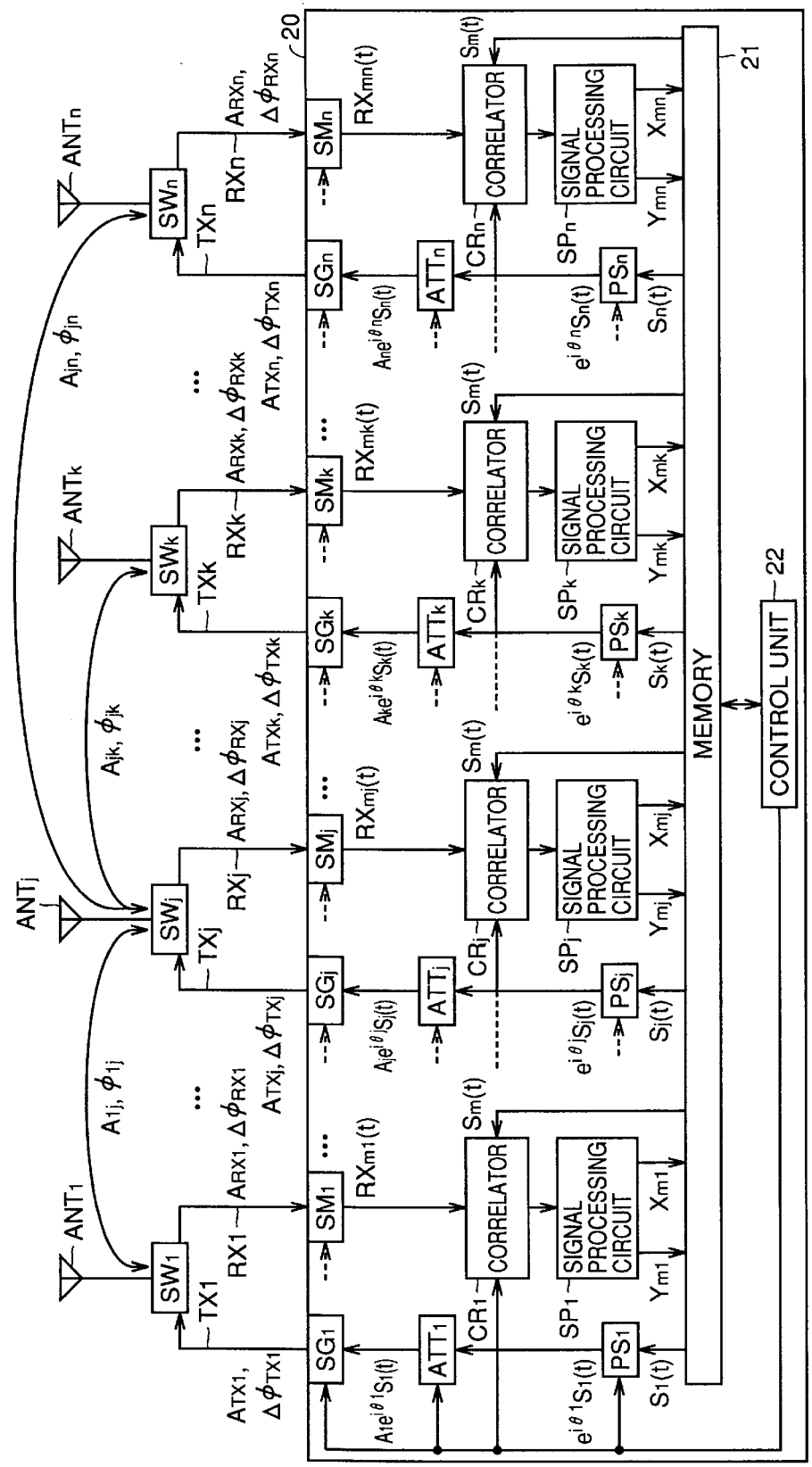
FIG. 55 is a block diagram showing a specific circuit structure of a sixteenth embodiment of the present invention.

FIG. 55 is a block diagram showing a specific circuit structure of a sixteenth embodiment of the present invention. In the sixteenth embodiment shown in FIG. 55, the multiplier $MP_j$ of each transmission system in the third embodiment of the second basic structure of the present invention shown in FIG. 30 is replaced with a correlator $CR_j$ (j=1, 2, ..., n). The operation principle of an adaptive array radio base station according to the sixteenth embodiment is now described.

In calibration, a phase rotation quantity $\theta_j$ of a phase shifter $PS_j$ of a j-th (j=1, 2, ..., n) transmission system is set to 0 and an amplitude fluctuation quantity $A_j$ of an attenuator $ATT_j$ is set to 1 (=0 dB). A known signal $S_j(t)$ corresponding to the j-th transmission system is read from a memory 21, and transmitted through an antenna element $ANT_j$.

The transmitted signal is received in an antenna element $ANT_k$ (k=1, 2, ..., n, where j≠k) of each of the remaining transmission systems excluding the j-th transmission system, and measured by a received signal measuring unit $SM_k$ of each transmission system as a received signal $RX_{jk}(t)$.

In the sixteenth embodiment shown in FIG. 55, an antenna sharer is not switched to connect a transmission circuit with a receiving circuit in each transmission system.

The following equation (3-13) expresses the signal $RX_{jk}(t)$ transmitted from each of the transmission systems sequentially switched from the first to n-th transmission systems and received and measured in all of the first to n-th transmission systems excluding the transmission system transmitting the signal:

$$RX_{jk}(t)=A_{jk}ATX_jARX_k\exp\{i(\phi_{jk}+\Delta\phi TX_j+\Delta\phi RX_k)\}S_j(t)+I_{jk}(t)+n_{jk}(t)$$

$(j=1, 2, \ldots, n), (k=1, 2, \ldots, n)$ where $j \neq k$     (3-13)

A cross-correlation value $CS_{jk}$ of the received signal $RX_{jk}(t)$ and the known signal $S_j(t)$ of the corresponding transmission system is calculated as follows:

$$CS_{jk}=A_{jk}ATX_jARX_k\exp\{i(\phi_{jk}+\Delta\phi TX_j+\Delta\phi RX_k)\}<S_j(t)\cdot S_j(t)>+ <I_{jk}(t)\cdot S_j(t)>+<n_{jk}(t)\cdot S_j(t)>$$

$(j=1, 2, \ldots, n), (k=1, 2, \ldots, n)$ where $j \neq k$     (3-14)

The following equation (3-15) is found by substituting these equations (3-4), (3-5) and (3-6) in the above equation (3-14), and the natural logarithm thereof is expressed in the following equation (3-16):

$$CS_{jk}=A_{jk}ATX_jARX_k\exp\{i(\phi_{jk}+\Delta\phi TX_j+\Delta\phi RX_k)\}$$

$(j=1, 2, \ldots, n), (k=1, 2, \ldots, n)$ where $j \neq k$     (3-15)

$$\log_e[A_{jk}ATX_jARX_k]+j(\phi_{jk}+\Delta\phi TX_j+\Delta\phi RX_k)=\log_e[CS_{jk}] \quad (3\text{-}16)$$

The following equation (3-17) is deduced when noting the imaginary part of the equation (3-16), while the following equation (3-18) is deduced when noting the real part:

$$\phi_{jk}+\Delta\phi TX_j+\Delta\phi RX_k=Im[\log_e[CS_{jk}]]$$

$(j=1, 2, \ldots, n), (k=1, 2, \ldots, n)$ where $j \neq k$     (3-17)

$$\log_e[A_{jk}ATX_jARX_k]=Re[\log_e[CS_{jk}]]$$

$(j=1, 2, \ldots, n), (k=1, 2, \ldots, n)$ where $j \neq k$     (3-18)

The right sides of the equations (3-17) and (3-18) can be found by measurement and calculation in each transmission system, and the results are stored in a memory 21.

Assuming that $Y_{jk}$ and $X_{jk}$ represent the values of the right sides of the equations (3-17) and (3-18) respectively, these values are expressed in the following equations (3-19) and (3-20) respectively:

$$Y_{jk}=\phi_{jk}+\Delta\phi TX_j+\Delta\phi RX_k,$$

$(j=1, 2, \ldots, n), (k=1, 2, \ldots, n),$ where $j \neq k$     (3-19)

$$X_{jk}=\log_e[A_{jk}]+\log_e[ATX_j]+\log_e[ARX_k],$$

$(j=1, 2, \ldots, n), (k=1, 2, \ldots, n)$ where $j \neq k$     (3-20)

When substituting $Y_{jk}-Y_{kj}=Z_{jk}$ in the equation (3-19) as to the phase information obtained in the aforementioned manner, the following simultaneous linear equations (3-21) are found. When substituting $X_{jk}-X_{kj}=V_{jk}$ in the equation (3-20) as to the obtained amplitude information, the following simultaneous linear equations (3-22) are found:

$$Z_{jk}=Y_{jk}-Y_{kj}=\Delta\phi_k-\Delta\phi_j$$

$(j=1, 2, \ldots, n-1), (k=j+1, j+2, \ldots, n)$     (3-21)

$$V_{jk}=X_{jk}-X_{kj}=\Delta A_k-\Delta A_j,$$

$(j=1, 2, \ldots, n), (k=j+1, j+2, \ldots, n)$     (3-22)

Subsequent processing is identical to that described with reference to FIG. 19, and the differences in the phase rotation quantity and the difference in the amplitude fluctuation quantity between signals passing through transmission circuit and receiving circuits can be calculated in all transmission systems by solving the aforementioned simultaneous linear equations (3-21) and (3-22) with $Y_{jk}$ and $X_{jk}$ stored in the memory 21 if the number n of the transmission systems is at least 3.

The transmission characteristics can be calibrated between the received signal and the transmitted signal in each transmission system by supplying information on the phase difference between the received signal and the transmitted signal of each transmission system estimated in the aforementioned manner to the phase shifter of the transmission system while supplying information on the amplitude fluctuation quantity in each transmission system to the attenuator of the transmission system.

A calculation routine for $Y_{jk}$ and $X_{jk}$ in the sixteenth embodiment is identical to the calculation routine of the fifteenth embodiment shown in FIG. 54, and hence redundant illustration and description are not repeated.

The remaining processing excluding the calculation routine is identical to that in the flow chart of the third embodiment shown in FIG. 31, and hence redundant description is not repeated.

According to the sixteenth embodiment of the present invention, as hereinabove described, a correlation circuit is provided on each transmission system for correlating the received signal $RX_{jk}(t)$ and the known signal $S_j(t)$, thereby eliminating a noise component $n_{jk}(t)$ and an interference signal $I_{jk}(t)$. Therefore, an error in estimation caused by influence of the noise component or the interference signal or both thereof can be suppressed when the received signal has an inferior S-N ratio or the interference signal is mixed into the received signal or in both cases, for excellently estimating information on the phase difference and the amplitude fluctuation quantity of each transmission system.

Mode Simultaneously Transmitting Signals

Seventeenth Embodiment

In the sixteenth embodiment shown in FIG. 55, the transmission system transmitting the signal is sequentially switched from the first to n-th transmission systems for measuring the received signal in all of the first to n-th transmission systems excluding the transmission system transmitting the signal and performing the aforementioned processing.

In a seventeenth embodiment of the present invention, on the other hand, all transmission systems simultaneously transmit signals while simultaneously receiving signals in the structure shown in FIG. 55, thereby reducing the time required for calibration, as described below.

In calibration, the phase rotation quantities $\theta_j$ of the phase shifters $PS_j$ of all transmission systems are set to 0 and the amplitude fluctuation quantities $A_j$ of the attenuators $ATT_j$ are set to 1 (=0 dB) in the structure shown in FIG. 55. The known signals $S_j(t)$ corresponding to all transmission systems are read from the memory 21, and transmitted through all antenna elements $ANT_j$.

The signal transmitted from each transmission circuit is received in the antenna elements $ANT_k$ (k=1, 2, . . . , n, where j≠k) of all of the remaining transmission systems excluding this transmission system.

Therefore, the following equation (4-1) expresses the signals $RX_k(t)$ simultaneously received and measured in the received signal measuring unit $SM_k$ of the k-th transmission system from all of the remaining transmission systems:

$$RX_k(t)=A_{1k}ATX_1ARX_k\exp\{i(\phi_{1k}+\Delta\phi TX_1+\Delta\phi RX_k)\}S_1(t)$$
$$+A_{2k}ATX_2ARX_k\exp\{i(\phi_{2k}+\Delta\phi TX_2+\Delta\phi RX_k)\}S_2(t)$$
$$+ \ldots$$
$$+A_{jk}ATX_jARX_k\exp\{i(\phi_{jk}+\Delta\phi TX_j+\Delta\phi RX_k)\}S_j(t)$$
$$+ \ldots$$
$$+A_{k-1,k}ATX_{k-1}ARX_k\exp\{i(\phi_{k-1,k}+\Delta\phi TX_{k-1}+\Delta\phi RX_k)\}S_{k-1}(t)$$
$$+A_{k+1,k}ATX_{k+1}ARX_k\exp\{i(\phi_{k+1,k}+\Delta\phi TX_{k+1}+\Delta\phi RX_k)\}S_{k+1}(t)$$
$$+ \ldots$$
$$+A_{nk}ATX_nARX_k\exp\{i(\phi_{nk}+\Delta\phi TX_n+\Delta\phi RX_k)\}S_n(t)$$
$$+n_k(t), (k=1, 2, \ldots, n) \quad (4\text{-}1)$$

Then, cross-correlation values $CS_{jk}$ of the received signals $RX_k(t)$ and the known signals $S_j(t)$ are calculated. The following equation (4-2) expresses the cross-correlation values $CS_{jk}$.

$S_j(t)$ (j=1, 2, . . . , n) represents signal series fully different from each other, and the cross-correlation values $CS_{jk}$ thereof satisfy the following expression (4-3):

$$CS_{jk}=<RX_k(t)\cdot S_j(t)> \quad (4\text{-}2)$$
$$<S_j(t)\cdot S_k(t)>=0, (j=1, 2, \ldots, n), (k=1, 2, \ldots, n),$$
$$\text{where } k\neq j \quad (4\text{-}3)$$

The cross-correlation value of the transmitted signal and the noise is 0 as expressed in the above equation (3-6) with reference to the fifteenth embodiment, and the self-autocorrelation value of the transmitted signal is 1, as expressed in the equation (3-4).

Therefore, the equation (4-2) is converted to the following equation (4-4) when calculating the cross-correlation values of $RX_k(t)$ in the equation (4-1) and $S_j(t)$. When performing this cross-correlation processing of $RX_k(t)$ and $S_j(t)$ on all known transmitted signals $S_j(t)$ (j=1, 2, . . . , n, where j≠k) and all received signals $RX_k(t)$ (k=1, 2, . . . , n), the found cross-correlation values are expressed in the equation (3-15) with reference to the seventeenth embodiment.

$$CS_k=<RX_k(t)\cdot S_j(t)>=A_{jk}ATX_jARX_k\exp\{i(\phi_{jk}+\Delta\phi TX_j+\Delta\phi RX_k)\}, \quad (4\text{-}4)$$

The above equation (3-16) with reference to the sixteenth embodiment expresses the natural logarithms of the equation (3-15), and the above equation (3-19) is reduced noting the imaginary parts thereof, while the equation (3-20) is deduced when noting the real parts. Subsequent processing is identical to that in the sixteenth embodiment, and hence redundant description is not repeated.

Figure 56:
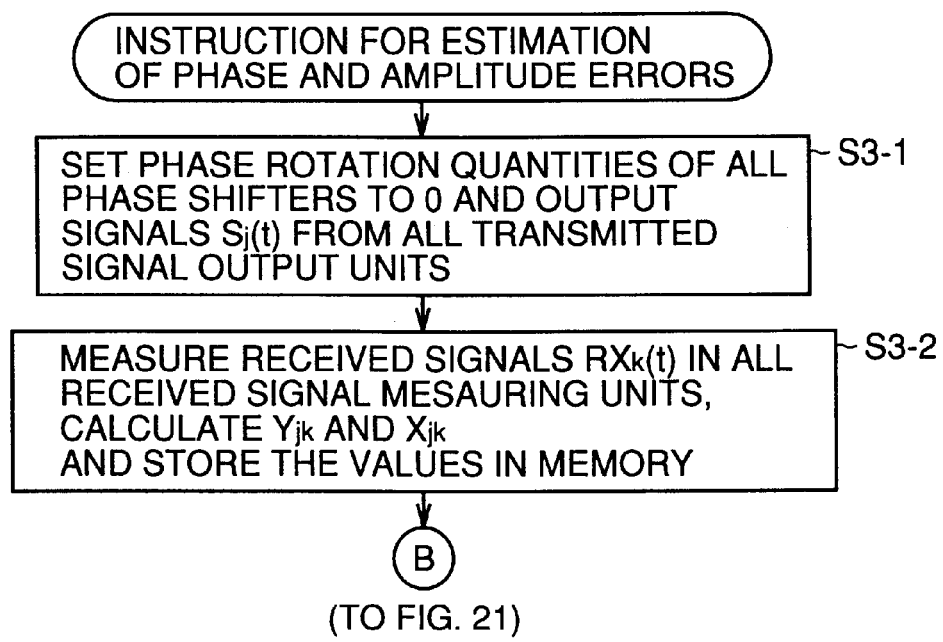
FIG. 56 is a flow chart showing the first half of operations of a seventeenth embodiment of the present invention.
Figure 57:
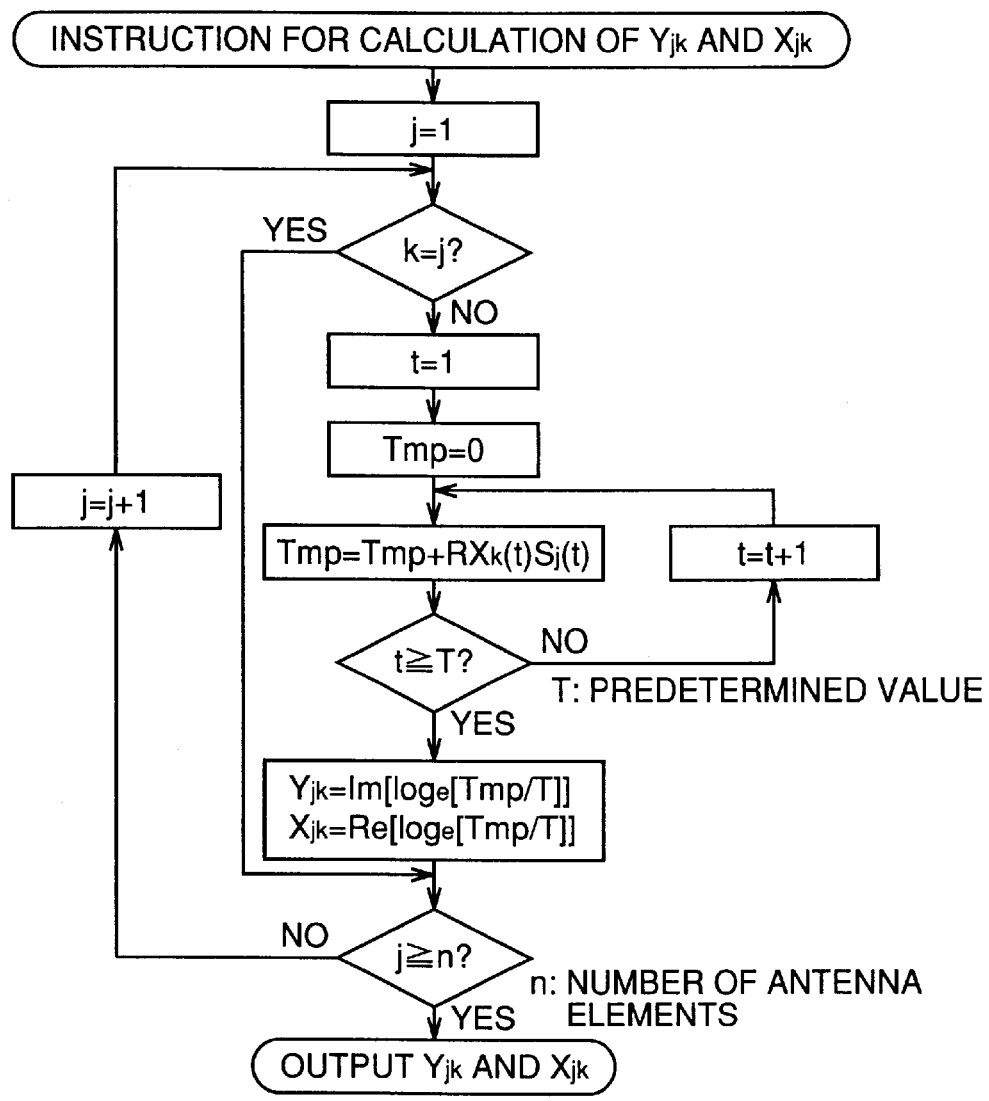
FIG. 57 is a flow chart showing a calculation routine included in the operations shown in FIG. 56.

FIG. 56 is a flow chart illustrating the first half of operations of the aforementioned seventeenth embodiment, and FIG. 57 is a flow chart showing a calculation routine of the seventeenth embodiment corresponding to a step S3-2 of the flow chart in FIG. 56.

The flow chart shown in FIG. 56 is different from all preceding embodiments in the point that all transmission systems simultaneously transmit the know signals $S_j(t)$ at a step S3-1 and all transmission systems simultaneously measure received signals at a step S3-2.

Referring to the flow chart shown in FIG. 57, a temporary variable $T_{mp}$ is set to 0 for each transmitted signal $S_j(t)$, for accumulating $RX_{jk}(t)S_j(t)$ up to a time T. The result of accumulation is divided by T for calculating a time average Tmp/T and the natural logarithm thereof is calculated for extracting an imaginary part $Y_{jk}$ and a real part $X_{jk}$.

It follows that the signals $S_j(t)$ transmitted from all transmission systems and the signals $RX_j(t)$ received in all transmission systems are subjected to cross-correlation processing due to the aforementioned operation performed on all transmitted signals $S_j(t)$.

Subsequent processing is identical to that in the flow chart shown in FIG. 21, and hence redundant description is not repeated.

Cross-correlation processing may be performed on the signals $S_j(t)$ transmitted from all transmission systems and the signals $RX_j(t)$ received in all transmission systems through the same steps S3-1 and S3-2 as in the seventeenth embodiment shown in FIG. 56 for obtaining phase rotation quantities and amplitude fluctuation quantities of receiving circuits of the respective transmission systems by directly solving the simultaneous linear equations (3-19) and (3-20) of the obtained values $Y_{jk}$.

According to the seventeenth embodiment, as hereinabove described, the known signals $S_j(t)$ are simultaneously transmitted/received in calibration, whereby the time required for calibration can be reduced as compared with each of the preceding embodiments sequentially switching the transmission system transmitting the signal.

Phase/Amplitude Offset Mode

Eighteenth Embodiment

The adaptive array radio base station of the second basic structure according to the present invention shown in FIG. 19 obtains the differences $\Delta\phi_j$ in the phase rotation quantity and the differences $\Delta A_j$ in the amplitude fluctuation quantity between the signals passing through the receiving circuits and the transmission circuits of all transmission systems by finally solving the above simultaneous linear equations (1-30) and (1-32).

The following equation (5-1) holds when the differences $\Delta\phi_j$ (j=1, 2, . . . , n) in the phase rotation quantity between the transmission and receiving circuits are identical in all transmission systems, while the following equation (5-2) holds when the differences $\Delta\phi_j$ (j=1, 2, . . . , n) in the amplitude fluctuation quantity between the transmission and receiving circuits are identical in all transmission systems:

$$\Delta\phi_1=\Delta\phi_2= \ldots =\Delta\phi_n \quad (5\text{-}2)$$
$$\Delta A_1=\Delta A_2= \ldots =\Delta A_n \quad (5\text{-}2)$$

In this case, all simultaneous linear equations derived from the above equations (1-30) and (1-32) are in cascade relation and the solutions are indeterminate even if a difference in a phase rotation quantity or a difference in an amplitude fluctuation quantity takes place in each transmission circuit and each receiving circuit. Therefore, it may be impossible to estimate correct differences in the phase rotation quantity and the amplitude fluctuation quantity.

In an eighteenth embodiment of the present invention described below, this point is improved by previously setting a phase rotation quantity of a phase shifter or an amplitude fluctuation quantity of an attenuator or both of these quantities to a given value or values in each transmission system before performing calibration, thereby preventing differences in phase rotation quantity and/or differences between amplitude fluctuation quantity between transmission and receiving circuits from reaching substantially identical values among transmission systems and improving the precision of estimation of the differences between the phase rotation quantities and between the amplitude fluctuation quantities of the respective transmission systems.

According to the eighteenth embodiment of the present invention, a phase rotation quantity of a phase shifter $PS_j$ of a j-th transmission system is previously set to $\theta_j$ while an amplitude fluctuation quantity of an attenuator $ATT_j$ is previously set to $A_j$ in calibration in an adaptive array radio base station according to the second basic structure of the present invention shown in FIG. 19. However, it is assumed that the phase rotation quantities of the respective phase shifters are so set that $\theta_j \neq \theta_k$ holds and the amplitude fluctuation quantities of the respective attenuators are so set that $A_j \neq A_k$ holds among the transmission systems.

A known signal $S_j(t)$ corresponding to the j-th transmission system is read from a memory 21 and output through a transmission circuit. The transmitted signal is received in a receiving circuit of each of all transmission systems excluding the j-th transmission system, and received in a received signal measuring unit $SM_k$ as a received signal $RX_{jk}(t)$. The following equation (5-3) expresses the signal $RX_{jk}(t)$ received and measured by all transmission systems excluding the transmission system transmitting the signal while sequentially switching the transmission system transmitting the signal from the first to n-th transmission systems:

$RX_{jk}(t)=A_{jk}A_jATX_jARX_k\exp\{i(\phi_{jk}+\theta_j+\Delta\phi TX_j+\Delta\phi RX_k)\}S_j(t)+n_{jk}(t)$ $(j=1, 2, \ldots, n), (k=1, 2, \ldots, n)$ where $j \neq k$ (5-3)

When dividing both sides of the above equation (5-3) by the known signal $S_j(t)$ in transmission and calculating the natural logarithms of both sides for performing Taylor expansion, the following equation (5-4) is found if the S-N ratio is sufficiently excellent. The following equation (5-5) is deduced when noting the imaginary part of the equation (5-4), while the following equation (5-6) is deduced when noting the real part:

$\log_e[A_{jk}A_jATX_jARX_k]+i(\phi_{jk}+\theta_j+\Delta\phi TX_j+A+RX_k)=\log_e[RX_{jk}(t)/S_j(t)]$ (5-4)

$\phi_{jk}+\theta_j+\Delta\phi TX_j+\Delta\phi RX_k=Im[\log_e[RX_{jk}(t)/S_j(t)]]$, $(j=1, 2, \ldots, n), (k=1, 2, \ldots, n)$ where $j \neq k$ (5-5)

$\log_e[A_{jk}A_jATX_jARX_k]=Re[\log_e[RX_{jk}(t)/S_j(t)]]$, $(j=1, 2, \ldots, n), (k=1, 2, \ldots, n)$ where $j \neq k$ (5-6)

The right sides of the equations (5-5) and (5-6) can be found by measurement and calculation. Assuming that $Y_{jk}$ and $X_{jk}$ represent the values of the right sides of the equations (5-5) and (5-6) respectively, these values are expressed in the following equations (5-7) and (5-8) respectively:

$Y_{jk}=\phi_{jk}+\theta_j+\Delta\phi TX_j+\Delta\phi RX_k$, $(j=1, 2, \ldots, n), (k=1, 2, \ldots, n)$ where $j \neq k$ (5-7)

$X_{jk}=\log_e[A_{jk}]+\log_e[A_j]+\log_e[ATX_j]+\log_e[ARX_k]$, $(j=1, 2, \ldots, n), (k=1, 2, \ldots, n)$ where $j \neq k$ (5-8)

In consideration of initial offset values previously set as described above, the difference $\Delta\phi_j$ between the phase rotation quantities of the transmission and receiving circuits of each transmission circuit and the difference $A\phi_j$ between the amplitude fluctuation quantities thereof are defined in the following equations (5-10) and (5-11) respectively:

$\Delta\phi_j=\Delta\phi RX_j-\{\Delta\phi TX_j+\theta_j\}, (j=1, 2, \ldots, n)$ (5-10)

$\Delta A_j=\log_e[ARX_j]-\{\log_e[ATX_j]+\log_e[A_j]\}, (j=1, 2, \ldots, n)$ (5-11)

The following equation (5-12) is obtained by substituting $Y_{jk}-Y_{jk}=Z_{jk}$ in the equation (5-7), and the following equation (5-13) is found by substituting $X_{jk}-X_{kj}=V_{jk}$ in the equation (5-8):

$Z_{jk}=Y_{jk}-Y_{kj}=\Delta\phi_k-\Delta\phi_j, (j=1, 2, \ldots, n-1), (k=j+1, j+2, \ldots, n)$ (5-12)

$V_{jk}=X_{jk}-X_{kj}=\Delta A_k-\Delta A_j, (j=1, 2, \ldots, n-1), (k=j+1, j+2, \ldots, n)$ (5-13)

Subsequent operations are identical to the operations of the second basic structure of the present invention described with reference to FIG. 19, and the difference in the phase rotation quantity and the difference in the amplitude fluctuation quantity between the transmission circuit and the receiving circuit in each transmission system can be calculated by solving these simultaneous linear equations (5-12) and (5-13).

Figure 58:
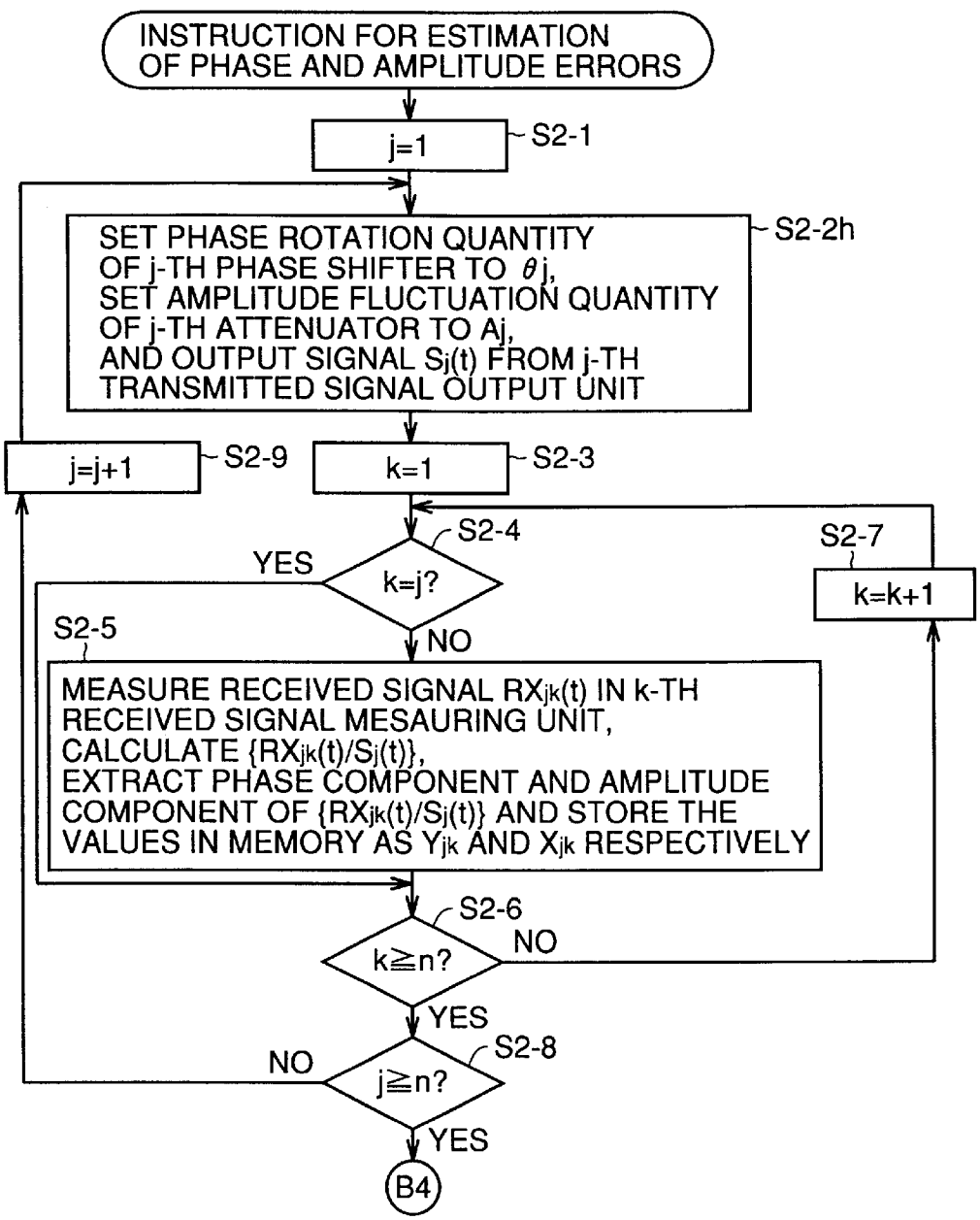
FIG. 58 is a flow chart showing the first half of operations of an eighteenth embodiment of the present invention.
Figure 59:
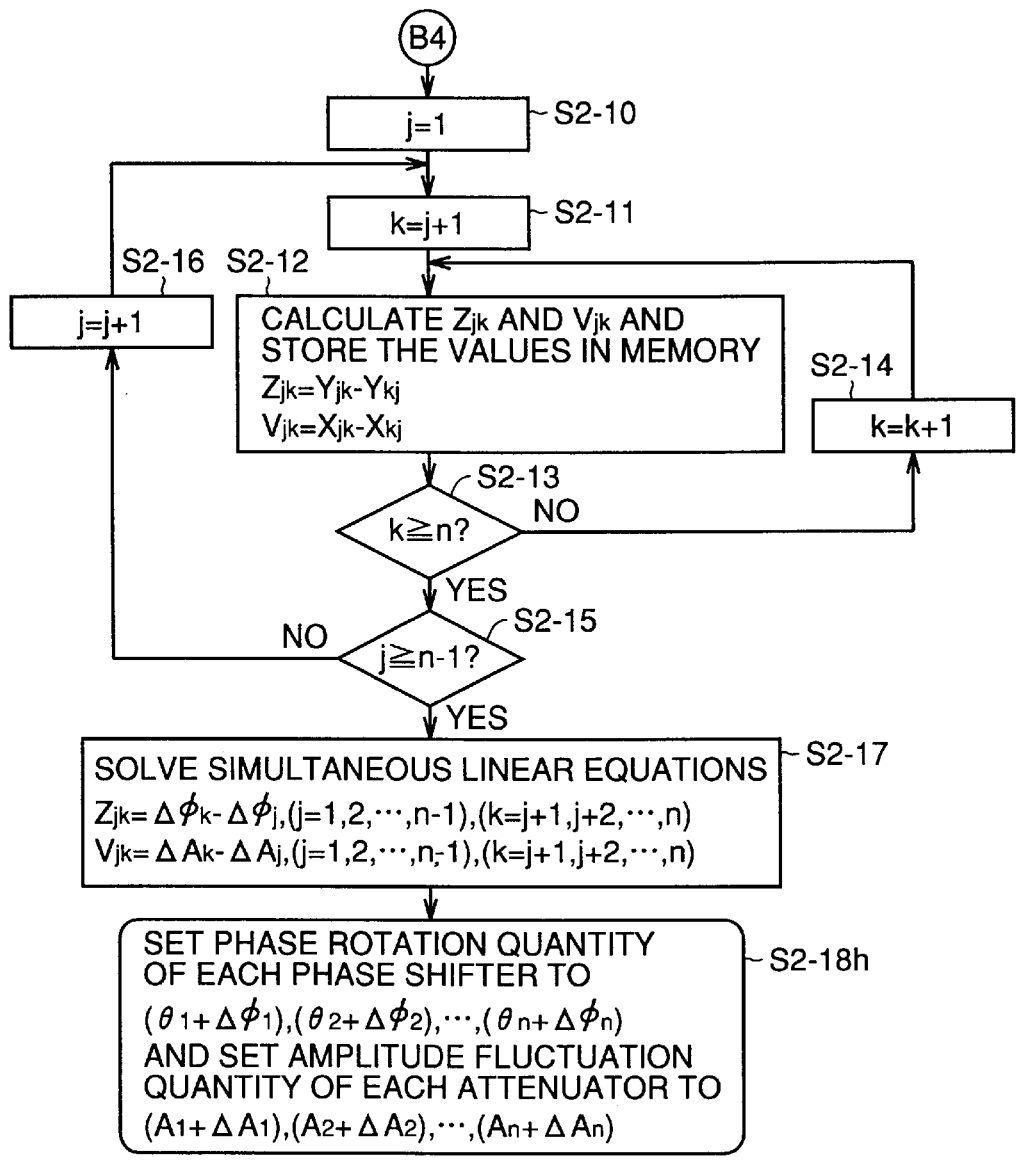
FIG. 59 is a flow chart showing the second half of the operations of the eighteenth embodiment of the present invention.

FIGS. 58 and 59 are flow charts of the aforementioned operations of the eighteenth embodiment implemented by a microcomputer in a software manner. The flow charts shown in FIGS. 58 and 59 are identical to the operations of the second basic structure of the present invention shown in FIGS. 20 and 21 except the following points:

At a step S2-2h, the phase rotation quantity of the phase shifter $PS_j$ of the transmission system is set not to 0 but to the known value $\theta_j$, while the amplitude fluctuation quantity of the attenuator $ATT_j$ is set not to 1 but to the known value $A_j$.

At a final step S2-18h, the aforementioned known values $\theta_j$ and $A_j$ are taken into consideration respectively when setting the phase rotation quantity of the phase shifter and the amplitude fluctuation quantity of the attenuator in each transmission system for calibration.

As to the remaining operations, the description with reference to the flow charts of FIGS. 20 and 21 is applied and redundant description is not repeated.

Figure 60:
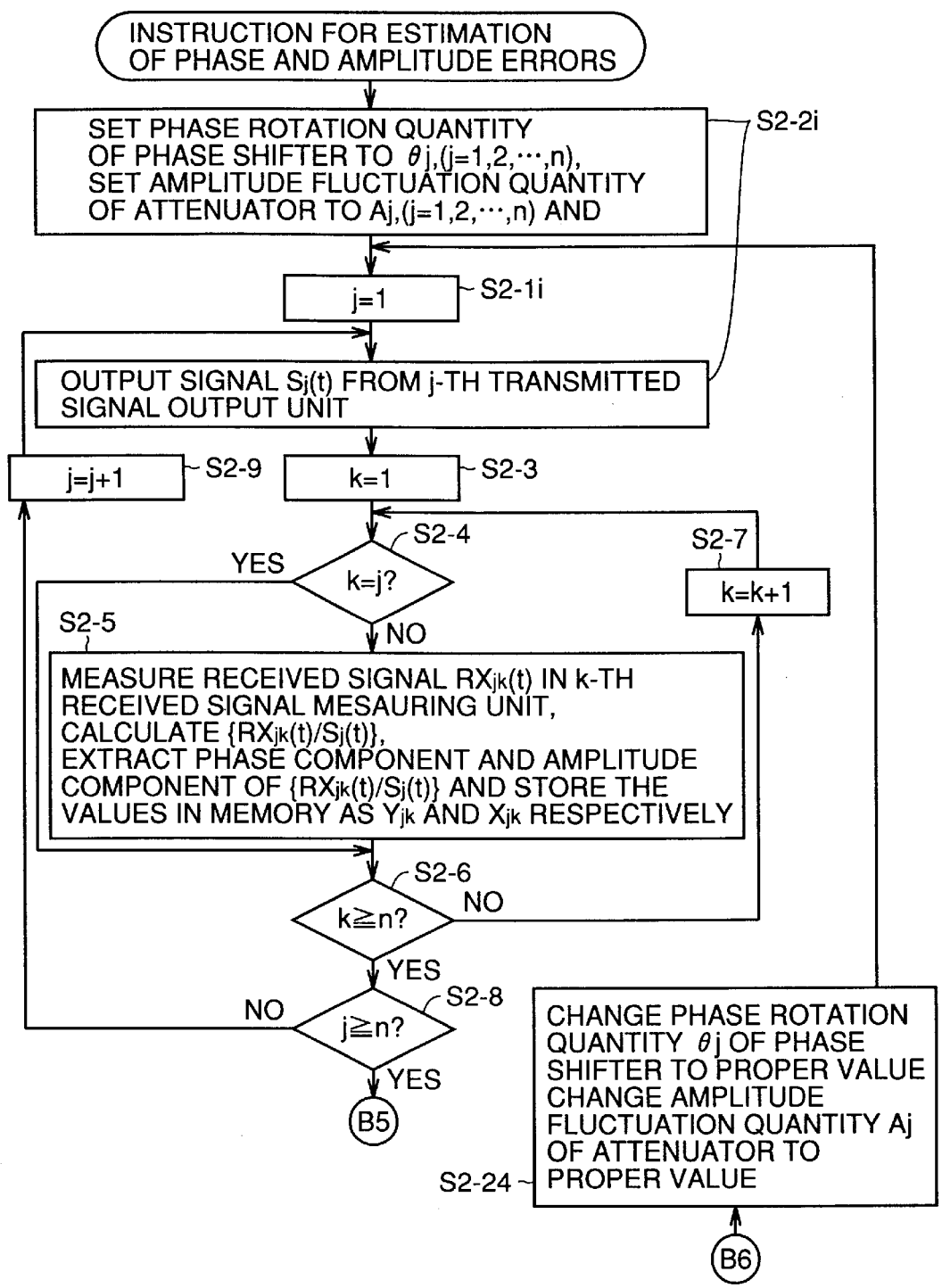
FIG. 60 is a flow chart showing the first half of operations of a modification of the eighteenth embodiment of the present invention.
Figure 61:
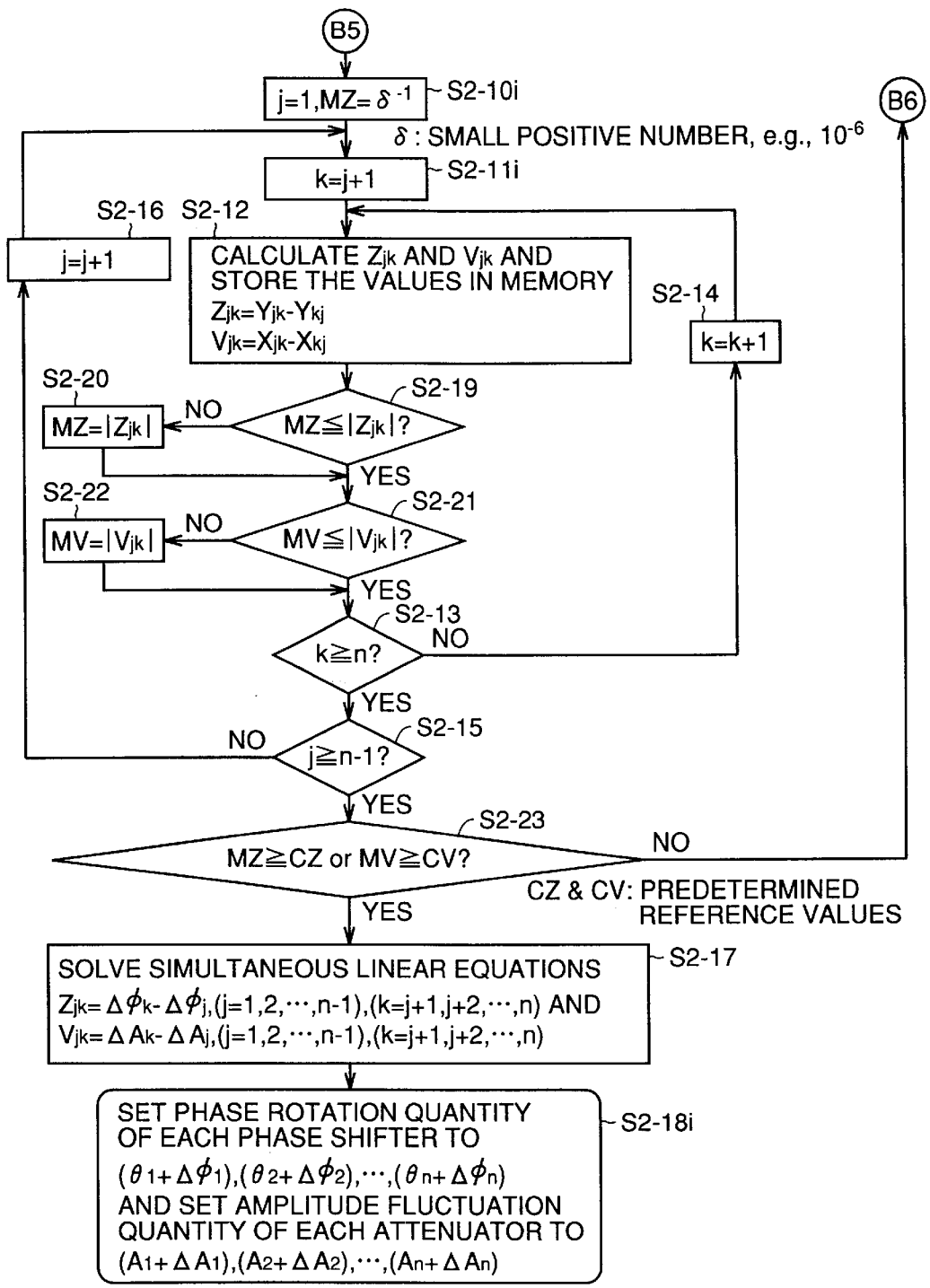
FIG. 61 is a flow chart showing the second half of the operations of the modification of the eighteenth embodiment of the present invention.

FIGS. 60 and 61 are flow charts showing a modification of the aforementioned eighteenth embodiment shown in FIGS. 58 and 59. In this modification, the phase rotation quantity of the phase shifter is set to $\theta_j$ and the amplitude fluctuation quantity of the attenuator is set to $A_j$ in each transmission system similarly to the aforementioned eighteenth embodiment, for thereafter transmitting a known signal $S_j(t)$ and calculating $Z_{jk}$ and $V_{jk}$ through operation processing absolutely identical to that in the eighteenth embodiment.

In the flow chart shown in FIG. 61, however, a determination is made as to whether or not calculated absolute values of $Z_{jk}$ and $V_{jk}$ have sufficient magnitudes. In other words, the calculated absolute value of $Z_{jk}$ is compared with a minimum value MZ of Z at a step S2-19 and MZ is replaced with current $|Z_{jk}|$ at a step S2-20 if $|Z_{jk}|$ is less than MZ. Similarly, the calculated absolute value of $V_{jk}$ is compared with a minimum value MV of V at a step S2-21 and MV is replaced with current $|V_{jk}|$ at a step S2-22 if $|V_{jk}|$ is less than MV.

When finally found MZ and MV are determined as less than prescribed reference values CZ and CV respectively at a step S2-23, the phase rotation quantity $\theta_j$ and the amplitude fluctuation quantity $A_j$ are changed to proper values respectively at a step S2-24 on the assumption that the initial set values $\theta_j$ and $A_j$ of the phase rotation quantity of the phase shifter and the amplitude fluctuation quantity of the attenuator have been insufficient, and thereafter $Z_{jk}$ and $V_{jk}$ are re-calculated. When the found MZ and MV are consequently determined as greater than CZ and CV respectively, processing identical to that in the eighteenth embodiment shown in FIG. 59 is thereafter performed.

Equation Selection Mode

Nineteenth Embodiment

In each of the aforementioned embodiments, the simultaneous linear equations related to the phase rotation quantities and the amplitude fluctuation quantities are finally solved thereby calculating the phase rotation quantities, the amplitude fluctuation quantities, the phase rotation quantity difference and the amplitude fluctuation quantity difference.

In any embodiment, the number of unknown variables and the number of independent equations forming the simultaneous linear equations are equally three when the number of antenna elements is three. In this case, therefore, all of three equations are employed for solving simultaneous linear equations. If the number of antenna elements exceeds four, however, it follows that the number of independent equations exceeds the number of unknown variables.

A nineteenth embodiment of the present invention is structured to select equations derived in higher accuracy from all independent equations forming simultaneous linear equations calculated on the basis of measured received signals and transmitted signals by a necessary number, i.e., the same number as that of unknown variables for solving the simultaneous linear equations when the number of antenna elements exceeds four.

According to the nineteenth embodiment of the present invention, it follows that the equations are sequentially selected from that having the largest value $|X_{jk}|$, $|Y_{jk}|$, $|V_{jk}|$ or $|Z_{jk}|$ found by measurement or calculation.

Figure 62:
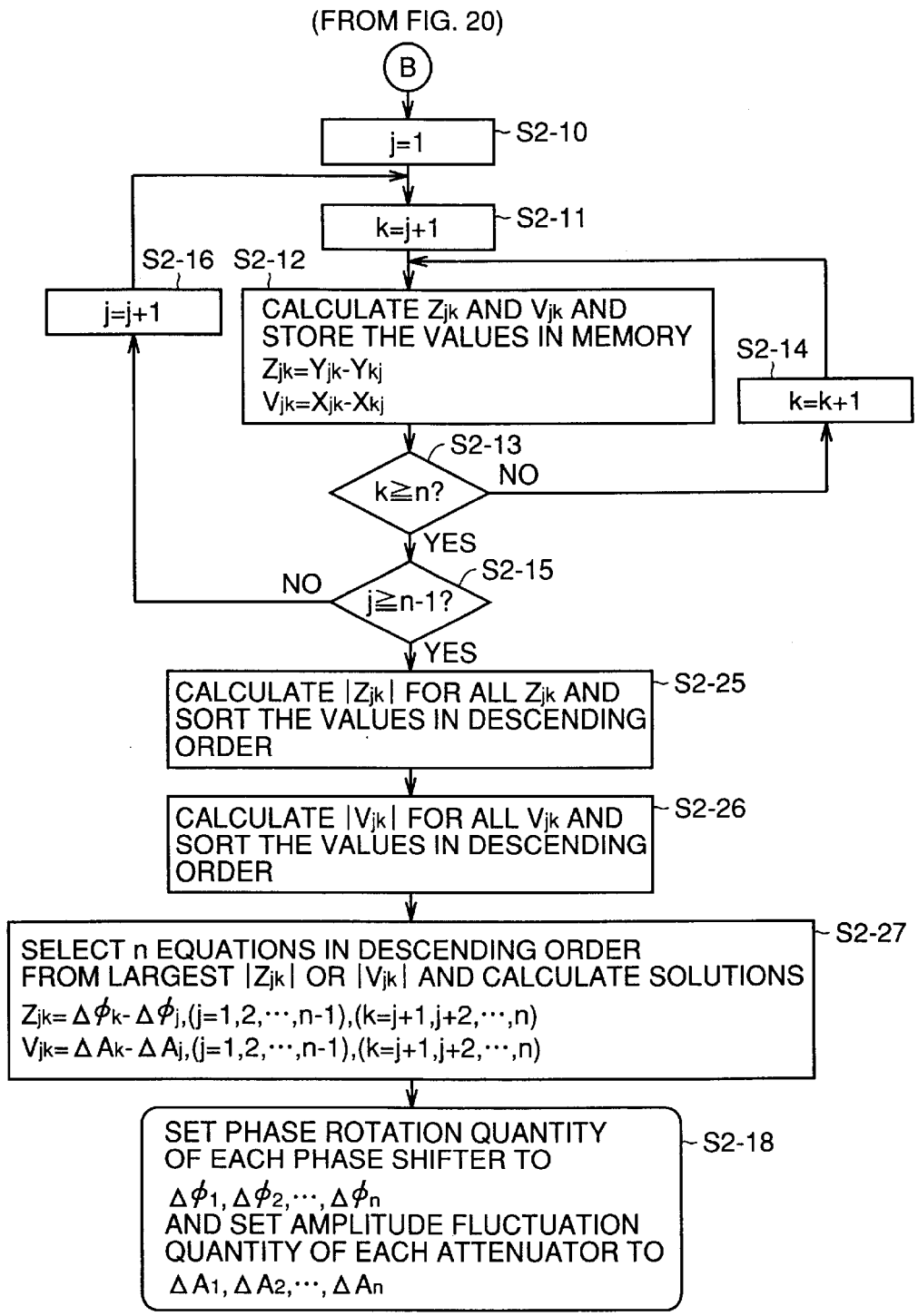
FIG. 62 is a flow chart showing the second half of operations of a nineteenth embodiment of the present invention.

FIG. 62 is a flow chart illustrating operations of the nineteenth embodiment, which are identical to the second half of the operations of the second basic structure shown in FIG. 21 except the following point: Absolute values of all $Z_{jk}$ are calculated and sorted in descending order at a step S2-25, and absolute values of all $V_{jk}$ are calculated and sorted in descending order at a step S2-26. Then, n equations corresponding to the number of unknown variables are selected in descending order with reference to $|Z_{jk}|$ for forming simultaneous linear equations related to differences between phase rotation quantities and calculating solutions, while selecting n equations in descending order with reference to $|V_{jk}|$ for forming simultaneous linear equations related to differences between amplitude fluctuation quantities and calculating solutions. As to the remaining operations, the description related to the flow charts shown in FIGS. 20 and 21 is applied and redundant description is not repeated.

According to the nineteenth embodiment of the present invention, as hereinabove described, equations derived in high accuracy are selected for forming simultaneous linear equations, whereby precise results of estimation can be obtained in relation to the phase rotation quantities and the amplitude fluctuation quantities.

Mode Utilizing Remainder Equation

Twentieth Embodiment

When the number of antenna elements exceeds four as described above, some of equations included in a plurality of independent equations forming simultaneous linear equations are not employed for finding solutions. According to a twentieth embodiment of the present invention, equations other than those employed for finding solutions are employed for verifying results of estimation of information related to phase rotation quantities and amplitude fluctuation quantities. When the number of antenna elements is four, for example, it follows that simultaneous equations for obtaining differences in phase rotation quantities between transmission circuits and receiving circuits are formed by the following independent equations (6-1) to (6-6):

$$Z_{12} = \Delta\phi_2 - \Delta\phi_1 \qquad (6\text{-}1)$$

$$Z_{13} = \Delta\phi_3 - \Delta\phi_1 \qquad (6\text{-}2)$$

$$Z_{14} = \Delta\phi_4 - \Delta\phi_1 \qquad (6\text{-}3)$$

$$Z_{23} = \Delta\phi_3 - \Delta\phi_2 \qquad (6\text{-}4)$$

$$Z_{24} = \Delta\phi_4 - \Delta\phi_2 \qquad (6\text{-}5)$$

$$Z_{34} = \Delta\phi_4 - \Delta\phi_3 \qquad (6\text{-}6)$$

It is assumed that the equations (6-1), (6-2), (6-5) and (6-6) included in the above six independent equations are employed for calculating four unknown variables $\Delta\phi_1$ to $\Delta\phi_4$, and it is also assumed that $tmp\Delta\phi_j$ (j=1, 2, 3, 4) represents actually calculated values. According to the twentieth embodiment, these values $tmp\Delta\phi_j$ are substituted in the equations (6-3) and (6-4) not employed for calculating solutions for calculating errors $e_l$ (l=1, 2, 3, . . . ). In this case, two errors $e_1$ and $e_2$ are calculated with the two unused equations as follows:

$$e_1 = Z_{14} - (tmp\Delta\phi_4 - tmp\Delta\phi_1) \qquad (6\text{-}7)$$

$$e_2 = Z_{23} - (tmp\Delta\phi_3 - tmp\Delta\phi_2) \qquad (6\text{-}8)$$

If these errors $e_1$ and $e_2$ are less than prescribed reference values respectively, it follows that the aforementioned results $tmp\Delta\phi_j$ (j=1, 2, 3, 4) of estimation are regarded as correct and output. When the errors $e_1$ and $e_2$ are greater than the prescribed reference values respectively, on the other hand, the results of estimation obtained through the aforementioned four equations are regarded as incorrect and estimation is continued through re-measurement or the like until the errors $e_1$ and $e_2$ reach values less than the prescribed reference values.

Figure 63:
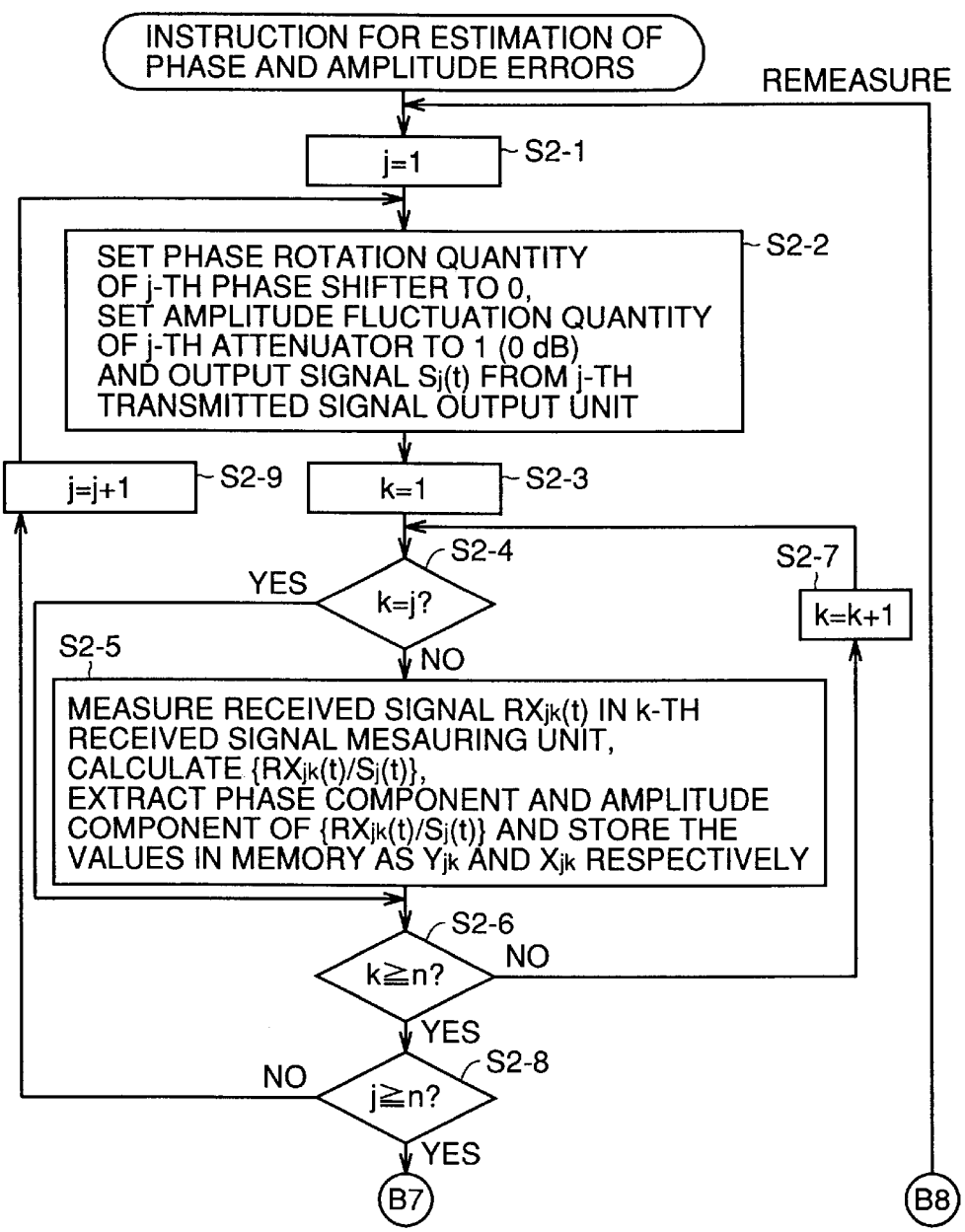
FIG. 63 is a flow chart showing the first half of operations of a twentieth embodiment of the present invention.
Figure 64:
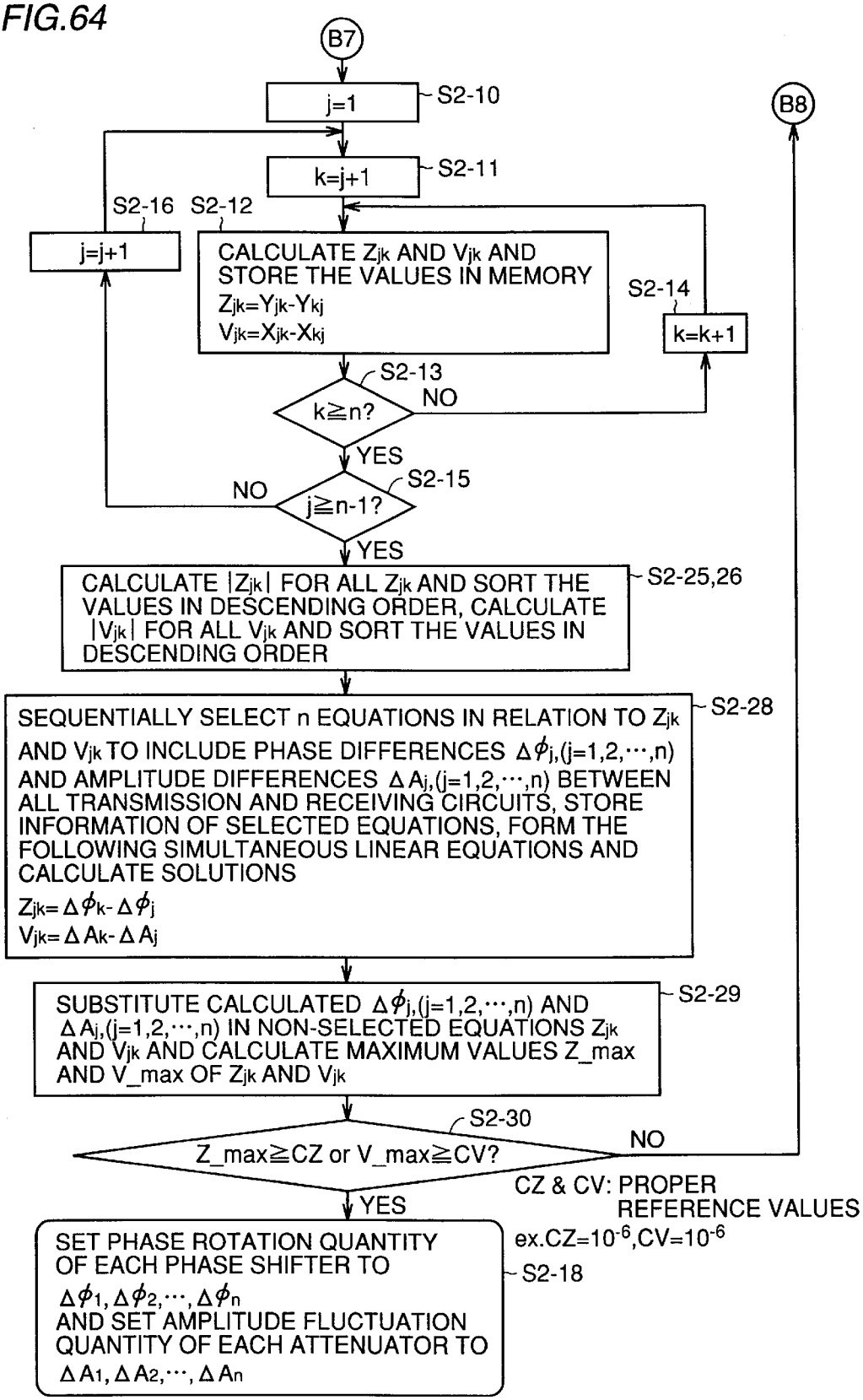
FIG. 64 is a flow chart showing the second half of the operations of the twentieth embodiment of the present invention.

FIGS. 63 and 64 are flow charts showing operations of the twentieth embodiment, which are identical to the operations of the nineteenth embodiment of the present invention shown in FIG. 62 except the following point:

Simultaneous linear equations consisting of n independent equations related to phase difference information and simultaneous linear equations consisting of n independent equations related to amplitude fluctuation quantity difference information are solved respectively for finding solutions at a step S2-28, and the calculated solutions are substituted in the equations not employed for calculating the solutions for calculating maximum values $Z_{max}$ and $V_{max}$ of $Z_{jk}$ and $V_{jk}$ respectively at a step S2-29. A determination is made as to whether or not the calculated maximum values are not more than prescribed reference values CZ and CV respectively at a step S2-30, and the aforementioned measurement and operations are repeated until the calculated maximum values are determined as exceeding the prescribed reference values.

The remaining operations are identical to those of the aforementioned nineteenth embodiment.

Table Reference Correction Mode

Twenty-First Embodiment

In each of the aforementioned embodiments, the information related to the estimated phase rotation quantity and the information related to the estimated amplitude fluctuation quantity are transmitted to the phase shifter serving as a phase rotator of each transmission system and the attenuator serving as an amplitude fluctuator thereof, for performing compensation so that the phase rotation quantity difference and the amplitude fluctuation quantity difference are 0 between the transmission circuit and the receiving circuit of each transmission system.

When the transmission circuit or the receiving circuit of each transmission system includes a circuit element (e.g., an amplifier) having nonlinear characteristics, however, the phase properties and the amplitude properties may be changed to nullify the aforementioned compensation depending on the power of a signal input in the transmission circuit or the receiving circuit.

In a twenty-first embodiment of the present invention, a phase rotation quantity and an amplitude fluctuation quantity set in a phase shifter and an attenuator are corrected to proper values through results of calibration once obtained by estimation and a correction table previously recorded in a memory 21 also when phase characteristics and amplitude characteristics are changed by power of a signal input in a transmission circuit or a receiving circuit as described above.

Figure 65:
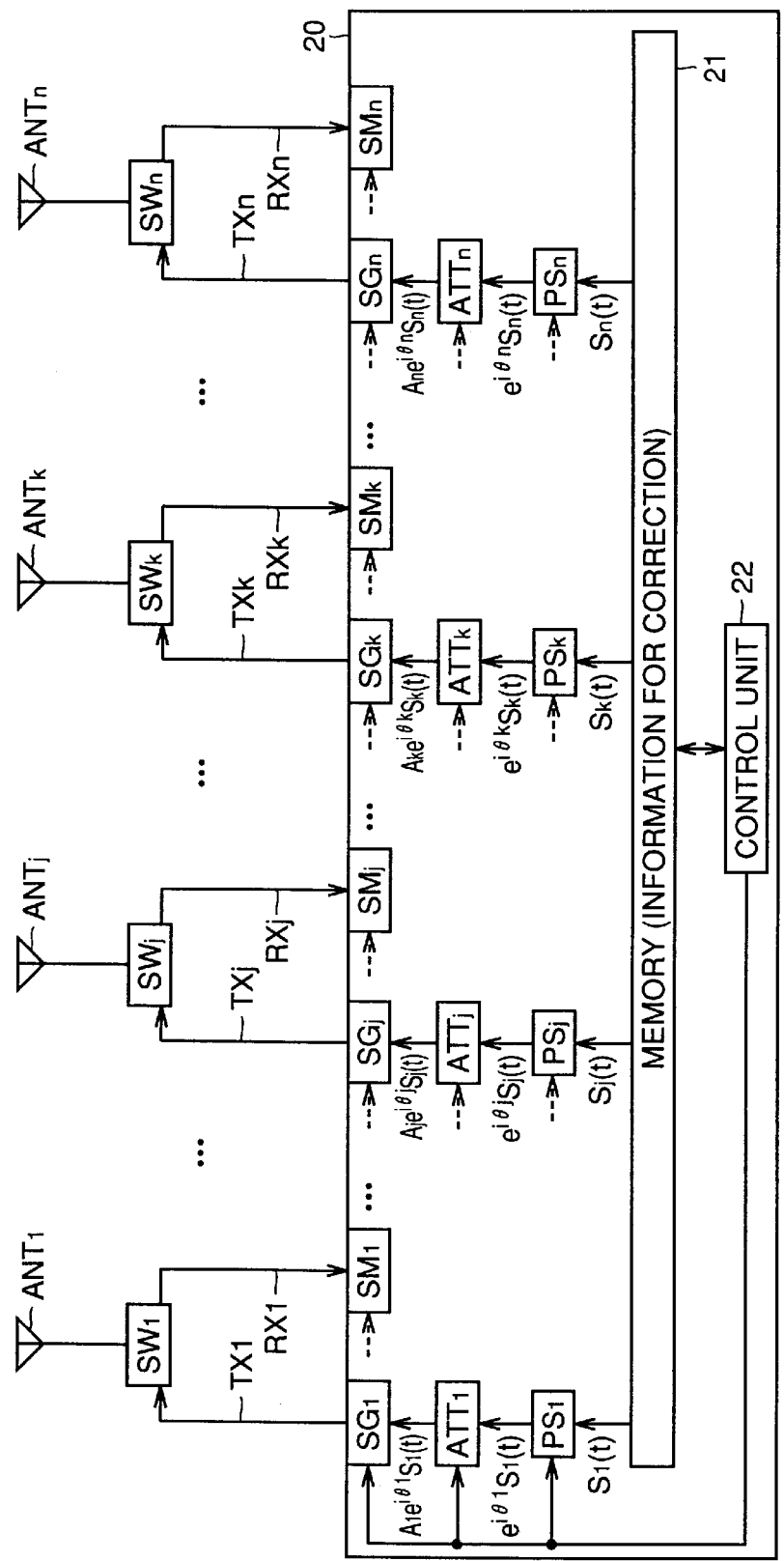
FIG. 65 is a block diagram showing a specific circuit structure of a twenty-first embodiment of the present invention.

FIG. 65 is a block diagram showing a specific circuit structure of such a twenty-first embodiment. In the twenty-first embodiment shown in FIG. 65, calibration information calculated for compensating phase rotation quantities is $\Delta\phi_1$, $\Delta\phi_2$, ..., $\Delta\phi_n$, and calibration information calculated for compensating amplitude fluctuation quantities is $\Delta A_1$, $\Delta A_2$, ..., $\Delta A_n$.

It is assumed that $PC_{TX}$ represents relatively low power of a transmitted signal at the time of estimation of the above calibration information and $PC_{RX}$ represents relatively low power of a received signal. It is also assumed that $P_{TX}$ represents power of a current transmitted signal and $P_{RX}$ represents power of a current received signal. It is further assumed that the memory 21 previously stores information for correcting phase rotation quantity information and amplitude fluctuation quantity information. A control unit 22 is structured to read correction information for a transmission system corresponding to $P_{TX}$ and $PC_{TX}$ or correction information for a receiving system corresponding to $P_{RX}$ and $PC_{RX}$ from the memory 21, add the same to the aforementioned calculated calibration values and thereafter supply the sums to the phase shifter serving as a phase rotator and the attenuator serving as an amplitude fluctuator. Thus, also when the transmission circuit or the receiving circuit includes a nonlinear circuit element, optimum calibration related to the phase rotation quantity difference information and the amplitude fluctuation quantity difference information can be regularly performed regardless of the power of the received signal or the transmitted signal.

This embodiment may alternatively be structured to store correction information skipped at proper intervals in the memory 21 for reducing the quantity of the correction information stored therein, and find optimum correction values by interpolation when using the correction information.

Amplitude Calibration Mode

Twenty-Second Embodiment

In each of the embodiments described above, the difference between the amplitude fluctuation quantities of the receiving circuit and the transmission circuit is estimated in each transmission system. Dissimilarly to the case of the phase rotation quantities, however, the characteristic difference between the transmission circuit and the receiving circuit itself is not much problematic but the maximum problem is that the differences between the amplitude fluctuation quantities of the transmission and receiving circuits vary with the transmission systems. As to calibration of amplitude information, therefore, the amplitude fluctuation quantity of the attenuator of each transmission system serving as an amplitude fluctuator may be so controlled that the differences in the amplitude fluctuation quantity between the transmission and receiving circuits of the respective transmission systems reach a given common value, in addition to the method of controlling the amplitude fluctuation quantity of the attenuator of each transmission system serving as an amplitude fluctuator so that the difference in the amplitude fluctuation quantity between the receiving circuit and the transmission circuit of each transmission system is 0 as in each of the aforementioned embodiments.

Outline of Third Basic Structure

Figure 66:
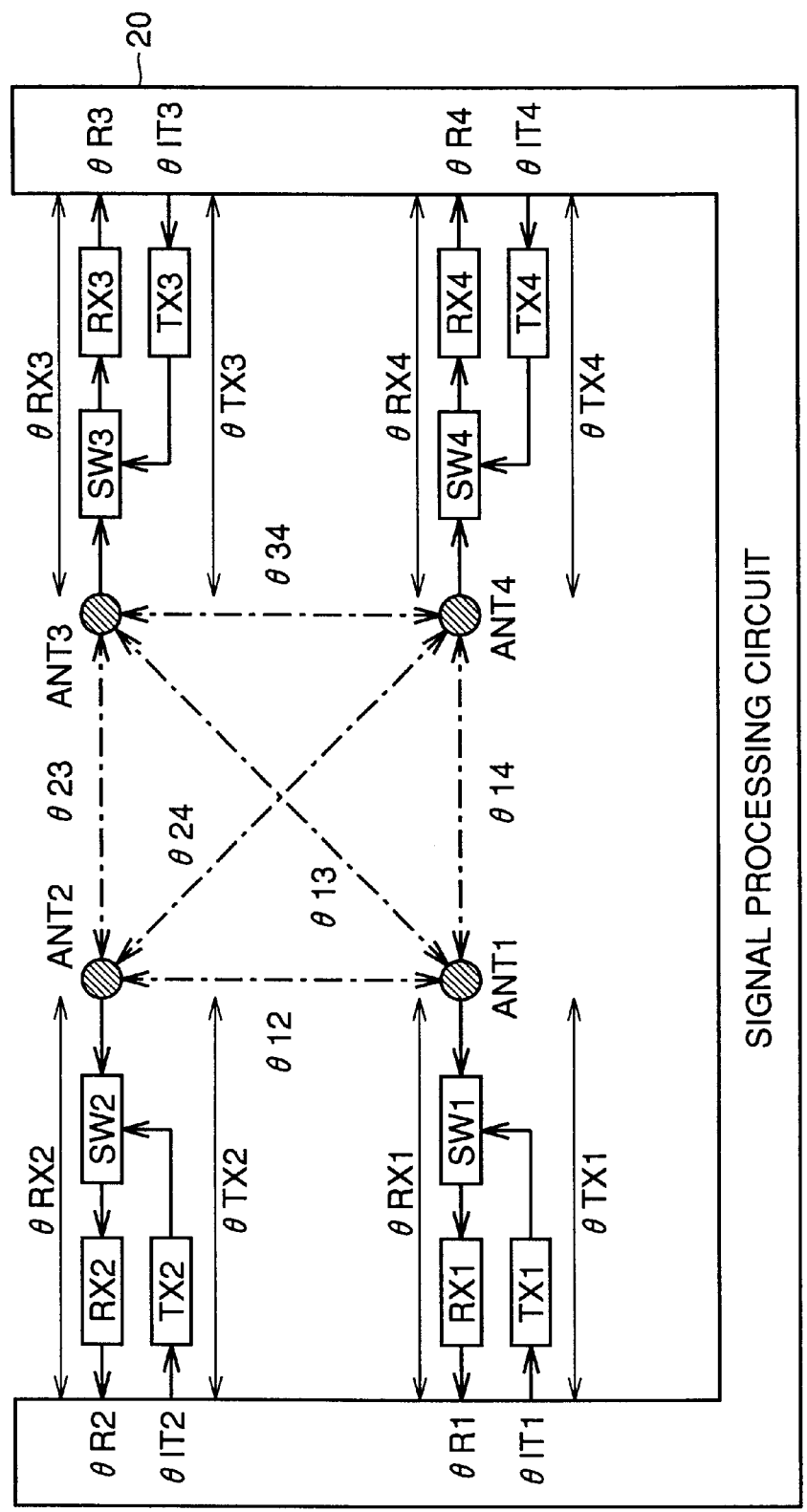
FIG. 66 is a block diagram showing a twenty-third embodiment of a third basic structure of the present invention.

FIG. 66 is a schematic block diagram showing the outline of a third basic structure of the adaptive array radio base station according to the present invention. In the third basic structure of FIG. 66, only parts of the adaptive array radio base station related to estimation of phase rotation quantities and amplitude fluctuation quantities and calibration thereof in relation to the present invention are shown similarly to the first and second basic structures described above.

The adaptive array radio base station shown in FIG. 66 consists of four signal transmission systems, and is characterized in that antenna elements (four in total) of the respective signal transmission systems are correctly arranged on the vertices of a square respectively.

More specifically, the adaptive array radio base station shown in FIG. 66 comprises a signal processing circuit 20 consisting of a memory (not shown) and a control unit (not shown), antenna elements ANT1, ANT2, ANT3 and ANT4 forming a square array antenna, antenna sharers SW1, SW2, SW3 and SW4 provided in correspondence to the antenna elements ANT1, ANT2, ANT3 and ANT4 respectively, and transmission circuits TX1, TX2, TX3 and TX4 and receiving circuits RX1, RX2, RX3 and RX4 provided between the antenna sharers SW1, SW2, SW3 and SW4 and the signal processing circuit 20 in correspondence to the antenna elements ANT1, ANT2, ANT3 and ANT4 respectively.

Similarly to the aforementioned first and second basic structures, it is assumed that the signal processing circuit 20 shown in FIG. 66 has a digital signal processing function of transmitting a known signal from each antenna element in calibration, actually measuring a signal received from another antenna element, calculating a receiving response vector and a transmission response vector described later and calibrating the phase rotation quantity and the amplitude fluctuation quantity on the basis of the results of calculation.

Each of the transmission circuits TX1, TX2, TX3 and TX4 is generically referred to as a circuit existing on a path between the signal processing circuit 20 and the corresponding antenna sharer SW, and each of the receiving circuits RX1, RX2, RX3 and RX4 is generically referred to as a circuit existing on a path between the corresponding antenna sharer SW and the signal processing circuit 20.

Embodiments of Third Basic Structure

Twenty-Third Embodiment

Referring to FIG. 66, each of symbols $\theta TX1$, $\theta TX2$, $\theta TX3$ and $\theta TX4$ denotes a phase rotation quantity of a signal output from the signal processing circuit 20 to pass through the corresponding transmission circuit TX and the corresponding antenna sharer SW and reach the corresponding antenna element ANT, and each of symbols $\theta RX1$, $\theta RX2$, $\theta RX3$ and $\theta RX4$ denotes a phase rotation quantity of the signal, received in the corresponding antenna element ANT, passing through the corresponding antenna sharer SW and the corresponding receiving circuit RX and reaching the signal processing circuit 20 in each transmission system.

Referring to FIG. 66, further, symbol $\theta 12$ denotes a phase rotation quantity of a signal between the antenna elements ANT1 and ANT2, symbol $\theta 13$ denotes a phase rotation quantity of a signal between the antenna elements ANT1 and ANT3, symbol $\theta 14$ denotes a phase rotation quantity of a signal between the antenna elements ANT1 and ANT4, symbol $\theta 23$ denotes a phase rotation quantity of a signal between the antenna elements ANT2 and ANT3, symbol $\theta 24$ denotes a phase rotation quantity of a signal between the antenna elements ANT2 and ANT4, and symbol $\theta 34$ denotes a phase rotation quantity of a signal between the antenna elements ANT3 and ANT4.

A twenty-third embodiment of the third basic structure of the present invention finds a receiving response vector and a transmission response vector in the structure shown in FIG. 66, for finding the difference between the phase data thereof as a correction value.

(1) Method of Measuring Receiving Response Vector

A method of measuring the receiving response vector is now described.

① In the structure shown in FIG. 66, a signal having an initial phase $\theta IT1$ fixed to 0 in the signal processing circuit 20 is transmitted from the antenna element ANT1 through the transmission circuit TX1 and the antenna sharer SW1, and received in the remaining antenna elements ANT2, ANT3 and ANT4.

The following equation (7-1) expresses a phase rotation quantity $\theta R21$ between transmission and receiving of the signal received in the signal processing circuit 20 through the antenna element ANT2, the antenna sharer SW2 and the receiving circuit RX2:

$$\theta R21 = \theta TX1 + \theta 12 + \theta RX2 \quad (7\text{-}1)$$

Similarly, the following equation (7-2) expresses a phase rotation quantity $\theta R31$ between transmission and receiving of the signal received in the signal processing circuit 20 through the antenna element ANT3, the antenna sharer SW3 and the receiving circuit RX3:

$$\theta R31 = \theta TX1 + \theta 13 + \theta RX3 \quad (7\text{-}2)$$

Similarly, the following equation (7-3) expresses a phase rotation quantity $\theta R41$ between transmission and receiving of the signal received in the signal processing circuit 20 through the antenna element ANT4, the antenna sharer SW4 and the receiving circuit RX4:

$$\theta R41 = \theta TX1 + \theta 14 + \theta RX4 \quad (7\text{-}3)$$

The equation (7-2) is subtracted from the equation (7-1):

$$\theta R21 - \theta R31 = \theta RX2 - \theta RX3 + (\theta 12 - \theta 13)$$

$$(\theta RX2 - \theta RX3) = (\theta R21 - \theta R31) - (\theta 12 - \theta 13) \quad (7\text{-}4)$$

Similarly, the equation (7-3) is subtracted from the equation (7-2):

$$\theta R31 - \theta R41 = \theta RX3 - \theta RX4 + (\theta 13 - \theta 14)$$

$$(\theta RX3 - \theta RX4) = (\theta R31 - \theta R41) - (\theta 13 - \theta 14) \quad (7\text{-}5)$$

Similarly, the equation (7-1) is subtracted from the equation (7-3):

$$\theta R41 - \theta R21 = \theta RX4 - \theta RX2 + (\theta 14 - \theta 12)$$

$$(\theta RX4 - \theta RX2) = (\theta R41 - \theta R21) - (\theta 14 - \theta 12) \quad (7\text{-}6)$$

② In the structure shown in FIG. 66, a signal having an initial phase $\theta IT2$ fixed to 0 in the signal processing circuit 20 is transmitted from the antenna element ANT2 through the transmission circuit TX2 and the antenna sharer SW2, and received in the remaining antenna elements ANT1, ANT3 and ANT4.

The following equation (7-7) expresses a phase rotation quantity $\theta R12$ between transmission and receiving of the signal received in the signal processing circuit 20 through the antenna element ANT1, the antenna sharer SW1 and the receiving circuit RX1:

$$\theta R12 = \theta TX2 + \theta 12 + \theta RX1 \quad (7\text{-}7)$$

Similarly, the following equation (7-8) expresses a phase rotation quantity $\theta R32$ between transmission and receiving of the signal received in the signal processing circuit 20 through the antenna element ANT3, the antenna sharer SW3 and the receiving circuit RX3:

$$\theta R32 = \theta TX2 + \theta 23 + \theta RX3 \quad (7\text{-}8)$$

Similarly, the following equation (7-9) expresses a phase rotation quantity $\theta R42$ between transmission and receiving of the signal received in the signal processing circuit 20 through the antenna element ANT4, the antenna sharer SW4 and the receiving circuit RX4:

$$\theta R42 = \theta TX2 + \theta 24 + \theta RX4 \quad (7\text{-}9)$$

The equation (7-8) is subtracted from the equation (7-7):

$$\theta R12-\theta R32=\theta RX1-\theta RX3+(\theta 12-\theta 23)$$

$$(\theta TX1-\theta RX3)=(\theta R12-\theta R32)-(\theta 12-\theta 23) \quad (7\text{-}10)$$

Similarly, the equation (7-9) is subtracted from the equation (7-8):

$$\theta R32-\theta R42=\theta RX3-\theta RX4+(\theta 23-\theta 24)$$

$$(\theta RX3-\theta RX4)=(\theta R32-\theta R42)-(\theta 23-\theta 24) \quad (7\text{-}11)$$

Similarly, the equation (7-7) is subtracted from the equation (7-9):

$$\theta R42-\theta R12=\theta RX4-\theta RX1+(\theta 24-\theta 12)$$

$$(\theta RX4-\theta RX1)=(\theta R42-\theta R12)-(\theta 24-\theta 12) \quad (7\text{-}12)$$

③ In the structure shown in FIG. 66, a signal having an initial phase θIT3 fixed to 0 in the signal processing circuit 20 is transmitted from the antenna element ANT3 through the transmission circuit TX3 and the antenna sharer SW3, and received in the remaining antenna elements ANT1, ANT2 and ANT4.

The following equation (7-13) expresses a phase rotation quantity θR13 between transmission and receiving of the signal received in the signal processing circuit 20 through the antenna element ANT1, the antenna sharer SW1 and the receiving circuit RX1:

$$\theta R13=\theta TX3+\theta 13+\theta RX1 \quad (7\text{-}13)$$

Similarly, the following equation (7-14) expresses a phase rotation quantity θR23 between transmission and receiving of the signal received in the signal processing circuit 20 through the antenna element ANT2, the antenna sharer SW2 and the receiving circuit RX2:

$$\theta R23=\theta TX3+\theta 23+\theta RX2 \quad (7\text{-}14)$$

Similarly, the following equation (7-15) expresses a phase rotation quantity θR43 between transmission and receiving of the signal received in the signal processing circuit 20 through the antenna element ANT4, the antenna sharer SW4 and the receiving circuit RX4:

$$\theta R43=\theta TX3+\theta 34+\theta RX4 \quad (7\text{-}15)$$

The equation (7-14) is subtracted from the equation (7-13):

$$\theta R13-\theta R23=\theta RX1-\theta RX2+(\theta 13-\theta 23)$$

$$(\theta RX1-\theta RX2)=(\theta R13-\theta R23)-(\theta 13-\theta 23) \quad (7\text{-}16)$$

Similarly, the equation (7-15) is subtracted from the equation (7-14):

$$\theta R23-\theta R43=\theta RX2-\theta RX4+(\theta 23-\theta 34)$$

$$(\theta RX2-\theta RX4)=(\theta R23-\theta R43)-(\theta 23-\theta 34) \quad (7\text{-}17)$$

Similarly, the equation (7-13) is subtracted from the equation (7-15):

$$\theta R43-\theta R13=\theta RX4-\theta RX1+(\theta 34-\theta 13)$$

$$(\theta RX4-\theta RX1)=(\theta R43-\theta R13)-(\theta 34-\theta 13) \quad (7\text{-}18)$$

④ In the structure shown in FIG. 66, a signal having an initial phase θIT4 fixed to 0 in the signal processing circuit 20 is transmitted from the antenna element ANT4 through the transmission circuit TX4 and the antenna sharer SW4, and received in the remaining antenna elements ANT1, ANT2 and ANT3.

The following equation (7-19) expresses a phase rotation quantity θR14 between transmission and receiving of the signal received in the signal processing circuit 20 through the antenna element ANT1, the antenna sharer SW1 and the receiving circuit RX1:

$$\theta R14=\theta TX4+\theta 14+\theta RX1 \quad (7\text{-}19)$$

Similarly, the following equation (7-20) expresses a phase rotation quantity θR24 between transmission and receiving of the signal received in the signal processing circuit 20 through the antenna element ANT2, the antenna sharer SW2 and the receiving circuit RX2:

$$\theta R24=\theta TX4+\theta 24+\theta RX2 \quad (7\text{-}20)$$

Similarly, the following equation (7-21) expresses a phase rotation quantity θR34 between transmission and receiving of the signal received in the signal processing circuit 20 through the antenna element ANT3, the antenna sharer SW3 and the receiving circuit RX3:

$$\theta R34=\theta TX4+\theta 34+\theta RX3 \quad (7\text{-}21)$$

The equation (7-20) is subtracted from the equation (7-19):

$$\theta R14-\theta R24=\theta RX1-\theta RX2+(\theta 14-\theta 24)$$

$$(\theta RX1-\theta RX2)=(\theta R14-\theta R24)-(\theta 14-\theta 24) \quad (7\text{-}22)$$

Similarly, the equation (7-21) is subtracted from the equation (7-20):

$$\theta R24-\theta R34=\theta RX2-\theta RX3+(\theta 24-\theta 34)$$

$$(\theta RX2-\theta RX3)=(\theta R24-\theta R34)-(\theta 24-\theta 34) \quad (7\text{-}23)$$

Similarly, the equation (7-19) is subtracted from the equation (7-21):

$$\theta R34-\theta R14=\theta RX3-\theta RX1+(\theta 34-\theta 14)$$

$$(\theta RX3-\theta RX1)=(\theta R34-\theta R14)-(\theta 34-\theta 14) \quad (7\text{-}24)$$

⑤ The difference (θRX1−θRX2) between the phase rotation quantities of the signals received in the antenna elements ANT1 and ANT2 is calculated.

While the difference (θRX1−θRX2) is found from each of the above equations (7-16) and (7-22), these equations are averaged in order to further improve the accuracy:

$$(\theta RX1-\theta RX2)=[\{(\theta R14-\theta R24)-(\theta 14-\theta 24)\}+\{(\theta R13-\theta R23)(\theta 13-\theta 23)\}]/2$$

From this equation, $$(\theta RX1-\theta RX2)=[\{(\theta R14-\theta R24)-(\theta 14-\theta 23)\}+\{(\theta R13-\theta R23)-(\theta 13-\theta 24)\}]/2$$

The antenna elements ANT1 to ANT4 shown in FIG. 66 are arranged to form a square, and hence θ14=θ23 and θ13=θ24 hold. Hence, the above equation is converted to the following equation (7-25):

$$(\theta RX1-\theta RX2)=\{(\theta R14-\theta R24)+(\theta R13-\theta R23)\}/2 \quad (7\text{-}25)$$

The right side of this equation is found from measured values, and hence the value of the difference (θRX1−θRX2) is calculated.

⑥ The difference ($\theta RX2-\theta RX3$) between the phase rotation quantities of the signals received in the antenna elements ANT2 and ANT3 is calculated.

While the difference ($\theta RX2-\theta RX3$) is found from each of the above equations (7-4) and (7-23), these equations are averaged in order to further improve the accuracy:

$$(\theta RX2-\theta RX3)=[\{(\theta R21-\theta R31)-(\theta 12-\theta 13)\}+\{(\theta R24-\theta R34)-(\theta 24-\theta 34)\}]/2$$

From this equation, $$(\theta RX2-\theta RX3)=[\{(\theta R21-\theta R31)-(\theta 12-\theta 34)\}+\{(\theta R24-\theta R34)-(\theta 24-\theta 13)\}]/2$$

$\theta 12=\theta 34$ and $\theta 13=\theta 24$ hold, and hence the above equation is converted to the following equation (7-26):

$$(\theta RX2-\theta RX3)=\{(\theta R21-\theta R31)+(\theta R24-\theta R34)\}/2 \quad (7\text{-}26)$$

The right side of this equation is found from measured values, and hence the value of the difference ($\theta RX2-\theta RX3$) is calculated.

⑦ The difference ($\theta RX3-\theta RX4$) between the phase rotation quantities of the signals received in the antenna elements ANT3 and ANT4 is calculated.

While the difference ($\theta RX3-\theta RX4$) is found from each of the above equations (7-5) and (7-11), these equations are averaged in order to further improve the accuracy:

$$(\theta RX3-\theta RX4)=[\{(\theta R31-\theta R41)-(\theta 13-\theta 14)\}+\{(\theta R32-\theta R42)-(\theta 23-\theta 24)\}]/2$$

From this equation, $$(\theta RX3-\theta RX4)=[\{(\theta R31-\theta R41)-(\theta 13-\theta 24)\}+\{(\theta R32-\theta R42)-(\theta 23-\theta 14)\}]/2$$

$\theta 13=\theta 24$ and $\theta 23=\theta 14$ hold, and hence the above equation is converted to the following equation (7-27):

$$(\theta RX3-\theta RX4)=\{(\theta R31-\theta R41)+(\theta R32-\theta R42)\}/2 \quad (7\text{-}27)$$

The right side of this equation is found from measured values, and hence the value of the difference ($\theta RX3-\theta RX4$) is calculated.

⑧ The difference ($\theta RX4-\theta RX1$) between the phase rotation quantities of the signals received in the antenna elements ANT4 and ANT1 is calculated.

While the difference ($\theta RX4-\theta RX1$) is found from each of the above equations (7-12) and (7-18), these equations are averaged in order to further improve the accuracy:

$$(\theta RX4-\theta RX1)=[\{(\theta R42-\theta R12)-(\theta 24-\theta 12)\}+\{(\theta R43-\theta R13)-(\theta 34-\theta 13)\}]/2$$

From this equation, $$(\theta RX4-\theta RX1)=[\{(\theta R42-\theta R12)-(\theta 24-\theta 13)\}+\{(\theta R43-\theta R13)-(\theta 34-\theta 12)\}]/2$$

$\theta 24=\theta 13$ and $\theta 34=\theta 12$ hold, and hence the above equation is converted to the following equation (7-28):

$$(\theta RX4-\theta RX1)=\{(\theta R42-\theta R12)+(\theta R43-\theta R13)\}/2 \quad (7\text{-}28)$$

The right side of this equation is found from measured values, and hence the value of the difference ($\theta RX4-\theta RX1$) is calculated.

⑨ The receiving response vector is obtained.

Assuming that $R(1)=\theta RX1$, $R(2)=\theta RX2$, $R(3)=\theta RX3$ and $R(4)\ \theta RX4$ represent the phase rotation quantities of the signals received by the antenna elements ANT1 to ANT4 of the four transmission systems respectively, a vector R having $R(1)$, $R(2)$, $R(3)$ and $R(4)$ as components is the receiving response vector of phase data.

While the differences between the phase rotation quantities are specifically calculated as the values ($\theta RX1-\theta RX2$), ($\theta RX2-\theta RX3$), ($\theta RX3\ \theta RX4$) and ($\theta RX4-\theta RX1$) through measured values as found in the above equations (7-25) to (7-28), the information is still insufficient for recognizing the values of the individual phase rotation quantities $R(1)$, $R(2)$, $R(3)$ and $R(4)$.

When setting the phase rotation quantity, e.g., $R(1)$, of any transmission system to a reference value 0, the phase rotation quantities of the remaining transmission systems can be individually calculated from the aforementioned calculated values of the differences. When setting $R(1)=0$, for example, $R(1)-R(2)=(\theta RX1-\theta RX2)$ results in $R(2)=R(1)-(\theta RX1-\theta RX2)$, and the value $R(2)$ is calculated on the basis of the aforementioned measured values of the differences.

Similarly, $R(2)-R(3)=(\theta RX2-\theta RX3)$ results in $R(3)=R(2)-(\theta RX2-\theta RX3)$, and the value $R(3)$ is calculated on the basis of the aforementioned measured values of the differences.

Similarly, $R(3)-R(4)=(\theta RX3-\theta RX4)$ results in $R(4)=R(3)-(\theta RX3-\theta RX4)$, and the value $R(4)$ is calculated on the basis of the aforementioned measured values of the differences.

When setting the phase rotation quantity of any transmission system to 0 as hereinabove described, the phase rotation quantities of the remaining transmission systems are individually found and it follows that the receiving response vector of phase data is obtained as a result.

Some methods of testing whether or not the aforementioned results of measurement are erroneous are now described.

(i) As to $R(4)-R(1)=(\theta RX4-\theta RX1)$, $R(1)=0$ is set and hence $R(4)-(\theta RX4-\theta RX1)$ must originally be substantially 0 if the measurement is correctly performed.

Therefore, rtmp=$|R(4)-(\theta RX4-\theta RX1)|$ is set for determining that the measurement is erroneous if rtmp is in excess of an error threshold.

(ii) Then, the above equations (7-10) and (7-24) are averaged for finding the difference ($\theta RX1-\theta RX3$) between the phase rotation quantities of the antenna elements ANT1 and ANT3:

$$(\theta RX1-\theta RX3)=[\{(\theta R12-\theta R32)-(\theta 12-\theta 23)\}-\{(\theta R34-\theta R14)-(\theta 34-\theta 14)\}]/2$$

$\theta 12=\theta 23$ and $\theta 34=\theta 14$ hold, and hence:

$$(\theta RX1-\theta RX3)=\{(\theta R12-\theta R32)-(\theta R34-\theta R14)\}/2$$

The right side of this equation is found from measured values, and hence the value ($\theta RX1-\theta RX3$) is calculated.

While $R(1)-R(3)=(\theta RX1-\theta RX3)$, $\{R(1)-R(3)\}-(\theta RX1-\theta RX3)$ must originally be substantially 0 if the measurement is correctly performed.

Therefore, rtmp=$|\{R(1)-R(3)\}-(\theta RX1-\theta RX3)|$ is set for determining that the measurement is erroneous if rtmp is in excess of an error threshold.

(iii) Then, the above equations (7-17) and (7-6) are averaged for finding the difference ($\theta RX2-\theta RX$) between the phase rotation quantities of the antenna elements ANT2 and ANT4:

$(\theta RX2-\theta RX4)=[\{(\theta R23-\theta R43)-(\theta 23-\theta 34)\}+\{(\theta R41-\theta R21)-(\theta 14-\theta 12)\}]/2$ $\theta 23=\theta 34$ and $\theta 14=\theta 12$ hold, and hence:

$(\theta RX2-\theta RX4)=\{(\theta R23-\theta R43)-(\theta R41-\theta R21)\}/2$

The right side of this equation is found from measured values, and hence the value ($\theta RX2-\theta RX4$) is calculated.

While $R(2)-R(4)=(\theta RX2-\theta RX4)$, $\{R(2)-R(4)\}-(\theta RX2-\theta RX4)$ must originally be substantially 0 if the measurement is correctly performed.

Therefore, $\text{rtmp}=|\{R(2)-R(4)\}-(\theta RX2-\theta RX4)|$ is set for determining that the measurement is erroneous if rtmp is in excess of an error threshold.

(2) Method of Measuring Transmission Response Vector

A method of measuring the transmission response vector is now described.

① The difference ($\theta TX1-\theta TX2$) between the phase rotation quantities of the transmitted signals of the antenna elements ANT1 and ANT2 is calculated.

The equation (7-8) is subtracted from the above equation (7-2):

$\theta R31-\theta R32=\theta TX1-\theta TX2+(\theta 13-\theta 23)$ $(\theta TX1-\theta TX2)=(\theta R31-\theta R32)-(\theta 13-\theta 23)$ \quad (7-29)

Similarly, the equation (7-9) is subtracted from the equation (7-3):

$\theta R41-\theta R42=\theta TX1-\theta TX2+(\theta 14-\theta 24)$ $(\theta TX1-\theta TX2)=(\theta R41-\theta R42)-(\theta 14-\theta 24)$ \quad (7-30)

While the difference ($\theta TX1-\theta TX2$) is found from each of the above equations (7-29) and (7-30), these equations are averaged in order to further improve the accuracy:

$(\theta TX1-\theta TX2)=[\{(\theta R31-\theta R32)-(\theta 13-\theta 23)\}+\{(\theta R41-\theta R42)-(\theta 14-\theta 24)\}]/2$ From this equation, $(TX1-\theta TX2)=[\{(\theta R31-\theta R32)-(\theta 13-\theta 24)\}+\{(\theta R41-\theta R42)-(\theta 14-\theta 23)\}]/2$ $\theta 13=\theta 24$ and $\theta 14=\theta 23$ hold, and hence the above equation is converted to the following equation (7-31):

$(\theta TX1-\theta TX2)=\{(\theta R31-\theta R32)+(\theta R41-\theta R42)\}/2$ \quad (7-31)

The right side of this equation is found from measured values, and hence the value of the difference ($\theta TX1-\theta TX2$) is calculated.

② The difference ($\theta TX2-\theta TX3$) between the phase rotation quantities of the transmitted signals of the antenna elements ANT2 and ANT3 is calculated.

The equation (7-13) is subtracted from the above equation (7-7):

$\theta R12-\theta R13=\theta TX2-\theta TX3+(\theta 12-\theta 13)$ $(\theta TX2-\theta TX3)=(\theta R12-\theta R13)-(\theta 12-\theta 13)$ \quad (7-32)

Similarly, the equation (7-15) is subtracted from the equation (7-9):

$\theta R42-\theta R43=\theta TX2-\theta TX3+(\theta 24-\theta 34)$ $(\theta TX2-\theta TX3)=(\theta R42-\theta R43)-(\theta 24-\theta 34)$ \quad (7-33)

While the difference ($\theta TX2-\theta TX3$) is found from each of the above equations (7-32) and (7-33), these equations are averaged in order to further improve the accuracy:

$(\theta TX2-\theta TX3)=[\{(\theta R12-\theta R13)-(\theta 12-\theta 13)\}+\{(\theta R42-\theta R43)-(\theta 24-\theta 34)\}]/2$ From this equation, $(\theta TX2-\theta TX3)=[\{(\theta R12-\theta R13)-(\theta 12-\theta 34)\}+\{(\theta R42-\theta R43)-(\theta 24-\theta 13)\}]/2$ $\theta 12=\theta 34$ and $\theta 24=\theta 13$ hold, and hence the above equation is converted to the following equation (7-34):

$(TX2-\theta TX3)=\{(\theta R12-\theta R13)+(\theta R42-\theta R43)\}/2$ \quad (7-34)

The right side of this equation is found from measured values, and hence the value of the difference ($\theta TX2-\theta TX3$) is calculated.

③ The difference ($\theta TX3-\theta TX4$) between the phase rotation quantities of the transmitted signals of the antenna elements ANT3 and ANT4 is calculated.

The equation (7-19) is subtracted from the above equation (7-13):

$(\theta R13-\theta R14)=\theta TX3-\theta TX4+(\theta 13-\theta 14)$ $(\theta TX3-\theta TX4)=(\theta R13-\theta R14)-(\theta 13-\theta 14)$ \quad (7-35)

Similarly, the equation (7-20) is subtracted from the equation (7-14):

$\theta R23-\theta R24=\theta TX3-\theta TX4+(\theta 23-\theta 24)$ $(\theta TX3-\theta TX4)=(\theta R23-\theta R24)-(\theta 23-\theta 24)$ \quad (7-36)

While the difference ($\theta TX3-\theta TX4$) is found from each of the above equations (7-35) and (7-36), these equations are averaged in order to further improve the accuracy:

$(\theta TX3-\theta TX4)=[\{(\theta R13-\theta R14)-(\theta 13-\theta 14)\}+\{(\theta R23-\theta R24)-(\theta 23-\theta 24)\}]/2$ From this equation, $(\theta TX3-\theta TX4)=[\{(\theta R13-\theta R14)-(\theta 13-\theta 24)\}+\{(\theta R23-\theta R24)-(\theta 23-\theta 14)\}]/2$ $\theta 13=\theta 24$ and $\theta 23=\theta 14$ hold, and hence the above equation is converted to the following equation (7-37):

$(\theta TX3-\theta TX4)=\{(\theta R13-\theta R14)+(\theta R23-\theta R24)\}/2$ \quad (7-37)

The right side of this equation is found from measured values, and hence the value of the difference ($\theta TX3-\theta TX4$) is calculated.

④ The difference ($\theta TX4-\theta TX1$) between the phase rotation quantities of the transmitted signals of the antenna elements ANT4 and ANT1 is calculated.

The equation (7-1) is subtracted from the above equation (7-20):

$\theta R24-\theta R21=\theta TX4-\theta TX1+(\theta 24-\theta 12)$ $(\theta TX4-\theta TX1)=(\theta R24-\theta R21)-(\theta R24-\theta R21)-(\theta 24-\theta 12)$ \quad (7-38)

Similarly, the equation (7-2) is subtracted from the equation (7-21):

$\theta R34-\theta R31=\theta TX4-\theta TX1+(\theta 34-\theta 13)$ $(\theta TX4-\theta TX1)=(\theta R34-\theta R31)-(\theta 34-\theta 13)$ \quad (7-39)

While the difference ($\theta TX4-\theta TX1$) is found from each of the above equations (7-38) and (7-39), these equations are averaged in order to further improve the accuracy:

$(\theta TX4-\theta TX1)=[\{(\theta R24-\theta R21)-(\theta 24-\theta 12)\}+\{(\theta R34-\theta R31)-(\theta 34-\theta 13)\}]/2$ From this equation, $(\theta TX4-\theta TX1)=[\{(\theta R24-\theta R21)-(\theta 24-\theta 13)\}+\{(\theta R34-\theta R31)-(\theta 34-\theta 12)\}]/2$ $\theta 24=\theta 13$ and $\theta 34=\theta 12$ hold, and hence the above equation is converted to the following equation (7-40):

$(\theta TX-\theta TX1)=\{(\theta R24-\theta R21)+(\theta R34-R31)\}/2$ (7-40)

The right side of this equation is found from measured values, and hence the value of the difference $(\theta TX4-\theta TX1)$ is calculated.

⑤ The transmission response vector is obtained.

Assuming that $T(1)=\theta TX1$, $T(2)=\theta TX2$, $T(3)=\theta TX3$ and $T(4)=\theta TX4$ represent the phase rotation quantities of the signals transmitted by the antenna elements ANT1 to ANT4 of the four transmission systems respectively, a vector T having $(T(1), T(2), T(3), T(4))$ as a component is the transmission response vector of phase data.

While the differences between the phase rotation quantities are specifically calculated as the values of $(\theta TX1-\theta TX2)$, $(\theta TX2-\theta TX3)$, $(\theta TX3-\theta TX4)$ and $(\theta TX4-\theta TX1)$ through measured values as found in the above equations (7-31), (7-34), (7-37) and (7-40), the information is still insufficient for recognizing the values of the individual phase rotation quantities $T(1)$, $T(2)$, $T(3)$ and $T(4)$.

When setting the phase rotation quantity, e.g., $T(1)$, of any transmission system to a reference value 0, the phase rotation quantities of the remaining transmission systems can be individually calculated from the aforementioned calculated values of the differences. When setting $T(1)=0$, for example, $T(1)-T(2)=(\theta TX1-\theta TX2)$ results in $T(2)=T(1)-(\theta TX1-\theta TX2)$, and the value $T(2)$ is calculated on the basis of the aforementioned measured values of the differences.

Similarly, $T(2)-T(3)=(\theta TX2-\theta TX3)$ results in $T(3)=T(2)-(\theta TX2-\theta TX3)$, and the value $T(3)$ is calculated on the basis of the aforementioned measured values of the differences.

Similarly, $T(3)-T(4)=(\theta TX3-\theta TX4)$ results in $T(4)=T(3)-(\theta TX3-\theta TX4)$, and the value $T(4)$ is calculated on the basis of the aforementioned measured values of the differences.

When setting the phase rotation quantity of any transmission system to 0 as hereinabove described, the phase rotation quantities of the remaining transmission systems are individually obtained and it follows that the transmission response vector of phase data is obtained as a result.

Some methods of testing whether or not the aforementioned results of measurement are erroneous are now described.

(i) As to $T(4)-T(1)=(\theta TX4-\theta TX1)$, $T(1)=0$ is set and hence $T(4)-(\theta TX4-\theta TX1)$ must originally be substantially 0 if the measurement is correctly performed.

Therefore, $rtmp=|T(4)-(\theta TX4-\theta TX1)|$ is set for determining that the measurement is erroneous if rtmp is in excess of an error threshold.

(ii) Then, the difference $(\theta TX1-\theta TX3)$ between the phase rotation quantities of the antenna elements ANT1 and ANT3 is obtained.

The equation (7-14) is subtracted from the equation (7-1):

$\theta R21-\theta R23=\theta TX1-\theta TX3+(\theta 12-\theta 23)$ $(\theta TX1-\theta TX3)=(\theta R21-\theta R23)-(\theta 12-\theta 23)$ (7-41)

Similarly, the equation (7-15) is subtracted from the equation (7-3):

$\theta R41-\theta R43=\theta TX1-\theta TX3+(\theta 14-\theta 34)$ $(\theta TX1-\theta TX3)=(\theta R41-\theta R43)-(\theta 14-\theta 34)$ (7-42)

These equations (7-41) and (7-42) are averaged:

$(\theta TX1-\theta TX3)=[\{(\theta R21-\theta R23)-(\theta 12-\theta 23)\}+\{(\theta R41-\theta R43)-(\theta 14-\theta 34)\}]/2$ $\theta 12=\theta 23$ and $\theta 14=\theta 34$ hold, and hence:

$(\theta TX1-\theta TX3)=\{(\theta R21-\theta R23)+(\theta R41-\theta R43)\}/2$

The right side of this equation is found from measured values, and hence the value $(\theta TX1-\theta TX3)$ is calculated.

While $T(1)-T(3)=(\theta TX1-\theta TX3)$, $\{T(1)-T(3)\}-(\theta TX1-\theta TX3)$ must originally be substantially 0 if the measurement is correctly performed.

Therefore, $rtmp=|\{T(1)-T(3)\}-(\theta TX1-\theta TX3)|$ is set for determining that the measurement is erroneous if rtmp is in excess of an error threshold.

(iii) Then, the difference $(\theta TX2-\theta TX4)$ between the phase rotation quantities of the antenna elements ANT2 and ANT4 is obtained.

The equation (7-19) is subtracted from the equation (7-7):

$\theta R12-\theta R14=\theta TX2-\theta TX4+(\theta 12-\theta 14)$ $(\theta TX2-\theta TX4)=(\theta R12-\theta R14)-(\theta 12-\theta 14)$ (7-43)

Similarly, the equation (7721) is subtracted from the equation (7-8):

$\theta R32-\theta R34=\theta TX2-\theta TX4+(\theta 23-\theta 34)$ $(\theta TX2-\theta TX4)=(\theta R32-\theta R34)-\theta(\theta 23-\theta 34)$ (7-44)

The equations (7-43) and (7-44) are averaged:

$(\theta TX2-\theta TX4)=[\{(\theta R12-\theta R14)-(\theta 12-\theta 14)\}+\{(\theta R32-\theta R34)-(\theta 23-\theta 34)\}]/2$ $\theta 12=\theta 14$ and $\theta 23=\theta 34$ hold, and hence:

$(\theta TX2-\theta TX4)=\{(\theta R12-\theta R14)+(\theta R32-\theta R34)\}/2$

The right side of this equation is found from measured values, and hence the value $(\theta TX2-\theta TX4)$ is calculated.

While $T(2)-T(4)=(\theta TX2-\theta TX4)$, $\{T(2)-T(4)\}-(\theta TX2-\theta TX4)$ must originally be substantially 0 if the measurement is correctly performed.

Therefore, $rtmp=|\{T(2)-T(4)\}-(\theta TX2-\theta TX4)|$ is set for determining that the measurement is erroneous if rtmp is in excess of an error threshold.

(3) Calibration

The difference between the phase rotation quantities in receiving and transmission, i.e., a phase correction quantity can be calculated for each corresponding transmission system by subtracting the phase rotation quantities $T(1)$, $T(2)$, $T(3)$ and $T(4)$ of the transmission response vector T from the phase rotation quantities $R(1)$, $R(2)$, $R(3)$ and $R(4)$ of the receiving response vector R calculated in the aforementioned manner.

The signal processing circuit 20 executes calibration of the phase rotation quantities by previously shifting the initial phase of the transmitted signal, for example, with the phase correction quantity calculated for each transmission system in the aforementioned manner.

Twenty-Fourth Embodiment

Figure 67:
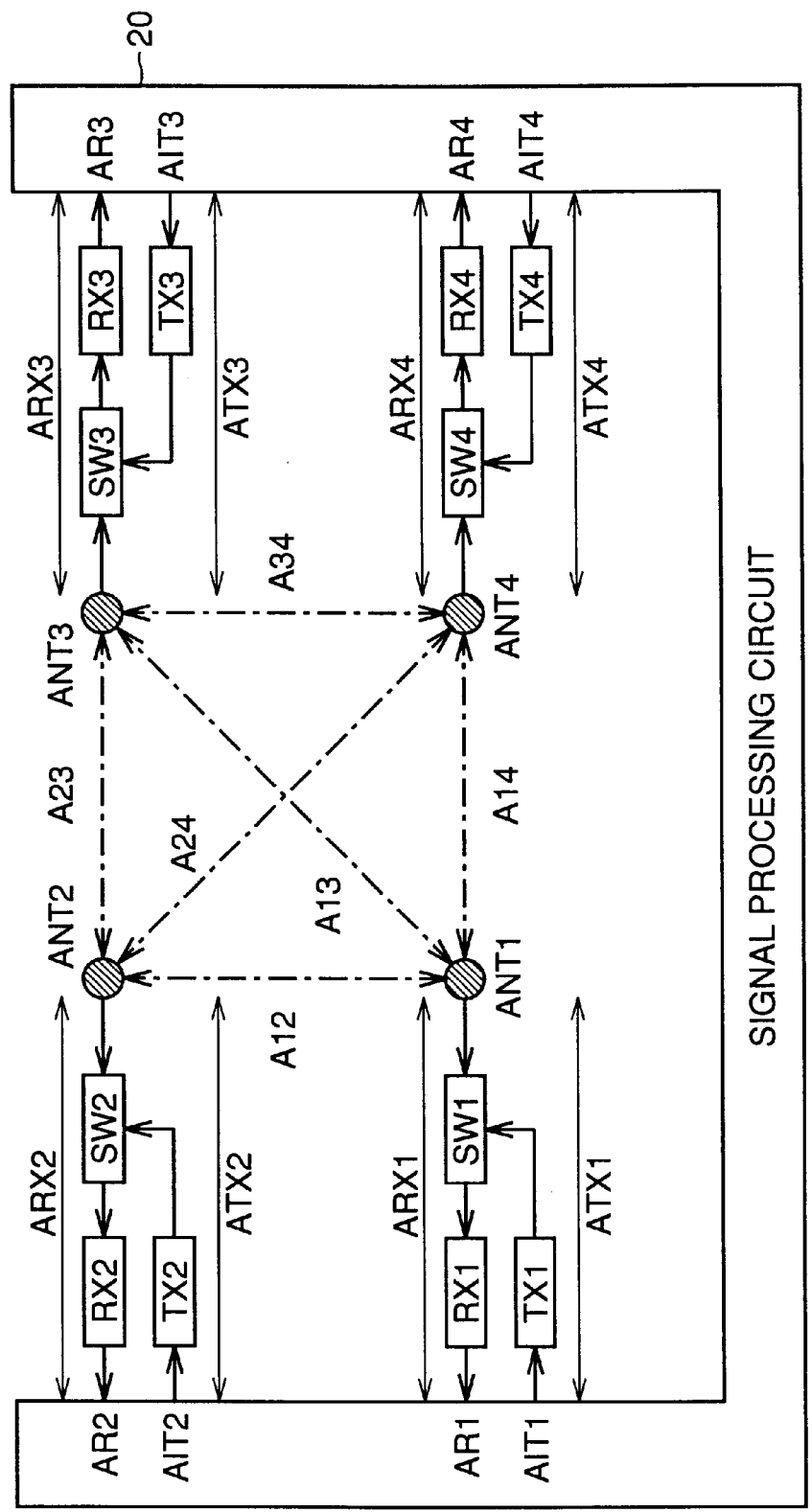
FIG. 67 is a block diagram showing a twenty-fourth embodiment of the third basic structure of the present invention.
Figure 68:
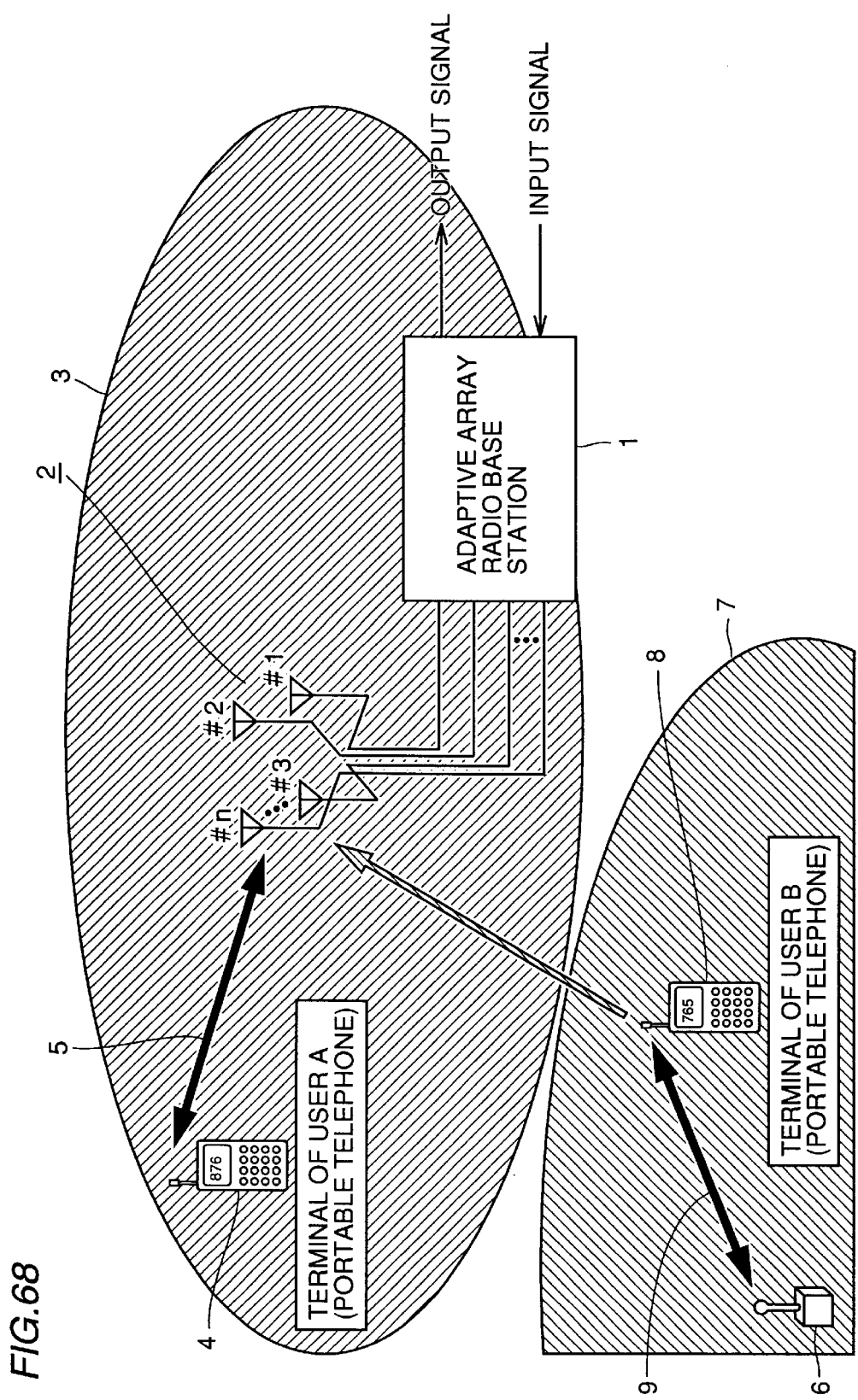
FIG. 68 is a model diagram conceptually showing basic operations of an adaptive array radio base station.

FIG. 67 shows amplification fluctuation quantities of the respective parts in the third basic structure of the present invention shown in FIG. 66. The structure of this adaptive array radio base station itself is identical to that shown in FIG. 66.

Referring to FIGS. 67, each of symbols ATX1, ATX2, ATX3 and ATX4 denotes an amplitude fluctuation quantity of a signal output from the signal processing circuit 20 to pass through the corresponding transmission circuit TX and the corresponding antenna sharer SW and reach the corresponding antenna element ANT, and each of symbols ARX1, ARX2, ARX3 and ARX4 denotes an amplitude fluctuation quantity of the signal received in the corresponding antenna element ANT passing through the corresponding antenna sharer SW and the corresponding receiving circuit RX and reaching the signal processing circuit 20 in each transmission system.

Referring to FIG. 67, further, symbol A12 denotes an amplitude fluctuation quantity of a signal between the antenna elements ANT1 and ANT2, symbol A13 denotes an amplitude fluctuation quantity of a signal between the antenna elements ANT1 and ANT3, symbol A14 denotes an amplitude fluctuation quantity of a signal between the antenna elements ANT1 and ANT4, symbol A23 denotes an amplitude fluctuation quantity of a signal between the antenna elements ANT2 and ANT3, symbol A24 denotes an amplitude fluctuation quantity of a signal between the antenna ANT2 and ANT4, and symbol A34 denotes an amplitude fluctuation quantity of a signal between the antenna ANT3 and ANT4.

A twenty-fourth embodiment of the third basic structure of the present invention obtains a receiving response vector and a transmission response vector in the structure shown in FIG. 67, for obtaining the difference between the amplitude data thereof as a correction value.

Method of Measuring Receiving Response Vector

A method of measuring the receiving response vector is now described.

① In the structure shown in FIG. 67, a signal having an initial amplitude AIT1 fixed to 1 in the signal processing circuit 20 is transmitted from the antenna element ANT1 through the transmission circuit TX1 and the antenna sharer SW1, and received in the remaining antenna elements ANT2, ANT3 and ANT4.

The following equation (8-1) expresses an amplitude fluctuation quantity AR21 between transmission and receiving of the signal received in the signal processing circuit 20 through the antenna element ANT2, the antenna sharer SW2 and the receiving circuit RX2:

$$AR21 = ATX1 * A12 * ARX2 \tag{8-1}$$

Similarly, the following equation (8-2) expresses an amplitude fluctuation quantity AR31 between transmission and receiving of the signal received in the signal processing circuit 20 through the antenna element ANT3, the antenna sharer SW3 and the receiving circuit RX3:

$$AR31 = ATX1 * A13 * ARX3 \tag{8-2}$$

Similarly, the following equation (8-3) expresses an amplitude fluctuation quantity AR41 between transmission and receiving of the signal received in the signal processing circuit 20 through the antenna element ANT4, the antenna sharer SW4 and the receiving circuit RX4:

$$AR41 = ATX1 * A14 * ATX4 \tag{8-3}$$

The equation (8-1) is divided by the equation (8-2):

$$AR21/AR31 = ARX2/ARX3 * (A12/A13)$$

$$(ARX2/ARX23) = (AR21/AR31)/(A12/A13) \tag{8-4}$$

Similarly, the equation (8-2) is divided by the equation (8-3):

$$AR31/AR41 = ARX3/ARX4 * (A13/A14)$$

$$(ARX3/ARX4) = (AR31/AR41)/(A13/A14) \tag{8-5}$$

Similarly, the equation (8-1) is divided by the equation (8-3):

$$AR21/AR41 = ARX2/ARX4 * (A12/A14)$$

$$(ARX2/ARX4) = (AR21/AR41)/(A12/A14) \tag{8-6}$$

② In the structure shown in FIG. 67, a signal having an initial amplitude AIT2 fixed to 1 in the signal processing circuit 20 is transmitted from the antenna element ANT2 through the transmission circuit TX2 and the antenna sharer SW2, and received in the remaining antenna elements ANT1, ANT3 and ANT4.

The following equation (8-7) expresses an amplitude fluctuation quantity AR 12 between transmission and receiving of the signal received in the signal processing circuit 20 through the antenna element ANT1, the antenna sharer SW1 and the receiving circuit RX1:

$$AR12 = ATX2 * A12 * ARX1 \tag{8-7}$$

Similarly, the following equation (8-8) expresses an amplitude fluctuation quantity AR32 between transmission and receiving of the signal received in the signal processing circuit 20 through the antenna element ANT3, the antenna sharer SW3 and the receiving circuit RX3:

$$AR32 = ATX2 * A23 * ARX3 \tag{8-8}$$

Similarly, the following equation (8-9) expresses an amplitude fluctuation quantity AR42 between transmission and receiving of the signal received in the signal processing circuit 20 through the antenna element ANT4, the antenna sharer SW4 and the receiving circuit RX4:

$$AR42 = ATX2 * A24 * ARX4 \tag{8-9}$$

The equation (8-7) is divided by the equation (8-8):

$$AR12/AR32 = ARX1/ARX3 * (A12/A23)$$

$$(ARX1/ARX3) = (AR12/AR32)/(A12/A23) \tag{8-10}$$

Similarly, the equation (8-8) is divided by the equation (8-9):

$$AR32/AR42 = ARX3/ARX4 * (A13/A24)$$

$$(ARX3/ARX4) = (AR32/AR42)/(A23/A24) \tag{8-11}$$

Similarly, the equation (8-9) is divided by the equation (8-7):

$$AR42/AR12 = ARX4/ARX1 * (A24/A12)$$

$$(ARX4/ARX1) = (AR42/AR12)/(A24/A12) \tag{8-12}$$

③ In the structure shown in FIG. 67, a signal having an initial amplitude AIT3 fixed to 1 in the signal processing circuit 20 is transmitted from the antenna element ANT3 through the transmission circuit TX3 and the antenna sharer SW3, and received in the remaining antenna elements ANT1, ANT2 and ANT4.

The following equation (8-13) expresses an amplitude fluctuation quantity AR13 between transmission and receiving of the signal received in the signal processing circuit 20 through the antenna element ANT1, the antenna sharer SW1 and the receiving circuit RX1:

$$AR13 = ATX3*A13*ARX1 \tag{8-13}$$

Similarly, the following equation (8-14) expresses an amplitude fluctuation quantity AR23 between transmission and receiving of the signal received in the signal processing circuit 20 through the antenna element ANT2, the antenna sharer SW2 and the receiving circuit RX2:

$$AR23 = ATX3*A23*ARX2 \tag{8-14}$$

Similarly, the following equation (8-15) expresses an amplitude fluctuation quantity AR43 between transmission and receiving of the signal received in the signal processing circuit 20 through the antenna element ANT4, the antenna sharer SW4 and the receiving circuit RX4:

$$AR43 = ATX3A34*ARX4 \tag{8-15}$$

The equation (8-13) is divided by the equation (8-14):

$$AR13/AR23 = ARX1/ARX2*(A13/A23)$$

$$(ARX1/ARX2) = (AR13/AR23)/(A13/A23) \tag{8-16}$$

Similarly, the equation (8-14) is divided by the equation (8-15):

$$AR23/AR43 = ARX2/ARX4*(A23/A34)$$

$$(ARX2/ARX4) = (AR23/AR43)/(A23/A34) \tag{8-17}$$

Similarly, the equation (8-15) is subtracted from the equation (8-13):

$$AR43/AR13 = ARX4/ARX1*(A34/A13)$$

$$(ARX4/ARX1) = (AR43/AR13)/(A34/A13) \tag{8-18}$$

④ In the structure shown in FIG. 67, a signal having an initial amplitude AIT4 fixed to 1 in the signal processing circuit 20 is transmitted from the antenna element ANT4 through the transmission circuit TX4 and the antenna sharer SW4, and received in the remaining antenna elements ANT1, ANT2 and ANT3.

The following equation (8-19) expresses an amplitude fluctuation quantity AR14 between transmission and receiving of the signal received in the signal processing circuit 20 through the antenna element ANT1, the antenna sharer SW1 and the receiving circuit RX1:

$$AR14 = ATX4*A14*ARX1 \tag{8-19}$$

Similarly, the following equation (8-20) expresses an amplitude fluctuation quantity AR24 between transmission and receiving of the signal received in the signal processing circuit 20 through the antenna element ANT2, the antenna sharer SW2 and the receiving circuit RX2:

$$AR24 = ATX4*A24*ARX2 \tag{8-20}$$

Similarly, the following equation (8-21) expresses an amplitude fluctuation quantity AR34 between transmission and receiving of the signal received in the signal processing circuit 20 through the antenna element ANT3, the antenna sharer SW3 and the receiving circuit RX3:

$$AR34 = ATX4*A34*ARX3 \tag{8-21}$$

The equation (8-19) is divided by the equation (8-20):

$$AR14/AR24 = ARX1/ARX2*(A14/A24)$$

$$(ARX1/ARX2) = (AR14/AR24)/(A14/A24) \tag{8-22}$$

Similarly, the equation (8-20) is divided by the equation (8-21):

$$AR24/AR34 = ARX2/ARX3*(A24/A34)$$

$$(ARX2/ARX3) = (AR24/AR34)/(A24/A34) \tag{8-23}$$

Similarly, the equation (8-19) is divided by the equation (8-21):

$$AR14/AR34 = ARX1/ARX3*(A14/A34)$$

$$(ARX1/ARX3) = (AR14/AR34)/(A14/A34) \tag{8-24}$$

⑤ The difference (ARX1/ARX2) between the amplitude fluctuation quantities of the signals received in the antenna elements ANT1 and ANT2 is calculated.

While the difference (ARX1//ARX2) is found from each of the above equations (8-16) and (8-22), these equations are averaged in order to further improve the accuracy. The first terms on the right sides of these equations can be found from measured values, while rigorous values can be calculated from the distance between the antenna elements as to the second terms. Therefore, the following averaging is performed on the assumption that there is no measurement error only when the difference between the calculated values of these equations is not more than an error threshold. This also applies to the following description of the averaging:

$$(ARX1/ARX2) = [\{(AR14/AR24)/(A14/A24)\} + \{(AR13/AR23)/(A13/A23)\}]/2 \tag{8-25}$$

The right side of this equation is found on the basis of the measured values and the values previously calculated from the distance between the antenna elements as described above, and hence the value of the difference (ARX1/ARX2) is calculated.

⑥ The difference (ARX2/ARX3) between the amplitude fluctuation quantities of the signals received in the antenna elements ANT2 and ANT3 is calculated.

While the difference (ARX2/ARX3) is found from each of the above equations (8-4) and (8-23), these equations are averaged in order to further improve the accuracy:

$$(ARX2/ARX3) = [\{(AR21/AR31)/(A12/A13)\} + \{(AR24/AR34)/(A24/A34)\}]/2 \tag{8-26}$$

The right side of this equation is found from measured values and values previously calculated from the distance between the antenna elements, and hence the value of the difference (ARX2/ARX3) is calculated.

⑦ The difference (ARX3/ARX4) between the amplitude fluctuation quantities of the signals received in the antenna elements ANT3 and ANT4 is calculated.

While the difference (ARX3/ARX4) is found from each of the above equations (8-5) and (8-11), these equations are averaged in order to further improve the accuracy:

$$(ARX3/ARX4) = [\{(AR31/AR41)/(A13/A14)\} + \{(AR32/AR42)/(A23/A24)\}]/2 \tag{8-27}$$

The right side of this equation is found from measured values and values previously calculated from the distance between the antenna elements, and hence the value of the difference (ARX3/ARX4) is calculated.

⑧ The difference (ARX4/ARX1) between the amplitude fluctuation quantities of the signals received in the antenna elements ANT4 and ANT1 is calculated.

While the difference (ARX4/ARX1) is found from each of the above equations (8-12) and (8-18), these equations are averaged in order to further improve the accuracy:

$$(ARX4/ARX1)=[\{(AR42/AR12)/(A24/A12)\}+\{(AR43/AR13)/(A34/A13)\}]/2 \quad (8\text{-}28)$$

The right side of this equation is found from measured values and values previously calculated from the distance between the antenna elements, and hence the value of the difference (ARX4/ARX1) is calculated.

⑨ The receiving response vector is obtained.

Assuming that AR(1)=ARX1, AR(2)=ARX2, AR(3)=ARX3 and AR(4)=ARX4 represent the amplitude fluctuation quantities of the signals received by the antenna elements ANT1 to ANT4 of the four transmission systems respectively, a vector R having AR(1), AR(2), AR(3) and AR(4) as components is the receiving response vector of amplitude data.

While the differences between the amplitude fluctuation quantities are specifically calculated as the values (ARX1/ARX2), (ARX2/ARX3), (ARX3/ARX4) and (ARX4/ARX1) through measured values etc. as found in the above equations (8-25) to (8-28), the information is still insufficient for recognizing the values of the individual amplitude fluctuation quantities AR(1), AR(2), AR(3) and AR(4).

When setting the amplitude fluctuation quantity, e.g., AR(1), of any transmission system to a reference value 1, the amplitude fluctuation quantities of the remaining transmission systems can be individually calculated from the aforementioned calculated values of the differences. When setting AR(1)=1, for example, AR(1)/AR(2)=(ARX1/ARX2) results in AR(2)=AR(1)/(ARX1/ARX2), and the value AR(2) is calculated on the basis of the aforementioned measured values of the differences.

Similarly, AR(2)/AR(3)=(ARX2/ARX3) results in

AR(3)=AR(2)/(ARX2/ARX3), and the value AR(3) is calculated on the basis of the aforementioned measured values of the differences.

Similarly, AR(3)/AR(4)=(ARX3/ARX4) results in

AR(4)=AR(3)/(ARX3/ARX4), and the value AR(4) is calculated on the basis of the aforementioned measured values of the differences.

When setting the amplitude fluctuation quality of any transmission system to 1 as hereinabove described, the amplitude fluctuation quantities of the remaining transmission systems are individually found and it follows that the receiving response vector of amplitude data is obtained as a result.

Some methods of testing whether or not the aforementioned results of measurement are erroneous are now described.

(i) As to AR(4)/AR(1)=(ARX4/ARX1), AR(1)=1 is set and hence AR(4)/(ARX4/ARX1) must originally be substantially 1 if the measurement is correctly performed.

Therefore, rtmp=|AR(4)/(ARX4/ARX1)−1| is set for determining that the measurement is erroneous if rtmp is in excess of an error threshold.

(ii) Then, the above equations (8-10) and (8-24) are averaged for finding the difference (ARX1/ARX3) between the amplitude fluctuation quantities of the antenna elements ANT1 and ANT3.

$$(ARX1/ARX3)=[\{(AR12/AR32)/(A12/A23)\}+\{(AR14/AR34)/(A14/A34)\}]/2$$

A12=A23=A34=A14 hold, and hence:

$$(ARX1/ARX3)=\{(AR12/AR32)+(AR14/AR34)\}/2$$

The right side of this equation is found from measured values, and hence the value (ARX1/ARX3) is calculated.

While AR(1)/AR(3)=(ARX1/ARX3),

{AR(1)/AR(3)}/(ARX1/ARX3) must originally be substantially 1 if the measurement is correctly performed.

Therefore, rtmp=|{AR(1)/AR(3)}/(ARX1/ARX3)−1| is set for determining that the measurement is erroneous if rtmp is in excess of an error threshold.

(iii) Then, the above equations (8-17) and (8-6) are averaged for finding the difference (ARX2/ARX4) between the amplitude fluctuation quantities of the antenna elements ANT2 and ANT4.

$$(ARX2/ARX4)=[\{(AR23/AR43)/(A23/A34)\}+\{(AR21/AR41)/(A12/A14)\}]/2$$

A12=A23=A34=A14 holds, and hence:

$$(ARX2/ARX4)=\{(AR23/AR43)+(AR21/AR41)\}/2$$

The right side of this equation is found from measured values, and hence the value (ARX2/ARX4) is calculated.

While AR(2)/AR(4)=(ARX2/ARX4),

{AR(2)/AR(4)}/(ARX2/ARX4) must originally be substantially 1 if the measurement is correctly performed.

Therefore, rtmp=|{AR(2)/AR(4)}/(ARX2/ARX4)−1| is set for determining that the measurement is erroneous if rtmp is in excess of an error threshold.

(2) Method of Measuring Transmission Response Vector

A method of measuring the transmission response vector is now described.

① The difference (ATX1/ATX2) between the amplitude fluctuation quantities of the transmitted signals of the antenna elements ANT1 and ANT2 is calculated.

The above equation (8-2) is divided by the equation (8-8):

$$AR31/AR32=ATX1/ATX2*(A13/A23)$$

$$(ATX1/ATX2)=(AR31/AR32)/(A13/A23) \quad (8\text{-}29)$$

Similarly, the equation (8-3) is divided by the equation (8-9):

$$AR41/AR42=ATX1/ATX2*(A14/A24)$$

$$(ATX1/ATX2)=(AR41/AR42)/(A14/A24) \quad (8\text{-}30)$$

While the difference (ATX1/ATX2) is found from each of the above equations (8-29) and (8-30), these equations are averaged in order to further improve the accuracy:

$$(ATX1/ATX2)=[\{(AR31/AR32)/(A13/A23)\}+\{(AR41/AR42)/(A14/A24)\}]/2 \quad (8\text{-}31)$$

The right side of this equation is found from measured values and values previously calculated from the distance between the antenna elements, and hence the value of the difference (ATX1/ATX2) is calculated.

② The difference (ATX2/ATX3) between the amplitude fluctuation quantities of the transmitted signals of the antenna elements ANT2 and ANT3 is calculated.

The above equation (8-7) is divided by the equation (8-13):

$$AR12/AR13 = ATX2/ATX3 * (A12/A13)$$

$$(ATX2/ATX3) = (AR12/AR13)/(A12/A13) \quad (8\text{-}32)$$

Similarly, the equation (8-9) is divided by the equation (8-15):

$$AR42/AR43 = ATX2/ATX3 * (A24/A34)$$

$$(ATX2/ATX3) = (AR42/AR43)/(A24/A34) \quad (8\text{-}33)$$

While the difference (ATX2/ATX3) is found from each of the above equations (8-32) and (8-33), these equations are averaged in order to further improve the accuracy:

$$(ATX2/ATX3) = [\{(AR12/AR13)/(A12/A13)\} + \{(AR42/AR43)/(A24/A34)\}]/2 \quad (8\text{-}34)$$

The right side of this equation is found from measured values and values previously calculated from the distance between the antenna elements, and hence the value of the difference (ATX2/ATX3) is calculated.

③ The difference (ATX3/ATX4) between the amplitude fluctuation quantities of the transmitted signals of the antenna elements ANT3 and ANT4 is calculated.

The above equation (8-13) is divided by the equation (8-19):

$$AR13/AR14 = ATX3/ATX4 * (A13/A14)$$

$$(ATX3/ATX4) = (AR13/AR14)/(A13/A14) \quad (8\text{-}35)$$

Similarly, the equation (8-14) is divided by the equation (8-20):

$$AR23/AR24 = ATX3/ATX4 * (A23/A24)$$

$$(ATX3/ATX4) = (AR23/AR24)/(A23/A24) \quad (8\text{-}36)$$

While the difference (ATX3/ATX4) is found from each of the above equations (8-35) and (8-36), these equations are averaged in order to further improve the accuracy:

$$(ATX3/ATX4) = [\{(AR13/AR14)/(A13/A14)\} + \{(AR23/AR24)/(A23/A24)\}]/2 \quad (8\text{-}37)$$

The right side of this equation is found from measured values and values previously calculated from the distance between the antenna elements, and hence the value of the difference (ATX3/ATX4) is calculated.

④ The difference (ATX4/ATX1) between the amplitude fluctuation quantities of the transmitted signals of the antenna elements ANT4 and ANT1 is calculated.

The above equation (8-20) is divided by the equation (8-1):

$$AR24/AR21 = ATX4/ATX1 * (A24/A12)$$

$$(ATX4/ATX1) = (AR24/AR21)/(A24/A12) \quad (8\text{-}38)$$

Similarly, the equation (8-21) is divided by the equation (8-2):

$$AR34/AR31 = ATX4/ATX1 * (A34/A13)$$

$$(ATX4/ATX1) = (AR34/AR31)/(A34/A13) \quad (8\text{-}39)$$

While the difference (ATX4/ATX1) is found from each of the above equations (8-38) and (8-39), these equations are averaged in order to further improve the accuracy:

$$(ATX4/ATX1) = [\{(AR24/AR21)/(A24/A12)\} + \{(AR34/AR31)/(A34/A13)\}]/2 \quad (8\text{-}40)$$

The right side of this equation is found from measured values and values previously calculated from the distance between the antenna elements, and hence the value of the difference (ATX4/ATX1) is calculated.

⑤ The transmission response vector is obtained.

Assuming that AT(1)=ATX1, AT(2)=ATX2, AT(3)=ATX3 and AT(4) ATX4 represent the amplitude fluctuation quantities of the signals transmitted by the antenna elements ANT1 to ANT4 of the four transmission systems respectively, a vector T having (AT(1), AT(2), AT(3), AT(4)) as components is the transmission response vector of amplitude data.

While the differences between the amplitude fluctuation quantities are specifically calculated as the values (ATX1/ATX2), (ATX2/ATX3), (ATX3/ATX4) and (ATX4/ATX1) through measured values as found in the above equations (8-31), (8-34), (8-37) and (8-40), the information is still insufficient for recognizing the values of the individual amplitude fluctuation quantities AT(1), AT(2), AT(3) and AT(4).

When setting the amplitude fluctuation quantity, e.g., AT(1), of any transmission system to a reference value 1, the amplitude fluctuation quantities of the remaining transmission systems can be individually calculated from the aforementioned calculated values of the differences. When setting AT(1)=1, for example, AT(1)/AT(2)=(ATX1/ATX2) results in AT(2)=AT(1)/(ATX1/ATX2), and the value AT(2) is calculated on the basis of the aforementioned measured values of the differences.

Similarly, AT(2)/AT(3)=(ATX2/ATX3) results in

AT(3)=AT(2)/(ATX2/ATX3), and the value AT(3) is calculated on the basis of the aforementioned measured values of the differences.

Similarly, AT(3)/AT(4)=(ATX3/ATX4) results in

AT(4)=AT(3)/(ATX3/ATX4), and the value AT(4) is calculated on the basis of the aforementioned measured values of the differences.

When setting the amplitude fluctuation quantity of any transmission system to 1 as hereinabove described, the amplitude fluctuation quantities of the remaining transmission systems are individually obtained and it follows that the transmission response vector of amplitude data is obtained as a result.

Some methods of testing whether or not the aforementioned results of measurement are erroneous are now described.

(i) As to AT(4)/AT(1)=(ATX4/ATX1),

AT(1)=1 is set and hence AT(4)/(ATX4/ATX1) must originally be substantially 1 if the measurement is correctly performed.

Therefore, rtmp=|AT(4)/(ATX4/ATX1)−1| is set for determining that the measurement is erroneous if rtmp is in excess of an error threshold.

(ii) Then, the difference (ATX1/ATX3) between the amplitude fluctuation quantities of the antenna elements ANT1 and ANT3 is obtained.

The equation (8-1) is divided by the equation (8-14):

$$AR21/AR23 = ATX1/ATX3 * (A12/A23)$$

$$(ATX1/ATX3) = (AR21/AR23)/(A12/A23) \quad (8\text{-}41)$$

Similarly, the equation (8-3) is divided by the equation (8-15):

$$AR41/AR43 = ATX1/ATX3 * (A14/A34)$$

$$(ATX1/ATX3) = (AR41/AR43)/(A14/A34) \quad (8\text{-}42)$$

These equations (8-41) and (8-42) are averaged:

$$(ATX1/ATX3) = [\{(AR21/AR23)/(A12/A23)\} + \{(AR41/AR43)/(A14/A34)\}]/2$$

A12=A23=A34=A14 holds, and hence:

$$(ATX1/ATX3) = \{(AR21/AR23) + (AR41/AR43)\}/2$$

The right side of this equation is found from measured values, and hence the value (ATX1/ATX3) is calculated.

While AT(1)/AT(3)=(ATX1/ATX3), $\{AT(1)/AT(3)\}/(ATX1/ATX3)$ must originally be substantially 1 if the measurement is correctly performed.

Therefore, rtmp=|$\{AT(1)/AT(3)\}/(ATX1/ATX3)-1$| is set for determining that the measurement is erroneous if rtmp is in excess of an error threshold.

(iii) Then, the difference (ATX2/ATX4) between the amplitude fluctuation quantities of the antenna elements ANT2 and ANT4 is obtained.

The equation (8-7) is divided the equation (8-19):

$$AR12/AR14 = ATX2/ATX4 * (A12/A14)$$

$$(ATX2/ATX4) = (AR12/AR14)/(A12/A14) \quad (8\text{-}43)$$

Similarly, the equation (8-8) is divided by the equation (8-21):

$$AR32/AR34 = ATX2/ATX4 * (A23/A34)$$

$$(ATX2/ATX4) = (AR32/AR34)/(A23/A34) \quad (8\text{-}44)$$

The equations (8-43) and (8-44) are averaged:

$$(ATX2/ATX4) = [\{(AR12/AR14)/(A12/A14)\} + \{(AR32/AR34)/(A23/A34)\}]/2$$

A12=A23=A34=A14 holds, and hence:

$$(ATX2/ATX4) = \{(AR12/AR14) + (AR32/AR34)\}/2$$

The right side of this equation is found from measured values, and hence the value (ATX2/ATX4) is calculated.

While AT(2)/AT(4)=(ATX2/ATX4), $\{AT(2)/AT(4)\}/(ATX2/ATX4)$ must originally be substantially 1 if the measurement is correctly performed.

Therefore, rtmp=|$\{AT(2)/AT(4)\}/(ATX2/ATX4)-1$| is set for determining that the measurement is erroneous if rtmp is in excess of an error threshold.

(3) Calibration

The difference in the amplitude fluctuation quantity between receiving and transmission, i.e., an amplitude correction quantity can be calculated for each corresponding transmission system by subtracting the amplitude fluctuation quantities AT(1), AT(2), AT(3) and AT(4) of the transmission response vector AT from the amplitude fluctuation quantities AR(1), AR(2), AR(3) and AR(4) of the receiving response vector AR calculated in the aforementioned manner.

The signal processing circuit 20 executes calibration of the amplitude fluctuation quantities by previously shifting the initial amplitude of the transmitted signal, for example, through the amplitude correction quantity calculated for each transmission system in the aforementioned manner.

According to the present invention, as hereinabove described, information related to transmission characteristics of each transmission system is estimated on the basis of a known signal transmitted from each transmission system and a received signal measured therein in a radio apparatus including a plurality of transmission systems, whereby calibration of the transmission characteristics between a receiving circuit and a transmission circuit of each transmission system can be performed in a simple structure at a low cost, without separately providing a specific measuring circuit.

What is claimed is:

1. A radio apparatus capable of calibrating transmission characteristics, comprising:

n (n: integer greater than or equal to 3) signal transmission systems each including an antenna (ANT) as well as a transmission circuit (TX) and a receiving circuit (RX) sharing said antenna;

control means (22) performing control for transmitting a known signal from said transmission circuit of each of said n signal transmission systems and receiving said transmitted signal in said receiving circuits of a plurality of signal transmission systems included in said n signal transmission systems in calibration;

signal processing means (PE, AE) provided for each said signal transmission system for performing prescribed signal processing on a signal received in said receiving circuit of said signal transmission system with said known signal;

storage means (21) storing signals obtained by said signal processing means in said plurality of signal transmission systems; and arithmetic means (22) calculating information related to at least either a phase rotation quantity or an amplitude fluctuation quantity resulting in a signal from passage of said signal through each of said transmission circuit and said receiving circuit of each of said n signal transmission systems on the basis of said signals stored in said storage means.

2. The radio apparatus according to claim 1, further comprising calibration means (PS, ATT) calibrating at least either said phase rotation quantity or said amplitude fluctuation quantity so that at least either the difference in a phase rotation quantity or the difference in an amplitude fluctuation quantity between said transmission circuit and said receiving circuit of each of said n signal transmission systems reaches 0 on the basis of said information calculated by said arithmetic means.

3. The radio apparatus according to claim 1, further comprising calibration means (ATT) calibrating said amplitude fluctuation quantity so that differences in amplitude fluctuation quantities between said transmission circuits and said receiving circuits of said n signal transmission systems are equal to each other among said n signal transmission systems on the basis of said information calculated by said arithmetic means.

4. The radio apparatus according to claim 1, wherein said control means performs control for receiving said known signal transmitted from said transmission circuit of each of said n signal transmission systems in said receiving circuits of all said n signal transmission systems.

5. The radio apparatus according to claim 1, wherein said control means performs control for receiving said known signal transmitted from said transmission circuit of each of said n signal transmission systems in said receiving circuits of said signal transmission systems, included in said n signal transmission systems, other than said signal transmission system transmitting said known signal.

6. The radio apparatus according to claim 1, wherein said control means serially performs transmission of said signal from said transmission circuit of each of said n signal transmission systems.

7. The radio apparatus according to claim 5, wherein said control means simultaneously performs transmission of said signal from said transmission circuit of each of said n transmission systems.

8. The radio apparatus according to claim 6, wherein said signal processing means includes:

means (MP) dividing each of signals received in said receiving circuit of each of said signal transmission systems from said respective transmission circuits of said signal transmission systems by said known signal, and means (SP) extracting a phase component and an amplitude component of each signal obtained by said division, and said arithmetic means includes:

means deriving first simultaneous linear equations consisting of unknown variables related to phase rotation quantities of said respective transmission circuits and said respective receiving circuits of said signal transmission systems and said phase components extracted by said respective signal processing means of said signal transmission systems, means deriving second simultaneous linear equations consisting of unknown variables related to amplitude fluctuation quantities of said respective transmission circuits and said respective receiving circuits of said signal transmission systems and said amplitude components extracted by said respective signal processing means of said signal transmission systems, and means solving said first and second simultaneous linear equations for calculating information related to said phase rotation quantities and said amplitude fluctuation quantities as said unknown variables.

9. The radio apparatus according to claim 6, wherein said signal processing means includes:

means (MP) dividing each of signals received in said receiving circuit of each of said signal transmission systems from said respective transmission circuits of said signal transmission systems by said known signal, and means (SP) calculating the natural logarithm of each signal obtained by said division and separating said natural logarithm into an imaginary part and a real part, and said arithmetic means includes:

means deriving first simultaneous linear equations consisting of unknown variables related to phase rotation quantities of said respective transmission circuits and said respective receiving circuits of said signal transmission systems and said imaginary parts separated by said respective signal processing means of said signal transmission systems, means deriving second simultaneous linear equations consisting of unknown variables related to amplitude fluctuation quantities of said respective transmission circuits and said respective receiving circuits of said signal transmission systems and said real parts separated by said respective signal processing means of said signal transmission systems, and means solving said first and second simultaneous linear equations for calculating information related to said phase rotation quantities and said amplitude fluctuation quantities as said unknown variables.

10. The radio apparatus according to claim 6, wherein said signal processing means includes:

means (SP) calculating the natural logarithm of each of signals received in said receiving circuit of each of said signal transmission systems from said respective transmission circuits of said signal transmission systems and separating said natural logarithm into an imaginary part and a real part, means (SA) performing first subtraction for subtracting an imaginary part of a signal found by calculating the natural logarithm of said known signal from said separated imaginary part, and means (SB) performing second subtraction for subtracting a real part of said signal found by calculating the natural logarithm of said known signal from said separated real part, and said arithmetic means includes:

means deriving first simultaneous linear equations consisting of unknown variables related to phase rotation quantities of said respective transmission circuits and said respective receiving circuits of said signal transmission systems and imaginary parts obtained through said first subtraction by said respective signal processing means of said signal transmission systems, means deriving second simultaneous linear equations consisting of unknown variables related to amplitude fluctuation quantities of said respective transmission circuits and said respective receiving circuits of said signal transmission systems and real parts obtained through said second subtraction by said respective signal processing means of said signal transmission systems, and means solving said first and second simultaneous linear equations for calculating information related to said phase rotation quantities and said amplitude fluctuation quantities as said unknown variables.

11. The radio apparatus according to claim 6, wherein said prescribed signal processing of said signal processing means includes time averaging of signals.

12. The radio apparatus according to claim 11, wherein said signal processing means includes:

means (MP) dividing each of signals received in said receiving circuit of each of said signal transmission systems from said respective transmission circuits of said signal transmission systems by said known signal, means (TA) time-averaging each of signals obtained by said division, and means (SP) calculating the natural logarithm of each of said time-averaged signals and separating said natural logarithm into an imaginary part and a real part, and said arithmetic means includes:

means deriving first simultaneous linear equations consisting of unknown variables related to phase rotation quantities of said respective transmission circuits and said respective receiving circuits of said signal transmission systems and said imaginary parts separated by said respective signal processing means of said signal transmission systems, means deriving second simultaneous linear equations consisting of unknown variables related to amplitude fluctuation quantities of said respective transmission circuits and said respective receiving circuits of said signal transmission systems and said real parts separated by said respective signal processing means of said signal transmission systems, and means solving said first and second simultaneous linear equations for calculating information related to said phase rotation quantities and said amplitude fluctuation quantities as said unknown variables.

13. The radio apparatus according to claim 11, wherein said signal processing means includes:

means (MP) dividing each of signals received in said receiving circuit of each of said signal transmission systems from said respective transmission circuits of said signal transmission systems by said known signal, means (SP) extracting a phase component and an amplitude component of each signal obtained by said division, and means (TA) time-averaging each of said extracted phase component and said extracted amplitude component, and said arithmetic means includes:

means deriving first simultaneous linear equations consisting of unknown variables related to phase rotation quantities of said respective transmission circuits and said respective receiving circuits of said signal transmission systems and said phase components time-averaged by said respective signal processing means of said signal transmission systems, means deriving second simultaneous linear equations consisting of unknown variables related to amplitude fluctuation quantities of said respective transmission circuits and said respective receiving circuits of said signal transmission systems and said amplitude components time-averaged by said respective signal processing means of said signal transmission systems, and means solving said first and second simultaneous linear equations for calculating information related to said phase rotation quantities and said amplitude fluctuation quantities as said unknown variables.

14. The radio apparatus according to claim 11, wherein said signal processing means includes:

means (MP) dividing each of signals received in said receiving circuit of each of said signal transmission systems from said respective transmission circuits of said respective signal transmission systems by said known signal, means (SP) calculating the natural logarithm of each signal obtained by said division and separating said natural logarithm into an imaginary part and a real part, and means (TA) time-averaging each of said separated imaginary part and said separated real part, and said arithmetic means includes:

means deriving first simultaneous linear equations consisting of unknown variables related to phase rotation quantities of said respective transmission circuits and said respective receiving circuits of said signal transmission systems and said imaginary parts time-averaged by said respective signal processing means of said signal transmission systems, means deriving second simultaneous linear equations consisting of unknown variables related to amplitude fluctuation quantities of said respective transmission circuits and said respective receiving circuits of said signal transmission systems and said real parts time-averaged by said respective signal processing means of said signal transmission systems, and means solving said first and second simultaneous linear equations for calculating information related to said phase rotation quantities and said amplitude fluctuation quantities as said unknown variables.

15. The radio apparatus according to claim 11, wherein said signal processing means includes:

means) (mp) dividing each of signals received in said receiving circuit of each of said signal transmission systems from said respective transmission circuits of said signal transmission systems by said known signal, means (LC) calculating the natural logarithm of each signal obtained by said division, means (TA) time-averaging each signal obtained by calculation of the natural logarithm, and means (IQ) separating said time-averaged signal into an imaginary part and a real part, and said arithmetic means includes:

means deriving first simultaneous linear equations consisting of unknown variables related to phase rotation quantities of said respective transmission circuits and said respective receiving circuits of said signal transmission systems and said imaginary parts separated by said respective signal processing means of said signal transmission systems, means deriving second simultaneous linear equations consisting of unknown variables related to amplitude fluctuation quantities of said respective transmission circuits and said respective receiving circuits of said signal transmission systems and said real parts separated by said respective signal processing means of said signal transmission systems, and means solving said first and second simultaneous linear equations for calculating information related to said phase rotation quantities and said amplitude fluctuation quantities as said unknown variables.

16. The radio apparatus according to claim 11, wherein said signal processing means includes:

means (SP) calculating the natural logarithm of each of signals received in said receiving circuit of each of said signal transmission systems from said respective transmission circuit of said signal transmission systems and separating said natural logarithm into an imaginary part and a real part, means (TA) time-averaging each of said separated imaginary part and said separated real part, means (SA) performing first subtraction for subtracting an imaginary part of a signal found by calculating the natural logarithm of said known signal from said time-averaged imaginary part, and means (SB) performing second subtraction for subtracting a real part of said signal found by calculating the natural logarithm of said known signal from said time-averaged real part, and said arithmetic means includes:

means deriving first simultaneous linear equations consisting of unknown variables related to phase rotation quantities of said respective transmission circuits and said respective receiving circuits of said signal transmission systems and imaginary parts obtained through said first subtraction by said respective signal processing means of said signal transmission systems, means deriving second simultaneous linear equations consisting of unknown variables related to amplitude fluctuation quantities of said respective transmission circuits and said respective receiving circuits of said signal transmission systems and real parts obtained through said second subtraction by said respective signal processing means of said signal transmission systems, and means solving said first and second simultaneous linear equations for calculating information related to said phase rotation quantities and said amplitude fluctuation quantities as said unknown variables.

17. The radio apparatus according to claim 11, wherein said signal processing means includes:

means (LC) calculating the natural logarithm of each of signals received in said receiving circuit of each of said signal transmission systems from said respective transmission circuits of said signal transmission systems, means (TA) time-averaging each signal obtained by calculation of the natural logarithm, means (IQ) separating said time-averaged signal into an imaginary part and a real part, means (SA) performing first subtraction for subtracting an imaginary part of a signal found by calculating the natural logarithm of said known signal from said separated imaginary part, and means (SB) performing second subtraction for subtracting a real part of said signal found by calculating the natural logarithm of said known signal from said separated real part, and said arithmetic means includes:

means deriving first simultaneous linear equations consisting of unknown variables related to phase rotation quantities of said respective transmission circuits and said respective receiving circuits of said signal transmission systems and said imaginary parts obtained through said first subtraction by said respective signal processing means of said signal transmission systems, means deriving second simultaneous linear equations consisting of unknown variables related to amplitude fluctuation quantities of said respective transmission circuits and said respective receiving circuits of said signal transmission systems and real parts obtained through said second subtraction by said respective signal processing means of said signal transmission systems, and means solving said first and second simultaneous linear equations for calculating information related to said phase rotation quantities and said amplitude fluctuation quantities as said unknown variables.

18. The radio apparatus according to claim 1, wherein said prescribed signal processing of said signal processing means includes signal correlation processing.

19. The radio apparatus according to claim 18, wherein said signal processing means includes:

means (CR) performing correlation processing of each of signals received in said receiving circuit of each of said signal transmission systems from said respective transmission circuits of said signal transmission systems and said known signal, and means (SP) calculating the natural logarithm of each signal obtained by said correlation processing and separating said natural logarithm into an imaginary part and a real part, and said arithmetic means includes:

means deriving first simultaneous linear equations consisting of unknown variables related to phase rotation quantities of said respective transmission circuits and said respective receiving circuits of said signal transmission systems and said imaginary parts separated by said respective signal processing means of said signal transmission systems, means deriving second simultaneous linear equations consisting of unknown variables related to amplitude fluctuation quantities of said respective transmission circuits and said respective receiving circuits of said signal transmission systems and said real parts separated by said respective signal processing means of said signal transmission systems, and means solving said first and second simultaneous linear equations for calculating information related to said phase rotation quantities and said amplitude fluctuation quantities as said unknown variables.

20. The radio apparatus according to claim 5, further comprising means offsetting the difference between phase rotation quantities of said transmission circuit and said receiving circuit of each said signal transmission system and the difference between amplitude fluctuation quantities of said transmission circuit and said receiving circuit of each said signal transmission system so that differences between said phase rotation quantities differ from each other between said n signal transmission systems and differences between said amplitude fluctuation quantities differ from each other between said n signal transmission systems.

21. The radio apparatus according to claim 8, 9, 10, 12, 15, 16 or 17, wherein said arithmetic means selects equations derived in higher accuracy and employs selected said equations for calculating said unknown variables when the number of equations forming each said simultaneous linear equations is greater than the number of equations necessary for calculating said unknown variables.

22. The radio apparatus according to claim 21, wherein said arithmetic means employs non-selected said equations included in said equations forming each said simultaneous linear equations for verification of variables calculated with said selected equations.

23. The radio apparatus according to claim 2 or 3, further comprising means correcting the quantity of said calibration by said calibration means in response to the power of a signal input in said transmission circuit or said receiving circuit of each said signal transmission system.

24. A calibration method for a radio apparatus comprising n (n: integer greater than or equal to 3) signal transmission systems each including an antenna (ANT) as well as a transmission circuit (TX) and a receiving circuit (RX) sharing said antenna, comprising steps of:

performing control for transmitting a known signal from said transmission circuit of each of said n signal transmission systems and receiving said transmitted signal in said receiving circuits of a plurality of signal transmission systems included in said n signal transmission systems in calibration;

performing prescribed signal processing on a signal received in said receiving circuit with said known signal in each said signal transmission system;

storing signals obtained by said signal processing in said plurality of signal transmission systems;

calculating information related to at least either a phase rotation quantity or an amplitude fluctuation quantity resulting in a signal from passage of said signal through each of said transmission circuit and said receiving circuit of each of said n signal transmission systems on the basis of said stored signals; and calibrating at least either the difference in a phase rotation quantity or the difference in an amplitude fluctuation quantity between said transmission circuit and said receiving circuit of each of said n signal transmission systems on the basis of said calculated information.

25. The calibration method according to claim 24, wherein said step of performing control includes a step of performing control for receiving said known signal transmitted from said transmission circuit of each of said n signal transmission systems in said receiving circuits of all said n signal transmission systems.

26. The calibration method according to claim 24, wherein said step of performing control includes a step of performing control for receiving said known signal transmitted from said transmission circuit of each of said n signal transmission systems in said receiving circuits of said signal transmission systems, included in said n signal transmission systems, other than said signal transmission system transmitting said known signal.

27. The calibration method according to claim 24, wherein said step of performing control includes a step of serially performing transmission of said signal from said transmission circuit of each of said n signal transmission systems.

28. The calibration method according to claim 26, wherein said step of performing control includes a step of simultaneously performing transmission of said signal from said transmission circuit of each of said n transmission systems.

29. The calibration method according to claim 27, wherein said step of performing prescribed processing includes a step of time-averaging signals.

30. The calibration method according to claim 24, wherein said step of performing prescribed signal processing includes a step of performing correlation processing of signals.

31. The calibration method according to claim 26, further including a step of offsetting the difference between phase rotation quantities of said transmission circuit and said receiving circuit of each said signal transmission system and the difference between amplitude fluctuation quantities of said transmission circuit and said receiving circuit of each said signal transmission system so that differences between said phase rotation quantities differ from each other between said n signal transmission systems and differences between said amplitude fluctuation quantities differ from each other between said n signal transmission systems.

32. The calibration method according to claim 24, further including a step of correcting the quantity of said calibration through said calibrating step in response to the power of a signal input in said transmission circuit or said receiving circuit of each said signal transmission system.

33. A radio apparatus capable of calibrating transmission characteristics, comprising:
   four signal transmission systems each including an antenna element (ANT) as well as a transmission circuit (TX) and a receiving circuit (RX) sharing said antenna element, with said antenna element of each of said four signal transmission systems arranged to be located on a vertex of a square;
   means transmitting a signal having a fixed initial phase from said transmission circuit of each of said four signal transmission systems and receiving said signal in said receiving circuits of remaining said signal transmission systems excluding said signal transmission system transmitting said signal for measuring a phase rotation quantity from transmission to receiving of said signal for each of said signal transmission systems receiving said signal;
   means calculating the difference between phase rotation quantities of said receiving circuits of each pair of said signal transmission systems adjacent to each other on said square on the basis of said measured phase rotation quantities;
   means setting a phase rotation quantity of said receiving circuit of any one of said four signal transmission systems to a prescribed reference value thereby calculating a phase rotation quantity of said receiving circuit of each of remaining said signal transmission systems;
   means calculating the difference between phase rotation quantities of said transmission circuits of each pair of said signal transmission systems adjacent to each other on said square on the basis of said measured phase rotation quantities;
   means setting a phase rotation quantity of said transmission circuit of any one of said four signal transmission systems to a prescribed reference value thereby calculating a phase rotation quantity of said transmission circuit of each of remaining said signal transmission systems; and
   means calculating the difference between said phase rotation quantities of said receiving circuit and said transmission circuit calculated for each said signal transmission system as a phase correction quantity.

34. A radio apparatus capable of calibrating transmission characteristics, comprising:
   four signal transmission systems each including an antenna element (ANT) as well as a transmission circuit (TX) and a receiving circuit (RX) sharing said antenna element, with said antenna element of each of said four signal transmission systems arranged to be located on a vertex of a square;
   means transmitting a signal having a fixed initial amplitude from said transmission circuit of each of said four signal transmission systems and receiving said signal in said receiving circuits of remaining said signal transmission systems excluding said signal transmission system transmitting said signal for measuring an amplitude fluctuation quantity from transmission to receiving of said signal for each of said signal transmission systems receiving said signal;
   means calculating the difference between amplitude fluctuation quantities of said receiving circuits of each pair of said signal transmission systems adjacent to each other on said square on the basis of said measured amplitude fluctuation quantities;
   means setting a amplitude fluctuation quantity of said receiving circuit of any one of said four signal transmission systems to a prescribed reference value thereby calculating an amplitude fluctuation quantity of said receiving circuit of each of remaining said signal transmission systems;
   means calculating the difference between amplitude fluctuation quantities of said transmission circuits of each pair of said signal transmission systems adjacent to each other on said square on the basis of said measured amplitude fluctuation quantities;
   means setting an amplitude fluctuation quantity of said transmission circuit of any one of said four signal transmission systems to a prescribed reference value thereby calculating an amplitude fluctuation quantity of said transmission circuit of each of remaining said signal transmission systems; and
   means calculating the difference between said amplitude fluctuation quantities of said receiving circuit and said transmission circuit calculated for each said signal transmission system as an amplitude correction quantity.

* * * * *

UNITED STATES PATENT AND TRADEMARK OFFICE
CERTIFICATE OF CORRECTION

PATENT NO. : 6,870,878 B1  Page 1 of 1
DATED : March 22, 2005
INVENTOR(S) : Yoshiharu Doi et al.

It is certified that error appears in the above-identified patent and that said Letters Patent is hereby corrected as shown below:

<u>Column 68,</u>
Line 10, correct "capable of" into -- for --.
Line 12, correct "n:" into -- where n is an --.
Line 13, correct "as well as" into -- , --.

<u>Column 74,</u>
Line 43, correct "n:" into -- where n is an --.
Line 44, correct "as well as" into -- , --.

<u>Column 75,</u>
Line 50, correct "capable of" into -- for --.
Line 53, correct "as well as" into -- , --.

<u>Column 76,</u>
Line 24, correct "capable of" into -- for --.
Line 27, correct "as well as" into -- , --.

Signed and Sealed this

Twenty-eighth Day of March, 2006

JON W. DUDAS
*Director of the United States Patent and Trademark Office*